US008834619B2

(12) United States Patent
Nagata et al.

(10) Patent No.: US 8,834,619 B2
(45) Date of Patent: Sep. 16, 2014

(54) INK COMPOSITION, INK FOR INKJET RECORDING AND INKJET RECORDING METHOD

(71) Applicant: FUJIFILM Corporation, Tokyo (JP)

(72) Inventors: Yoshiaki Nagata, Kanagawa (JP); Keiichi Tateishi, Kanagawa (JP); Toshiharu Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/030,112

(22) Filed: Sep. 18, 2013

(65) Prior Publication Data

US 2014/0013997 A1 Jan. 16, 2014

Related U.S. Application Data

(63) Continuation of application No. PCT/JP2011/079555, filed on Dec. 20, 2011.

(30) Foreign Application Priority Data

Mar. 18, 2011 (JP) ................................ 2011-061444
Jun. 29, 2011 (JP) ................................ 2011-145035

(51) Int. Cl.

| | |
|---|---|
| ***C09D 11/02*** | (2014.01) |
| ***C09B 31/153*** | (2006.01) |
| ***C09B 31/072*** | (2006.01) |
| ***C09B 31/20*** | (2006.01) |
| ***C09B 31/28*** | (2006.01) |
| ***C09B 31/30*** | (2006.01) |
| ***C09D 11/00*** | (2014.01) |
| ***C09B 31/08*** | (2006.01) |
| ***C09B 35/60*** | (2006.01) |
| ***C09B 33/28*** | (2006.01) |
| ***C09B 56/04*** | (2006.01) |
| ***C09B 33/22*** | (2006.01) |
| ***C09B 33/26*** | (2006.01) |
| ***C09B 35/54*** | (2006.01) |

(52) U.S. Cl.

CPC .............. *C09D 11/328* (2013.01); *C09B 31/08* (2013.01); *C09B 35/60* (2013.01); *C09B 31/30* (2013.01); *C09B 31/28* (2013.01); *C09B 33/28* (2013.01); *C09B 56/04* (2013.01); *C09B 33/22* (2013.01); *C09B 33/26* (2013.01); *C09B 35/54* (2013.01); *C09B 31/20* (2013.01); *C09B 31/153* (2013.01)

USPC .................... 106/31.48; 106/31.5; 106/31.52; 534/752; 534/754; 534/755; 534/757; 534/797; 534/810

(58) Field of Classification Search

CPC .. C09D 11/328; C09B 31/153; C09B 31/072; C09B 31/20; C09B 31/28; C09B 31/30

USPC ........... 106/31.48, 31.52, 31.5; 534/752, 754, 534/755, 757, 797, 810

See application file for complete search history.

(56) References Cited

U.S. PATENT DOCUMENTS 7,402,201 B2 * 7/2008 Wachi et al. ............... 106/31.48
7,520,928 B2 * 4/2009 Ikeda et al. ................ 106/31.52

(Continued)

FOREIGN PATENT DOCUMENTS

JP 2003-306623 A 10/2003
JP 2005-139427 A 6/2005

(Continued)

OTHER PUBLICATIONS

Derwent Abstract for JP 2005/264090, Sep. 2005.*

(Continued)

*Primary Examiner* — Helene Klemanski
(74) *Attorney, Agent, or Firm* — Sughrue Mion, PLLC

(57) ABSTRACT

An ink composition containing at least two kinds of water-soluble long-wavelength dyes whose absorption spectrum in an aqueous solvent has a maximum wavelength of 550 nm to 700 nm, in which at least one kind of the water-soluble long-wavelength dyes is a first water-soluble long-wavelength dye of an azo compound represented by the following Formula (1), at least one kind of the water-soluble long-wavelength dyes is a second water-soluble long-wavelength dye that is different from the first water-soluble long-wavelength dye, and the second water-soluble long-wavelength dye is a compound having two to four azo groups conjugated with each other per molecule, an ink for inkjet recording using the ink composition, and an inkjet recording method using the ink for inkjet recording using the ink for inkjet recording.

Formula (1):

Formula (1)

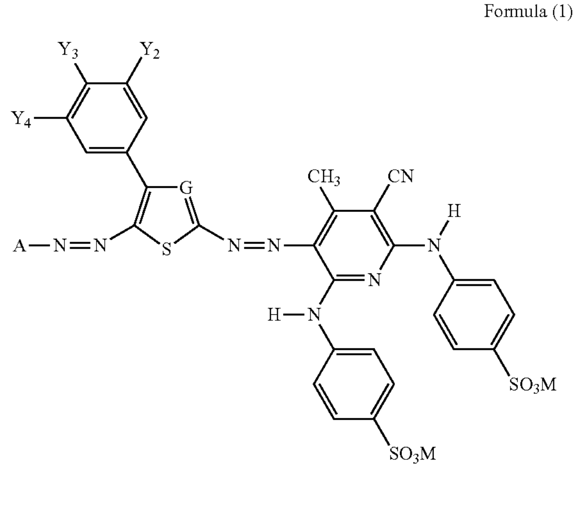

19 Claims, No Drawings

(56) References Cited

U.S. PATENT DOCUMENTS

| | | | | |
|---|---|---|---|---|
| 8,372,190 | B2 * | 2/2013 | Tateishi et al. | 106/31.5 |
| 8,585,781 | B2 * | 11/2013 | Tateishi et al. | 106/31.52 |
| 8,603,191 | B2 * | 12/2013 | Tateishi et al. | 106/31.52 |
| 2004/0020404 | A1 | 2/2004 | Popat et al. | |
| 2005/0150420 | A1 | 7/2005 | Takasaki et al. | |
| 2005/0243151 | A1 | 11/2005 | Chino et al. | |
| 2006/0060108 | A1 | 3/2006 | Devonald | |
| 2006/0144288 | A1 | 7/2006 | Ohno et al. | |
| 2006/0162616 | A1 | 7/2006 | Chino et al. | |
| 2007/0062409 | A1 | 3/2007 | Mistry et al. | |
| 2007/0107628 | A1 | 5/2007 | Matsui et al. | |
| 2007/0109376 | A1 | 5/2007 | Tojo et al. | |
| 2007/0263056 | A1 | 11/2007 | Fukumoto et al. | |
| 2007/0266890 | A1 * | 11/2007 | Taguchi et al. | 106/31.47 |
| 2008/0043078 | A1 | 2/2008 | Wachi | |
| 2009/0011130 | A1 | 1/2009 | Mafune et al. | |
| 2009/0238976 | A1 | 9/2009 | Ishii et al. | |

FOREIGN PATENT DOCUMENTS

| | | | |
|---|---|---|---|
| JP | 2005-220338 | A | 8/2005 |
| JP | 2005-264090 | A | 9/2005 |
| JP | 2006-282795 | A | 10/2006 |
| JP | 2007-517082 | A | 6/2007 |
| JP | 2007-302801 | A | 11/2007 |
| JP | 2008-001881 | A | 1/2008 |
| JP | 2008-506791 | A | 3/2008 |
| JP | 2009-030023 | A | 2/2009 |
| JP | 2009-256601 | A | 11/2009 |
| JP | 4502274 | B2 | 4/2010 |
| JP | 4517174 | B2 | 5/2010 |
| JP | 4518302 | B2 | 5/2010 |
| JP | 4533136 | B2 | 6/2010 |
| JP | 2010-155936 | A | 7/2010 |
| JP | 2010-159312 | A | 7/2010 |
| JP | 4473135 | B2 | 3/2012 |
| WO | 03087238 | A1 | 10/2003 |
| WO | 03106572 | A1 | 12/2003 |
| WO | 2004046265 | A1 | 6/2004 |
| WO | 2004113463 | A1 | 12/2004 |
| WO | 2005052065 | A1 | 6/2005 |
| WO | WO 2009/057712 | A1 * | 5/2009 |
| WO | 2010041065 | A1 | 4/2010 |

OTHER PUBLICATIONS

International Preliminary Report on Patentability issued Oct. 3, 2013, in International Application No. PCT/JP2011/079555.

International Search Report [PCT/ISA/210] issued Feb. 14, 2012 in International Application No. PCT/JP2011/079555.

Written Opinion [PCT/ISA/237] issued Feb. 14, 2012 in International Application No. PCT/JP2011/079555.

* cited by examiner

INK COMPOSITION, INK FOR INKJET RECORDING AND INKJET RECORDING METHOD

CROSS REFERENCE TO RELATED APPLICATION

This is a continuation of International Application No. PCT/JP2011/079555 filed on Dec. 20, 2011, and claims priority from Japanese Patent application Nos. 2011-061444 and 2011-145035, filed on Mar. 18, 2011 and Jun. 29, 2011, respectively, the entire disclosures of which are incorporated herein by reference.

TECHNICAL FIELD

The present invention relates to an ink composition, specifically an ink composition capable of forming an image which is excellent in light resistance and ozone resistance, and having a good coloring balance. Further, the present invention relates to an ink for inkjet recording and an inkjet recording method using the ink composition.

BACKGROUND ART

Recently, an inkjet recording method is rapidly spread and more developed because material cost is low, high-speed recording is feasible, a noise is low while recording is performed, and color recording is easy.

The inkjet recording method includes a continuous manner that continuously disperses a liquid drop and an on-demand manner that disperses a liquid drop according to an image information signal as the inkjet recording method, and a discharging manner includes a manner that discharges a liquid drop by applying pressure by a piezo element, a manner that discharges a liquid drop by generating bubbles in ink by heat, a manner that uses an ultrasonic wave, and a manner that absorbs a liquid drop by electrostatic force and discharge it.

Further, an aqueous ink, an oily ink or a solid (melt type) ink is used as an ink for inkjet recording.

A colorant used in ink for inkjet recording needs to ensure favorable solubility or polydispersity to a solvent, recording at a high concentration, favorable colors, fastness to light, heat, and active gas ($NO_x$, $SO_x$ other than oxidative gas such as ozone, or the like) in an environment, excellent fastness to water or chemicals, good settlement to an image-receiving material, low spreading, excellent preservation as ink, non-toxicity, high purity, and availableness at low price.

Various dyes and pigments have already been suggested for inkjet and have been used in practice, but an ink satisfying all requirements has not been found yet. It is difficult to combine color and fastness required to an ink for inkjet recording by using conventionally well-known dyes or pigments such as those with a color index (C. I.) number.

Recently, a disazo colorant, a trisazo colorant or a tetrakisazo colorant has been reviewed as a dye for black ink, but it has not satisfied a market demand for fastness to light and ozone gas.

Further, in addition to the above-mentioned points, the inkjet ink needs to ensure improvement of grey balance in a range from a high-concentration region to a low-concentration region from the viewpoint of image quality improvement of recorded matters obtained.

RELATED ART

Patent Document

Patent Document 1: Japanese Patent Application Laid-Open No. 2003-306623

Patent Document 2: Japanese Patent Application Laid-Open No. 2005-139427

Patent Document 3: Japanese Patent Application Laid-Open No. 2005-220338

Patent Document 4: Japanese Patent Application Laid-Open No. 2008-001881

Patent Document 5: Japanese Patent No. 4518302

Patent Document 6: International Publication No. WO10/041065

Patent Document 7: Japanese Patent Application Laid-Open No. 2010-155936

Patent Document 8: Japanese Patent No. 4502274

Patent Document 9: Japanese National Publication of International Patent Application No. 2007-517082

Patent Document 10: Japanese Patent No. 4473135

Patent Document 11: Japanese Patent No. 4533136

Patent Document 12: Japanese Patent Application Laid-Open No. 2007-302801

Patent Document 13: Japanese Patent No. 4517174

DISCLOSURE OF INVENTION

Problems to be Solved by the Invention

The performance improvement of the ink for inkjet recording has been made by the studies so far achieved. Patent Documents 1 to 13 discloses a disazo colorant, a trisazo colorant or a tetrakisazo colorant as a dye for black ink. In addition, in the examples of Patent Documents 1 to 13, fastness to light and ozone gas is evaluated with respect to a specific trisazo colorant or tetrakisazo colorant.

Recently, in consideration of diversified usage environment of black ink, there is a need for an ink having a fastness to light and ozone gas at a higher level and having an excellent grey balance in a range from a high-concentration region to a low-concentration region.

Specifically, from the viewpoint of the image quality improvement of recorded matters obtained, the inkjet ink needs to ensure improvement of grey balance in a range from a high-concentration region to a low-concentration region in addition to the fastness to light and ozone gas.

The present invention has been made in order to solve the above-mentioned problems, and an object thereof is to provide an ink composition capable of forming an image which is excellent in fastness to light and ozone gas, and having an excellent grey balance in a range from a high-concentration region to a low-concentration region, an ink for inkjet recording using the ink composition, and an inkjet recording method using the ink for inkjet recording.

Means for Solving the Problems

The present inventors have intensively reviewed an ink composition capable of forming an image which is excellent in light resistance and ozone resistance, and having a good coloring balance, and have found out that the above-mentioned problems may be solved by combining a specific water-soluble long-wavelength dye, thereby completing the present invention.

The means for solving the above-mentioned problems is as follows.

[1] An ink composition containing at least two kinds of water-soluble long-wavelength dyes whose absorption spectrum in an aqueous solvent has a maximum wavelength of 550 nm to 700 nm, in which at least one kind of the water-soluble long-wavelength dyes is a first water-soluble long-wavelength dye of an azo compound represented by the following Formula (1), at least one kind of the water-soluble long-wavelength dyes is a second water-soluble long-wavelength dye that is different from the first water-soluble long-wavelength dye, and the second water-soluble long-wavelength dye is a compound having two to four azo groups conjugated with each other per molecule.

Formula (1)

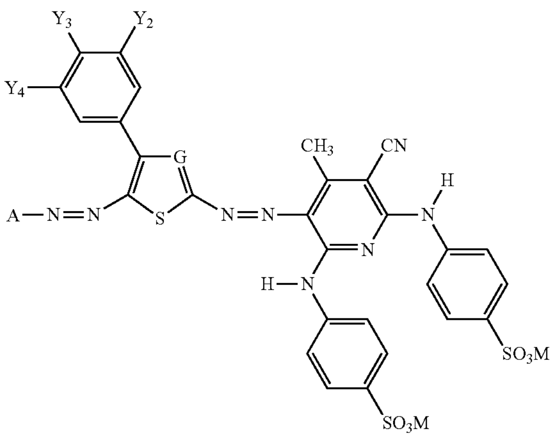

(In Formula (1), A represents a substituted or unsubstituted aryl group or a substituted or unsubstituted nitrogen-containing 5-membered heterocyclic group. G represents a nitrogen atom or —C($R_2$)═. $R_2$ represents a hydrogen atom, a sulfo group, a carboxyl group, a substituted or unsubstituted carbamoyl group or a cyano group. $Y_2$, $Y_3$ and $Y_4$ each independently represent a hydrogen atom or a monovalent substituent. $Y_2$, $Y_3$ and $Y_4$ may be bound with each other to form a ring. All of $Y_2$, $Y_3$ and $Y_4$ do not represent a hydrogen atom at the same time. M's each independently represent a hydrogen atom or a monovalent countercation.)

[2] The ink composition of [1], in which the azo compound represented by Formula (1) is an azo compound represented by the following Formula (2-1).

Formula (2-1)

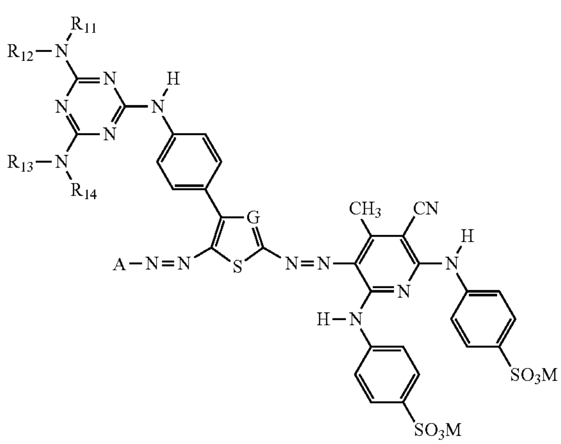

(In Formula (2-1), G represents a nitrogen atom or —C($R_2$)═. $R_2$ represents a hydrogen atom, a sulfo group, a carboxyl group, a substituted or unsubstituted carbamoyl group or a cyano group. $R_{11}$, $R_{12}$, $R_{13}$ and $R_{14}$ each independently represent a hydrogen atom or a monovalent substituent. A represents a substituted or unsubstituted aryl group or a substituted or unsubstituted nitrogen-containing 5-membered heterocyclic group. M's each independently represent a hydrogen atom or a monovalent countercation.)

[3] The ink composition of [1] or [2], in which the azo compound represented by Formula (1) or (2-1) is an azo compound represented by the following Formula (3-1).

Formula (3-1)

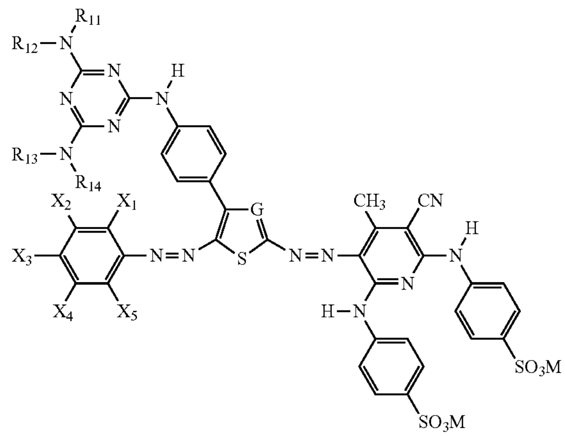

(In Formula (3-1), G represents a nitrogen atom or —C($R_2$)═. $R_2$ represents a hydrogen atom, a sulfo group, a carboxyl group, a substituted or unsubstituted carbamoyl group or a cyano group. $R_{11}$, $R_{12}$, $R_{13}$ and $R_{14}$ each independently represent a hydrogen atom or a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

[4] The ink composition of any one of [1] to [3], in which the azo compound represented by Formula (1), (2-1) or (3-1) is an azo compound represented by the following Formula (4-1).

Formula (4-1)

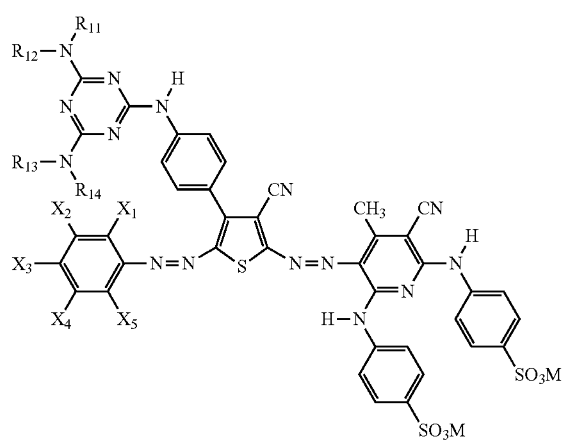

(In Formula (4-1), $R_{11}$, $R_{12}$, $R_{13}$ and $R_{14}$ each independently represent a hydrogen atom or a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

[5] The ink composition of [1], in which the azo compound represented by Formula (1) is an azo compound represented by the following Formula (2-2).

Formula (2-2)

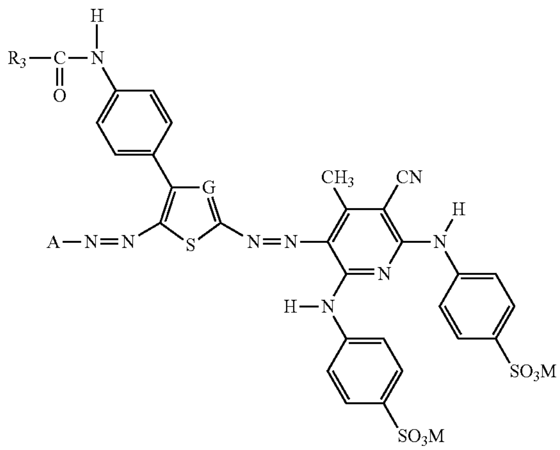

(In Formula (2-2), G represents a nitrogen atom or —C($R_2$)═. $R_2$ represents a hydrogen atom, a sulfo group, a carboxyl group, a substituted or unsubstituted carbamoyl group or a cyano group. $R_3$ represents a monovalent substituent. A represents a substituted or unsubstituted aryl group or a substituted or unsubstituted nitrogen-containing 5-membered heterocyclic group. M's each independently represent a hydrogen atom or a monovalent countercation.)

[6] The ink composition of [1] or [5], in which the azo compound represented by Formula (1) or (2-2) is an azo compound represented by Formula (3-2).

Formula (3-2)

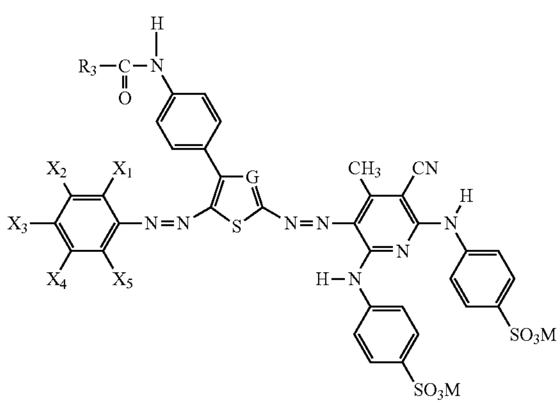

(In Formula (3-2), G represents a nitrogen atom or —C($R_2$)═. $R_2$ represents a hydrogen atom, a sulfo group, a carboxyl group, a substituted or unsubstituted carbamoyl group or a cyano group. $R_3$ represents a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

[7] The ink composition of any one of [1], [5] and [6], in which the azo compound represented by Formula (1), (2-2) or (3-2) is an azo compound represented by the following Formula (4-2).

Formula (4-2)

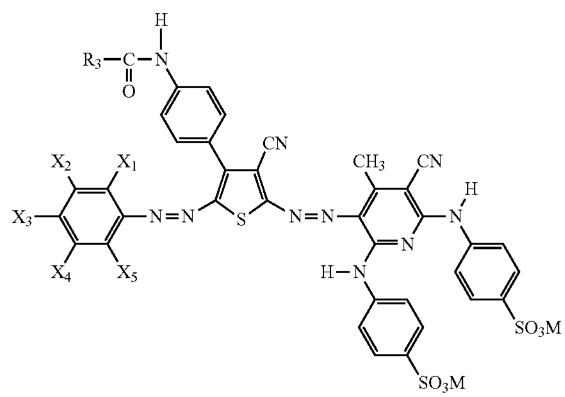

(In Formula (4-2), $R_3$ represents a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

[8] The ink composition of [1], in which the azo compound represented by Formula (1) is an azo compound represented by the following Formula (1-3).

Formula (1-3)

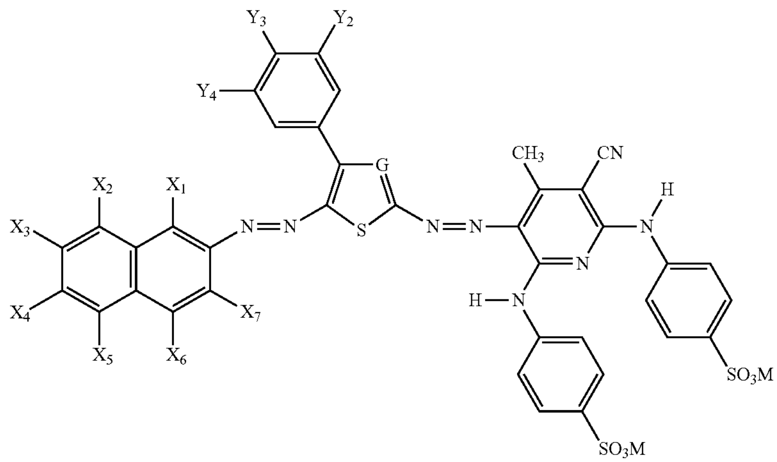

(In Formula (1-3), G represents a nitrogen atom or —C($R_2$)═. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $Y_2$, $Y_3$ and $Y_4$ each independently represent a hydrogen atom or a monovalent substituent. $Y_2$, $Y_3$ and $Y_4$ may be bound with each other to form a ring. All of $Y_2$, $Y_3$ and $Y_4$ do not represent a hydrogen atom at the same time. M's each independently represent a hydrogen atom or a monovalent countercation.)

[9] The ink composition of [1] or [8], in which the azo compound represented by Formula (1) or (1-3) is an azo compound represented by the following Formula (2-3).

(In Formula (2-3), G represents a nitrogen atom or —C($R_2$)═. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $R_{11}$, $R_{12}$, $R_{13}$ and $R_{14}$ each independently represent a hydrogen atom or a monovalent substituent. M's each independently represent a hydrogen atom or a monovalent countercation.)

[10] The ink composition of any one of [1], [8] and [9], in which the azo compound represented by Formula (1), (1-3) or (2-3) is an azo compound represented by the following Formula (3-3).

Formula (2-3)

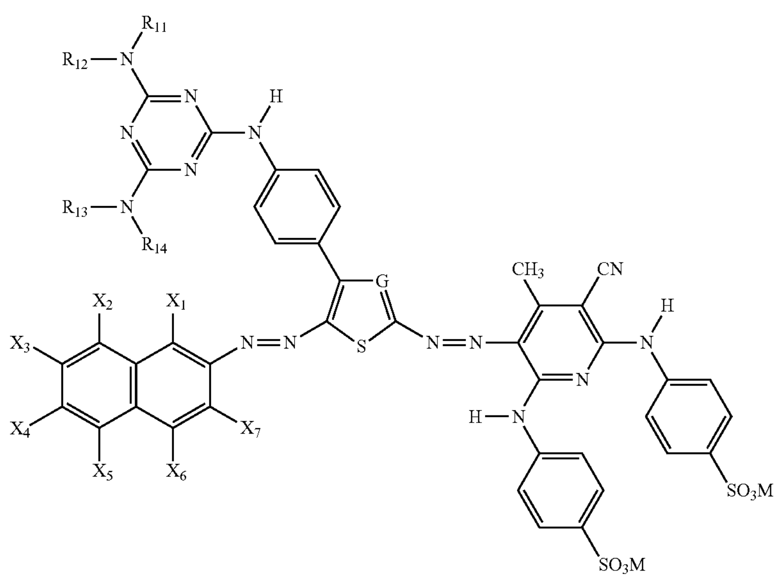

Formula (3-3)

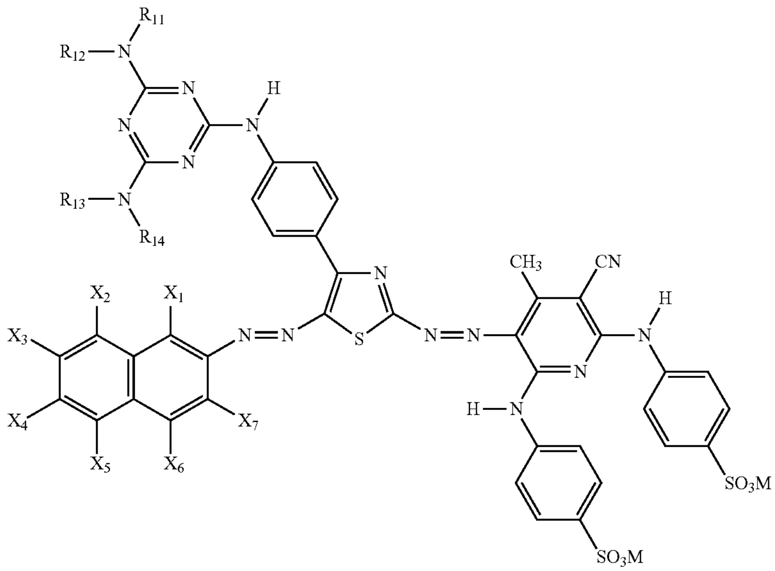

(In Formula (3-3), $R_{11}$, $R_{12}$, $R_{13}$ and $R_{14}$ each independently represent a hydrogen atom or a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

[11] The ink composition of any one of [1], [8] and [9], in which the azo compound represented by Formula (1), (1-3) or (2-3) is an azo compound represented by the following Formula (4-3).

(In Formula (4-3), $R_{11}$, $R_{12}$, $R_{13}$ and $R_{14}$ each independently represent a hydrogen atom or a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

[12] The ink composition of [1] or [8], in which the azo compound represented by Formula (1) or (1-3) is an azo compound represented by the following Formula (2-4).

(Formula 4-3)

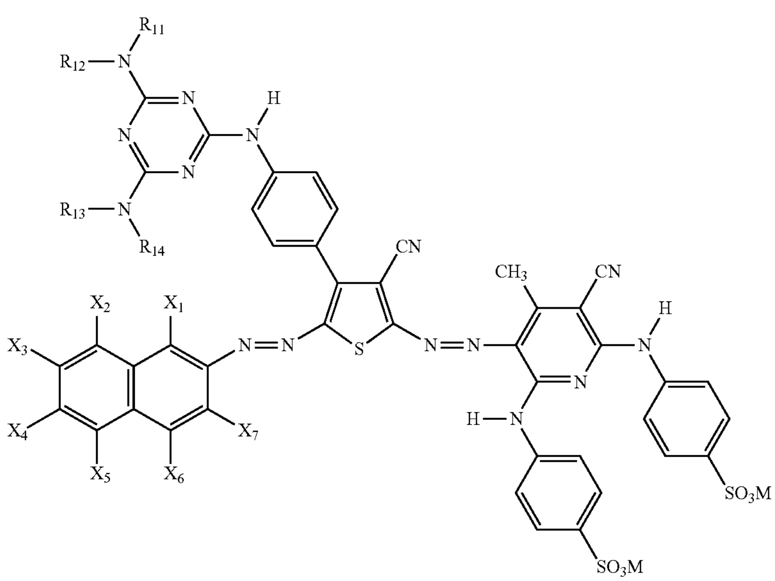

Formula (2-4)

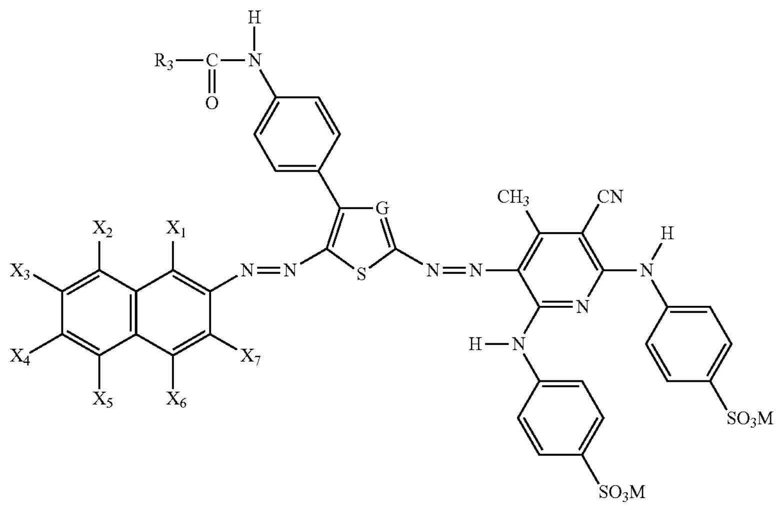

(In Formula (2-4), G represents a nitrogen atom or —C($R_2$)=. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $R_3$ represents a monovalent substituent. M's each independently represent a hydrogen atom or a monovalent countercation.)

[13] The ink composition of any one of [1], [8] and [12], in which the azo compound represented by Formula (1), (1-3) or (2-4) is an azo compound represented by the following Formula (3-4).

Formula (3-4)

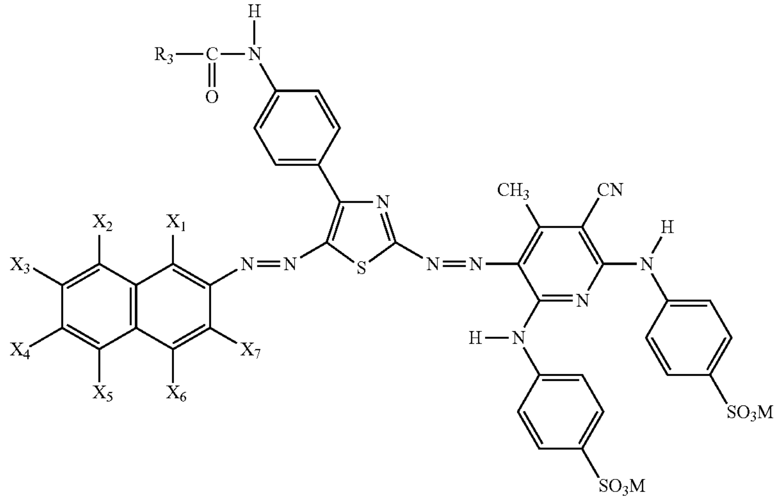

(In Formula (3-4), $R_3$ represents a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

[14] The ink composition of any one of [1], [8] and [12], in which the azo compound represented by Formula (1), (1-3) or (2-4) is an azo compound represented by the following Formula (4-4).

Formula (4-4)

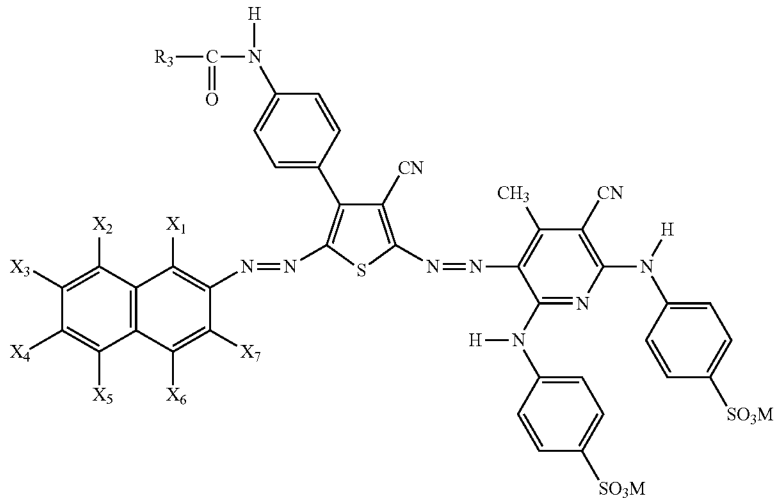

(In Formula (4-4), $R_3$ represents a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

[15] The ink composition of any one of [1] to [14], in which the azo compound represented by Formula (1), (2-1), (2-2), (2-3), (2-4), (3-1), (3-2), (3-3), (3-4), (4-1), (4-2), (4-3) or (4-4) has at least three ionic hydrophilic groups selected from a sulfo group, a carboxyl group or a salt thereof.

[16] The ink composition of any one of [1] to [15], in which in the azo compound represented by Formula (1), (2-1), (2-2), (2-3), (2-4), (3-1), (3-2), (3-3), (3-4), (4-1), (4-2), (4-3) or (4-4), at least one M is a lithium ion.

[17] The ink composition of any one of [1] to [16], in which in the dye represented by Formula (1), all M's are a lithium ion.

[18] The ink composition of any one of [1] to [17], in which the second water-soluble long-wavelength dye is a compound represented by any one of the following Formulas (DC-1), (DF-1), (DG-1), (TA-4), (TA-6), (TB-1), (TC-2), (TD-1) and (QA-1), or a salt thereof.

Formula (DC-1)

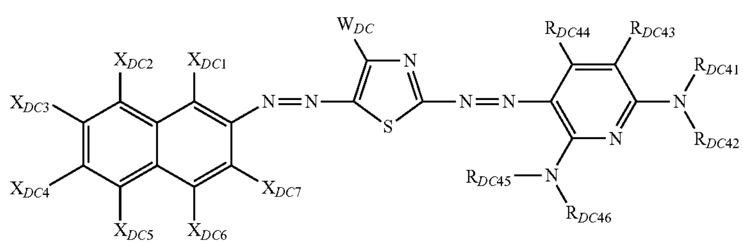

(In Formula (DC-1), $W_{DC}$, $R_{DC43}$ and $R_{DC44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an alkylamino group, an arylamino group, and a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be substituted. $R_{DC41}$, $R_{DC42}$, $R_{DC45}$ and $R_{DC46}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group, and each group may be substituted. However, $R_{DC41}$ and $R_{DC42}$ do not represent a hydrogen atom at the same time. Further, $R_{DC43}$ and $R_{DC41}$, $R_{DC41}$ and $R_{DC42}$, or $R_{DC45}$ and $R_{DC46}$ may be bound with each other to form a 5- or 6-membered ring. $X_{DC1}$, $X_{DC2}$, $X_{DC3}$, $X_{DC4}$, $X_{DC5}$, $X_{DC6}$ and $X_{DC7}$ represent a monovalent group. However, Formula (DC-1) contains at least one ionic hydrophilic group selected from a carboxyl group, a sulfo group or a salt thereof.)

Formula (DF-1)

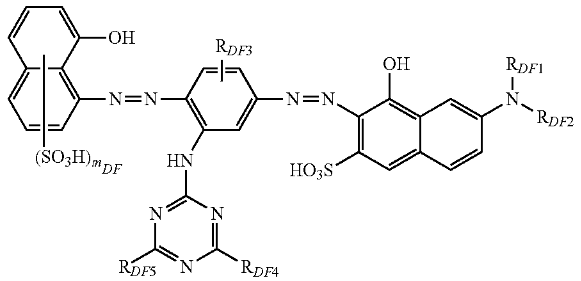

(In Formula (DF-1), $R_{DF1}$ and $R_{DF2}$ each independently represent a hydrogen atom, an alkyl group, an alkanoyl group, a hydroxyalkyl group, or a phenyl group, a benzoyl group or a benzyl group which may be substituted, $R_{DF3}$ represents a hydrogen atom, an alkyl group, an alkoxy group, an alkoxy-alkoxy group, a carboxyl group or a sulfonate group, $R_{DF4}$ and $R_{DF5}$ each independently represent a substituted or unsubstituted amino group, a substituted or unsubstituted hydroxyl group or a chlorine atom, and $m_{DF}$ represents 1 or 2.)

Formula (DG-1)

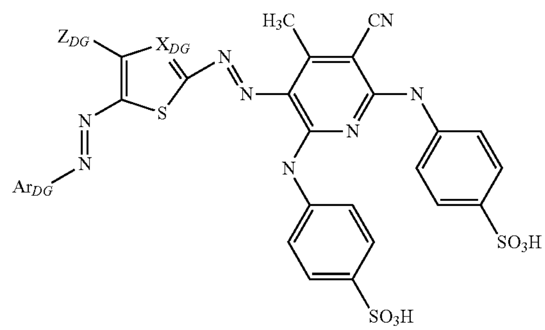

(In Formula (DG-1), $X_{DG}$ represents N or C(CN). $Z_{DG}$ represents an alkyl group which may be substituted, an aryl group which may be substituted or a heterocyclic group which may be substituted. $Ar_{DG}$ is an aryl group substituted with at least one nitro group, and may further have a substituent.)

(TA-4)

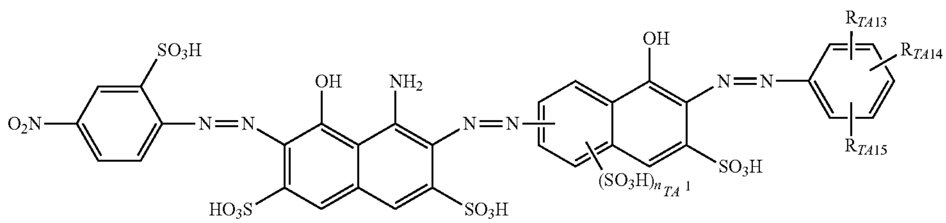

(In Formula (TA-4), $R_{TA13}$, $R_{TA14}$ and $R_{TA15}$ each independently represent a hydrogen atom, a halogen atom, a cyano group, a carboxyl group, a sulfo group, a sulfamoyl group which may be substituted with an alkyl group having 1 to 4 carbon atoms or a phenyl group, a phosphate group, a nitro group, an acyl group, a ureido group, an alkyl group having 1 to 4 carbon atoms which may be substituted with a hydroxyl group or an alkoxy group having 1 to 4 carbon atoms, an alkoxy group having 1 to 4 carbon atoms having which may be substituted with a hydroxyl group, an alkoxy group having 1 to 4 carbon atoms, a sulfo group or a carboxyl group, an alkoxy group which may be substituted with a sulfo group or a carboxyl group, or an acylamino group, and at least one of $R_{TA13}$, $R_{TA14}$ and $R_{TA15}$ is a sulfo group or a carboxyl group. $n_{TA}1$ is 0 or 1.)

(TA-6)

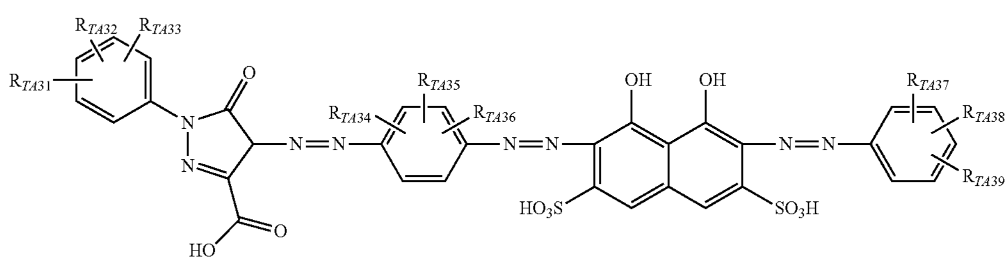

(In Formula (TA-6), $R_{TA31}$ to $R_{TA39}$ independently represent a group selected from the group consisting of H, OH, $SO_3H$, $PO_3H_2$, $CO_2H$, $NO_2$ and $NH_2$.)

Formula (TB-1)

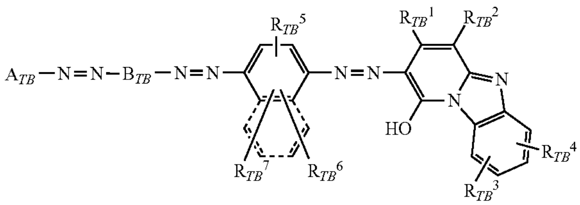

(In Formula (TB-1), $R_{TB}^1$ represents an unsubstituted alkyl group having 1 to 4 carbon atoms; a carboxy-substituted alkyl group having 2 to 5 carbon atoms; an unsubstituted phenyl group; a sulfo-substituted phenyl group; or a carboxyl group, $R_{TB}^2$ represents a cyano group; a carbamoyl group; or a carboxyl group, $R_{TB}^3$ and $R_{TB}^4$ each independently represent a hydrogen atom; a methyl group; a chlorine atom; or a sulfo group, the ring substituted with $R_{TB}^5$, $R_{TB}^6$ and $R_{TB}^7$ represent a benzene ring when the ring shown as broken lines is not present; or a naphthalene ring when the ring shown as broken lines is present, $R_{TB}^5$, $R_{TB}^6$ and $R_{TB}^7$ each independently represent a hydrogen atom; a carboxyl group; a sulfo group; a hydroxyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a hydroxyalkoxy group, a sulfo group or a carboxyl group; or an acetylamino group, Group $A_{TB}$ is a substituted phenyl group or a substituted naphthyl group, the substituent of Group $A_{TB}$ is a group selected from the group consisting of a carboxyl group; a sulfo group; a hydroxyl group; unsubstituted benzenesulfonyloxy group; a benzenesulfonyloxy group whose benzene ring is substituted with a methyl group, a nitro group or a chlorine atom; a chlorine atom; a cyano group; a nitro group; a sulfamoyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a sulfo group or a carboxyl group; an unsubstituted alkylsulfonyl group having 1 to 4 carbon atoms; an alkylsulfonyl group having 1 to 4 carbon atoms substituted with a hydroxyl group, a sulfo group or a carboxyl group; an unsubstituted alkylaminosulfonyl group having 1 to 8 carbon atoms; an alkylaminosulfonyl group having 1 to 8 carbon atoms substituted with a hydroxyl group, a sulfo group or a carboxyl group; an unsubstituted alkylcarbonylamino group having 1 to 8 carbon atoms; a carboxy-substituted alkylcarbonylamino group having 2 to 9 carbon atoms; an unsubstituted benzoylamino group; a benzoylamino group whose benzene ring is substituted with a sulfo group, a carboxyl group, a chlorine atom or an alkyl group having 1 to 4 carbon atoms; an unsubstituted benzenesulfonylamino group; a benzenesulfonylamino group whose benzene ring is substituted with a methyl group, a nitro group or a chlorine atom; a trifluoromethyl group; an acetyl group; and a benzoyl group, Group $B_{TB}$ is a substituted phenylene group, or a divalent substituted thiophene group or a divalent substituted thiazole group which is bound with an azo group at the 2- and 5-positions, and the substituent of Group $B_{TB}$ is a group selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms, or a sulfo-substituted alkoxy group having 1 to 4 carbon atoms.)

Formula (TC-2)

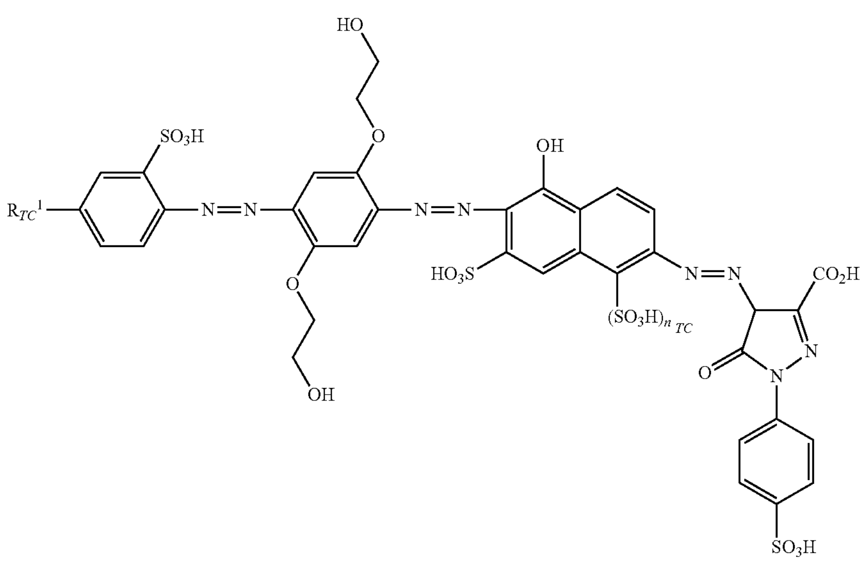

(In Formula (TC-2), $R_{TC}^1$ represents alkyl having 1 to 4 carbon atoms or alkoxy having 1 to 4 carbon atoms, and $n_{TC}$ is 0 or 1.)

Formula (TD-1)

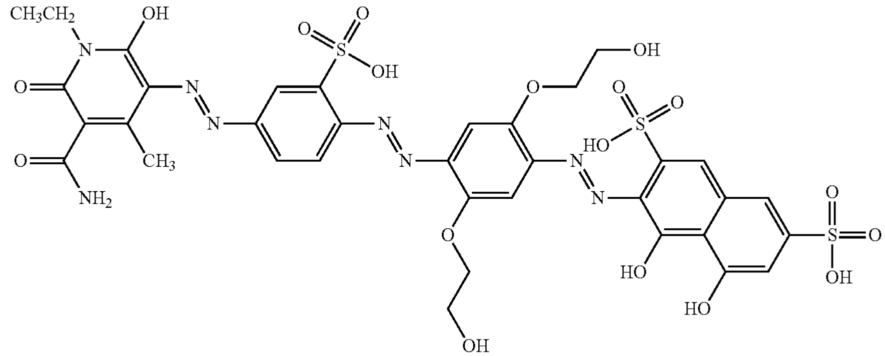

Formula (QA-1)

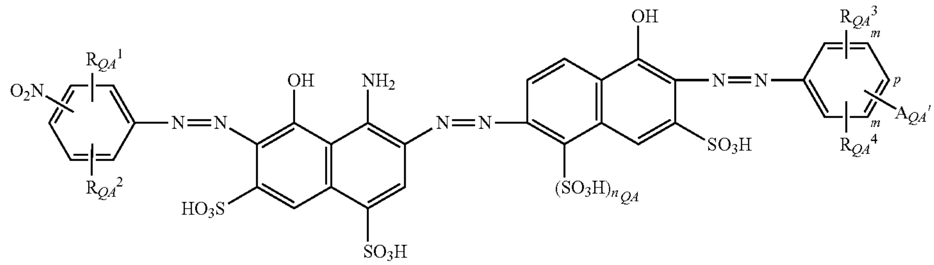

(In Formula (QA-1), $A_{QA}$' is represented by the following Formula (QA-1a-1), the substitution position of $A_{QA}$' is the m-position or p-position with respect to the azo group, $R_{QA}^1$ and $R_{QA}^2$ each independently represent a hydrogen atom; a halogen atom; a cyano group; carboxyl group; a sulfo group; a sulfamoyl group; an N-alkylaminosulfonyl group; an N-phenylaminosulfonyl group; a phospho group; a nitro group; an acyl group; a ureido group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfo group or a carboxyl group; or an acylamino group which may be substituted with an alkoxy group having 1 to 4 carbon atoms, a sulfo group or a carboxyl group, $R_{QA}^3$ and $R_{QA}^4$ each independently represent a hydrogen atom; a halogen atom; a cyano group; a carboxyl group; a sulfo group; a nitro group; an alkyl group having 1 to 4 carbon atoms; a hydroxyl group; or an alkoxy group having 1 to 4 carbon atoms which may be substituted with an alkoxy group having 1 to 4 carbon atoms or a sulfo group, and $n_{QA}$ is 0 or 1.)

Formula (QA-1a-1)

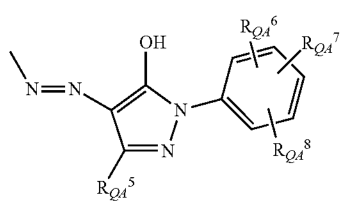

(In Formula (QA-1a-1), $R_{QA}^5$ represents a cyano group; a carboxyl group; an alkyl group having 1 to 4 carbon atoms; an alkoxycarbonyl group having 1 to 4 carbon atoms or a phenyl group, and $R_{QA}^6$, $R_{QA}^7$ and $R_{QA}^8$ each independently represent a hydrogen atom; a halogen atom; a cyano group; a carboxyl group; a sulfo group; a nitro group, an alkyl group having 1 to 4 carbon atoms; an alkoxy group having 1 to 4 carbon atoms which may be substituted with a hydroxyl group, an alkoxy group having 1 to 4 carbon atoms or a sulfo group; or an acylamino group which may be substituted with a hydroxyl group, an alkoxy group having 1 to 4 carbon atoms or a sulfo group.)

[19] The ink composition of any one of [1] to [18], in which the content of the first water-soluble long-wavelength dye represented by Formula (1) is 0.1% by mass to 10% by mass based on the total mass of the ink composition.

[20] The ink composition of any one of [1] to [19], in which the content of the second water-soluble long-wavelength dye is 0.1% by mass to 10% by mass based on the total mass of the ink composition.

[21] The ink composition of any one of [1] to [20], in which the mass ratio of the content (% by mass) of the first water-soluble long-wavelength dye to the content (% by mass) of the second water-soluble long-wavelength dye in the ink composition is 0.5 to 5.0.

[22] An ink for inkjet recording containing the ink composition of any one of [1] to [21].

[23] An inkjet recording method using the ink for inkjet recording of [22].

[24] An inkjet recording method including discharging ink droplets to an image-receiving material having an image-receiving layer containing white inorganic pigment particles on a support in accordance with a recording signal to record an image on the image-receiving material, in which the ink droplets are made of the ink for inkjet recording of [22].

Effects of the Invention

According to the present invention, it is possible to provide an ink composition capable of forming an image which is excellent in light resistance and ozone resistance, and having an excellent grey balance in a range from a high-concentration region to a low-concentration region, an ink for inkjet recording using the ink composition, and an inkjet recording method using the ink for inkjet recording.

EMBODIMENTS FOR CARRYING OUT THE INVENTION

Hereinafter, the present invention will be described in detail.

First, in the present invention, Group A' of substituents, Group J of substituents, an ionic hydrophilic group, and a Hammett's substituent constant σp value will be defined.

(Group A' of Substituents)

Examples thereof may include a straight-chained or branched-chained alkyl group having 1 to 12 carbon atoms, a straight-chained or branched-chained aralkyl group having 7 to 18 carbon atoms, a straight-chained or branched-chained alkenyl group having 2 to 12 carbon atoms, a straight-chained or branched-chained alkynyl group having 2 to 12 carbon atoms, a cycloalkyl group having 3 to 12 carbon atoms, a cycloalkenyl group having 3 to 12 carbon atoms (for example, methyl, ethyl, n-propyl, i-propyl, n-butyl, i-butyl, sec-butyl, t-butyl, 2-ethylhexyl, 2-methylsulfonylethyl, 3-phenoxypropyl, trifluoromethyl and cyclopentyl), a halogen atom (for example, a chlorine atom and a bromine atom), an aryl group (for example, phenyl, 4-t-butylphenyl and 2,4-di-t-amylphenyl), a heterocyclic group (for example, imidazolyl, pyrazolyl, triazolyl, 2-furyl, 2-thienyl, 2-pyrimidinyl and 2-benzothiazolyl), a cyano group, a hydroxyl group, a nitro group, a carboxy group, an amino group, an alkyloxy group (for example, methoxy, ethoxy, 2-methoxyethoxy and 2-methylsulfonylethoxy), an aryloxy group (for example, phenoxy, 2-methylphenoxy, 4-t-butylphenoxy, 3-nitrophenoxy, 3-t-butyloxycarbonylphenoxy and 3-methoxycarbonylphenyloxy), an acylamino group (for example, acetamide, benzamide and 4-(3-t-butyl-4-hydroxyphenoxy)butaneamide), an alkylamino group (for example, methylamino, butylamino, diethylamino and methylbutylamino), an arylamino group (for example, phenylamino and 2-chloroanylino), a ureido group (for example, phenylureido, methylureido and N,N-dibutylureido), a sulfamoylamino group (for example, N,N-dipropylsulfamoylamino), an alkylthio group (for example, methylthio, octylthio and 2-phenoxyethylthio), an arylthio group (for example, phenylthio, 2-butoxy-5-t-octylphenylthio and 2-carboxyphenylthio), an alkyloxycarbonylamino group (for example, methoxycarbonylamino), an alkylsulfonylamino group and an arylsulfonylamino group (for example, methylsulfonylamino, phenylsulfonylamino and p-toluenesulfonylamino), a carbamoyl group (for example, N-ethylcarbamoyl and N,N-dibutylcarbamoyl), a sulfamoyl group (for example, N-ethylsulfamoyl, N,N-dipropylsulfamoyl, N,N-diethylsulfamoyl and N-phenylsulfamoyl), a sulfonyl group (for example, methylsulfonyl, octylsulfonyl, phenylsulfonyl and p-toluenesulfonyl), a sulfonamide group (for example, methanesulfonamide, benzenesulfonamide, p-toluenesulfonamide and octadecane), an alkyloxycarbonyl group (for example, methoxycarbonyl and butyloxycarbonyl), a heterocyclicoxy group (for example, 1-phenyltetrazole-5-oxy and 2-tetrahydropyranyloxy), an azo group (for example, phenylazo, 4-methoxyphenylazo, 4-pivaloylaminophenylazo and 2-hydroxy-4-propanoylphenylazo), an acyloxy group (for example, acetoxy), a carbamoyloxy group (for example, N-methylcarbamoyloxy and N-phenylcarbamoyloxy), a silyloxy group (for example, trimethylsilyloxy and dibutylmethylsilyloxy), an aryloxycarbonylamino group (for example, phenoxycarbonylamino), an imide group (for example, N-succinimide and N-phthalimide), a heterocyclicthio group (for example, 2-benzothiazolylthio, 2,4-di-phenoxy-1,3,5-triazole-6-thio and 2-pyridylthio), a sulfinyl group (for example, 3-phenoxypropylsulfinyl), a phosphonyl group (for example, phenoxyphosphonyl, octyloxyphosphonyl and phenylphosphonyl), an aryloxycarbonyl group (for example, phenoxycarbonyl), an acyl group (for example, acetyl, 3-phenylpropanoyl and benzoyl), and an ionic hydrophilic group (a carboxyl group, a sulfo group, a quaternary ammonium group or the like). The substituents may be additionally substituted, and examples of the additional substituent may include a group selected from Group A' of substituents as described above.

(Group J of Substituents)

Examples thereof may include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclicoxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, an alkyl or arylsulfinyl group, an alkyl or arylsulfonyl group, an acyl group, an aryloxycarbonyl group, an alkoxycarbonyl group, a carbamoyl group, an aryl or heterocyclicazo group, an imide group, a phosphino group, a phosphinyl group, a phosphinyloxy group, a phosphinylamino group, a silyl group, and an ionic hydrophilic group. The substituents may be additionally substituted, and examples of the additional substituent may include a group selected from Group J of substituents as described above.

More specifically, examples of the halogen atom may include a fluorine atom, a chlorine atom, a bromine atom, or an iodine atom.

Examples of the alkyl group may include straight-chained, branched-chained or cyclic, substituted or unsubstituted alkyl groups, and also include a cycloalkyl group, a bicycloalkyl group, a tricyclo structure having more ring structures, or the like. The alkyl group of the substituents described hereinafter (for example, an alkyl group of an alkoxy group and an alkylthio group) represents an alkyl group of the aforementioned concept. Specifically, the alkyl group is preferably an alkyl group having 1 to 30 carbon atoms, and for example, a methyl group, an ethyl group, a n-propyl group, an i-propyl group, a t-butyl group, a n-octyl group, an eicosyl group, a 2-chloroethyl group, a 2-cyanoethyl group, a 2-ethylhexyl group, or the like, the cycloalkyl group is preferably a substituted or unsubstituted cycloalkyl group having 3 to 30 carbon atoms, and for example, a cyclohexyl group, a cyclopentyl group, a 4-n-dodecylcyclohexyl group, or the like, and the bicycloalkyl group is preferably a substituted or unsubstituted bicycloalkyl group having 5 to 30 carbon atoms, that is, a monovalent group obtained by removing one hydrogen atom from bicycloalkane having 5 to 30 carbon atoms, and for example, a bicyclo[1,2,2]heptane-2-yl group, a bicyclo[2,2,2]octane-3-yl group, or the like.

Examples of the aralkyl group may include a substituted or unsubstituted aralkyl group, and an aralkyl group having 7 to 30 carbon atoms is preferred as the substituted or unsubstituted aralkyl group. Examples thereof may include a benzyl group and a 2-phenethyl group.

Examples of the alkenyl group may include a straight-chained, branched-chained, and cyclic substituted or unsubstituted alkenyl groups, and include a cycloalkenyl group and a bicycloalkenyl group. Specifically, the alkenyl group is preferably a substituted or unsubstituted alkenyl group having 2 to 30 carbon atoms, and for example, a vinyl group, an allyl group, a prenyl group, a geranyl group, an oleyl group, or the like, the cycloalkenyl group is preferably a substituted or unsubstituted cycloalkenyl group having 3 to 30 carbon atoms, that is, a monovalent group obtained by removing one hydrogen atom of cycloalkene having 3 to 30 carbon atoms, and for example, a 2-cyclopentene-1-yl group, a 2-cyclohexene-1-yl group, or the like, and the bicycloalkenyl group is a substituted or unsubstituted bicycloalkenyl group, preferably a substituted or unsubstituted bicycloalkenyl group having 5 to 30 carbon atoms, that is, a monovalent group obtained by removing one hydrogen atom of bicycloalkene having one double bond, and for example, a bicyclo[2,2,1]hept-2-en-1-yl group, a bicyclo[2,2,2]oct-2-en-4-yl group, or the like.

The alkynyl group may be preferably a substituted or unsubstituted alkynyl group having 2 to 30 carbon atoms, and for example, an ethynyl group, a proparyl group, a trimethylsilylethynyl group, or the like.

The aryl group may be preferably a substituted or unsubstituted aryl group having 6 to 30 carbon atoms, and for example, a phenyl group, a p-tolyl group, a naphthyl group, a m-chlorophenyl group, an o-hexadecanoylaminophenyl group, or the like.

The heterocyclic group may be preferably a monovalent group obtained by removing one hydrogen atom from a 5- or 6-membered substituted or unsubstituted aromatic or non-aromatic heterocyclic compound, more preferably a 5- or 6-membered aromatic heterocyclic group having 3 to 30 carbon atoms, and for example, a 2-furyl group, a 2-thienyl group, a 2-pyrimidinyl group, a 2-benzothiazolyl group, or the like.

The alkoxy group may be preferably a substituted or unsubstituted alkoxy group having 1 to 30 carbon atoms, and for example, a methoxy group, an ethoxy group, an isopropoxy group, a t-butoxy group, a n-octyloxy group, a 2-methoxyethoxy group, or the like.

The aryloxy group may be preferably a substituted or unsubstituted aryloxy group having 6 to 30 carbon atoms, and for example, a phenoxy group, a 2-methylphenoxy group, a 4-t-butylphenoxy group, a 3-nitrophenoxy group, a 2-tetradecanoylaminophenoxy group, or the like.

The silyloxy group may be preferably a substituted or unsubstituted silyloxy group having 0 to 20 carbon atoms, and for example, a trimethylsilyloxy group, a diphenylmethylsilyloxy group, or the like.

The heterocyclicoxy group may be preferably a substituted or unsubstituted heterocyclicoxy group having 2 to 30 carbon atoms, and for example, a 1-phenyltetrazole-5-oxy group, a 2-tetrahydropyranyloxy group, or the like.

The acyloxy group may be preferably a formyloxy group, a substituted or unsubstituted alkylcarbonyloxy group having 2 to 30 carbon atoms, or a substituted or unsubstituted arylcarbonyloxy group having 6 to 30 carbon atoms, and for example, an acetyloxy group, a pivaloyloxy group, a stearoyloxy group, a benzoyloxy group, a p-methoxyphenylcarbonyloxy group, or the like.

The carbamoyloxy group may be preferably a substituted or unsubstituted carbamoyloxy group having 1 to 30 carbon atoms, and for example, a N,N-dimethylcarbamoyloxy group, a N,N-diethylcarbamoyloxy group, a morpholinocarbonyloxy group, a N,N-di-n-octylaminocarbonyloxy group, a N-n-octylcarbamoyloxy group, or the like.

The alkoxycarbonyloxy group may be preferably a substituted or unsubstituted alkoxycarbonyloxy group having 2 to 30 carbon atoms, and for example, a methoxycarbonyloxy group, an ethoxycarbonyloxy group, a t-butoxycarbonyloxy group, a n-octylcarbonyloxy group, or the like.

The aryloxycarbonyloxy group may be preferably a substituted or unsubstituted aryloxycarbonyloxy group having 7 to 30 carbon atoms, and for example, a phenoxycarbonyloxy group, a p-methoxyphenoxycarbonyloxy group, a p-n-hexadecyloxyphenoxycarbonyloxy group, or the like.

Examples of the amino group may include an alkylamino group, an arylamino group, a heterocyclicamino group, and the amino group may be preferably an amino group, a substituted or unsubstituted alkylamino group having 1 to 30 carbon atoms, or a substituted or unsubstituted anylino group having 6 to 30 carbon atoms, and for example, a methylamino group, a dimethylamino group, an anylino group, an N-methyl-anylino group, a diphenylamino group, a triazinylamino group, or the like.

The acylamino group may be preferably a formylamino group, a substituted or unsubstituted alkylcarbonylamino group having 1 to 30 carbon atoms, or a substituted or unsubstituted arylcarbonylamino group having 6 to 30 carbon atoms, and for example, an acetylamino group, a pivaloylamino group, a lauroylamino group, a benzoylamino group, a 3,4,5-tri-n-octyloxyphenylcarbonylamino group, or the like.

The aminocarbonylamino group may be preferably a substituted or unsubstituted aminocarbonylamino group having 1 to 30 carbon atoms, and for example, a carbamoylamino group, a N,N-dimethylaminocarbonylamino group, a N,N-diethylaminocarbonylamino group, a morpholinocarbonylamino group, or the like.

The alkoxycarbonylamino group may be preferably a substituted or unsubstituted alkoxycarbonylamino group having 2 to 30 carbon atoms, and for example, a methoxycarbonylamino group, an ethoxycarbonylamino group, a t-butoxycarbonylamino group, a n-octadecyloxycarbonylamino group, an N-methyl-methoxycarbonylamino group, or the like.

The aryloxycarbonylamino group may be preferably a substituted or unsubstituted aryloxycarbonylamino group having 7 to 30 carbon atoms, and for example, a phenoxycarbonylamino group, a p-chlorophenoxycarbonylamino group, an m-n-octyloxyphenoxycarbonylamino group, or the like.

The sulfamoylamino group may be preferably a substituted or unsubstituted sulfamoylamino group having 0 to 30 carbon atoms, and for example, a sulfamoylamino group, an N,N-dimethylaminosulfonylamino group, an N-n-octylaminosulfonylamino group, or the like.

The alkyl or arylsulfonylamino group may be preferably a substituted or unsubstituted alkylsulfonylamino group having 1 to 30 carbon atoms, or a substituted or unsubstituted arylsulfonylamino group having 6 to 30 carbon atoms, and for example, a methylsulfonylamino group, a butylsulfonylamino group, a phenylsulfonylamino group, a 2,3,5-trichlorophenylsulfonylamino group, a p-methylphenylsulfonylamino group, or the like.

The alkylthio group may be preferably a substituted or unsubstituted alkylthio group having 1 to 30 carbon atoms, and for example, a methylthio group, an ethylthio group, a n-hexadecylthio group, or the like.

The arylthio group may be preferably a substituted or unsubstituted arylthio group having 6 to 30 carbon atoms, and for example, a phenylthio group, a p-chlorophenylthio group, an m-methoxyphenylthio group, or the like.

The heterocyclicthio group may be preferably a substituted or unsubstituted heterocyclicthio group having 2 to 30 carbon atoms, and for example, a 2-benzothiazolylthio group, a 1-phenyltetrazole-5-ylthio group, or the like.

The sulfamoyl group may be preferably a substituted or unsubstituted sulfamoyl group having 0 to 30 carbon atoms, and for example, an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl)sulfamoyl group, or the like.

The alkyl or arylsulfinyl group may be preferably a substituted or unsubstituted alkylsulfinyl group having 1 to 30 carbon atoms, or a substituted or unsubstituted arylsulfinyl group having 6 to 30 carbon atoms, and for example, a methylsulfinyl group, an ethylsulfinyl group, a phenylsulfinyl group, a p-methylphenylsulfinyl group, or the like.

The alkyl or arylsulfonyl group may be preferably a substituted or unsubstituted alkylsulfonyl group having 1 to 30 carbon atoms, or a substituted or unsubstituted arylsulfonyl group having 6 to 30 carbon atoms, and for example, a methylsulfonyl group, an ethylsulfonyl group, a phenylsulfonyl group, a p-methylphenylsulfonyl group, or the like.

The acyl group may be preferably a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocycliccarbonyl group having 2 to 30 carbon atoms, in which a carbon atom and a carbonyl group are bonded, and for example, an acetyl group, a pivaloyl group, a 2-chloroacetyl group, a stearoyl group, a benzoyl group, a p-n-octyloxyphenylcarbonyl group, a 2-pyridylcarbonyl group, a 2-furylcarbonyl group, or the like.

The aryloxycarbonyl group may be preferably a substituted or unsubstituted aryloxycarbonyl group having 7 to 30 carbon atoms, and for example, a phenoxycarbonyl group, an o-chlorophenoxycarbonyl group, a m-nitrophenoxycarbonyl group, a p-t-butylphenoxycarbonyl group, or the like.

The alkoxycarbonyl group may be preferably a substituted or unsubstituted alkoxycarbonyl group having 2 to 30 carbon atoms, and for example, a methoxycarbonyl group, an ethoxycarbonyl group, a t-butoxycarbonyl group, a n-octadecyloxycarbonyl group, or the like.

The carbamoyl group may be preferably a substituted or unsubstituted carbamoyl group having 1 to 30 carbon atoms, and for example, a carbamoyl group, a N-methylcarbamoyl group, an N,N-dimethylcarbamoyl group, an N,N-di-n-octylcarbamoyl group, an N-(methylsulfonyl)carbamoyl group, or the like.

The aryl or heterocyclicazo group may be preferably a substituted or unsubstituted arylazo group having 6 to 30 carbon atoms, or a substituted or unsubstituted heterocyclicazo group having 3 to 30 carbon atoms, and for example, phenylazo, p-chlorophenylazo, 5-ethylthio-1,3,4-thiadiazole-2-ylazo, or the like.

The imide group may be preferably an N-succinimide group, an N-phthalimide group, or the like.

The phosphino group may be preferably a substituted or unsubstituted phosphino group having 0 to 30 carbon atoms, and for example, a dimethylphosphino group, a diphenylphosphino group, a methylphenoxyphosphino group, or the like.

The phosphinyl group may be preferably a substituted or unsubstituted phosphinyl group having 0 to 30 carbon atoms, and for example, a phosphinyl group, a dioctyloxyphosphinyl group, a diethoxyphosphinyl group, or the like.

The phosphinyloxy group may be preferably a substituted or unsubstituted phosphinyloxy group having 0 to 30 carbon atoms, and for example, a diphenoxyphosphinyloxy group, a dioctyloxyphosphinyloxy group, or the like.

The phosphinylamino group may be preferably a substituted or unsubstituted phosphinylamino group having 0 to 30 carbon atoms, and for example, a dimethoxyphosphinylamino group, a dimethylaminophosphinylamino group, or the like.

The silyl group may be preferably a substituted or unsubstituted silyl group having 0 to 30 carbon atoms, and for example, a trimethylsilyl group, a t-butyldimethylsilyl group, a phenyldimethylsilyl group, or the like.

(Ionic Hydrophilic Group)

Examples thereof may include a sulfo group, a carboxyl group, a thiocarboxyl group, a sulfino group, a phosphono group, a dihydroxyphosphino group, a quaternary ammonium group, or the like. The sulfo group and the carboxyl group are particularly preferred. Further, the carboxyl group, the phosphono group and the sulfo group may be in a state of salt, and examples of countercations forming a salt include an ammonium ion, an alkali metal ion (e.g., a lithium ion, a sodium ion or a potassium ion) and an organic cation (e.g., a tetramethylammonium ion, a tetramethylguanidium ion or tetramethylphosphonium), preferably a lithium salt, a sodium salt, a potassium salt or an ammonium salt, more preferably a lithium salt or a mixed salt including a lithium salt as a main component, and most preferably a lithium salt.

It is preferred that the monovalent countercation of the ionic hydrophilic group contained in the compound represented by Formula (1) of the present invention contains a lithium ion as the main component. The countercation may not be totally a lithium ion, but the concentration of the lithium ion of each ink composition is preferably 50% by mass or more based on the entire countercation of each ink composition, more preferably 75% by mass or more, still more preferably 80% by mass, and particularly preferably 95% by mass or more.

Under the condition of the aforementioned ratio, a hydrogen ion, an alkali metal ion (for example, a sodium ion, and a potassium ion), an alkali earth metal ion (for example, a magnesium ion, a potassium ion, or the like), a quaternary ammonium ion, a quaternary phosphonium ion, a sulfonium ion, or the like may be included as the countercation.

With regard to the kind and the ratio of the countercation of the colorant, since "The New Experimental Chemical Lecture 9 Analysis Chemistry" (Maruzen on 1977) by The Chemical Society of Japan, and "The 4th-ed. Experimental Chemistry Lecture 15 Analysis" (Maruzen on 1991) by The Chemical Society of Japan describe itemized discussion of a analysis method or an element, the analysis method may be selected based on the itemized discussion to perform analysis and quantification. Among the methods, it is easy to determine analysis by an analysis method such as ion chromatography, an atom absorption method, and an inductively coupled plasma spectrometer analysis method (ICP).

Any method may be used as a method of obtaining the colorant of the present invention including the lithium ion as the countercation. Examples thereof may include (1) a method of converting a countercation from another cation to a lithium ion by using an ion exchange resin, (2) a method of precipitating an acid or a salt from a system including a lithium ion, (3) a method of forming a colorant by using a raw material and a synthetic intermediate where a countercation is a lithium ion, (4) a method of introducing an ionic hydrophilic group by conversion of a functional group of a colorant of each color by using a reactive agent where a countercation is a lithium ion, and (5) a method of synthesizing a compound where a countercation of an ionic hydrophilic group of a colorant is a silver ion, and reacting the compound with a lithium halogenate solution to remove the precipitated halogenated silver, thus using a lithium ion as a countercation.

The ionic hydrophilic group in the colorant of each color may be any ionic dissociation group. Preferred examples of the ionic hydrophilic group may include a sulfo group (which may be a salt), a carboxyl group (which may be a salt), a hydroxyl group (which may be a salt), a phosphono group (which may be a salt) and a quaternary ammonium group, an acylsulfamoyl group (which may be a salt), a sulfonylcarbamoyl group (which may be a salt), sulfonylsulfamoyl group (which may be a salt), or the like.

The sulfo group, the carboxyl group or the hydroxyl group (including salts thereof) is preferred. In the case where the ionic hydrophilic group is a salt, preferred examples of the countercation may include a mixture salt of lithium, alkali metal (for example, sodium and potassium) including lithium as a main component, ammonium, and an organic cation (for example, pyridinium, tetramethylammonium and guadinium), and among the examples, the countercation is preferably a mixture salt of lithium or alkali metal including lithium as a main component, and particularly preferably a lithium salt of a sulfo group, a lithium salt of a carboxy group, and a lithium salt of a hydroxyl group.

(Hammett's Substituent Constant σp Value)

The Hammett's substituent constant σp value used in the present specification will be described.

The Hammett's rule is an empirical rule proposed by L. P. Hammett in 1935 in order to quantitatively treat an effect of a substituent to reaction or equilibrium of a benzene derivative, which is extensively considered to be reasonable today. There are a σp value and a σm value as a substituent constant required in the Hammett equation, and the values are found in many general documents, and for example, are described in detail in "Lange's Handbook of Chemistry", 12$^{th}$ ed., 1979 (McGraw-Hill) by J. A. Dean, or "Chemical Region", special edition, Vol. 122, pp. 96 to 103, 1979 (Nankodo). Meanwhile, in the present invention, each substituent is limited by the Hammett's substituent constant σp or described, which does not mean to be found in the aforementioned books or limited to only the substituent having a value described in the document, and in the case where the value is measured based on the Hammett equation even though the value is not described in the document, of course, even the substituent considered to be included in the aforementioned range is included. The compound according to the present invention is not a benzene derivative, but an index exhibiting an electron effect of the substituent, and the σp value is used regardless of a substitution position. In the present invention, the σp value will be used as the aforementioned meaning.

Meanwhile, in the present invention, in the case where the compound is the salt, the salt is dissociated into ions to be present in ink, but for the convenience of description, the expression "the salt is contained" is used.

Next, the groups or substituents in the present invention will be described.

Examples of the halogen atom may include a fluorine atom, a chlorine atom and a bromine atom.

In the present specification, the aliphatic group refers to an alkyl group, a substituted alkyl group, an alkenyl group, a substituted alkenyl group, an alkynyl group, a substituted alkynyl group, an aralkyl group and a substituted aralkyl group. The aliphatic group may have a branched group or form a ring. The aliphatic group has preferably 1 to 20 carbon atoms, and more preferably 1 to 16 carbon atoms. The aryl moiety of the aralkyl group and the substituted aralkyl group is preferably phenyl or naphthyl, and particularly preferably phenyl. Examples of the aliphatic group may include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, a benzyl group, a 2-phenethyl group, a vinyl group and an allyl group.

In the present specification, the monovalent aromatic group refers to an aryl group and a substituted aryl group. The aryl group is preferably phenyl or naphthyl, and particularly preferably phenyl. The monovalent aromatic group has preferably 6 to 20 carbon atoms, and more preferably 6 to 16 carbon atoms. Examples of the monovalent aromatic group include phenyl, p-tolyl, p-methoxyphenyl, o-chlorophenyl and m-(3-sulfopropylamino)phenyl. The divalent aromatic group is the one obtained by making the monovalent aromatic group divalent, and examples thereof include phenylene, p-tolylene, p-methoxyphenylene, o-chlorophenylene and m-(3-sulfopropylamino)phenylene, naphthylene and the like.

The heterocyclic group includes a heterocyclic group having a substituent and an unsubstituted heterocyclic group. The heterocyclic ring may be condensed with an aliphatic ring, an aromatic ring or other heterocyclic rings. The heterocyclic group is preferably a 5- or 6-membered heterocyclic group, and examples of the heteroatom of the heterocyclic ring may include N, O and S. Examples of the substituent include an aliphatic group, a halogen atom, an alkyl and arylsulfonyl group, an acyl group, an acylamino group, a sulfamoyl group, a carbamoyl group, an ionic hydrophilic group and the like. Examples of the heterocyclic group include a 2-pyridyl group, a 2-thienyl group, a 2-thiazolyl group, a 2-benzothiazolyl group, a 2-benzoxazolyl group and 2-furyl group. The divalent heterocyclic group is a group in which a hydrogen atom is removed from the monovalent heterocyclic ring to be a bonding hand.

The carbamoyl group includes a carbamoyl group having a substituent and an unsubstituted carbamoyl group. Examples of the substituent include an alkyl group. Examples of the carbamoyl group include a methylcarbamoyl group and a dimethylcarbamoyl group.

The alkoxycarbonyl group includes an alkoxycarbonyl group having a substituent and an unsubstituted alkoxycarbonyl group. The alkoxycarbonyl group is preferably an alkoxycarbonyl group having 2 to 20 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituent and an unsubstituted aryloxycarbonyl group. The aryloxycarbonyl group is preferably an aryloxycarbonyl group having 7 to 20 carbon atoms. Examples of the substituent include an ionic hydrophilic group. Examples of the aryloxycarbonyl group include a phenoxycarbonyl group.

The heterocyclic oxycarbonyl group includes a heterocyclic oxycarbonyl group having a substituent and an unsubstituted heterocyclic oxycarbonyl group. The heterocyclic oxycarbonyl group is preferably a heterocyclic oxycarbonyl group having 2 to 20 carbon atoms. Examples of the substituent include an ionic hydrophilic group. Examples of the heterocyclic oxycarbonyl group include a 2-pyridyloxycarbonyl group. The acyl group includes an acyl group having a substituent and an unsubstituted acyl group. The acyl group is preferably an acyl group having 1 to 20 carbon atoms. Examples of the substituent include an ionic hydrophilic group. Examples of the acyl group include an acetyl group and a benzoyl group.

The alkoxy group includes an alkoxy group having a substituent and an unsubstituted alkoxy group. The alkoxy group is preferably an alkoxy group having 1 to 20 carbon atoms.

Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent and an unsubstituted aryloxy group. The aryloxy group is preferably an aryloxy group having 6 to 20 carbon atoms. Examples of the substituent include an alkoxy group and an ionic hydrophilic group. Examples of the aryloxy group include a phenoxy group, a p-methoxyphenoxy group and an o-methoxyphenoxy group.

The heterocyclic oxy group includes a heterocyclic oxy group having a substituent and an unsubstituted heterocyclic oxy group. The heterocyclic oxy group is preferably a heterocyclic oxy group having 2 to 20 carbon atoms. Examples of the substituent include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted with an aliphatic group or an aromatic group having 1 to 20 carbon atoms. Examples of the silyloxy group include trimethylsilyloxy and diphenylmethylsilyloxy.

The acyloxy group includes an acyloxy group having a substituent and an unsubstituted acyloxy group. The acyloxy group is preferably an acyloxy group having 1 to 20 carbon atoms. Examples of the substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the substituent include an alkyl group. Examples of the carbamoyloxy group include an N-methylcarbamoyloxy group.

The alkoxycarbonyloxy group includes an alkoxycarbonyloxy group having a substituent and an unsubstituted alkoxycarbonyloxy group. The alkoxycarbonyloxy group is preferably an alkoxycarbonyloxy group having 2 to 20 carbon atoms. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. The aryloxycarbonyloxy group is preferably an aryloxycarbonyloxy group having 7 to 20 carbon atoms. Examples of the aryloxycarbonyloxy group include a phenoxycarbonyloxy group.

The amino group includes an amino group substituted with an alkyl group, an aryl group or a heterocyclic group, and the alkyl group, the aryl group and the heterocyclic group may also have a substituent. The alkylamino group is preferably an alkylamino group having 1 to 20 carbon atoms. Examples of the substituent include an ionic hydrophilic group. Examples of the alkylamino group include a methylamino group and a diethylamino group. The arylamino group includes an arylamino group having a substituent and an unsubstituted arylamino group, and also an anilino group. The arylamino group is preferably an arylamino group having 6 to 20 carbon atoms. Examples of the substituent include a halogen atom and an ionic hydrophilic group. Examples of the arylamino group include a phenylamino group and a 2-chlorophenylamino group.

The heterocyclic amino group includes a heterocyclic amino group having a substituent and an unsubstituted heterocyclic amino group. The heterocyclic amino group is preferably heterocyclic amino group having 2 to 20 carbon atoms. Examples of the substituent include an alkyl group, a halogen atom and an ionic hydrophilic group.

The acylamino group includes an acylamino group having a substituent and an unsubstituted acylamino group. The acylamino group is preferably an acylamino group having 2 to 20 carbon atoms. Examples of the substituent include an ionic hydrophilic group. Examples of the acylamino group include an acetylamino group, a propionylamino group, a benzoylamino group, an N-phenylacetylamino and a 3,5-disulfobenzoylamino group.

The ureido group includes a ureido group having a substituent and an unsubstituted ureido group. The ureido group is preferably a ureido group having 1 to 20 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent and an unsubstituted sulfamoylamino group. Examples of the substituent include an alkyl group. Examples of the sulfamoylamino group include a N,N-dipropyla sulfamoylamino group.

The alkoxycarbonylamino group includes an alkoxycarbonylamino group having a substituent and an unsubstituted alkoxycarbonylamino group. The alkoxycarbonylamino group is preferably an alkoxycarbonylamino group having 2 to 20 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. The aryloxycarbonylamino group is preferably an aryloxycarbonylamino group having 7 to 20 carbon atoms. Examples of the substituent include an ionic hydrophilic group. Examples of the aryloxycarbonylamino group include a phenoxycarbonylamino group.

The alkyl- and arylsulfonylamino group includes an alkyl- and arylsulfonylamino group having a substituent and an unsubstituted alkyl- and arylsulfonylamino group. The sulfonylamino group is preferably a sulfonylamino group having 1 to 20 carbon atoms. Examples of the substituent include an ionic hydrophilic group. Examples of the sulfonylamino group include a methylsulfonylamino group, an N-phenylmethylsulfonylamino group, a phenylsulfonylamino group and a 3-carboxyphenylsulfonylamino group.

The heterocyclic sulfonylamino group includes a heterocyclic sulfonylamino group having a substituent and an unsubstituted heterocyclic sulfonylamino group. The heterocyclic sulfonylamino group is preferably a heterocyclic sulfonylamino group having 1 to 12 carbon atoms. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl includes a heterocyclic sulfonyl group having a substituent and an unsubstituted heterocyclic sulfonyl group. The heterocyclic sulfonyl group is preferably a heterocyclic sulfonyl group having 1 to 20 carbon atoms. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. The heterocyclic sulfinyl group is preferably a heterocyclic sulfinyl group having 1 to 20 carbon atoms. Examples of the substituent include an ionic hydrophilic group. Examples of the heterocyclic sulfinyl group include a 4-pyridinesulfinyl group.

The alkyl-, aryl- and heterocyclic thio group includes an alkyl-, aryl- and heterocyclic thio group having a substituent and an unsubstituted alkyl-, aryl- and heterocyclic thio group. The alkyl-, aryl- and heterocyclic thio group is one having 1 to 20 carbon atoms. Examples of the substituent include an ionic hydrophilic group. Examples of the alkyl-, aryl- and heterocyclic thio group include a methylthio group, phenylthio group, 2-pyridylthio group.

The alkyl- and arylsulfonyl group includes an alkyl- and arylsulfonyl group having a substituent and an unsubstituted alkyl- and arylsulfonyl group. Examples of the alkyl- and arylsulfonyl group include a methylsulfonyl group and a phenylsulfonyl group, respectively.

The alkyl- and arylsulfinyl group includes an alkyl- and an arylsulfinyl group having a substituent and an unsubstituted alkyl- and arylsulfinyl group. Examples of the alkyl- and arylsulfinyl group include a methylsulfinyl group and a phenylsulfinyl group, respectively.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

Further, the substituent in the present invention refers to a substitutable group, and examples thereof may include an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxycarbonyl, a carbamoyl group, an aliphatic sulfonyl group, an arylsulfonyl group, a heterocyclic sulfonyl group, an aliphaticsulfonyloxy group, an arylsulfonyloxy group, a heterocyclic sulfonyloxy group, a sulfamoyl group, an aliphatic sulfonamide group, an arylsulfonamide group, a heterocyclic sulfonamide group, an amino group, an aliphaticamino group, an arylamino group, a heterocyclic amino group, an aliphatic oxycarbonylamino group, an aryloxycarbonylamino group, a heterocyclic oxycarbonylamino group, an aliphatic sulfinyl group, an arylsulfinyl group, an aliphatic thio group, an arylthio group, a hydroxyl group, a cyano group, a sulfo group, a carboxyl group, an aliphatic oxyamino group, an aryloxyamino group, a carbamoylamino group, a sulfamoylamino group, a halogen atom, a sulfamoylcarbamoyl group, a carbamoylsulfamoyl group, a dialiphatic oxyphosphonyl group, a diaryloxyphosphonyl group, an ionic hydrophilic group (for example, a carboxyl group, a sulfo group, a phosphono group and a quaternary ammonium group) and the like. The substituent may be additionally substituted, and examples of the additional substituent may include a group selected from the substituents as described above.

Hereinafter, the ink composition of the present invention will be described.

The ink composition of the present invention is an ink composition containing at least two kinds of water-soluble long-wavelength dyes whose absorption spectrum in an aqueous solvent has a maximum wavelength of 550 nm to 700 nm, in which at least one kind of the water-soluble long-wavelength dyes is a first water-soluble long-wavelength dye of an azo compound represented by the following Formula (1) (hereinafter, the dye represented by Formula (1) is referred to as an "azo dye" in some cases), at least one kind of the water-soluble long-wavelength dyes is a second water-soluble long-wavelength dye that is different from the first water-soluble long-wavelength dye, and the second water-soluble long-wavelength dye is a compound having two to four azo groups conjugated with each other per molecule.

The first water-soluble long-wavelength dye and the second water-soluble long-wavelength dye with respect to the present invention is water soluble, and has a maximum wavelength (absorption maximum) of an absorption spectrum in an aqueous solvent at 550 nm to 700 nm. The first water-soluble long-wavelength dye and the second water-soluble long-wavelength dye with respect to the present invention preferably have a half-band width of an absorption spectrum of 100 nm or more, more preferably 120 nm to 500 nm, and still more preferably 120 to 350 nm.

The absorption spectrum of the first and second water-soluble long-wavelength dye is measured by using a single compound. That is, it means that, when the absorption spectrum of the first and second water-soluble long-wavelength dye is measured in an aqueous solvent, the properties such as a desired absorption maximum and a half-band width are obtained from one compound but not from a combination of a plurality of compounds. As used herein, the aqueous solvent refers to a medium that dissolves or disperses a dye, which is a solvent composed of only water. Further, the absorption spectrum means a spectrum which is measured with a spectrophotometer which employs a commonly used 1-cm cell. The same is applied to a water-soluble short-wavelength dye S as describe below.

Further, the water-soluble short-wavelength dye S used in the examples of the present invention is a dye whose absorption spectrum in an aqueous solvent has a maximum wavelength (absorption maximum: λmax) of 440 nm to 540 nm, and a half-band width of 90 nm to 200 nm. The absorption spectrum of the water-soluble short-wavelength dye S is measured by using a single compound. That is, it means that, when the absorption spectrum of the water-soluble short-wavelength dye S is measured in an aqueous solvent, the properties such as a desired absorption maximum and a half-band width are obtained from a single compound but not from a combination of a plurality of compounds.

Since the ink composition contains the first water-soluble long-wavelength dye represented by Formula (1), and also at least one kind of the second water-soluble long-wavelength dye, it is possible to provide an ink composition which has an excellent grey balance in a range from a high-concentration region to a low-concentration region. Although the reason is not clear, it is presumed that the first water-soluble long-wavelength dye represented by Formula (1) and at least one kind of the second water-soluble long-wavelength dye are contained in the ink composition, and the first and the second water-soluble long-wavelength dyes interact such that an extreme difference in permeability to an image-receiving layer hardly occurs even in the low-concentration region.

Formula (1)

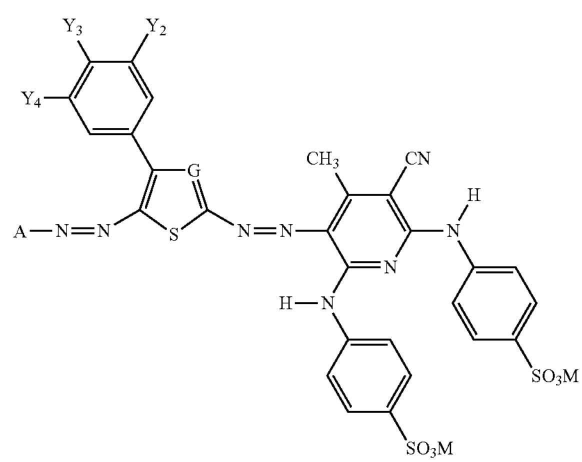

(In Formula (1), A represents a substituted or unsubstituted aryl group or a substituted or unsubstituted nitrogen-containing 5-membered heterocyclic group. G represents a nitrogen atom or —C($R_2$)═. $R_2$ represents a hydrogen atom, a sulfo group, a carboxyl group, a substituted or unsubstituted carbamoyl group or a cyano group. $Y_2$, $Y_3$ and $Y_4$ each independently represent a hydrogen atom or a monovalent substituent. $Y_2$, $Y_3$ and $Y_4$ may be bound with each other to form a ring. All of $Y_2$, $Y_3$ and $Y_4$ do not represent a hydrogen atom at the same time. M's each independently represent a hydrogen atom or a monovalent countercation.)

[Dye Represented by Formula (1)]

The azo dye used in the ink composition of the present invention is represented by Formula (1). Hereinafter, description will be made with respect to the azo dye represented by Formula (1) (black dye) (hereinafter, referred to as the "azo compound represented by Formula (1)").

Formula (1):

Formula (1)

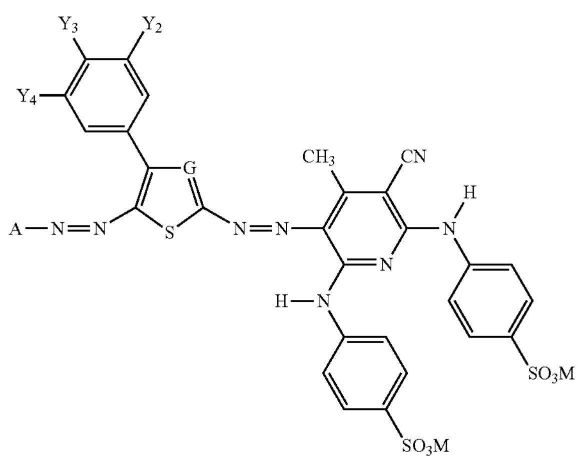

(In Formula (1), A represents a substituted or unsubstituted aryl group or a substituted or unsubstituted nitrogen-containing 5-membered heterocyclic group. G represents a nitrogen atom or —C($R_2$)═. $R_2$ represents a hydrogen atom, a sulfo group, a carboxyl group, a substituted or unsubstituted carbamoyl group or a cyano group. $Y_2$, $Y_3$ and $Y_4$ each independently represent a hydrogen atom or a monovalent substituent. $Y_2$, $Y_3$ and $Y_4$ may be bound with each other to form a ring. All of $Y_2$, $Y_3$ and $Y_4$ do not represent a hydrogen atom at the same time. M's each independently represent a hydrogen atom or a monovalent countercation.)

In Formula (1), G represents a nitrogen atom or —C($R_2$)═. $R_2$ represents a hydrogen atom, a sulfo group, a carboxyl group, a substituted or unsubstituted carbamoyl group or a cyano group, and in the case where the carbamoyl group has a substituent, examples of the substituent may include an alkyl group (a methyl group and an ethyl group) and an aryl group (a phenyl group).

$Y_2$, $Y_3$, and $Y_4$ each independently represent a hydrogen atom or a monovalent substituent. At least one of $Y_2$, $Y_3$, and $Y_4$ represents a substituent. In the case where $Y_2$, $Y_3$ and $Y_4$ represent a substituent, examples of the substituent each independently include Group J of substituents as described above.

In Formula (1), $Y_2$, $Y_3$ and $Y_4$ each independently represent preferably any one of a hydrogen atom, an ionic hydrophilic group, a substituted or unsubstituted amino group, a substituted or unsubstituted carbamoyl group, a substituted or unsubstituted sulfamoyl group, a substituted or unsubstituted alkylsulfonylamino group, a substituted or unsubstituted arylsulfonylamino group, a substituted or unsubstituted acylamino group. For a substituted or unsubstituted amino group, a heterocyclic amino group is preferred.

$Y_2$, $Y_3$ and $Y_4$ each independently represent more preferably any one of a hydrogen atom, an ionic hydrophilic group, a substituted or unsubstituted heterocyclic amino group, a substituted or unsubstituted alkylsulfonylamino group, a substituted or unsubstituted arylsulfonylamino group and a substituted or unsubstituted acylamino group, and particularly preferably any one of a hydrogen atom, a substituted or unsubstituted heterocyclic amino group, a substituted or unsubstituted arylsulfonylamino group and a substituted or unsubstituted acylamino group.

In the case where the heterocyclic amino group, the sulfamoyl group, the alkylsulfonylamino group, the arylsulfonylamino group or the acylamino group represented by $Y_2$, $Y_3$ and $Y_4$ has a substituent, it is more preferred that the substituents each independently represent an ionic hydrophilic group (for example, —$CO_2M$, —$SO_3M$: M is a monovalent countercation).

$Y_2$, $Y_3$ and $Y_4$ may additionally have a substituent, and examples of the additional substituent may include preferably a hydroxyl group, a substituted or unsubstituted amino group or an aryl group which may have an ionic hydrophilic group, a heterocyclic group which may have an ionic hydrophilic group, and preferably a substituted or unsubstituted amino group. The substituent of the substituted amino group is preferably, for example, a substituted or unsubstituted alkyl group, a substituted or unsubstituted aryl group or a substituted or unsubstituted heterocyclic group, and more preferably an alkyl group substituted with an ionic hydrophilic group, or an aryl group substituted with an ionic hydrophilic group.

The heterocyclic amino group is preferably a substituted or unsubstituted triazinylamino group, and more preferably a triazinylamino group having a substituent.

The substituent possessed by the triazinylamino group is preferably a substituted or unsubstituted amino group, and particularly preferably a substituted or unsubstituted amino group.

As the substituent of the substituted amino group, The aforementioned examples are appropriately used. Herein, the alkyl group in the alkyl group substituted with an ionic hydrophilic group is preferably a methyl group, an ethyl group or a n-propyl group, and more preferably an ethyl group. The aryl group in the aryl group substituted with an ionic hydrophilic group is preferably a phenyl group.

The acylamino group is preferably an alkylcarbonylamino group, an alkylcarbonylamino group having an ionic hydrophilic group as a substituent or an arylcarbonylamino group having an ionic hydrophilic group as a substituent. The alkyl group in the alkylcarbonylamino group is preferably a methyl group, an ethyl group or a n-propyl group, and more preferably an ethyl group. The aryl group in the arylcarbonylacyl group is preferably a phenyl group.

All of $Y_2$, $Y_3$ and $Y_4$ do not represent a hydrogen atom at the same time. $Y_2$, $Y_3$ and $Y_4$ may be bound with each other to form a ring, and the ring in which $Y_2$, $Y_3$ and $Y_4$ are bound with each other to form may be, for example, a benzene ring or a naphthalene ring, and preferably a benzene ring.

Among $Y_2$, $Y_3$ and $Y_4$, it is preferred that $Y_3$ represents a substituent, and it is more preferred that $Y_2$ and $Y_4$ represent a hydrogen atom and $Y_3$ represents a substituent.

Particularly, it is most preferred that $Y_2$ and $Y_4$ represent a hydrogen atom and $Y_3$ is a heterocyclic amino group having a substituted or unsubstituted amino group as a substituent, an arylsulfonylamino group having an ionic hydrophilic group as a substituent, or an acylamino group having an ionic hydrophilic group as a substituent.

The substituent represented by $Y_2$, $Y_3$ and $Y_4$ may be more specifically the following Substituent (A1).

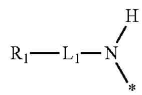

(A1)

(In Substituent (A1), * represents a bonding hand to $Y_2$ to $Y_4$. $L_1$ represents a single bond, a carbonyl group, or a sulfonyl group. $R_1$ represents a substituted or unsubstituted alkyl group, a substituted or unsubstituted aryl group, or a substituted or unsubstituted heterocyclic group)

$R_1$ is preferably a substituted or unsubstituted alkyl group, a substituted or unsubstituted aryl group or a substituted or unsubstituted heterocyclic group, and in the case where $R_1$ has a substituent, the substituent may be an ionic hydrophilic group, an arylamino group or an alkylamino group.

Substituent (A1) is preferably the following Substituent (A2) or Substituent (A3).

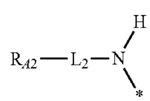

(A2)

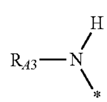

(A3)

(In Substituents (A2) and (A3), * represents a bonding hand to $Y_2$ to $Y_4$. $L_2$ represents a carbonyl group or a sulfonyl group. $R_{A2}$ represents a substituted or unsubstituted alkyl group or a substituted or unsubstituted aryl group. $R_{A3}$ represents a substituted or unsubstituted heterocyclic group.)

$R_{A2}$ represents a substituted or unsubstituted alkyl group or a substituted or unsubstituted aryl group, and preferably an alkyl group. In the case where $R_{A2}$ has a substituent, the substituent is preferably an ionic hydrophilic group.

$L_2$ is preferably a carbonyl group.

$R_{A3}$ represents a substituted or unsubstituted heterocyclic group, and in the case where $R_{A3}$ has a substituent, the substituent is preferably an alkylamino group or an arylamino group, and more preferably an alkylamino group or an arylamino group, and the groups may further have a substituent and are preferably substituted with an ionic hydrophilic group.

Substituent (A3) is preferably the following Substituent (A4).

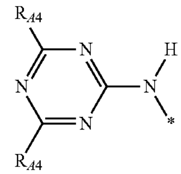

(A4)

(In Substituent (A4), * represents a bonding to $Y_2$ to $Y_4$. $R_{A4}$'s each independently represent a substituted or unsubstituted alkylamino group or a substituted or unsubstituted arylamino group.)

$R_{A4}$'s each independently represent a substituted or unsubstituted alkylamino group or a substituted or unsubstituted arylamino group, and in the case where $R_{A4}$ has a substituent, the substituent is preferably an ionic hydrophilic group.

Specific examples of the alkyl group, the aryl group, the heterocyclic group, the alkylamino group, the arylamino group and the ionic hydrophilic group in Substituents (A1) to (A4) are the same as those in $Y_2$, $Y_3$ and $Y_4$.

Specific examples of Substituents (A1) to (A4) will be described below, but are not limited thereto. * represents a bonding hand to $Y_2$ to $Y_4$.

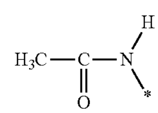

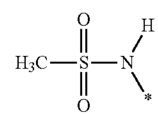

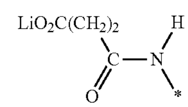

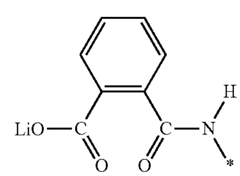

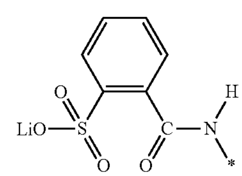

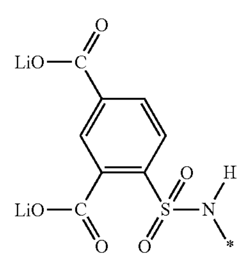

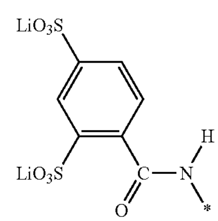

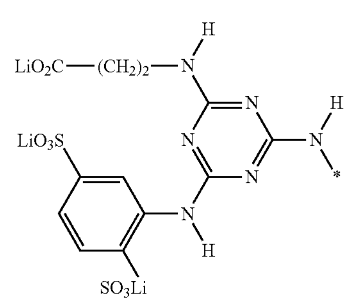

-continued

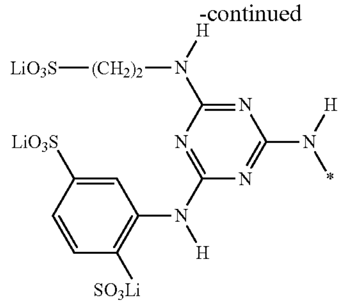

A represents a substituted or unsubstituted aryl group or a substituted or unsubstituted nitrogen-containing 5-membered heterocyclic group. The aryl group includes a substituted or unsubstituted aryl group. More specifically, the aryl group may be an aryl group having Group J of substituents.

The aryl group represented by A is preferably a substituted or unsubstituted aryl group having 6 to 30 carbon atoms, and more preferably a substituted or unsubstituted phenyl group or a substituted or unsubstituted phenyl group. Examples of the substituent may include groups as described in the section of the aforementioned Group J of substituents, and preferably an ionic hydrophilic group or an electron-withdrawing group having a Hammett's $\sigma p$ value of 0.3 or more.

The nitrogen-containing heterocyclic group represented by A includes a substituted or unsubstituted nitrogen-containing heterocyclic group. The heterocyclic group represented by A is preferably a monovalent group obtained by removing one hydrogen atom from a substituted or unsubstituted 5-membered aromatic or non-aromatic heterocyclic compound, and more preferably a 5-membered aromatic heterocyclic group having 2 to 4 carbon atoms. Examples of the substituent may include groups as described in the section of the aforementioned Group J of substituents. The nitrogen-containing 5-membered heterocyclic group may be a pyrrole ring, a pyrazole ring, an imidazole ring, a triazole ring, a thiazole ring, an isothiazole ring, or a thiadiazole ring as long as the substitution position is not limited.

A is preferably an aryl group having a substituent, more preferably an aryl group having an ionic hydrophilic group or an electron-withdrawing group having a Hammett's $\sigma p$ value of 0.3 or more, and still more preferably a phenyl group having an ionic hydrophilic group or an electron-withdrawing group having a Hammett's $\sigma p$ value of 0.3 or more.

The ionic hydrophilic group in Formula (1) is preferably $—SO_3M_1$ or $—CO_2M_1$, more preferably $—SO_3M_1$, and particularly preferably $—SO_3Li$.

$M_1$ and M each independently represent a hydrogen atom or a monovalent countercation, and the monovalent countercation may be, for example, an ammonium ion, an alkali metal ion (e.g., a lithium ion, a sodium ion or a potassium ion), or an organic cation (e.g., a tetramethylammonium ion, a tetramethylguanidium ion or tetramethylphosphonium). The countercation other than the lithium ion is preferably a potassium ion or a sodium ion, and more preferably a sodium ion.

The formed salt is preferably a lithium salt, a sodium salt, a potassium salt, or an ammonium salt, more preferably a lithium salt or a mixed salt including a lithium salt as a main component, and most preferably a lithium salt.

In the case where the azo compound represented by Formula (1) is a mixed salt, the salt is preferably a mixed salt of a lithium salt and a sodium salt from the viewpoints of solubility in water, viscosity of the aqueous solution, surface tension, and storage stability of a high-concentration aqueous solution, and may be an aspect where a portion of a plurality of M's represents a lithium ion and the residual M's represents a sodium ion, or an aspect of mixing of a dye where all M's in Formula (1) represent a lithium ion and a dye where all M's in Formula (1) represent a sodium ion.

In the case where M is a mixed salt of a lithium salt and a sodium salt, the molar ratio (Li:Na) of the lithium salt and the sodium salt is preferably 99:1 to 25:75, particularly preferably 99:1 to 50:50, more preferably 99:1 to 55:45, and particularly most preferably 99:1 to 65:35. Within the aforementioned range, as the solubility in water and the dissolution rate are favorable, the viscosity of the high-concentration aqueous solution and the surface tension may be easily adjusted, and the storage stability of the high-concentration aqueous solution becomes excellent, it is easy to perform a treatment design of constitutional requirements of for example, a water-soluble ink composition, particularly an ink composition of water-soluble ink for inkjet, and thus, there is exhibited an effect that may provide an excellent raw material (a high-concentration aqueous solution and an ink composition) satisfying performances required in water-soluble ink for inkjet at a high level.

The ratio of the cation of the mixed salt may be measured by ion chromatography analysis.

A particularly preferred combination as the compound represented by Formula (1) includes the followings (a) to (e).

(a) G represents a nitrogen atom or $—C(R_2)═$, and is preferably $—C(R_2)═$. $R_2$ represents a hydrogen atom, a sulfo group, a carboxyl group, a substituted or unsubstituted carbamoyl group or a cyano group, and is preferably a carbamoyl group ($—CONH_2$ group) or a cyano group, and more preferably a cyano group.

(b) A is preferably an aryl group having a substituent, more preferably an aryl group having an ionic hydrophilic group or an electron-withdrawing group having a Hammett's $\sigma p$ value of 0.3 or more, and still more preferably a phenyl group having two ionic hydrophilic groups.

(c) $Y_2$, $Y_3$ $Y_4$ each independently preferably represent any one of a hydrogen atom, a substituted or unsubstituted heterocyclic amino group, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, and a substituted or unsubstituted acylamino group, more preferably any one of a hydrogen atom, a heterocyclic amino group having a substituted or unsubstituted amino group as a substituent, an ionic hydrophilic group, a substituted or unsubstituted alkylsulfonylamino group, a substituted or unsubstituted arylsulfonylamino group, and a substituted or unsubstituted acylamino group, and particularly preferably any one of a hydrogen atom, a heterocyclic amino group having a substituted or unsubstituted amino group as a substituent, an arylsulfonylamino group having an ionic hydrophilic group as a substituent, and an acylamino group having an ionic hydrophilic group as a substituent. The acylamino group is preferably an alkylcarbonylacyl group, an alkylcarbonylacyl group having an ionic hydrophilic group as a substituent, and an arylcarbonylacyl group having an ionic hydrophilic group as a substituent. The alkyl group in the alkylcarbonylacyl group is preferably a methyl group, an ethyl group or a n-propyl group, and more preferably an ethyl group. The aryl group in the arylcarbonylacyl group is preferably a phenyl group.

It is most preferred that $Y_2$ and $Y_4$ represent a hydrogen atom and $Y_3$ is a heterocyclicamino group having a substituted or unsubstituted amino group as a substituent, an arylsulfonylamino group having an ionic hydrophilic group as a substituent, or an acylamino group having an ionic hydrophilic group as a substituent.

(d) The ionic hydrophilic group is preferably —$SO_3M_1$ or —$CO_2M_1$, more preferably —$SO_3M_1$, and particularly preferably —$SO_3Li$.

(e) $M_1$ and M each independently represent a hydrogen atom or a monovalent countercation, and the monovalent countercation may be, for example, an ammonium ion, an alkali metal ion (e.g., a lithium ion, a sodium ion or a potassium ion), or an organic cation (e.g., a tetramethylammonium ion, a tetramethylguanidium ion or a tetramethylphosphonium), and is preferably a lithium salt, a sodium salt, a potassium salt or an ammonium salt, more preferably a lithium salt or a mixed salt including a lithium salt as a main component, and most preferably a lithium salt.

The preferred factors of this structure may be exemplified by the fact that it is possible to electronically and sterically impart an azo colorant structure in which the water solubility of the azo compound of Formula (1) can be enhanced, and a good color and tinctorial strength and a high storage stability are compatible with each other.

As a result, the storage stability as an aqueous solution is enhanced, and the light fastness, the heat stability, the moist heat stability, the water resistance, the gas resistance and/or the solvent resistance, which are performance requirements for inks, are considerably enhanced, thereby it being a preferred example.

It is also preferred that the compound represented by Formula (1) is a compound represented by the following Formula (2-1).

Hereinafter, the compound represented by Formula (2-1) or a salt thereof will be described in detail.

Formula (2-1)

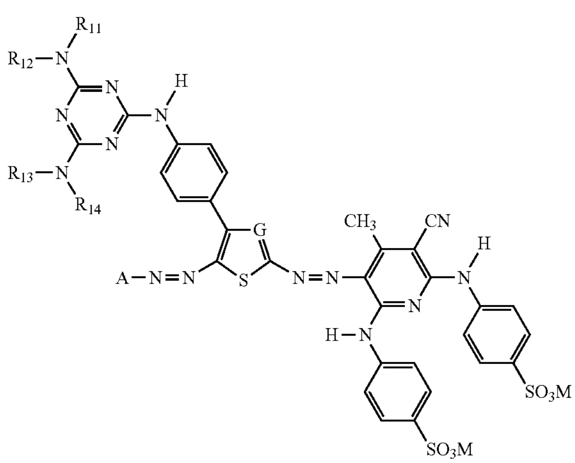

(In Formula (2-1), G represents a nitrogen atom or —C($R_2$)═. $R_2$ represents a hydrogen atom, a sulfo group, a carboxyl group, a substituted or unsubstituted carbamoyl group or a cyano group. $R_{11}$, $R_{12}$, $R_{13}$ and $R_{14}$ each independently represent a hydrogen atom or a monovalent substituent. A represents a substituted or unsubstituted aryl group or a substituted or unsubstituted nitrogen-containing 5-membered heterocyclic group. M's each independently represent a hydrogen atom or a monovalent countercation.)

Examples of G, A, $R_2$, and M in Formula (2-1) each independently have the same meaning as examples of G, A, $R_2$ and M in Formula (1), and preferred examples thereof are also the same.

In Formula (2-1), each of the monovalent substituents represented by each of $R_{11}$, $R_{12}$, $R_{13}$ and $R_{14}$ may be independently exemplified by Group A' of substituents, and is preferably a substituted or unsubstituted alkyl group, a substituted or unsubstituted aryl group, or a substituted or unsubstituted heterocyclic group, and more preferably an alkyl group substituted with an ionic hydrophilic group (which may be an alkyl group having 1 to 10 carbon atoms, and is preferably a methyl group, an ethyl group, a n-propyl group, an i-propyl group, a n-butyl group, an i-butyl group, a sec-butyl group, or a t-butyl group, more preferably a methyl group, an ethyl group or a n-propyl group, and still more preferably a n-propyl group), or an aryl group substituted with an ionic hydrophilic group (which may be an aryl group having 6 to 20 carbon atoms, and is preferably a phenyl group or a naphthyl group, and more preferably a phenyl group).

It is also preferred that the compound represented by Formula (1) or (2-1) is a compound represented by the following Formula (3-1).

Hereinafter, the compound represented by Formula (3-1) or a salt thereof will be described in detail.

Formula (3-1)

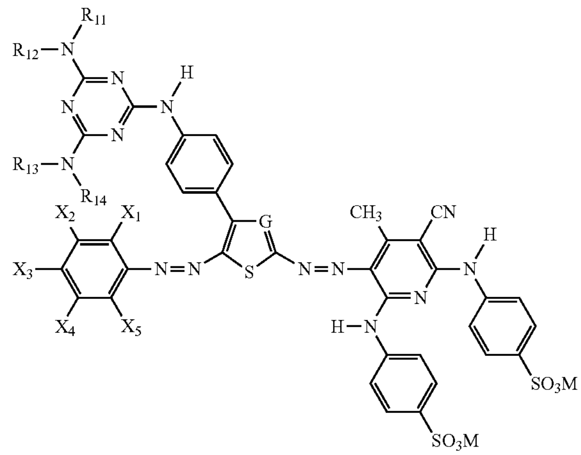

(In Formula (3-1), G represents a nitrogen atom or —C($R_2$)═. $R_2$ represents a hydrogen atom, a sulfo group, a carboxyl group, a substituted or unsubstituted carbamoyl group or a cyano group. $R_{11}$, $R_{12}$, $R_{13}$ and $R_{14}$ each independently represent a hydrogen atom or a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

Examples of G, $R_2$, $R_{11}$, $R_{12}$, $R_{13}$, $R_{14}$ and M in Formula (3-1) each independently have the same meaning as examples of G, $R_2$, $R_{11}$, $R_{12}$, $R_{13}$, $R_{14}$ and M in Formula (2-1), and preferred examples thereof are also the same.

In Formula (3-1), $X_1$, $X_2$, $X_3$, $X_4$ and $X_5$ each independently represent a hydrogen atom or a monovalent substituent. In the case where $X_1$, $X_2$, $X_3$, $X_4$ and $X_5$ represent a substituent, the substituent may be the aforementioned Group J of substituents.

$X_1$, $X_2$, $X_3$, $X_4$ and $X_5$ each independently represent preferably a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group or a carbamoyl group, and particularly preferably a hydrogen atom, an ionic hydrophilic group or a cyano group.

In Formula (3-1), $X_2$ and $X_4$ each independently represent preferably a hydrogen atom or an ionic hydrophilic group. $X_1$, $X_3$ and $X_5$ each independently represent preferably any one of a hydrogen atom or Group J of substituents, and at least one of $X_1$, $X_3$ and $X_5$ preferably represents an electron-withdrawing group having a Hammett's σp value of 0.3 or more. The electron-withdrawing group has an upper limit of the σp value of the Hammett's substituent constant of 1.0 or less.

If at least one of $X_1$, $X_3$ and $X_5$ is the electron-withdrawing group having a σp value in the aforementioned range, it is possible to adjust a color of the azo compound and improve light fastness and ozone gas fastness, thereby being useful to a water-soluble dye for inkjet recording black ink.

Specific examples of the electron-withdrawing group having a σp value of 0.3 or more may include an acyl group, an acyloxy group, a carbamoyl group, alkyloxycarbonyl group, an aryloxycarbonyl group, a cyano group, a nitro group, a dialkylphosphono group, a diarylphosphono group, a diarylphosphonyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron-withdrawing group having a σp value of 0.3 or more, a nitro group, a heterocyclic group, a halogen atom, an azo group or a selenocyanate group. The electron-withdrawing group is preferably a cyano group, a methylsulfonyl group, a phenylsulfonyl group, a methoxycarbonyl group, a carbamoyl group or a nitro group, and more preferably a cyano group, a methylsulfonyl group or a nitro group.

From the viewpoints of the color, tinctorial strength and storage stability of water solubility, among the aforementioned matters, at least one of $X_2$ and $X_4$ is preferably an ionic hydrophilic group, it is preferred that $X_1$, $X_3$ and $X_5$ are a hydrogen atom or an electron-withdrawing group having a Hammett's σp value of 0.3 or more, and it is more preferred that $X_1$, $X_3$ and $X_5$ are a hydrogen atom and $X_2$ and $X_4$ are an ionic hydrophilic group. The ionic hydrophilic group is preferably —$SO_3M_1$ or —$CO_2M_1$ ($M_1$ represents a hydrogen atom or a monovalent countercation), more preferably —$CO_2M_1$, and particularly preferably —$CO_2Li$.

A particularly preferred combination as the compound represented by Formula (3-1) includes the following (a) to (e).

(a) $X_2$ and $X_4$ each independently represents preferably a hydrogen atom or an ionic hydrophilic group, and at least one of $X_1$, $X_3$ and $X_5$ preferably represents an electron-withdrawing group having a Hammett's σp value of 0.3 or more, is a cyano group, a methylsulfonyl group, a phenylsulfonyl group, a methoxycarbonyl group, a carbamoyl group, or a nitro group, more preferably a cyano group, a methylsulfonyl group, or a nitro group, and still more preferably a cyano group, and it is particularly preferred that $X_1$, $X_2$, $X_3$ and $X_4$ are a hydrogen atom and $X_5$ is a cyano group.

(b) G represents a nitrogen atom or —$C(R_2)$=, and is preferably —$C(R_2)$=. $R_2$ represents a hydrogen atom, a sulfo group, a carboxy group, a substituted or unsubstituted carbamoyl group, or a cyano group, is preferably a carbamoyl group (—$CONH_2$ group) or a cyano group, and more preferably a cyano group.

(c) The monovalent substituent represented by $R_{11}$, $R_{12}$, $R_{13}$ and $R_{14}$ may be exemplified by Group A' of substituents, and is preferably a substituted or unsubstituted alkyl group, a substituted or unsubstituted aryl group, or a substituted or unsubstituted heterocyclic group, and more preferably an alkyl group substituted with an ionic hydrophilic group or an aryl group substituted with an ionic hydrophilic group.

(d) The ionic hydrophilic group is preferably —$SO_3M_1$ or —$CO_2M_1$, more preferably —$SO_3M_1$, and particularly preferably —$SO_3Li$.

(e) $M_1$ and M each independently represent a hydrogen atom or a monovalent countercation, and the monovalent countercation may be, for example, an ammonium ion, an alkali metal ion (e.g., a lithium ion, a sodium ion or a potassium ion) or an organic cation (e.g., a tetramethylammonium ion, a tetramethylguanidium ion or tetramethylphosphonium), and is preferably a lithium salt, a sodium salt, a potassium salt, or an ammonium salt, more preferably a lithium salt or a mixed salt including a lithium salt as a main component, and most preferably a lithium salt.

The preferred factor of this structure may be exemplified by the fact that the water solubility of the azo compound of Formula (3-1) and association of azo dyes in an aqueous solution are considerably enhanced, and particularly, a storage stability in an aqueous solution is enhanced.

As a result, the storage stability for a long period of time is achieved, and the light fastness, the heat stability, the moist heat stability, the water resistance, the gas resistance and/or the solvent resistance, which are performance requirements for inks, are considerably enhanced, thereby it being a preferred example.

It is preferred that the compound represented by Formula (1), (2-1), or (3-1) is a compound represented by the following Formula (4-1).

Hereinafter, the compound represented by Formula (4-1) or a salt thereof will be described in detail.

Formula (4-1)

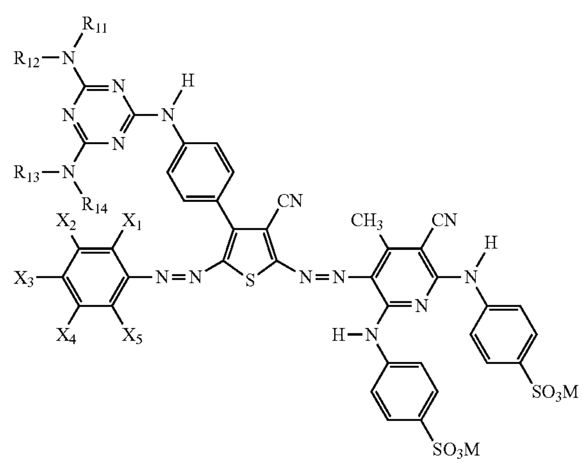

(In Formula (4-1), $R_{11}$, $R_{12}$, $R_{13}$ and $R_{14}$ each independently represent a hydrogen atom or a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

Examples of $R_{11}$, $R_{12}$, $R_{13}$, $R_{14}$ and M in Formula (4-1) each independently have the same meaning as examples of $R_{11}$, $R_{12}$, $R_{13}$, $R_{14}$ and M in Formula (2-1), and preferred examples thereof are also the same.

Examples of $X_1$, $X_2$, $X_3$, $X_4$ and $X_5$ in Formula (4-1) each independently have the same meaning as examples of $X_1$, $X_2$, $X_3$, $X_4$ and $X_5$ in Formula (3-1), and preferred examples thereof are also the same.

The preferred factor of this structure is that a ring including G in Formula (1) is not a nitrogen-containing 5-membered heterocyclic ring but a thiophene ring, a preservation property of image fastness of a printed matter using the ink composition of the present invention (for example, ozone gas fastness and light fastness) may be improved, and discoloration (a change in color) and decolorization (color fading) may be presented at a higher level, and a suitability to grey to black ink requiring a small change in discoloration and decolorization is improved.

It is preferred that the compound represented by Formula (1), (2-1), (3-1) or (4-1) is a compound represented by the following Formula (5).

Hereinafter, the compound represented by Formula (5) or a salt thereof will be described in detail.

Formula (5)

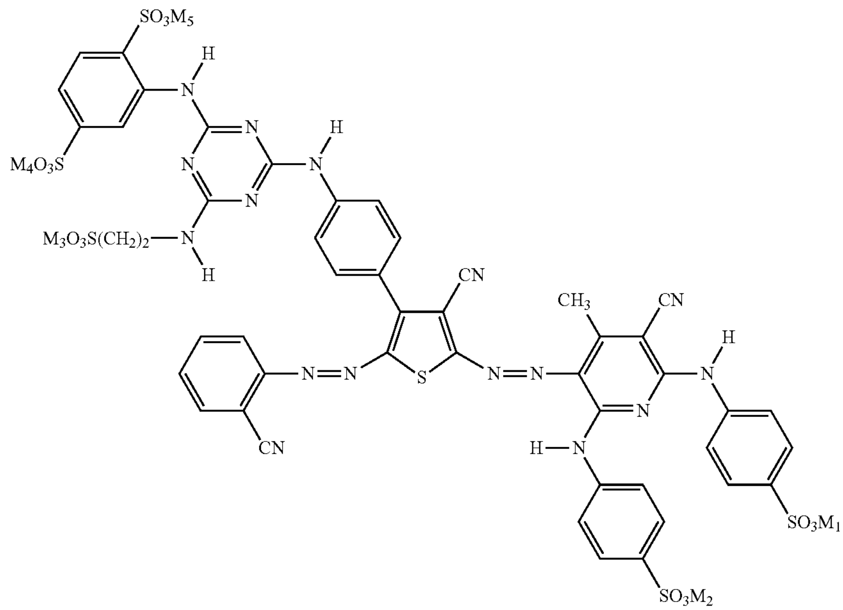

(In Formula (5), $M_1$, $M_2$, $M_3$, $M_4$ and $M_5$ each independently represent a hydrogen atom or a monovalent countercation, and in the case where $M_1$, $M_2$, $M_3$, $M_4$ and $M_5$ represent a monovalent countercation, $M_1$, $M_2$, $M_3$, $M_4$ and $M_5$ represent a lithium ion, a sodium ion, a potassium ion or an ammonium ion.)

It is preferred that the compound represented by Formula (1) is a compound represented by the following Formula (2-2).

Hereinafter, the compound represented by Formula (2-2) or a salt thereof will be described in detail.

Formula (2-2)

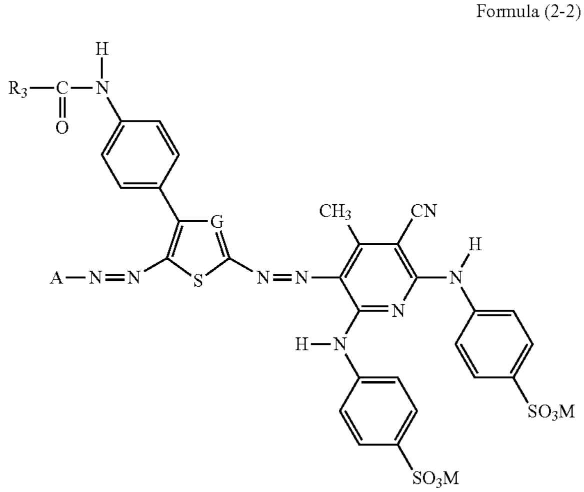

(In Formula (2-2), G represents a nitrogen atom or —C($R_2$)=. $R_2$ represents a hydrogen atom, a sulfo group, a carboxyl group, a substituted or unsubstituted carbamoyl group or a cyano group. $R_3$ represents a monovalent substituent. A represents a substituted or unsubstituted aryl group or a substituted or unsubstituted nitrogen-containing 5-membered heterocyclic group. M's each independently represent a hydrogen atom or a monovalent countercation.)

Examples of A, G, $R_2$ and M in Formula (2-2) each independently have the same meaning as examples of A, G, $R_2$ and M in Formula (1), and preferred examples thereof are also the same.

In Formula (2-2), the monovalent substituent represented by $R_3$ may be exemplified by Group A' of substituents, and is preferably a substituted or unsubstituted alkyl group, a substituted or unsubstituted aryl group, or a substituted or unsubstituted heterocyclic group, more preferably an alkyl group or an aryl group substituted with an ionic hydrophilic group, and particularly preferably an alkyl group substituted with an ionic hydrophilic group.

In the alkyl group substituted with the ionic hydrophilic group, the alkyl group is preferably a methyl group, an ethyl group, or a n-propyl group, and particularly preferably an ethyl group. The ionic hydrophilic group is preferably —$SO_3M_1$ or —$CO_2M_1$ ($M_1$ represents a hydrogen atom or a monovalent countercation), more preferably —$CO_2M_1$, and particularly preferably —$CO_2Li$.

It is preferred that the compound represented by Formula (1) or (2-2) is a compound represented by the following Formula (3-2).

Hereinafter, the compound represented by Formula (3-2) or a salt thereof will be described in detail.

Formula (3-2)

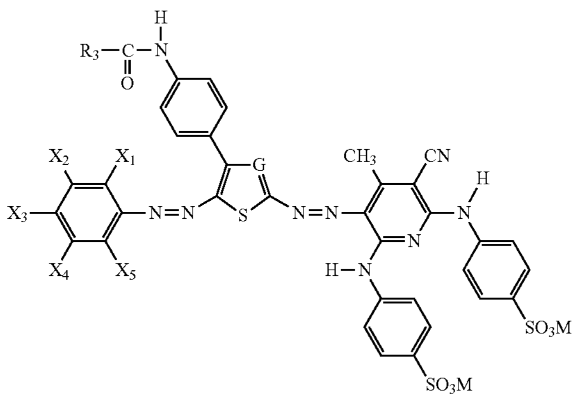

(In Formula (3-2), G represents a nitrogen atom or —C($R_2$)=. $R_2$ represents a hydrogen atom, a sulfo group, a carboxyl group, a substituted or unsubstituted carbamoyl group or a cyano group. $R_3$ represents a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

Examples of G, $R_2$, $R_3$ and M in Formula (3-2) each independently have the same meaning as examples of G, $R_2$, $R_3$ and M in Formula (2-2), and preferred examples thereof are also the same.

In Formula (3-2), $X_1$, $X_2$, $X_3$, $X_4$ and $X_5$ each independently represent a hydrogen atom or a monovalent substituent. In the case where $X_1$, $X_2$, $X_3$, $X_4$ and $X_5$ represent a substituent, the substituent may be the aforementioned Group J of substituents.

$X_1$, $X_2$, $X_3$, $X_4$ and $X_5$ each independently represent preferably a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group, or a carbamoyl group, and particularly preferably a hydrogen atom, an ionic hydrophilic group (preferably —$SO_3M_1$ or —$CO_2M_1$, more preferably —$CO_2M_1$, and particularly preferably —$CO_2Li$), or a cyano group.

In Formula (3-2), it is preferred that $X_2$ and $X_4$ each independently represent a hydrogen atom or an ionic hydrophilic group. $X_1$, $X_3$ and $X_5$ each independently represent preferably any one of a hydrogen atom or Group J of substituents, and at least one of $X_1$, $X_3$ and $X_5$ preferably represents an electron-withdrawing group having a Hammett's σp value of 0.3 or more. The electron-withdrawing group has an upper limit of the σp value of the Hammett's substituent constant of 1.0 or less.

If at least one of $X_1$, $X_3$ and $X_5$ is the electron-withdrawing group having a σp value in the aforementioned range, it is possible to adjust a color of the azo compound and improve light fastness and ozone gas fastness, thus being useful to a water-soluble dye for inkjet recording black ink.

Specific examples of the electron-withdrawing group having a σp value of 0.3 or more may include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphonyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron-withdrawing group having a σp value of 0.3 or more, a nitro group, a heterocyclic group, a halogen atom, an azo group or a selenocyanate group. The electron-withdrawing group is preferably a cyano group, a methylsulfonyl group, a phenylsulfonyl group, a methoxycarbonyl group, a carbamoyl group or a nitro group, and more preferably a cyano group, a methylsulfonyl group or a nitro group.

From the viewpoints of the color, tinctorial strength and storage stability of water solubility, among the aforementioned matters, at least one of $X_2$ and $X_4$ is preferably an ionic hydrophilic group, it is preferred that $X_1$, $X_3$ and $X_5$ are a hydrogen atom or an electron-withdrawing group having a Hammett's σp value of 0.3 or more, and it is more preferred that $X_1$, $X_3$ and $X_5$ are a hydrogen atom and $X_2$ and $X_4$ are an ionic hydrophilic group. The ionic hydrophilic group is preferably —$SO_3M_1$ or —$CO_2M_1$ ($M_1$ represents a hydrogen atom or a monovalent countercation), more preferably —$CO_2M_1$, and particularly preferably —$CO_2Li$.

A particularly preferred combination as the compound represented by Formula (3-2) includes the following (a) to (d).

(a) At least one of $X_2$ and $X_4$ is preferably an ionic hydrophilic group, it is preferred that $X_1$, $X_3$ and $X_5$ are a hydrogen atom or an electron-withdrawing group having a Hammett's σp value of 0.3 or more, and it is more preferred that $X_1$, $X_3$ and $X_5$ are a hydrogen atom and $X_2$ and $X_4$ are an ionic hydrophilic group.

(b) The monovalent substituent represented by $R_3$ may be exemplified by Group A' of substituents, and is preferably a substituted or unsubstituted alkyl group, a substituted or unsubstituted aryl group or a heterocyclic group, and more preferably an alkyl group or an aryl group substituted with an ionic hydrophilic group.

(c) The ionic hydrophilic group is preferably —$SO_3M_1$ or —$CO_2M_1$, more preferably —$CO_2M_1$, and particularly preferably —$CO_2Li$.

(d) $M_1$ and M each independently represent a hydrogen atom or a monovalent countercation, and the monovalent countercation may be, for example, an ammonium ion, an alkali metal ion (e.g., a lithium ion, a sodium ion or a potassium ion), or an organic cation (e.g., a tetramethylammonium ion, a tetramethylguanidium ion or tetramethylphosphonium), and is preferably a lithium salt, a sodium salt, a potassium salt, or an ammonium salt, more preferably a lithium salt or a mixed salt including a lithium salt as a main component, and most preferably a lithium salt.

The preferred factors of this structure may be exemplified by the fact that it is possible to impart an azo colorant structure electronically and sterically, in which the water solubility of the azo compound of Formula (3-2) can be enhanced, and a good color and tinctorial strength and a high storage stability are compatible with each other.

As a result, the storage stability for a long period of time is achieved, and the light fastness, the heat stability, the moist heat stability, the water resistance, the gas resistance and/or the solvent resistance, which are performance requirements for inks, are considerably enhanced, thereby it being a preferred example.

It is preferred that the compound represented by Formula (1), (2-2), or (3-2) is a compound represented by the following Formula (4-2).

Hereinafter, the compound represented by Formula (4-2) or a salt thereof will be described in detail.

Formula (4-2)

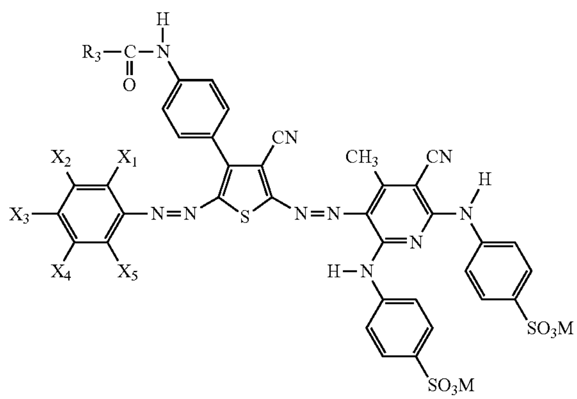

(In Formula (4-2), $R_3$ represents a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

Examples of $R_3$ and M in Formula (4-2) each independently have the same meaning as examples of $R_3$ and M in Formula (2-2), and preferred examples thereof are also the same.

Examples of $X_1$, $X_2$, $X_3$, $X_4$ and $X_5$ in Formula (4-2) have the same meaning as examples of $X_1$, $X_2$, $X_3$, $X_4$ and $X_5$ in Formula (3-2), and preferred examples thereof are also the same.

A particularly preferred combination as the compound represented by Formula (4) includes the following (a) to (d).

(a) In Formula (1), A is an aryl group having a substituent, more preferably an aryl group having an ionic hydrophilic group or an electron-withdrawing group having a Hammett's σp value of 0.3 or more, and still more preferably a phenyl group having two ionic hydrophilic groups.

(b) The monovalent substituent represented by $R_3$ may be exemplified by Group A' of substituents, and is preferably a substituted or unsubstituted alkyl group, a substituted or unsubstituted aryl group or a heterocyclic group, more preferably an alkyl group or an aryl group substituted with an ionic hydrophilic group, and particularly preferably an alkyl group substituted with an ionic hydrophilic group (preferably a methyl group, an ethyl group or a n-propyl group, and particularly preferably a n-propyl group).

(c) The ionic hydrophilic group is preferably —$SO_3M_1$ or —$CO_2M_1$, more preferably —$CO_2M_1$, and particularly preferably —$CO_2Li$.

(d) $M_1$ and M each independently represent a hydrogen atom or a monovalent countercation, and the monovalent countercation may be, for example, an ammonium ion, an alkali metal ion (e.g., a lithium ion, a sodium ion or a potassium ion), or an organic cation (e.g., a tetramethylammonium ion, a tetramethylguanidium ion or tetramethylphosphonium). The formed salt is preferably a lithium salt, a sodium salt, a potassium salt or an ammonium salt, more preferably a lithium salt or a mixed salt including a lithium salt as a main component, and most preferably a lithium salt.

The preferred factor of this structure is that a ring including G in Formula (1) is not a nitrogen-containing 5-membered heterocyclic ring but a thiophene ring, a preservation property of image fastness of a printed matter using the ink composition of the present invention (for example, ozone gas fastness and light fastness) may be improved, and discoloration (a change in color) and decolorization (color fading) may be presented at a higher level, and a suitability to grey to black ink requiring a small change in discoloration and decolorization is improved.

It is preferred that the compound represented by Formula (1), (2-2), (3-2) or (4-2) is a compound represented by the following Formula (5-2).

Formula (5-2)

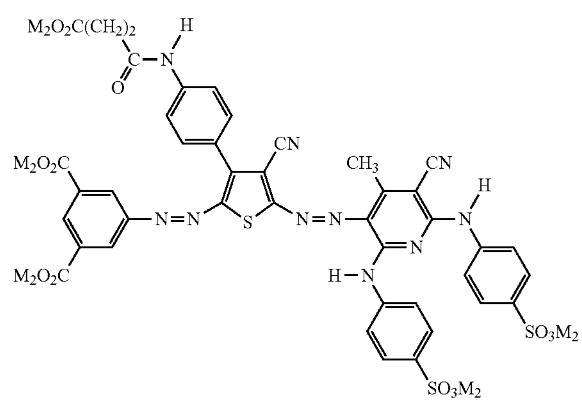

($M_2$'s each independently represent a hydrogen atom or a monovalent countercation, and in the case where $M_2$ represents a monovalent countercation, $M_2$ represents a lithium ion, a sodium ion, a potassium ion or an ammonium ion.)

Examples of $M_2$ in Formula (5-2) each independently have the same meaning as examples of M in Formula (2-2), and preferred examples thereof are also the same.

Further, the present invention relates to the azo compound represented by Formula (1), and the aqueous solution and the water-soluble ink composition using the azo compound of the present invention as a colorant mean a composition containing a coloring material such as a dye or a pigment and a dispersant thereof (solvent and the like), and particularly, may be suitably used to form an image.

It is also preferred that the compound represented by Formula (1) is a compound represented by the following Formula (1-3).

Hereinafter, the compound represented by Formula (1-3) or a salt thereof will be described in detail.

Formula (1-3)

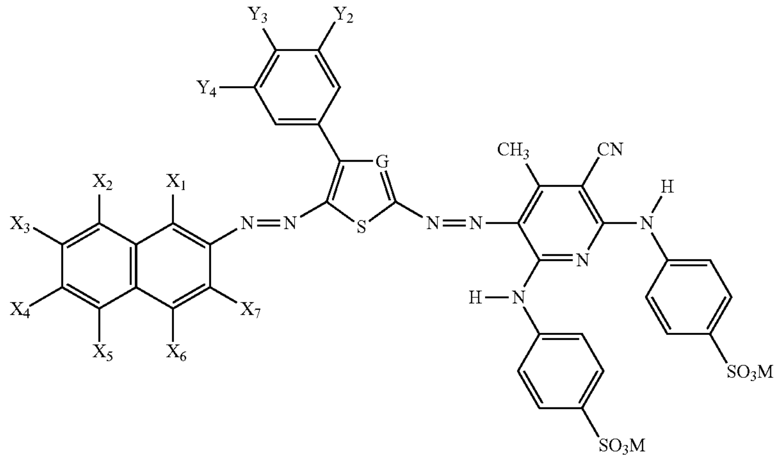

(In Formula (1-3), G represents a nitrogen atom or —C($R_2$)═. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $Y_2$, $Y_3$ and $Y_4$ each independently represent a hydrogen atom or a monovalent substituent. $Y_2$, $Y_3$ and $Y_4$ may be bound with each other to form a ring. All of $Y_2$, $Y_3$ and $Y_4$ do not represent a hydrogen atom at the same time. M's each independently represent a hydrogen atom or a monovalent countercation.)

Examples of G, $R_2$, $Y_2$, $Y_3$, $Y_4$ and M in Formula (1-3) each independently have the same meaning as examples of $R_2$, $Y_2$, $Y_3$, $Y_4$ and M in Formula (1), and preferred examples thereof are also the same.

In Formula (1-3), $X_1$, $X_2$, $X_3$, $X_4$, $X_5$, $X_6$ and $X_7$ each independently represent a hydrogen atom or a monovalent substituent. In the case where $X_1$, $X_2$, $X_3$, $X_4$, $X_5$, $X_6$ and $X_7$ represent a substituent, the substituent may be the aforementioned Group J of substituents.

$X_1$, $X_2$, $X_3$, $X_4$, $X_5$, $X_6$ and $X_7$ each independently represent preferably a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, phenylsulfonyl group, a nitro group, methoxycarbonyl group or a carbamoyl group, and particularly preferably a hydrogen atom, an ionic hydrophilic group or a cyano group.

In Formula (1-3), $X_1$, $X_3$, $X_5$ and $X_7$ each independently represent preferably any one of a hydrogen atom or Group J of substituents, and at least one of $X_2$, $X_4$, and $X_6$ preferably represents an electron-withdrawing group having a Hammett's σp value of 0.3 or more.

If at least one of $X_2$, $X_4$ and $X_6$ the electron-withdrawing group having a σp value in the aforementioned range, it is possible to adjust a color of the azo compound and improve light fastness and ozone gas fastness, thus being useful to a water-soluble dye for inkjet recording black ink.

$X_2$, $X_4$ and $X_6$ each independently represent preferably a hydrogen atom, an ionic hydrophilic group, a cyano group, a substituted or unsubstituted alkylsulfonyl group, a substituted or unsubstituted arylsulfonyl group, a nitro group, a substituted or unsubstituted alkoxycarbonyl group, a substituted or unsubstituted carbamoyl group, or a substituted or unsubstituted sulfamoyl group, more preferably a hydrogen atom, an ionic hydrophilic group, a cyano group, a methanesulfonyl group, a phenylsulfonyl group, a nitro group, a methoxycarbonyl group or a carbamoyl group, and particularly preferably a hydrogen atom, an ionic hydrophilic group or a cyano group.

Further, it is preferred that at least one of $X_2$, $X_4$, and $X_6$ is an electron-withdrawing group having a σp value of 0.3 or more, and it is more preferred that the electron-withdrawing group has an upper limit of the σp value of the Hammett's substituent constant of 1.0 or less, $X_2$ and $X_6$ is an ionic hydroxyl group, and $X_4$ represents an electron-withdrawing group having a σp value of 0.3 or more.

Specific examples of the electron-withdrawing group having a σp value of 0.3 or more may include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphonyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron-withdrawing group having a σp value of 0.3 or more, a nitro group, a heterocyclic group, a halogen atom, an azo group or a selenocyanate group. The electron-withdrawing group is preferably a cyano group, a methylsulfonyl group, a phenylsulfonyl group, a methoxycarbonyl group, a carbamoyl group or a nitro group, and more preferably a cyano group, a methylsulfonyl group or a nitro group.

From the viewpoints of the color, tinctorial strength and storage stability of water solubility, among the aforementioned matters, at least one of $X_2$, $X_4$ and $X_6$ is preferably an ionic hydrophilic group, it is preferred that at least one of $X_2$, $X_4$ and $X_6$ is an electron-withdrawing group having a Hammett's σp value of 0.3 or more, and it is more preferred that $X_3$ is an electron-withdrawing group having a Hammett's σp value of 0.3 or more, and $X_2$ and $X_6$ is an ionic hydrophilic group. The ionic hydrophilic group is preferably —$SO_3M_1$ or —$CO_2M_1$ ($M_1$ represents a hydrogen atom or a monovalent countercation), more preferably —$SO_3M_1$, and particularly preferably —$SO_3Li$.

A particularly preferred combination as the compound represented by Formula (1-3) includes the following (a) to (e).

(a) G represents a nitrogen atom or —C($R_2$)═, and is preferably —C($R_2$)═. $R_2$ represents a hydrogen atom, a sulfo group, a carboxyl group, a substituted or unsubstituted carbamoyl group or a cyano group, more preferably a carbamoyl group (—$CONH_2$ group) or a cyano group, and more preferably a cyano group.

(b) $Y_2$, $Y_3$ and $Y_4$ each independently represent preferably any one of a hydrogen atom, a substituted or unsubstituted heterocyclic amino group, an ionic hydrophilic group, a substituted or unsubstituted carbamoyl group, a substituted or unsubstituted sulfamoyl group, a substituted or unsubstituted alkylsulfonylamino group, a substituted or unsubstituted arylsulfonylamino group, and a substituted or unsubstituted acylamino group, more preferably any one of a hydrogen atom, a heterocyclic amino group having a substituted or unsubstituted amino group as a substituent, an ionic hydrophilic group, a substituted or unsubstituted alkylsulfonylamino group, a substituted or unsubstituted arylsulfonylamino group, and a substituted or unsubstituted acylamino group, and particularly preferably any one of a hydrogen atom, a heterocyclic amino group having a substituted or unsubstituted amino group as a substituent, an arylsulfonylamino group having an ionic hydrophilic group as a substituent, and an acylamino group having an ionic hydrophilic group as a substituent. The acylamino group is preferably an alkylcarbonylamino group, an alkylcarbonylamino group having an ionic hydrophilic group as a substituent, or an arylcarbonylamino group having an ionic hydrophilic group as a substituent. In the alkylcarbonylacyl group, the alkyl group is preferably a methyl group, an ethyl group or a n-propyl group, and more preferably an ethyl group. In the arylcarbonylacyl group, the aryl group is preferably a phenyl group.

It is most preferred that $Y_2$ and $Y_4$ represent a hydrogen atom and $Y_3$ is a heterocyclicamino group having a substituted or unsubstituted amino group as a substituent, an arylsulfonylamino group having an ionic hydrophilic group as a substituent, or an acylamino group having an ionic hydrophilic group as a substituent.

(c) The ionic hydrophilic group is preferably —$SO_3M_1$ or —$CO_2M_1$ ($M_1$ represents a hydrogen atom or a monovalent countercation), more preferably —$SO_3M_1$, and particularly preferably —$SO_3Li$.

(d) $M_1$ and M each independently represent a hydrogen atom or a monovalent countercation, and the monovalent countercation may be, for example, an ammonium ion, an alkali metal ion (e.g., a lithium ion, a sodium ion or a potassium ion), or an organic cation (e.g., a tetramethylammonium ion, a tetramethylguanidium ion or tetramethylphosphonium), and is preferably a lithium salt, a sodium salt, a potassium salt or an ammonium salt, more preferably a lithium salt or a mixed salt including a lithium salt as a main component, and most preferably a lithium salt.

(e) $X_1$, $X_2$, $X_3$, $X_4$, $X_5$, $X_6$ and $X_7$ each independently represent preferably any one of a hydrogen atom or Group J of substituents, and is more preferably a hydrogen atom, an ionic hydrophilic group, a cyano group, a methanesulfonyl group, a phenylsulfonyl group, a nitro group, a methoxycarbonyl group or a carbamoyl group, and particularly preferably a hydrogen atom, an ionic hydrophilic group or a cyano group. $X_1$, $X_3$, $X_5$ and $X_7$ each independently represents preferably any one of a hydrogen atom or Group J of substituents, and it is preferred that at least one of $X_2$, $X_4$ and $X_6$ represents an electron-withdrawing group having a Hammett's $\sigma p$ value of 0.3 or more, and it is more preferred that $X_4$ is an electron-withdrawing group having a Hammett's $\sigma p$ value of 0.3 or more, and $X_2$ and $X_6$ are an ionic hydrophilic group. The ionic hydrophilic group is preferably —$SO_3M_1$ or —$CO_2M_1$ ($M_1$ represents a hydrogen atom or a monovalent countercation), more preferably —$SO_3M_1$, and particularly preferably —$SO_3Li$.

The preferred factors of this structure may be exemplified by the fact that it is possible to electronically and sterically impart an azo colorant structure in which the water solubility of the azo compound of Formula (1-3) can be enhanced, and a good color and tinctorial strength and a high storage stability are compatible with each other.

As a result, the storage stability as an aqueous solution is enhanced, and the light fastness, the heat stability, the moist heat stability, the water resistance, the gas resistance and/or the solvent resistance, which are performance requirements for inks, are considerably enhanced, thereby it being a preferred example.

It is also preferred that the compound represented by Formula (1-3) is a compound represented by the following Formula (2-3).

Hereinafter, the compound represented by Formula (2-3) or a salt thereof will be described in detail.

Compound (2-3)

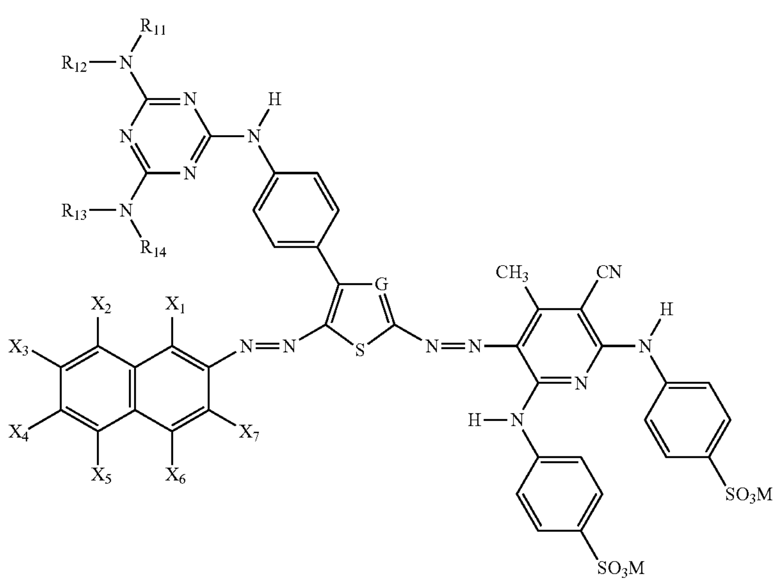

(In Formula (2-3), G represents a nitrogen atom or —C($R_2$)=. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $R_{11}$, $R_{12}$, $R_{13}$ and $R_{14}$ each independently represent a hydrogen atom or a monovalent substituent. M's each independently represent a hydrogen atom or a monovalent countercation.)

Examples of G, $R_2$, $X_1$ to $X_7$ and M in Formula (2-3) each independently have the same meaning as examples of G, $R_2$, $X_1$ to $X_7$ and M in Formula (1-3), and preferred examples thereof are also the same.

In Formula (2-3), the monovalent substituent represented by $R_{11}$, $R_{12}$, $R_{13}$ and $R_{14}$ may be exemplified by Group A' of substituents, and is preferably a substituted or unsubstituted alkyl group, a substituted or unsubstituted aryl group, or a substituted or unsubstituted heterocyclic group, and more preferably an alkyl group substituted with an ionic hydrophilic group, or an aryl group substituted with an ionic hydrophilic group.

It is preferred that one of $R_{11}$ and $R_{12}$ is a hydrogen atom and the other is a hydrogen atom, or an alkyl group or an aryl group having an ionic hydrophilic group. It is also preferred that one of $R_{13}$ and $R_{14}$ is a hydrogen atom and the other is a hydrogen atom, or an alkyl group or an aryl group having an ionic hydrophilic group.

Specifically, since the water solubility of the dyes and the association of the dyes in water solubility may be enhanced (the interaction between molecules of the dyes is enhanced) by combination in which one of the substituents ($R_{11}$ and $R_{12}$) of the amino group on the s-triazine ring is a hydrogen atom and the other is an alkyl group or an aryl group having an ionic hydrophilic group, and one of the substituents ($R_{13}$ and $R_{14}$) is a hydrogen atom and the other is an alkyl group or an aryl group having an ionic hydrophilic group, it is preferred in that the storage stability of the water-soluble ink for inkjet (prevention of colorant precipitation and suppression of colorant decomposition) may be considerably enhanced.

It is preferred that the compound represented by Formula (1) or (2-3) is a compound represented by the following Formula (3-3).

Hereinafter, the compound represented by Formula (3-3) or a salt thereof will be described in detail.

Formula (3-3)

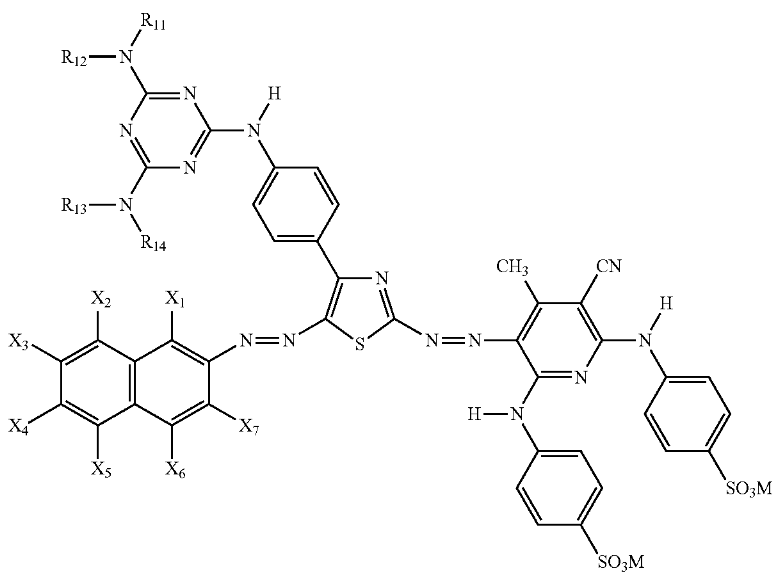

(In Formula (3-3), $R_{11}$, $R_{12}$, $R_{13}$ and $R_{14}$ each independently represent a hydrogen atom or a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

Examples of $X_1$ to $X_7$, $R_{11}$ to $R_{14}$ and M in Formula (3-3) each independently have the same meaning as examples of $X_1$ to $X_7$, $R_{11}$ to $R_{14}$ and M in Formula (2-3), and preferred examples thereof are also the same.

It is preferred that the compound represented by Formula (1) or (2-3) is a compound represented by the following Formula (4-3).

Hereinafter, the compound represented by Formula (4-3) or a salt thereof will be described in detail.

(Formula 4-3)

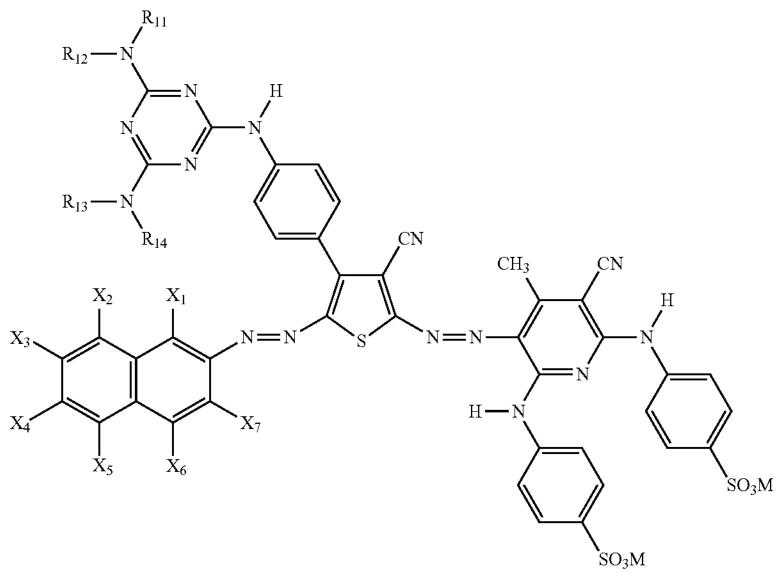

(In Formula (4-3), $R_{11}$, $R_{12}$, $R_{13}$ and $R_{14}$ each independently represent a hydrogen atom or a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

Examples of $X_1$ to $X_7$, $R_{11}$ to $R_{14}$ and M each independently have the same meaning as examples of $X_1$ to $X_7$, $R_{11}$ to $R_{14}$ and M in Formula (2-3), and preferred examples thereof are also the same.

A particularly preferred combination as the compound represented by Formula (2-3), (3-3) or (4-3) includes the following (a) to (d).

(a) The monovalent substituent represented by $R_{11}$ to $R_{14}$ may be exemplified by Group A' of substituents, and is preferably a substituted or unsubstituted alkyl group, a substituted or unsubstituted aryl group, or a substituted or unsubstituted heterocyclic group, and more preferably an alkyl group substituted with an ionic hydrophilic group, or an aryl group substituted with an ionic hydrophilic group.

(b) The ionic hydrophilic group is preferably —$SO_3M_1$ or —$CO_2M_1$, more preferably —$SO_3M_1$, and particularly preferably —$SO_3Li$.

(c) $M_1$ and M each independently represent a hydrogen atom or a monovalent countercation, and the monovalent countercation may be, for example, an ammonium ion, an alkali metal ion (e.g., a lithium ion, a sodium ion or a potassium ion), or an organic cation (e.g., a tetramethylammonium ion, a tetramethylguanidium ion or tetramethylphosphonium), and is preferably a lithium salt, a sodium salt, a potassium salt or an ammonium salt, more preferably a lithium salt or a mixed salt including a lithium salt as a main component, and most preferably a lithium salt.

(d) At least one of $X_2$, $X_4$ and $X_6$ is preferably an ionic hydrophilic group, and it is preferred that at least one of $X_2$, $X_4$ and $X_6$ is an electron-withdrawing group having a Hammett's σp value of 0.3 or more, and it is more preferred that $X_4$ is an electron-withdrawing group having a Hammett's σp value of 0.3 or more, and $X_2$ and $X_6$ are an ionic hydrophilic group.

The preferred factor of this structure may be exemplified by the fact that the water solubility of the azo compound of Formula (2-3), (3-3) or (4-3) and association of azo dyes in an aqueous solution are considerably enhanced, and particularly, a storage stability in an aqueous solution is enhanced.

As a result, the storage stability for a long period of time is achieved, and the light fastness, the heat stability, the moist heat stability, the water resistance, the gas resistance and/or the solvent resistance, which are performance requirements for inks, are considerably enhanced, thereby it being a preferred example.

It is preferred that the compound represented by Formula (1-3) is a compound represented by the following Formula (2-4).

Hereinafter, the compound represented by Formula (2-4) or a salt thereof will be described in detail.

Formula (2-4)

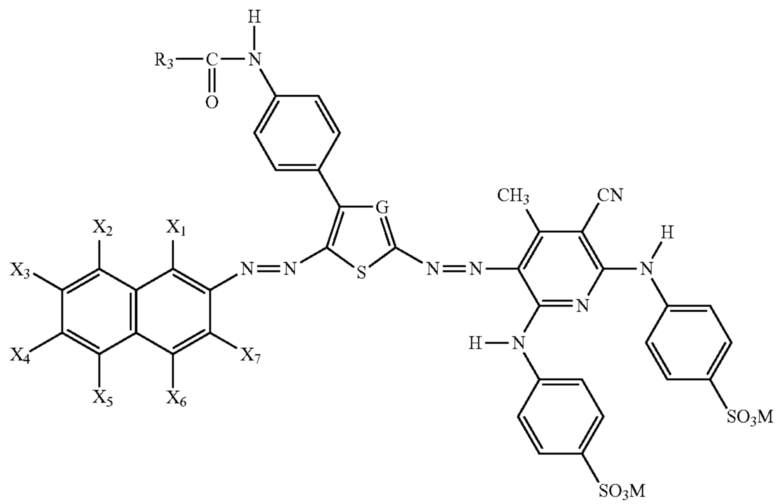

(In Formula (2-4), G represents a nitrogen atom or —C($R_2$)=. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $R_3$ represents a monovalent substituent. M's each independently represent a hydrogen atom or a monovalent countercation.)

Examples of G, $X_1$ to $X_7$, $R_2$ and M in Formula (2-4) each independently have the same meaning as examples of $X_1$ to $X_7$, $R_2$ and M in Formula (I-3), and preferred examples thereof are also the same.

In Formula (2-4), the monovalent substituent represented by $R_3$ may be exemplified by Group A' of substituents, and is preferably a substituted or unsubstituted alkyl group, a substituted or unsubstituted aryl group, or a heterocyclic group, and more preferably an alkyl group, an aryl group substituted with an ionic hydrophilic group.

It is preferred that the compound represented by Formula (1-3) or (2-4) is a compound represented by the following Formula (3-4).

Hereinafter, the compound represented by Formula (3-4) or a salt thereof will be described in detail.

Formula (3-4)

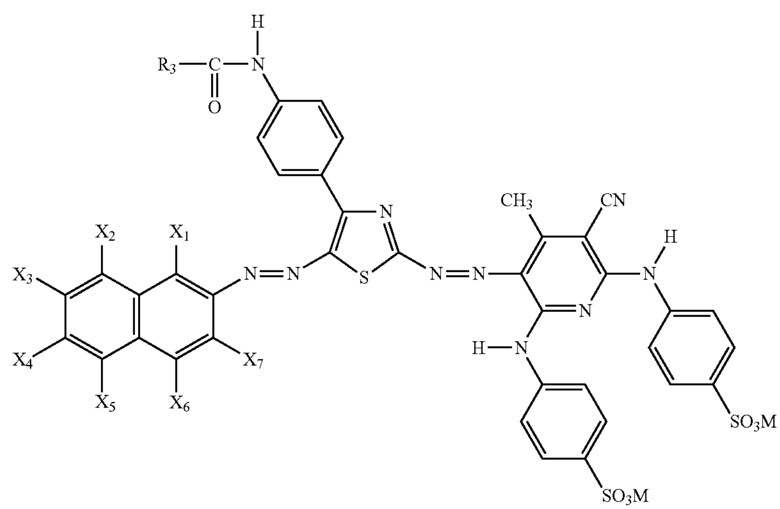

(In Formula (3-4), $R_3$ represents a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

Examples of M, $R_3$ and $X_1$ to $X_7$ in Formula (3-4) each independently have the same meaning as examples of M, $R_3$ and $X_1$ to $X_7$ in Formula (2-4), and preferred examples thereof are also the same.

A particularly preferred combination as the compound represented by Formula (2-4) or (3-4) includes the following (a) to (d).

(a) The monovalent substituent represented by $R_3$ may be exemplified by Group A' of substituents, and is preferably a substituted or unsubstituted alkyl group, a substituted or unsubstituted aryl group, or a heterocyclic group, and more preferably an alkyl group substituted with an ionic hydrophilic group, or an aryl group substituted with an ionic hydrophilic group.

(b) The ionic hydrophilic group is preferably —$SO_3M_1$ or —$CO_2M_1$, more preferably —$SO_3M_1$, and particularly preferably —$SO_3Li$.

(c) $M_1$ and M each independently represent a hydrogen atom or a monovalent countercation, and the monovalent countercation may be, for example, an ammonium ion, an alkali metal ion (e.g., a lithium ion, a sodium ion or a potassium ion), or an organic cation (e.g., a tetramethylammonium ion, a tetramethylguanidium ion or tetramethylphosphonium), and is preferably a lithium salt, a sodium salt, a potassium salt or an ammonium salt, more preferably a lithium salt or a mixed salt including a lithium salt as a main component, and most preferably a lithium salt.

(d) At least one of $X_2$, $X_4$ and $X_6$ is preferably an ionic hydrophilic group, and it is preferred that at least one of $X_2$, $X_4$ and $X_6$ is an electron-withdrawing group having a Hammett's σp value of 0.3 or more, and it is more preferred that $X_4$ is an electron-withdrawing group having a Hammett's σp value of 0.3 or more, and $X_2$ and $X_6$ are an ionic hydrophilic group.

The preferred factor of this structure may be exemplified by the fact that the water solubility of the azo compound of Formula (2-4) or (3-4) and association of azo dyes in an aqueous solution are considerably enhanced, and particularly, a storage stability in an aqueous solution is enhanced.

As a result, the storage stability for a long period of time is achieved, and the light fastness, the heat stability, the moist heat stability, the water resistance, the gas resistance and/or the solvent resistance, which are performance requirements for inks, are considerably enhanced, thereby it being a preferred example.

It is preferred that the compound represented by Formula (1-3) or (2-4) is a compound represented by the following Formula (4-4).

Hereinafter, the compound represented by Formula (4-4) or a salt thereof will be described in detail.

Formula (4-4)

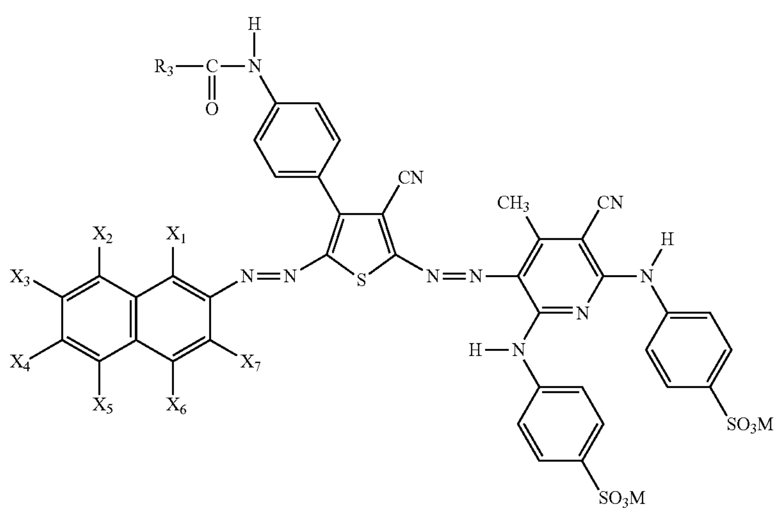

(In Formula (4-4), $R_3$ represents a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

Examples of $R_3$, $X_1$ to $X_7$ and M in Formula (4-4) each independently have the same meaning as examples of $R_3$, $X_1$ to $X_7$ and M in Formula (2-4), and preferred examples thereof are also the same.

Further, the present invention relates to the azo compound represented by Formula (1), and the ink composition using the azo compound of the present invention as a colorant mean a composition containing a coloring material such as a dye or a pigment and a dispersant thereof (solvent and the like), and particularly, may be suitably used to form an image.

Formula (1)

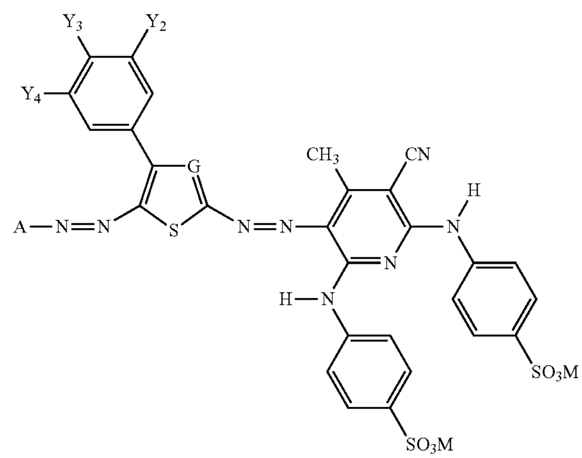

(In Formula (1), A represents a substituted or unsubstituted aryl group or a substituted or unsubstituted nitrogen-containing 5-membered heterocyclic group. G represents a nitrogen atom or —$C(R_2)$=. $R_2$ represents a hydrogen atom, a sulfo group, a carboxyl group, a substituted or unsubstituted carbamoyl group or a cyano group. $Y_2$, $Y_3$ and $Y_4$ each independently represent a hydrogen atom or a monovalent substituent. $Y_2$, $Y_3$ and $Y_4$ may be bound with each other to form a ring. All of $Y_2$, $Y_3$ and $Y_4$ do not represent a hydrogen atom at the same time. M's each independently represent a hydrogen atom or a monovalent countercation.)

Examples of G, A, $R_2$, $Y_2$, $Y_3$, $Y_4$ and M in Formula (1) each independently have the same meaning as examples of G, A, $R_2$, $Y_2$, $Y_3$, $Y_4$ and M in Formula (1) as described above, and preferred examples thereof are also the same.

It is preferred that the azo compound represented by Formula (1) is an azo compound represented by the following Formula (3-1).

Formula (3-1)

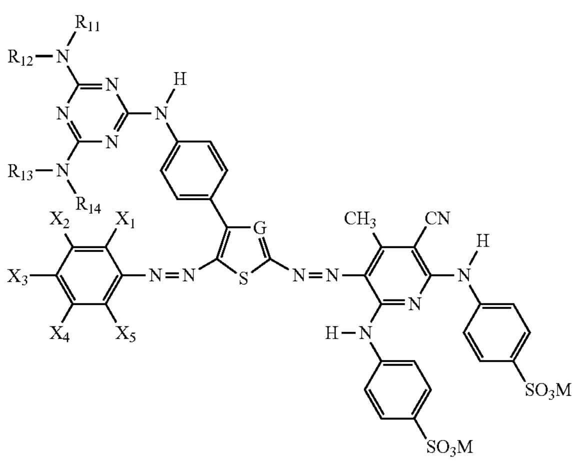

(In Formula (3-1), G represents a nitrogen atom or —C($R_2$)=. $R_2$ represents a hydrogen atom, a sulfo group, a carboxyl group, a substituted or unsubstituted carbamoyl group or a cyano group. $R_{11}$, $R_{12}$, $R_{13}$ and $R_{14}$ each independently represent a hydrogen atom or a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

Examples of G, $R_2$, $R_{11}$, $R_{12}$, $R_{13}$, $R_{14}$, $X_1$, $X_2$, $X_3$, $X_4$, $X_5$ and M in Formula (3-1) each independently have the same meaning as examples of G, $R_2$, $R_{11}$, $R_{12}$, $R_{13}$, $R_{14}$, $X_1$, $X_2$, $X_3$, $X_4$, $X_5$ and M in Formula (3-1) as described above, and preferred examples thereof are also the same.

It is preferred that the azo compound represented by Formula (3-1) is an azo compound represented by the following Formula (4-1).

Formula (4-1)

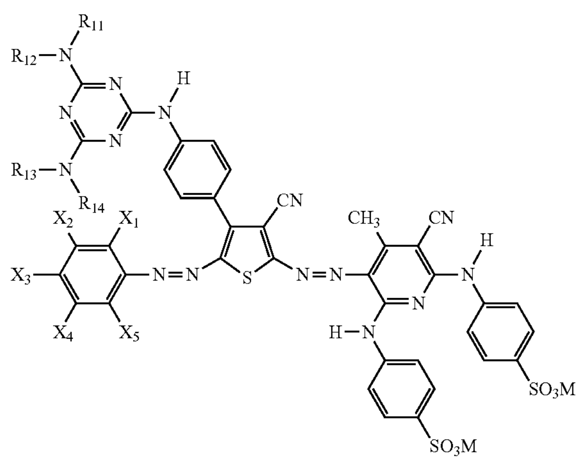

(In Formula (4-1), $R_{11}$, $R_{12}$, $R_{13}$ and $R_{14}$ each independently represent a hydrogen atom or a monovalent substituent. $X_1$, $X_2$, $X_3$, $X_4$ and $X_5$ each independently represent a hydrogen atom or a monovalent substituent. M's each independently represent a hydrogen atom or a monovalent countercation.)

Examples of $R_{11}$, $R_{12}$, $R_{13}$, $R_{14}$, $X_1$, $X_2$, $X_3$, $X_4$, $X_5$ and M in Formula (4-1) each independently have the same meaning as examples of $R_{11}$, $R_{12}$, $R_{13}$, $R_{14}$, $X_1$, $X_2$, $X_3$, $X_4$, $X_5$ and M in Formula (4-1) as described above, and preferred examples thereof are also the same.

It is preferred that the azo compound represented by Formula (4-1) is an azo compound represented by the following Formula (5).

Formula (5)

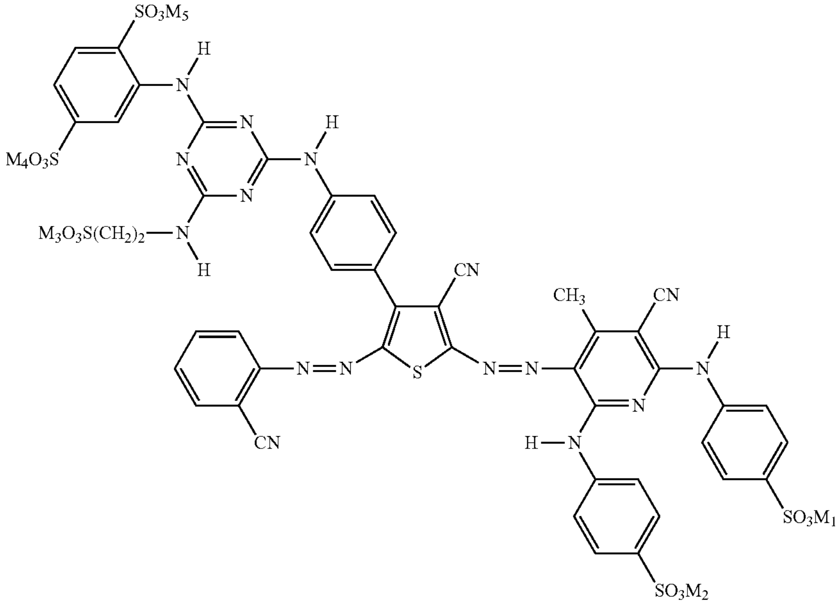

(In Formula (5), $M_1$, $M_2$, $M_3$, $M_4$ and $M_5$ each independently represent a hydrogen atom or a monovalent countercation, and in the case where $M_1$, $M_2$, $M_3$, $M_4$ and $M_5$ represent a monovalent countercation, $M_1$, $M_2$, $M_3$, $M_4$ and $M_5$ represent a lithium ion, a sodium ion, a potassium ion or an ammonium ion.)

It is preferred that the azo compound represented by Formula (1) is an azo compound represented by the following Formula (6).

Formula (6)

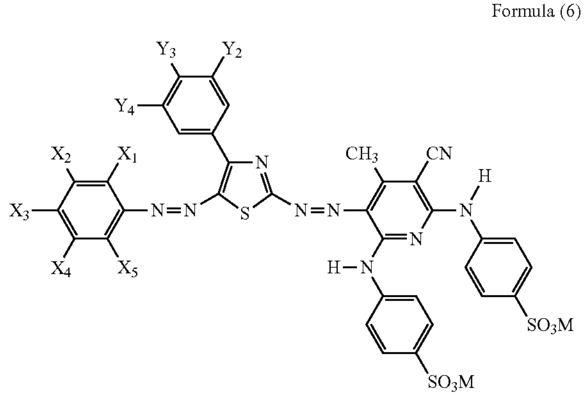

(In Formula (6), $X_1$, $X_2$, $X_3$, $X_4$ and $X_5$ each independently represent a hydrogen atom or a monovalent substituent. $Y_2$, $Y_3$ and $Y_4$ each independently represent a hydrogen atom or a monovalent substituent. All of $Y_2$, $Y_3$ and $Y_4$ do not represent a hydrogen atom at the same time. M's each independently represent a hydrogen atom or a monovalent countercation.)

Examples of $X_1$, $X_2$, $X_3$, $X_4$, $X_5$ and M in Formula (6) each independently have the same meaning as examples of $X_1$, $X_2$, $X_3$, $X_4$, $X_5$ and M in Formula (3-1), and preferred examples thereof are also the same.

Examples of $Y_2$, $Y_3$ and $Y_4$ in Formula (6) each independently have the same meaning as examples of $Y_2$, $Y_3$ and $Y_4$ in Formula (1), and preferred examples thereof are also the same.

It is preferred that the azo compound represented by Formula (1) is an azo compound represented by the following Formula (7).

Formula (7)

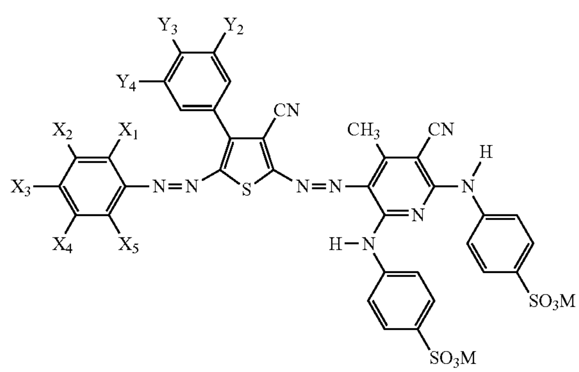

(In Formula (7), $X_1$, $X_2$, $X_3$, $X_4$ and $X_5$ each independently represent a hydrogen atom or a monovalent substituent. $Y_2$, $Y_3$ and $Y_4$ each independently represent a hydrogen atom or a monovalent substituent. All of $Y_2$, $Y_3$ and $Y_4$ do not represent a hydrogen atom at the same time. M's each independently represent a hydrogen atom or a monovalent countercation.)

Examples of $Y_2$, $Y_3$, $Y_4$, $X_1$ to $X_5$ and M in Formula (7) each independently have the same meaning as examples of $Y_2$, $Y_3$, $Y_4$, $X_1$ to $X_5$ and M in Formula (6), and preferred examples thereof are also the same.

It is preferred that the azo compound represented by Formula (1) or (7) is an azo compound represented by the following Formula (8).

Formula (8)

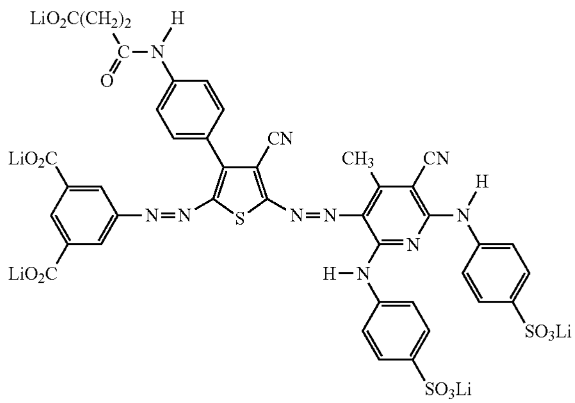

Further, the present invention relates to the azo compound represented by Formula (2-3), and the ink composition using the azo compound of the present invention as a colorant mean a composition containing a coloring material such as a dye or a pigment and a dispersant thereof (solvent and the like), and particularly, may be suitably used to form an image.

Compound (2-3)

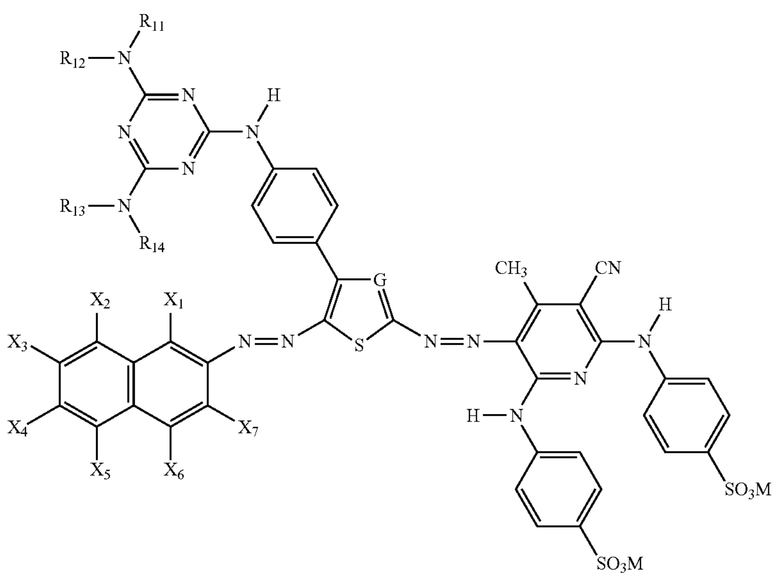

(In Formula (2-3), G represents a nitrogen atom or —C($R_2$)═. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $R_{11}$, $R_{12}$, $R_{13}$ and $R_{14}$ each independently represent a hydrogen atom or a monovalent substituent. M's each independently represent a hydrogen atom or a monovalent countercation.)

Examples of G, $R_2$, $R_{11}$, $R_{12}$, $R_{13}$, $R_{14}$, $X_1$ to $X_7$ and M in Formula (2-3) each independently have the same meaning as examples of O, $R_2$, $R_{11}$, $R_{12}$, $R_{13}$, $R_{14}$, $X_1$ to $X_7$ and M in Formula (2-3) as described above, and preferred examples thereof are also the same.

It is preferred that the azo compound represented by Formula (2-3) is an azo compound represented by the following Formula (4-3).

(Formula 4-3)

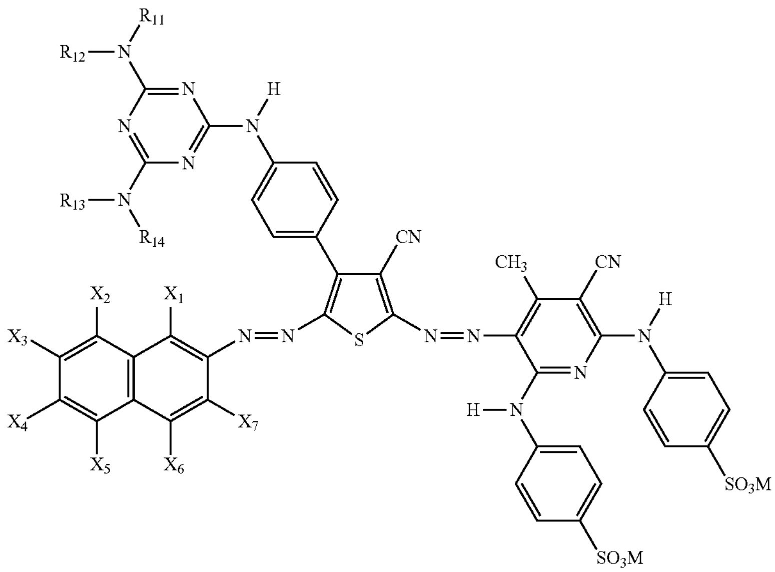

(In Formula (4-3), $R_{11}$, $R_{12}$, $R_{13}$ and $R_{14}$ each independently represent a hydrogen atom or a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

Examples of $R_{11}$, $R_{12}$, $R_{13}$, $R_{14}$, $X_1$ to $X_7$ and M in Formula (4-3) each independently have the same meaning as examples of $R_{11}$, $R_{12}$, $R_{13}$, $R_{14}$, $X_1$ to $X_7$ and M in Formula (4-3) as described above, and preferred examples thereof are also the same.

Further, the present invention relates to the azo compound represented by Formula (2-4), and the ink composition using the azo compound of the present invention as a colorant mean a composition containing a coloring material such as a dye or a pigment and a dispersant thereof (solvent and the like), and particularly, may be suitably used to form an image.

Formula (2-4)

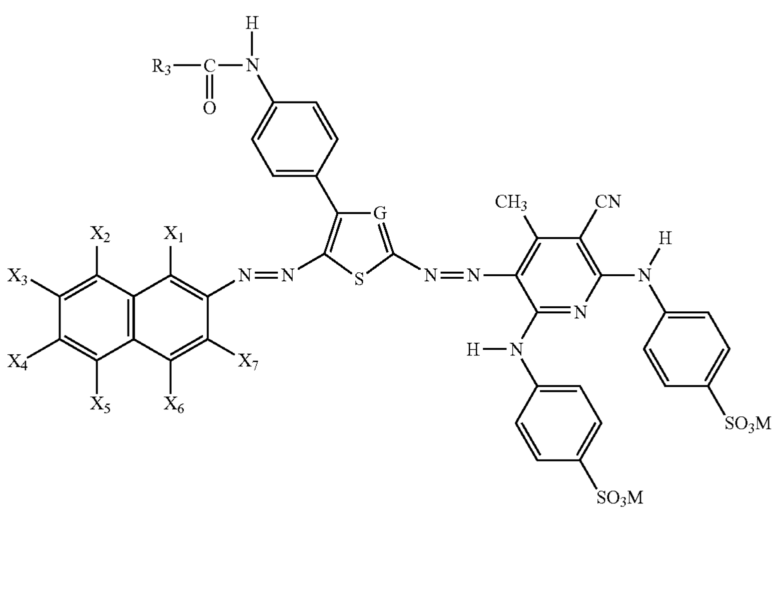

(In Formula (2-4), G represents a nitrogen atom or —C($R_2$)=. $R_2$ represents a hydrogen atom, a sulfo group, a carboxyl group, a substituted or unsubstituted carbamoyl group or a cyano group. $X_1$, $X_2$, $X_3$, $X_4$, $X_5$, $X_6$ and $X_7$ each independently represent a hydrogen atom or a monovalent substituent. $R_3$ represents a monovalent substituent. M's each independently represent a hydrogen atom or a monovalent countercation.)

It is preferred that the azo compound represented by Formula (2-4) is an azo compound represented by the following Formula (3-4).

Formula (3-4)

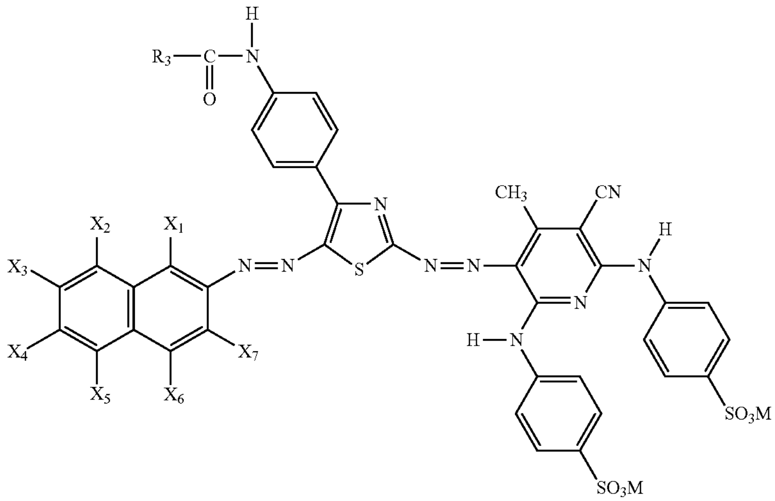

(In Formula (3-4), $R_3$ represents a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

It is preferred that the azo compound represented by Formula (2-4) is an azo compound represented by the following Formula (4-4).

Formula (4-4)

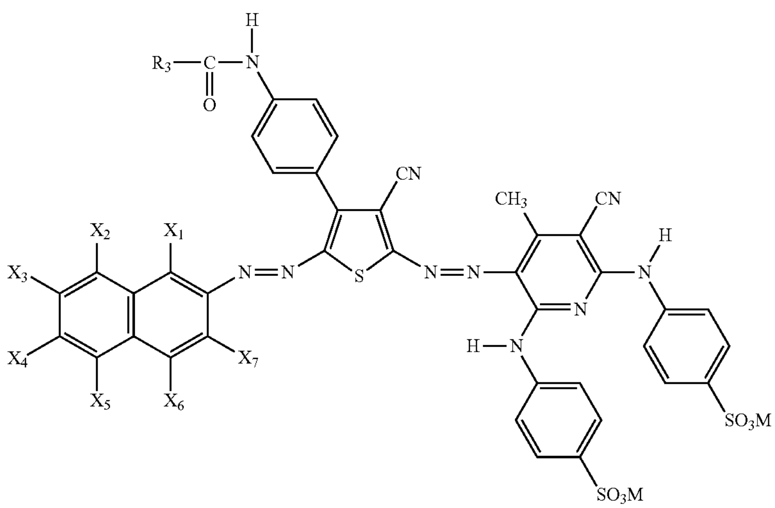

(In Formula (4-4), $R_3$ represents a monovalent substituent. $X_1$, $X_2$, $X_3$, $X_4$, $X_5$, $X_6$ and $X_7$ each independently represent a hydrogen atom or a monovalent substituent. M's each independently represent a hydrogen atom or a monovalent countercation.)

The compound represented by Formulas (1), (2-1), (2-2), (2-3), (2-4), (3-1), (3-2), (3-3), (3-4), (4-1), (4-2), (4-3), (4-4), (5) to (7) or (8) has a maximum absorption wavelength (λmax) of preferably 550 nm to 700 nm, and particularly preferably 580 nm to 650 nm in the absorption spectrum measured by using water as a solvent.

Further, in the present invention, the compound represented by Formulas (1), (2-1), (2-2), (2-3), (2-4), (3-1), (3-2), (3-3), (3-4), (4-1), (4-2), (4-3), (4-4), (5) to (7) or (8) has preferably at least three or more ionic hydrophilic groups. The compound has more preferably 3 to 6 ionic hydrophilic groups, and still more preferably 4 to 5 ionic hydrophilic groups. Accordingly, there are exhibited effects that the water solubility of the azo compound and the storage stability of the aqueous solution of the present invention are improved, the performance required as a water-soluble dye for inkjet recording black ink are satisfied at a high level, and an image quality of an inkjet printed matter is further improved when the compound is used as an ink for inkjet recording.

In the azo compound represented by Formula (1), (2-1), (2-2), (2-3), (2-4), (3-1), (3-2), (3-3), (3-4), (4-1), (4-2), (4-3), (4-4), (5) to (7) or (8), it is preferred that at least one M is a lithium ion.

Further, in the present invention, although the compound represented by Formula (1), (2-1), (2-2), (2-3), (2-4), (3-1), (3-2), (3-3), (3-4), (4-1), (4-2), (4-3), (4-4), (5) to (7) or (8) contains isotope elements (for example, 2H, 3H, 13C and 15N), the compound may be applied.

Hereinafter, specific examples of the compounds Formula (1), (2-1), (2-2), (2-3), (2-4), (3-1), (3-2), (3-3), (3-4), (4-1), (4-2), (4-3), (4-4) and (5) to (7) are shown below, but the compound used in the present invention is not limited to the following examples. M represents a hydrogen atom or a monovalent countercation (a lithium ion, a sodium ion, a potassium ion or an ammonium ion).
(BLACK-1)
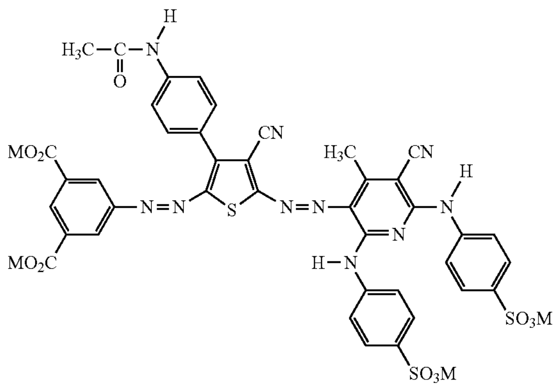
(BLACK-2)
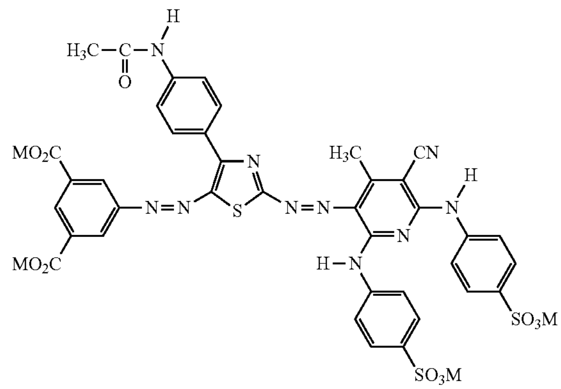
(BLACK-3)
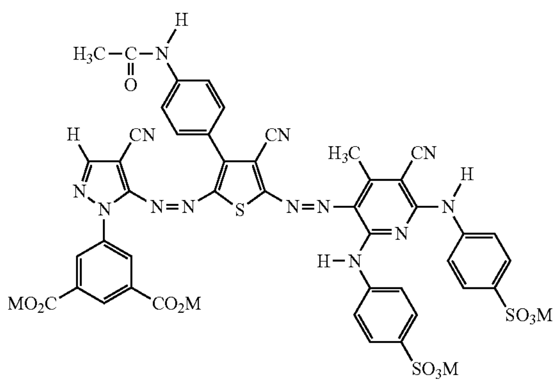
(BLACK-4)
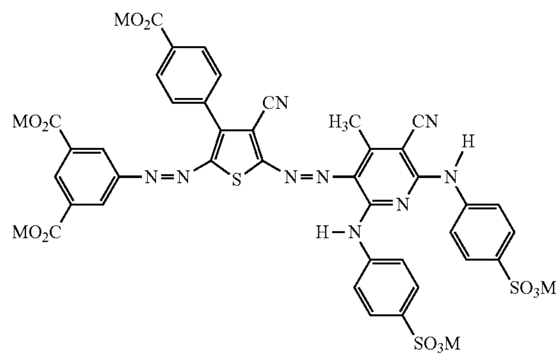
(BLACK-5)
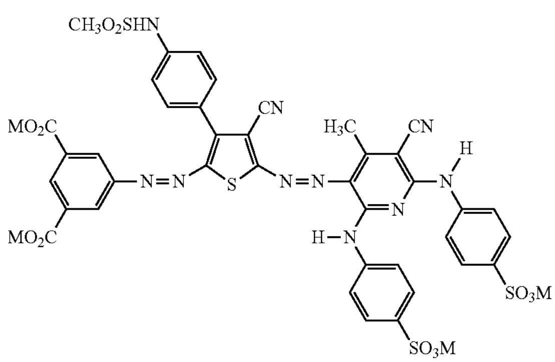
(BLACK-6)
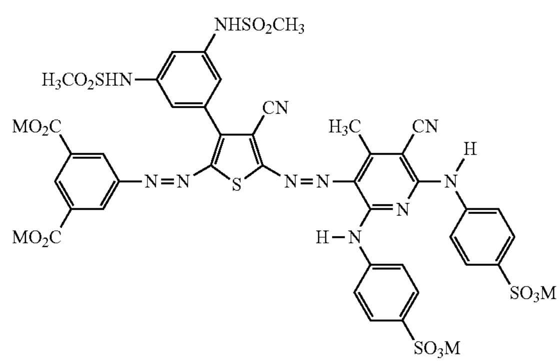

-continued
(BLACK-7)
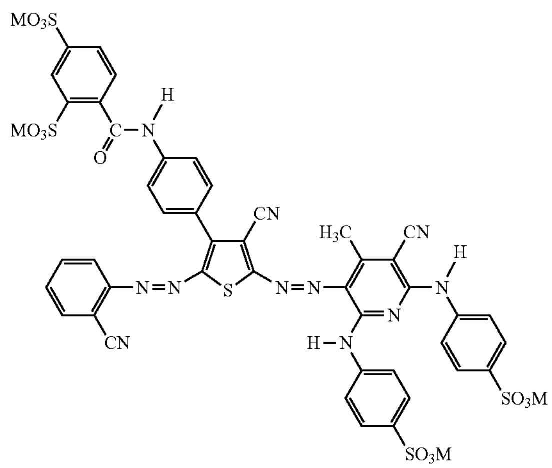
(BLACK-8)
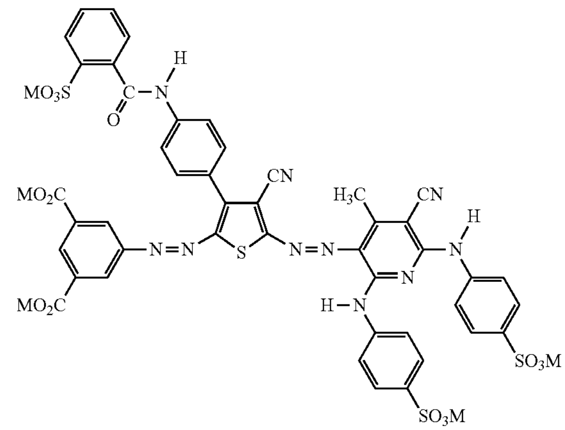
(BLACK-9)
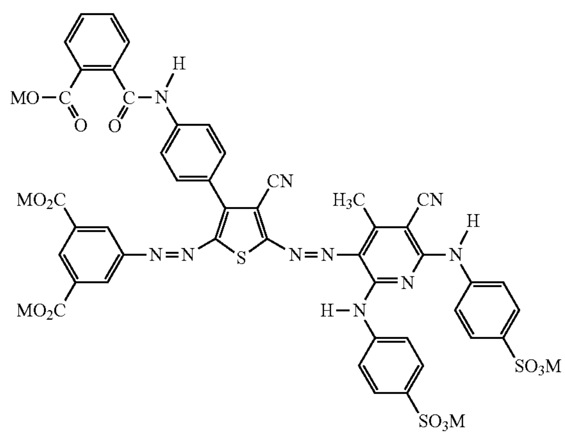
(BLACK-10)
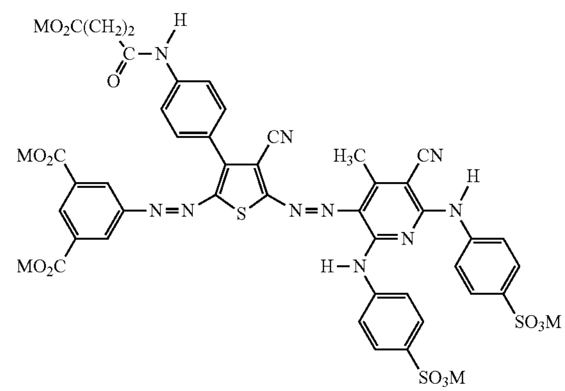
(BLACK-11)
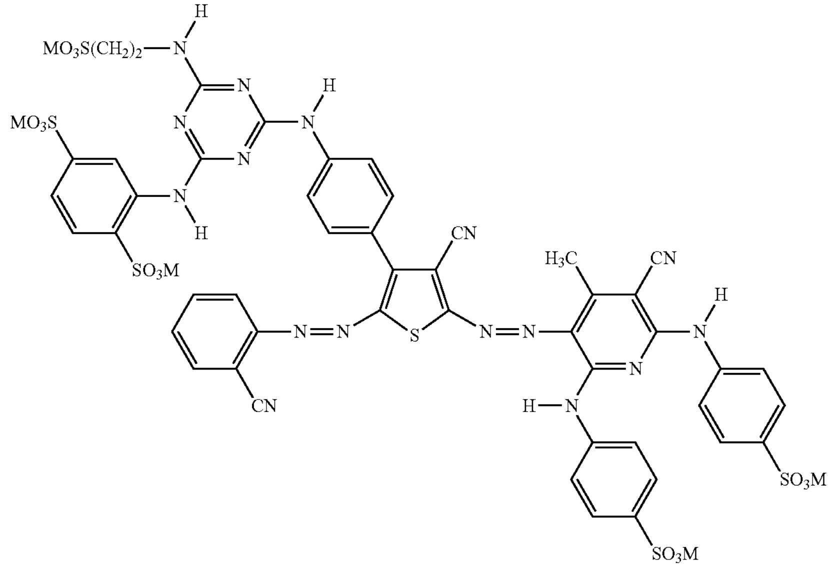

-continued
(BLACK-12)
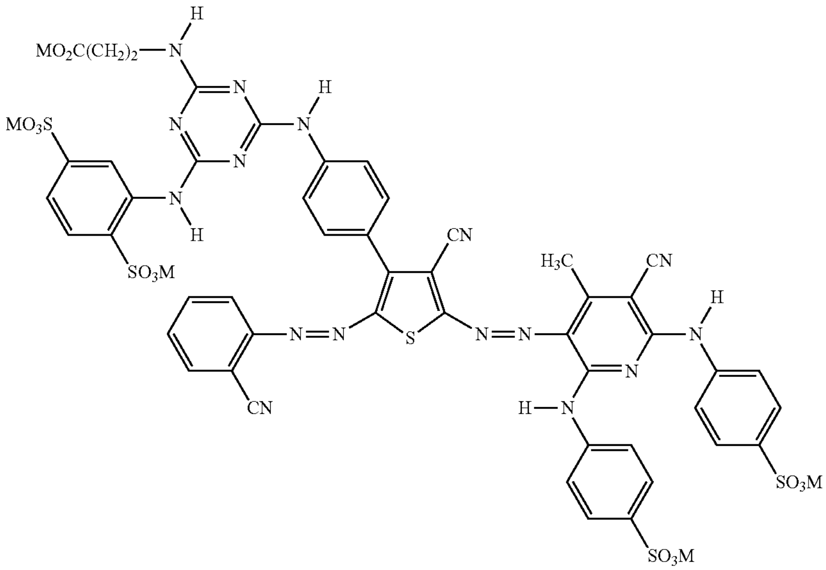
(BLACK-20)
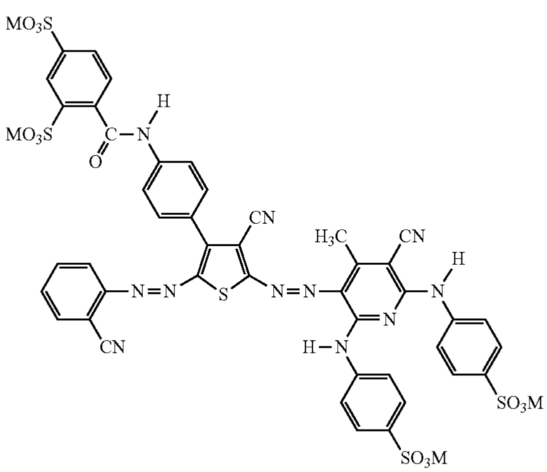
(BLACK-21)
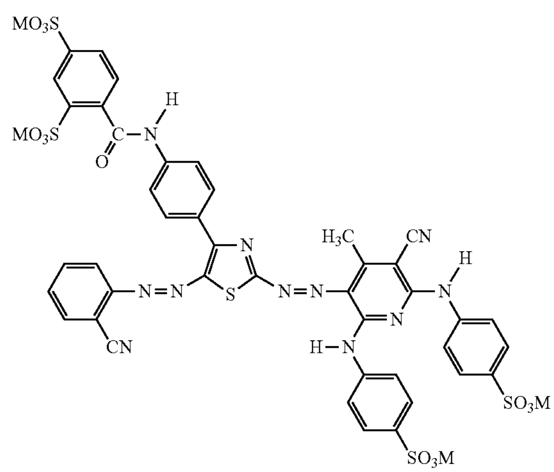
(BLACK-22)
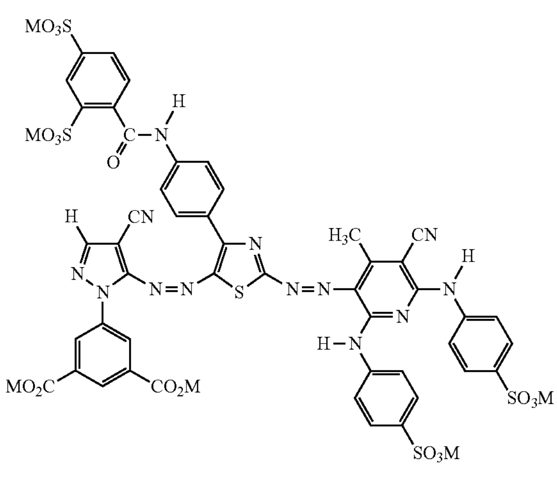
(BLACK-23)
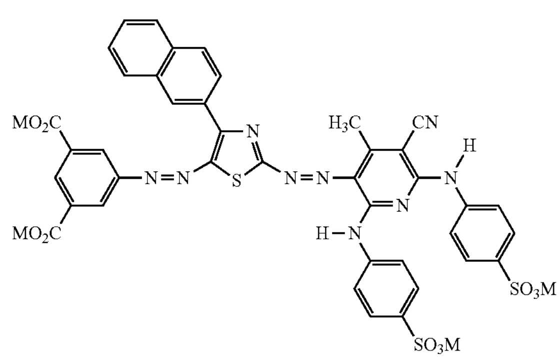

-continued
(BLACK-24)
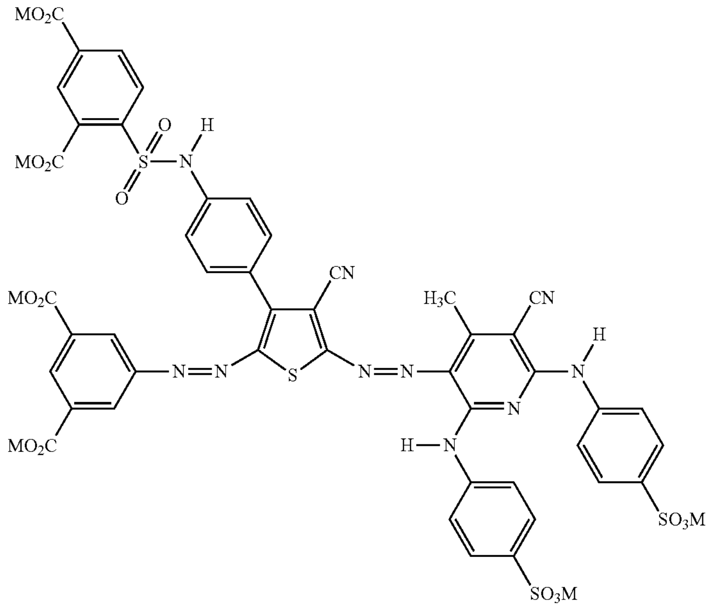
(BLACK-31)
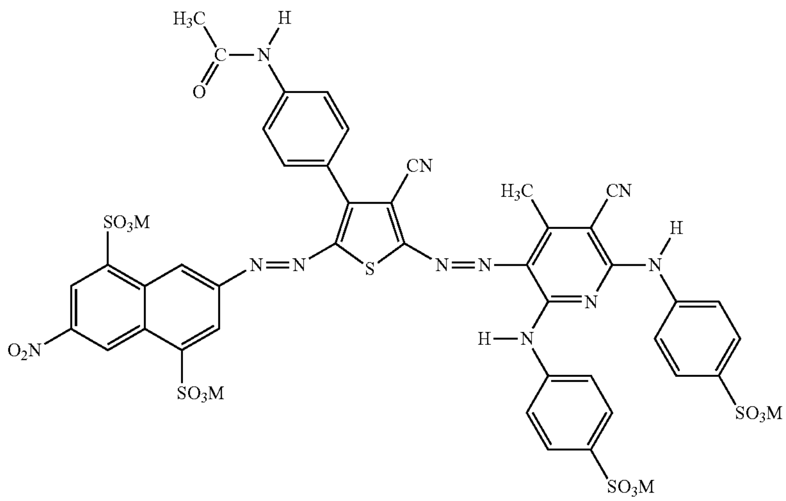
(BLACK-32)
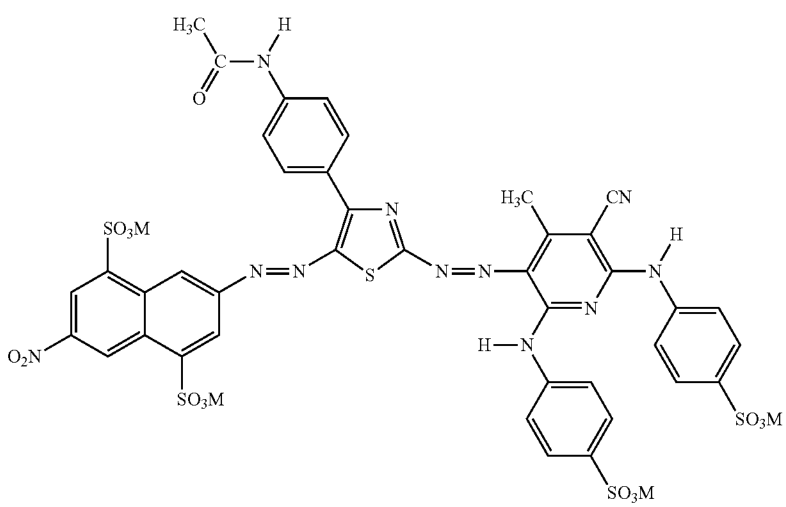

-continued
(BLACK-33)
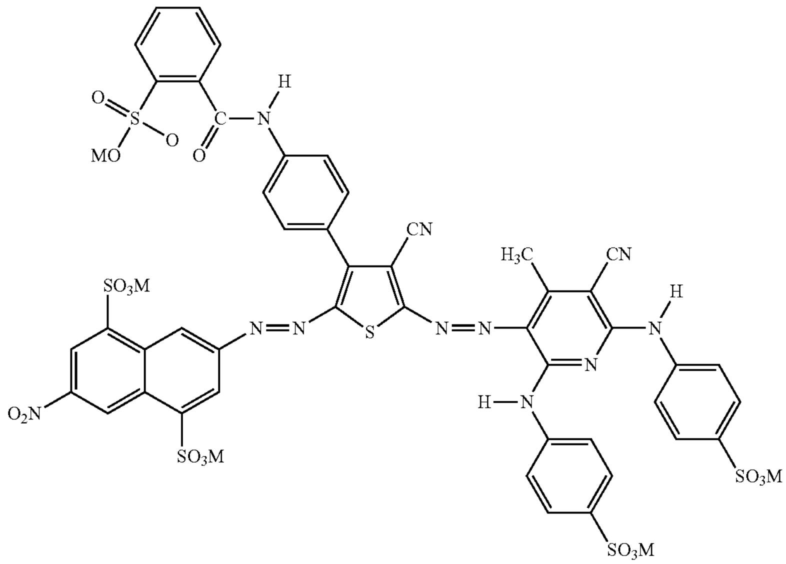
(BLACK-34)
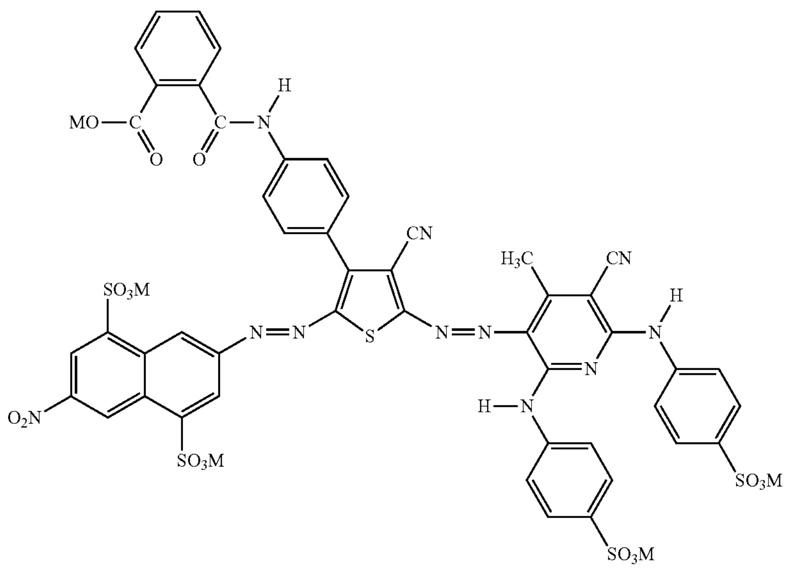
(BLACK-35)
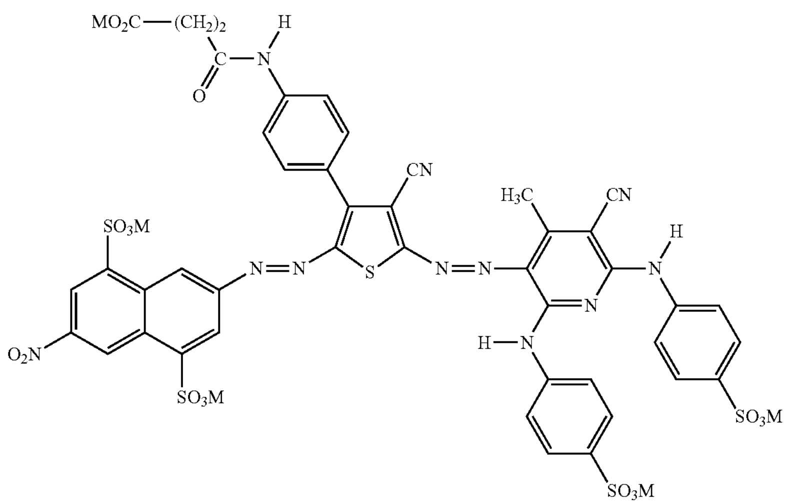

-continued
(BLACK-36)
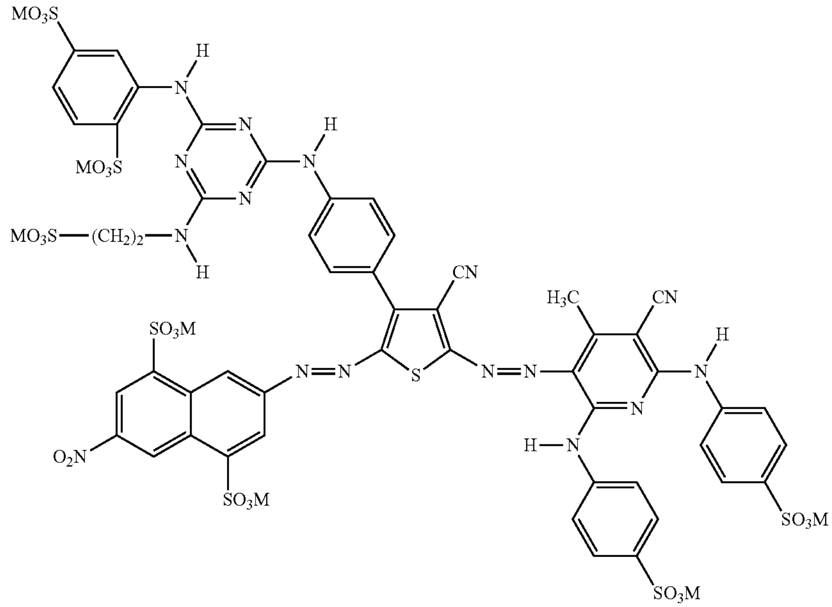
(BLACK-37)
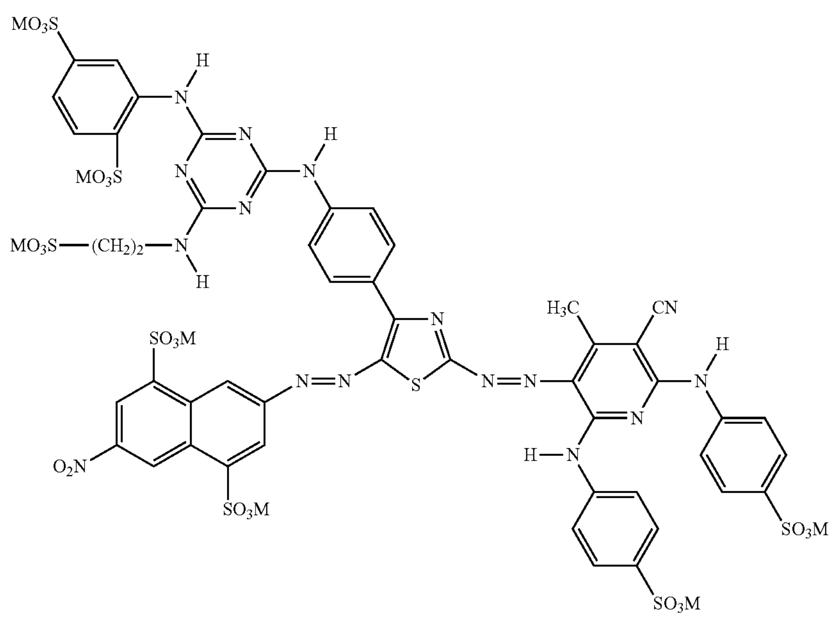

-continued
(BLACK-38)
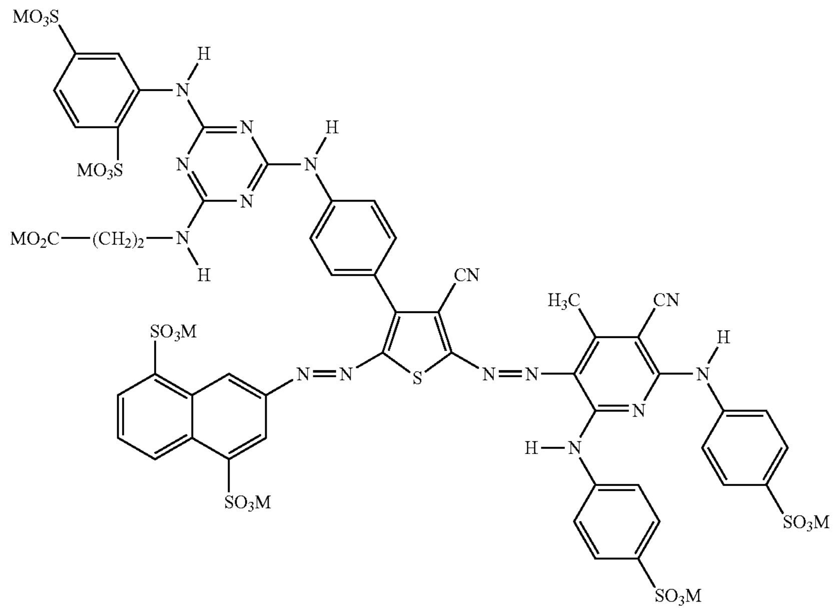
(BLACK-39)
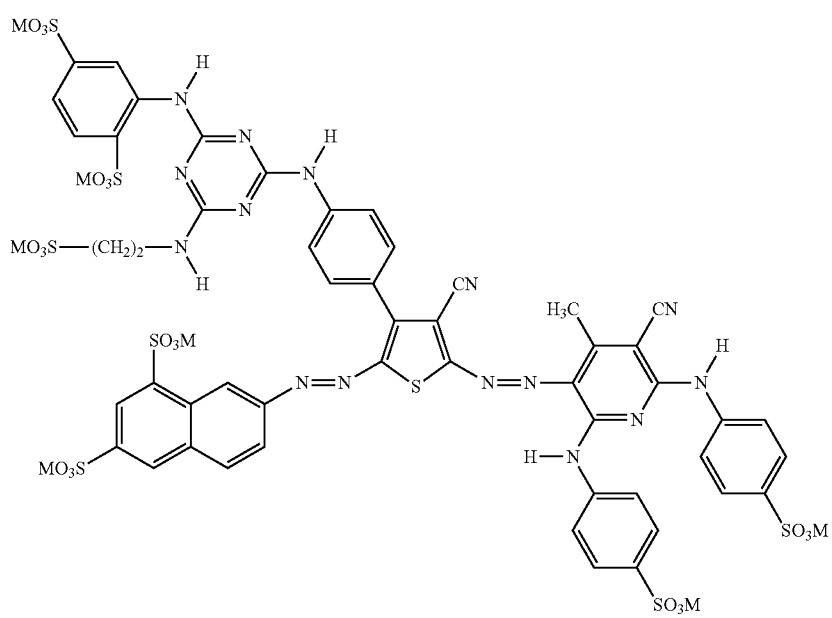

-continued
(BLACK-41)
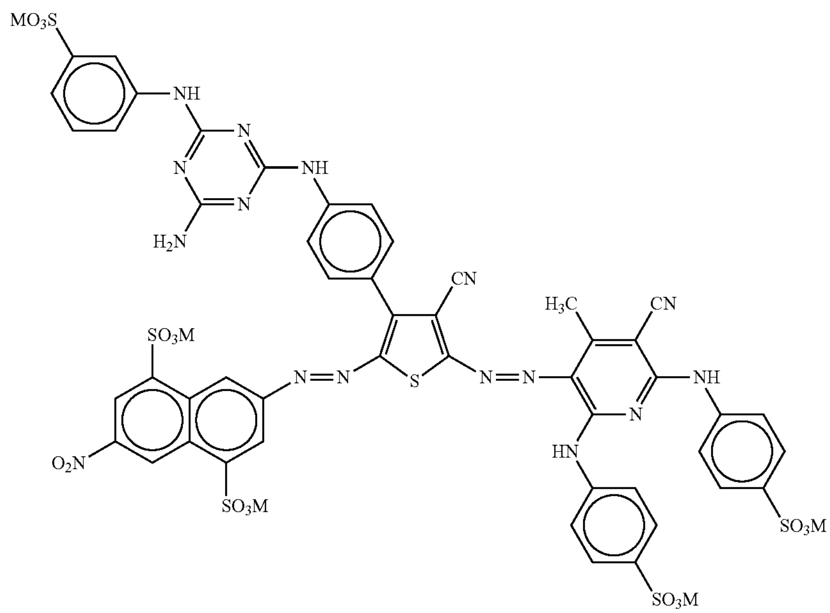
(BLACK-42)
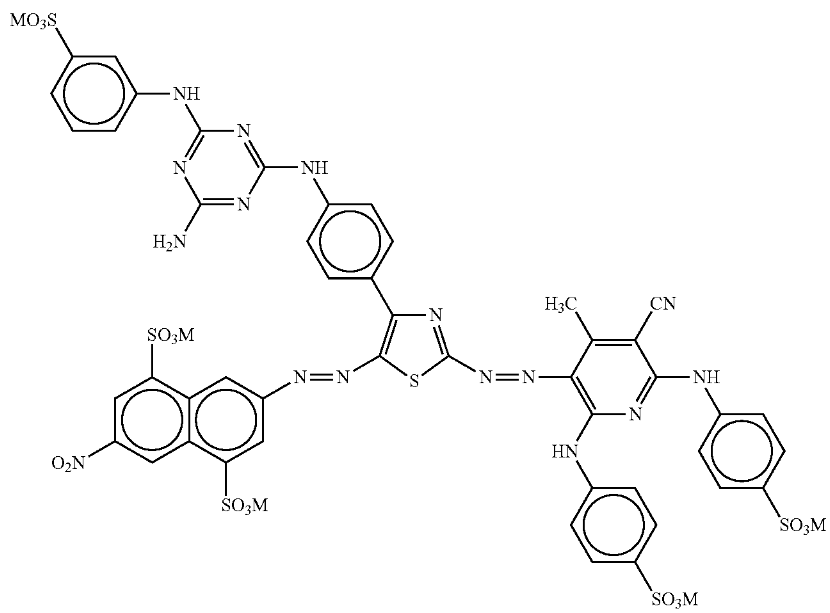
(BLACK-51)
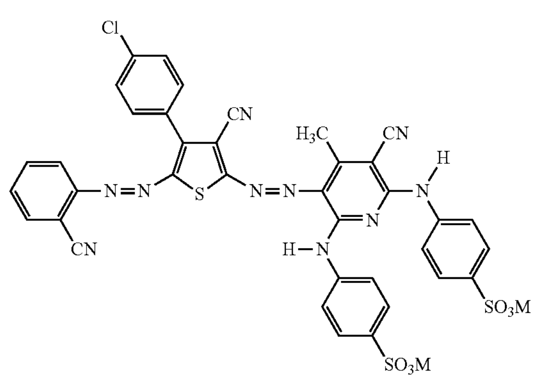
(BLACK-52)
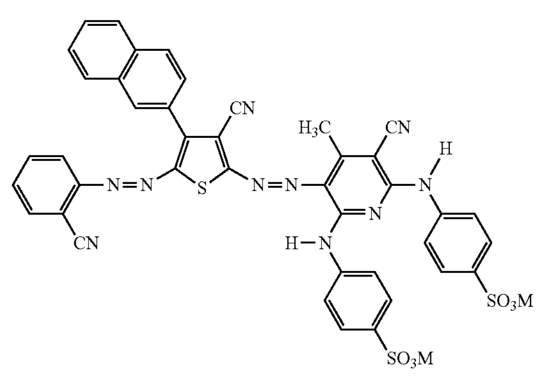

The dye represented by Formula (1) may be in a state of a mixed salt in which multiple kinds of M are present. In the case of a mixed salt, it is preferred that 50% to 100%, more preferably 80% to 100%, particularly 90 to 100% of M is a $Li^+$ ion in terms of the molar fraction in M possessed by the dye represented by Formula (1) contained in an ink. Other than a $Li^+$ ion, M is preferably a $Na^+$ ion or a $NH_4^+$ ion, and more preferably $Na^+$ ion.

Further, it is most preferred that every M in the dye represented by Formula (1) contained in the ink is Li, besides a mixed salt. Since every M is Li, in a molecular dispersion state when dissolved in an aqueous solution or an ink solution, cation species are exchanged in an ionized state where a carboxyl group, which is an ionic hydrophilic group, or a salt thereof (—$CO_2M$) is dissociated into —$CO_2^-$ and $M^+$. Therefore, it is possible to obtain an effect that a salt having lower solubility in an aqueous solution or an ink solution is formed, thereby easily suppressing precipitation in a state of a salt of a colorant.

The dye represented by Formula (1) may be synthesized by a general synthesis, for example, a coupling reaction of a diazo component and a coupler. Specifically, the dye may be synthesized by a method described in Japanese Patent Application Laid-Open No. 2003-306623 or Japanese Patent Application No. 2005-139427.

(Ink Composition)

The ink composition of the present invention (also referred to as the ink of the present invention) at least contains one kind or more of the first water-soluble long-wavelength dye represented by Formula (1) and one kind or more of the second water-soluble long-wavelength dye in an aqueous medium, and is preferably obtained by dissolving the dyes in an aqueous medium.

The content of the first water-soluble long-wavelength dye represented by Formula (1) in the ink composition is preferably 0.1% by mass to 10% by mass, and more preferably 2.0% by mass to 6.0% by mass based on the total mass of the ink composition. By using the dye, it is possible to suppress bleeding or color migration of the obtained image, and achieve quality with good color or color concentration. Further, the dye has excellent fastness to light, heat, air, water, chemicals, and the like compared to general azo dyes, thereby contributing to storage stability of ink and a recorded image.

Further, it is preferred that the ink composition of the present invention is used as an ink for inkjet recording. That is, the present invention also relates to an ink for inkjet recording containing the ink composition of the present invention. The contents of the first water-soluble long-wavelength dye represented by Formula (1) and the second water-soluble long-wavelength dye in the ink for inkjet recording are the same as the contents thereof in the ink composition.

The content of the second water-soluble long-wavelength dye in the ink composition is preferably 0.1% by mass to 10% by mass, and more preferably 0.5% by mass to 4.0% by mass based on the total mass of the ink composition. By using the second water-soluble long-wavelength dye in combination with the first water-soluble long-wavelength dye represented by Formula (1), it is possible to provide an ink composition having an excellent grey balance in a range from a high-concentration region to a low-concentration region.

Further, the sum (% by mass) of the contents of the first water-soluble long-wavelength dye and the second water-soluble long-wavelength dye in the ink composition is preferably 1.0% by mass to 10.0% by mass based on the total mass of the ink composition. In addition, the sum (% by mass) of these contents is particularly preferably 1.5% by mass to 6.0% by mass. By setting the sum thereof within the range, light resistance, ozone resistance and water resistance of an image to be formed become more excellent, and the color tone is also excellent. Thus, there is a tendency to obtain good inkjet characteristics.

Further, the mass ratio (first water-soluble long-wavelength dye/second water-soluble long-wavelength dye) of the content (% by mass) of the first water-soluble long-wavelength dye represented by Formula (1) to the content (% by mass) of the second water-soluble long-wavelength dye is preferably 0.5 to 5.0, and more preferably 1.0 to 4.0. By setting the content ratio within the range, it is possible to obtain the light resistance and the ozone resistance at a higher level, as well as to obtain a better effect with respect to the grey balance in a range from a high-concentration region to a low-concentration region.

The present inventors presume as follows on the reason that a synergy effect is exhibited by using the first water-soluble long-wavelength dye and the second water-soluble long-wavelength dye in a specific mass ratio, thereby obtaining improvement in light resistance, ozone resistance and grey balance in a range from a high-concentration region to a low-concentration region at a level more than expected.

Since the compound represented by Formula (1) originally has low solubility, when an ink containing the compound is imparted to a recording medium, association or agglomeration of the coloring materials occurs rapidly immediately thereafter. The association or agglomeration tends to enhance the fastness of the water-soluble long-wavelength dye on the recording medium forming an image. On the other hand, however, excessive association or agglomeration may lower the ability of the light resistance or the ozone resistance originally possessed by the molecular structure. In this regard, it is considered that, when a compound having two to four azo groups conjugated with each other per molecule coexists, the compound represented by Formula (1) is formed in an optimum state of association or agglomeration with respect to light resistance, thereby enhancing the light resistance and the ozone resistance.

The black dye used in the present invention has an excellent forced fading rate constant for ozone gas. For measurement of the forced fading rate constant for ozone gas, a colored region which has a color in the main spectral absorption region of the ink in an image obtained by printing only the ink on a reflective image-receiving medium and whose reflection concentration measured through a status A filter is 0.90 to 1.10 is selected as an initial concentration point, and the initial concentration is defined as a starting concentration (=100%). The image is faded using an ozone fading tester, which maintains an ozone concentration of 5 mg/L at all times, to measure the time for which the concentration becomes 80% of the initial concentration, and a reciprocal of the time [hour-1] is obtained to be defined as the forced fading rate constant, based on the assumption that the relationship between fading concentration and time follows a rate equation of first-order reaction. Therefore, the fading rate constant obtained is a fading rate constant of a colored region that is printed by the ink, and in the present specification, the value is used as a fading rate constant of the ink.

As a test print patch, it is possible to use a patch obtained by printing a black square symbol of JIS code 2223, a stepwise color patch of the Macbeth chart, or an arbitrary stepwise density patch where a measured area may be obtained.

A reflection concentration of a reflection image (stepwise color patch) printed for measurement is a concentration obtained with measurement light passing through a status A filter by a densitometer satisfying the International Standard ISO5-4 (geometrical conditions for reflection concentration).

In a test chamber for measurement of a forced fading rate constant for ozone gas, an ozone generator (for example, a high-voltage discharge mode of applying an alternating current voltage to dry air) capable of constantly maintaining an internal ozone gas concentration at 5 mg/L is provided, and an aeration temperature is adjusted to 25° C.

Meanwhile, the forced fading rate constant is an index for showing the susceptibility to oxidation by oxidative atmosphere in the environment, such as photochemical smog, exhaust gas of automobiles, organic vapor from a painted surface of furniture, a carpet or the like, and gas generated from a frame in a bright room, and an index using ozone gas as a representative of the oxidative atmosphere.

(Second Water-Soluble Long-Wavelength Dye)

The ink of the present invention contains a compound having two to four azo groups conjugated with each other per molecule as the second water-soluble long-wavelength dye. The compound may be used either alone or in combination of two or more thereof, but it is preferred to use in combination of two or more thereof from the viewpoint of coloring balance. Further, the compound may be in a state of salt, and preferred salts or alkali metal salts (particularly, lithium, sodium or potassium), ammonium and a substituted ammonium salts (including quaternary amine such as $(CH_3)_4N^+$), or a mixture thereof. A particularly preferred salt is sodium, lithium, ammonia or volatile amine, and more preferably lithium.

The second water-soluble long-wavelength dye is preferably any one of compounds represented by Formulas (DC-1), (DF-1), (DG-1), (TA-4), (TA-6), (TB-1), (TC-1), (TC-2), (TD-1) and (QA-1) as described below, more preferably any one of compounds represented by Formulas (DC-1), (DF-1), (DG-1), (TA-4), (TA-6), (TB-1), (TC-2), (TD-1) and (QA-1), and most preferably any one of compounds represented by Formulas (DC-1), (TA-4), (TA-6), (TB-1), (TD-1) and (QA-1).

Hereinafter, description will be made with respect to a compound having two azo groups conjugated with each other per moleculel (disazo compound), a compound having three azo groups conjugated with each other per molecule (trisazo compound), and a compound having four azo groups conjugated with each other per molecule (tetrakisazo compound), respectively.

[Compound Having Two Azo Groups Conjugated with Each Other Per Molecule (Disazo Compound)]

The compound having two azo groups conjugated with each other per molecule used as the second water-soluble long-wavelength dye related to the present invention is generally represented by the following Formula.

$$A_1\text{-N=N-}A_2\text{-N=N-}A_3 \qquad \text{Formula (A)}$$

In Formula (A), $A_1$, $A_2$ and $A_3$ each independently represent an aromatic group which may be substituted or a heterocyclic group which may be substituted ($A_1$ and $A_3$ are a monovalent group, $A_2$ is a divalent group).

In Formula (A), $A_1$, $A_2$ and $A_3$ each independently represent an aromatic group which may be substituted or a heterocyclic group which may be substituted. Examples of the aromatic ring may include a benzene ring or a naphthalene ring, and examples of the heteroatom of the heterocyclic ring may include N, O and S. The heterocyclic ring may be condensed with an aliphatic ring, an aromatic ring or another heterocyclic ring. The aromatic group and heterocyclic group represented by $A_1$, $A_2$ and $A_3$ may have a substituent, and the group which may substitute may be any substitutable group in the section of the aforementioned substituents.

Further, at least one of $A_1$ and $A_2$ is preferably an aromatic heterocyclic group.

$A_3$ is preferably an aromatic heterocyclic group, more preferably an aromatic nitrogen-containing heterocyclic group, still more preferably a group consisting of pyridine, pyrimidine, pyridazine or pyrazine, and particularly preferably an aromatic nitrogen-containing 6-membered heterocyclic group represented by the following Formula (DA-1). In the case where $A_3$ is an aromatic nitrogen-containing 6-membered heterocyclic group represented by the following Formula (DA-1), Formula (A) corresponds to Formula (DA-2) described below.

Formula (DA-1)

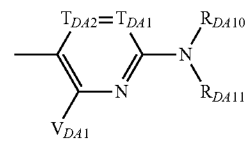

In Formula (DA-1), $T_{DA1}$ and $T_{DA2}$ each represent $=CR_{DA12}$- and $—CR_{DA13}=$, or any one represents a nitrogen atom and the other represents $=CR_{DA12}—$ or $—CR_{DA13}=$, but it is more preferred that each represents $=CR_{DA12}—$ and $—CR_{DA13}=$.

$R_{DA10}$ and $R_{DA11}$ each independently represent a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, and each group may further have a substituent. Examples of preferred substituents represented by $R_{DA10}$ and $R_{DA11}$ may include a hydrogen atom, an aliphatic group, an aromatic group, a heterocyclic group, an acyl group, and an alkyl- or arylsulfonyl group. The substituent is more preferably a hydrogen atom, an aromatic group, a heterocyclic group, an acyl group, or an alkyl- or arylsulfonyl group. The substituent is most preferably a hydrogen atom, an aryl group or a heterocyclic group. Each group may further have a substituent. However, $R_{DA10}$ and $R_{DA11}$ are not a hydrogen atom at the same time.

$V_{DA1}$, $R_{DA12}$ and $R_{DA13}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an anilino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- and arylthio group, a heterocyclic thio group, an alkyl- and arylsulfonyl group, a heterocyclic sulfonyl group, an alkyl- and arylsulfinyl group, a heterocyclic sulfinyl group, a sulfamoyl group or a sulfo group, and each group may be further substituted.

The substituent represented by $V_{DA1}$ is preferably a hydrogen atom, a halogen atom, an aliphatic group, an aromatic group, a hydroxyl group, an alkoxy group, an aryloxy group, an acyloxy group, a heterocyclic oxy group, an amino group (including an anilino group and a heterocyclic amino group), an acylamino group, a ureido group, a sulfamoylamino group, an alkoxycarbonylamino group, an aryloxycarbonylamino group, an alkyl- and arylthio group, or heterocyclic thio group, more preferably a hydrogen atom, a halogen atom, an alkyl group, a hydroxyl group, an alkoxy group, an aryloxy group, an acyloxy group, an amino group (including an anilino group and a heterocyclic amino group) or an acylamino group, and among them, most preferably a hydrogen atom, an anilino group or an acylamino group. Each group may further have a substituent.

Examples of preferred substituents represented by $R_{DA12}$ and $R_{DA13}$ may include a hydrogen atom, an alkyl group, a halogen atom, an alkoxycarbonyl group, a carboxyl group, a carbamoyl group, a hydroxyl group, an alkoxy group and a cyano group. Each group may further have a substituent.

$R_{DA12}$ and $R_{DA10}$, or $R_{DA10}$ and $R_{DA11}$ may be bound with each other to form a 5- or 6-membered ring.

In the case where each group represented by $A_1$, $R_{DA12}$, $R_{DA13}$, $R_{DA10}$, $R_{DA11}$ or $V_{DA1}$ further has a substituent, the substituent may include substituents exemplified in $V_{DA1}$, $R_{DA10}$ and $R_{DA11}$ as described above. Further, it is preferred to have an ionic hydrophilic group as a substituent at any position on $A_1$, $R_{DA8}$, $R_{DA9}$, $R_{DA10}$, $R_{DA11}$ or $V_{DA1}$.

The ionic hydrophilic group as a substituent includes a sulfo group, a carboxyl group, a phosphono group and a quaternary ammonium group. The ionic hydrophilic group is preferably a carboxyl group, a phosphono group or a sulfo group, and particularly preferably a carboxyl group or a sulfo group. The carboxyl group, the phosphono group and the sulfo group may be in a state of salt, and examples of countercations forming a salt include an ammonium ion, an alkali metal ion (e.g., a lithium ion, a sodium ion or a potassium ion) and an organic cation (e.g., a tetramethylammonium ion, a tetramethylguanidium ion or a tetramethylphosphonium ion).

In Formula (A) or Formula (DA-2), when $A_2$ is a ring structure, preferred heterocyclic rings include a thiophene ring, a thiazole ring, an imidazole ring, a benzothiazole ring and a thienothiazole ring. Each heterocyclic group may further have a substituent. Among them, $A_2$ is preferably a thiophene ring, a thiazole ring, an imidazole ring, a benzothiazole ring or a thienothiazole ring represented by the following Formulas (a) to (e), and most preferably the thiophene ring represented by (a) or the thiazole ring represented by (b). Further, when $A_2$ is a thiophene ring represented by (a) and $A_3$ is a structure represented by Formula (DA-1), Formula (A) corresponds to Formula (DA-3) as described below.

(a)

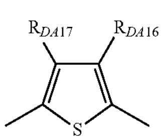

(b)

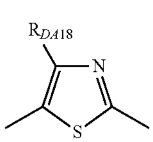

(c)

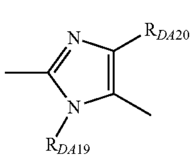

-continued (d)

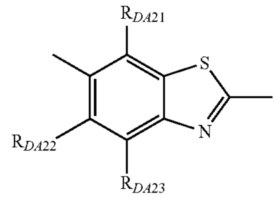

(e)

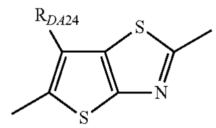

In Formulas (a) to (e), $R_{DA16}$ to $R_{DA24}$ represent the same substituents as those of $V_{DA1}$, $R_{DA12}$ and $R_{DA13}$ in Formula (DA-1).

$A_2$ may further have a substituent, and examples of the substituent may include a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, aryloxycarbonyloxy, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imide group, a phosphino group, a phosphono group, a phosphonyl group, a phosphinyloxy group, a phosphinylamino group and a silyl group.

Among the aforementioned functional groups, a functional group having a hydrogen atom may be substituted with the aforementioned group by removing the hydrogen atom. Examples of such a substituent may include an alkylcarbonylaminosulfonyl group, an arylcarbonylaminosulfonyl group, an alkylsulfonylaminocarbonyl group, an arylsulfonylaminocarbonyl group and the like.

In Formulas (a) to (e), the substituents on the heterocyclic ring may be bound with each other to form a condensed ring with a hydrocarbon ring or a heterocyclic ring, and the condensed ring may further have a substituent thereon. In the case of a nitrogen-containing heterocyclic ring, the nitrogen atom may be quarternized. Further, for a heterocyclic ring which may be tautomerized, even though only one tautomer is mentioned, the other tautomer is also included.

Further, Het represents an aromatic heterocyclic group, but is preferably an aromatic nitrogen-containing heterocyclic group, more preferably a group consisting of pyridine, pyrimidine, pyridazine or pyrazine, and still more preferably a group represented by Formula (DA-1). For $T_{DA1}$, $R_{DA2}$, $R_{DA10}$, $R_{DA11}$ and $V_{DA1}$ in Formula (DA-1), the definitions, examples and preferred groups described in the section of the preferred heterocyclic group of $A_3$ are applied as they are.

In the present invention, it is preferred that the dye represented by Formula (A) is a dye represented by the following Formula (DA-2).

Formula (DA-2)

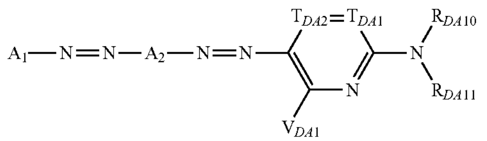

In Formula (DA-2), $A_1$ and $A_2$ have the same meaning as those in Formula (A), and preferred ranges thereof are also the same.

$T_{DA1}$ and $T_{DA2}$ each represent $=CR_{DA12}-$ and $-CR_{DA13}=$, or any one represents a nitrogen atom and the other represents $=CR_{DA12}-$ or $-CR_{DA13}=$.

$V_{DA1}$, $R_{DA12}$ and $R_{DA13}$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- and arylthio group, a heterocyclic thio group, an alkyl- and arylsulfonyl group, a heterocyclic sulfonyl group, an alkyl- and arylsulfinyl group, a heterocyclic sulfinyl group, a sulfamoyl group or a sulfo group, and each group may be further substituted.

$R_{DA10}$ and $R_{DA11}$ each independently represent, a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group or a sulfamoyl group, and each group may further have a substituent. However, all of $R_{DA10}$ and $R_{DA11}$ are not a hydrogen atom at the same time.

Further, $R_{DA12}$ and $R_{DA10}$, or $R_{DA10}$ and $R_{DA11}$ may be bound with each other to form a 5- or 6-membered ring.

Further, it is preferred that the dye represented by Formula (DA-2) is a dye represented by the following Formula (DA-3) or (DA-3-2).

Formula (DA-3)

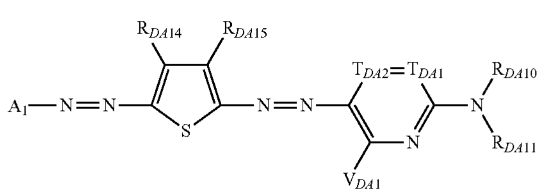

Formula (DA-3-2)

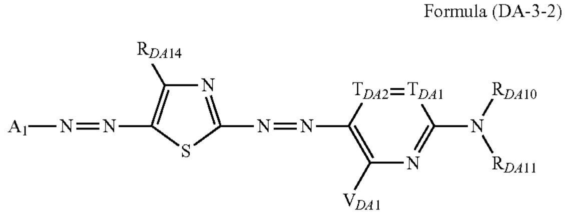

In Formulas (DA-3) and (DA-3-2), $R_{DA14}$ and $R_{DA15}$ have the same meaning as $R_{DA12}$ in Formula (DA-2). $A_1$, $R_{DA10}$, $R_{DA11}$, $T_{DA1}$, $T_{DA2}$ and $V_{DA1}$ have the same meaning as those in Formula (DA-2).

In the present invention, a particularly preferred structure is represented by the following Formula (DA-4) or Formula (DA-4-2).

Formula (DA-4)

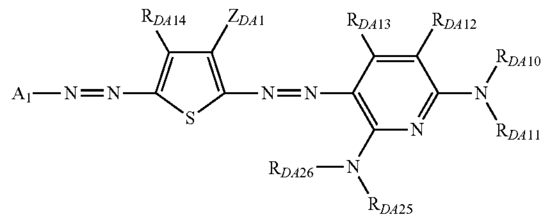

Formula (DA-4-2)

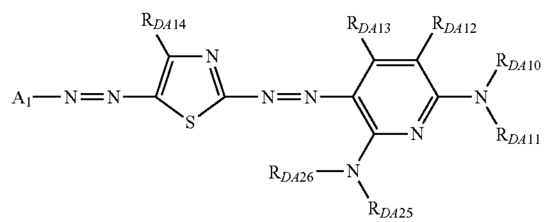

In the formulas, $A_1$ has the same meaning as that in Formula (DA-2). $Z_{DA1}$ represents an electron-withdrawing group having a Hammett's σp value of 0.20 or more. $Z_{DA1}$ is preferably an electron-withdrawing group having σp value of 0.30 or more, more preferably 0.45 or more, and particularly 0.60 or more, but preferably not more than 1.0. Preferred specific substituents may be exemplified by electron-withdrawing groups as described below, and among them, is preferably an acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, an carbamoyl group having 1 to 20 carbon atoms or a halogenated alkyl group having 1 to 20 carbon atoms. The substituent is particularly preferably a cyano group, an alkylsulfonyl group having 1 to 20 carbon atoms or an arylsulfonyl group having 6 to 20 carbon atoms, and most preferably a cyano group.

$R_{DA10}$, $R_{DA11}$, $R_{DA12}$ and $R_{DA13}$ have the same meaning as those in Formula (DA-2). $R_{DA25}$ and $R_{DA26}$ each independently represent a hydrogen atom, an aliphatic group, an aromatic group, a heterocyclic group, an acyl group, an alkoxycarbonyl group, an aryloxycarbonyl group, a carbamoyl group, an alkyl- and arylsulfonyl group, or a sulfamoyl group. Among them, preferred are a hydrogen atom, an aromatic group, a heterocyclic group, an acyl group and an alkyl- or arylsulfonyl group, and particularly preferred are a hydrogen atom, an aromatic group and a heterocyclic group.

In Formula (DA-4) and (DA-4-2), $R_{DA14}$ has the same meaning as $R_{DA14}$ in Formula (DA-3)($R_{DA12}$ in Formula (DA-2)), and is preferably an aromatic group, a heterocyclic group or an alkyl group, more preferably an aromatic group, and still more preferably a phenyl group which may have a substituent or a naphthyl group which may have a substituent.

Each group described in Formulas (DA-4) and (DA-4-2) may further have a substituent. In the case where each of these groups further has a substituent, examples of the substituent may include the substituents described in Formula (DA-2), the groups exemplified in $V_{DA1}$, $R_{DA10}$ and $R_{DA11}$, or an ionic hydrophilic group.

Examples of the electron-withdrawing group having a Hammett's σp value of 0.60 or more may include a cyano group, a nitro group, an alkylsulfonyl group (for example, methylsulfonyl group) and an arylsulfonyl group (for example, phenylsulfonyl group).

Examples of the electron-withdrawing group having a Hammett's σp value of 0.45 or more may include, in addition to the aforementioned groups, an acyl group (for example, an acetyl group), an alkoxycarbonyl group (for example, a dodecyloxycarbonyl group), an aryloxycarbonyl group (for example, m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl and N,N-dimethylsulfamoyl), a halogenated alkyl group (for example, trifluoromethyl).

Examples of the electron-withdrawing group having a Hammett's σp value of 0.30 or more may include, in addition to the aforementioned groups, an acyloxy group (for example, an acetoxy), a carbamoyl group (for example, N-ethylcarbamoyl and N,N-dibutylcarbamoyl), a halogenated alkoxy group (for example, trifluoromethyloxy), a halogenated aryloxy group (for example, a pentafluorophenyloxy), a sulfonyloxy group (for example, a methylsulfonyloxy group), a halogenated alkylthio group (for example, a difluoromethylthio), an aryl group substituted with two or more electron-withdrawing groups having a σp value of 0.15 or more (for example, 2,4-dinitrophenyl and pentachlorophenyl), and a heterocylic ring (for example, 2-benzoxazolyl, 2-benzothiazolyl and 1-phenyl-2-benzimidazolyl).

Specific examples of the electron-withdrawing group having a Hammett's σp value of 0.20 or more may include, in addition to the aforementioned groups, a halogen atom and the like.

In the present invention, it is also preferred that the dye represented by Formula (DA-4) or Formula (DA-4-2) is represented by the following Formula (DA-4') or Formula (DA-4'-2).

Formula (DA-4')

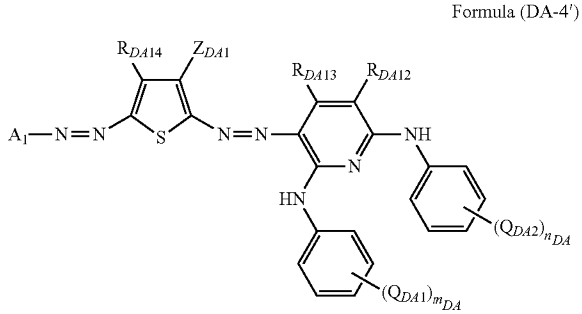

-continued

Formula (DA-4'-2)

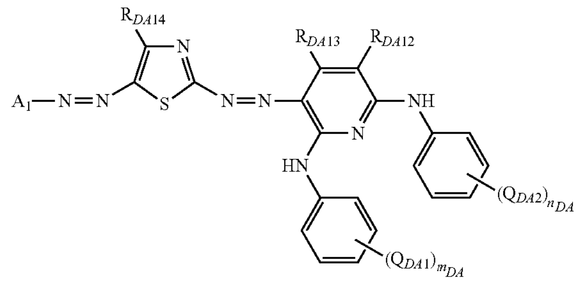

In Formula (DA-4') and (DA-4'-2), $A_1$, $Z_{DA1}$, $R_{DA12}$, $R_{DA13}$ and $R_{DA14}$ have the same meaning as those in Formula (DA-4) and (DA-4-2), and preferred ranges thereof are also the same.

$Q_{DA1}$ and $Q_{DA2}$ represent an ionic hydrophilic group, particularly a sulfo group or a carboxyl group, and $m_{DA}$ and $n_{DA}$ each independently represent an integer of 1 to 3. Preferably, $A_1$ represents a monovalent aromatic ring, and particularly preferably a benzene ring or a naphthalene ring.

For combination of particularly preferred substituents in the azo colorant represented by Formula (DA-2), $R_{DA10}$ and $R_{DA11}$ are preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, all of $R_{DA10}$ and $R_{DA11}$ are not a hydrogen atom at the same time.

$V_{DA1}$ is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

$A_1$ is preferably a benzene ring, a naphthalene ring, a pyridine ring, an imidazole ring or a pyrazole ring, and most preferably a benzene ring or a naphthalene ring.

$T_{DA1}$ and $T_{DA2}$ each are $=CR_{DA12}—$ and $—CR_{DA13}=$, $R_{DA12}$ and $R_{DA13}$ each are preferably a hydrogen atom, an alkyl group, a halogen atom, a cyano group, a carbamoyl group, a carboxyl group, a hydroxyl group, an alkoxy group or an alkoxycarbonyl group, and more preferably a hydrogen atom, an alkyl group, a carboxyl group, a cyano group or a carbamoyl group.

For combination of preferred substituents of the compound represented by Formula (DA-2), preferred is a compound in which at least one of various substituents is the aforementioned preferred group, more preferred is a compound in which more substituents are the aforementioned preferred groups, and most preferred is a compound in which all substituents are the aforementioned preferred groups.

Specific examples of the azo colorant represented by Formula (A) or (DA-2) are shown below, but the azo colorant used in the present invention is not limited to the following examples. Further, the carboxyl group, the phosphono group and the sulfo group may be in a state of salt, and examples of countercations forming a salt include an ammonium ion, an alkali metal ion (e.g., a lithium ion, a sodium ion or a potassium ion) and an organic cation (e.g., a tetramethylammonium ion, a tetramethylguanidium ion or a tetramethylphosphonium ion). Among them, preferred are an ammonium salt, an organic cation and a lithium salt, and most preferred is a lithium salt.

| A—N=N—B—N=N—C | | | |
|---|---|---|---|
| | A | B | C |
| (Da-1) | 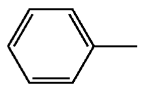 | 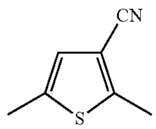 | 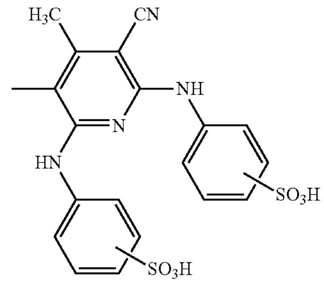 |
| (Da-2) | 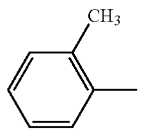 | 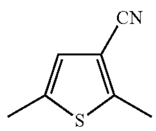 | 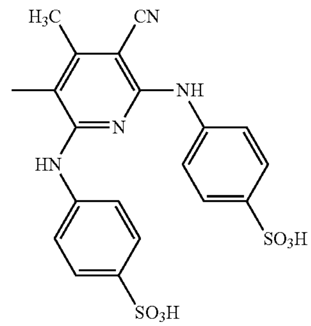 |
| (Da-3) | 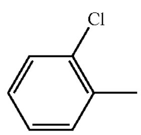 | 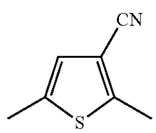 | 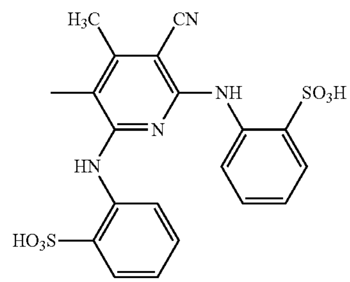 |
| (Da-4) | 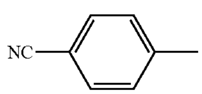 | 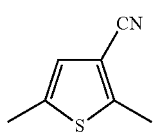 | 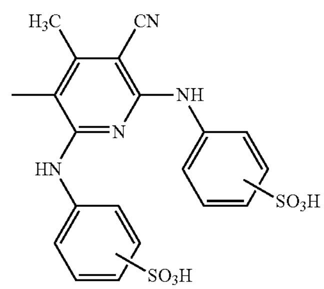 |
| (Da-5) | 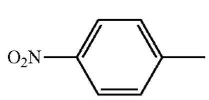 | 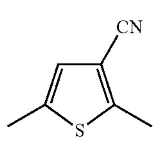 | 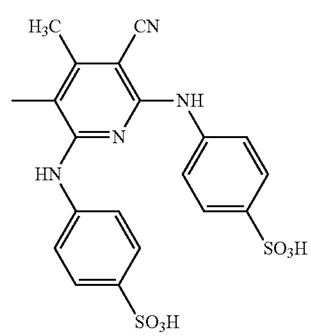 |

-continued
A—N═N—B—N═N—C
| | A | B | C |
|---|---|---|---|
| (Da-6) | 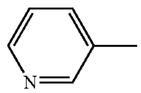 | 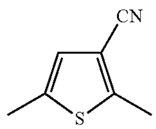 | 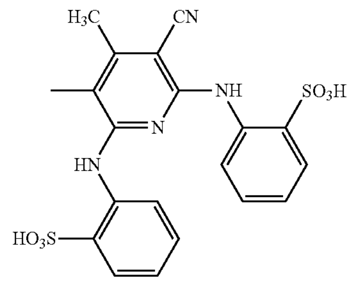 |
| (Da-7) | 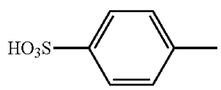 | 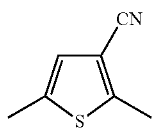 | 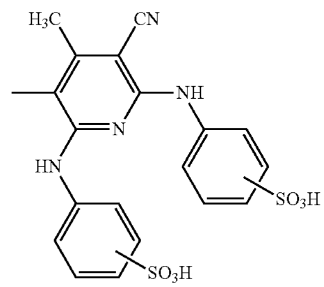 |
| (Da-8) | 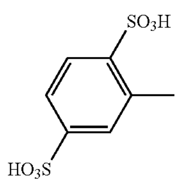 | 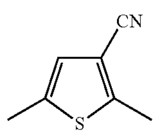 | 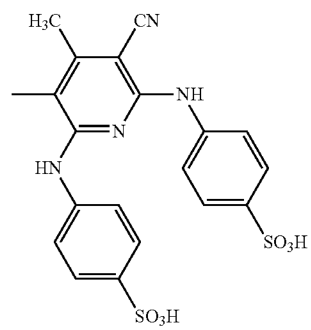 |
| (Da-9) | 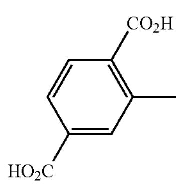 | 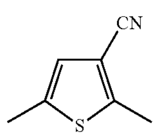 | 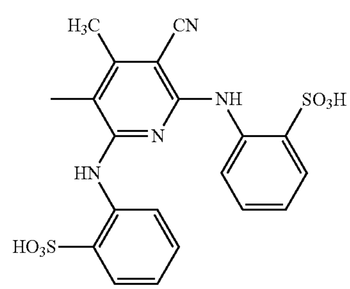 |
| (Da-10) | 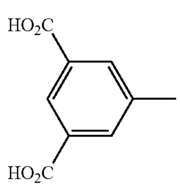 | 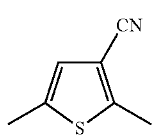 | 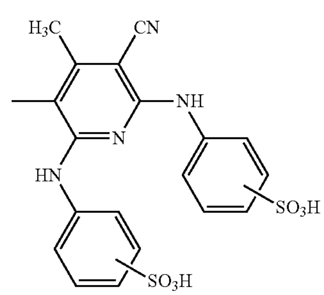 |

-continued
| A—N=N—B—N=N—C | | | |
|---|---|---|---|
| | A | B | C |
| (Da-11) | 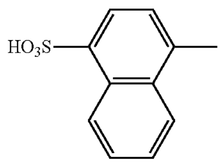 | 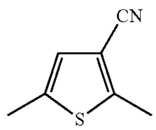 | 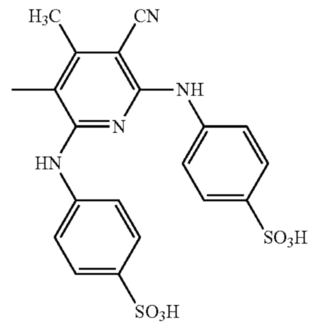 |
| (Da-12) | 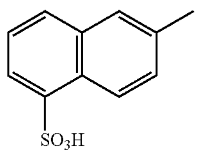 | 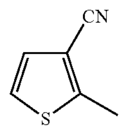 | 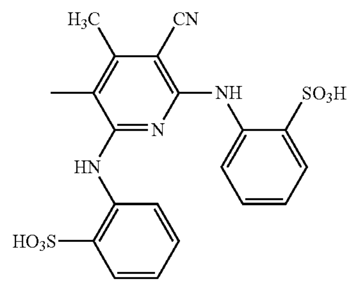 |
| (Da-13) | 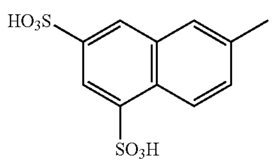 | 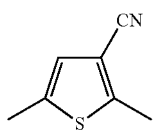 | 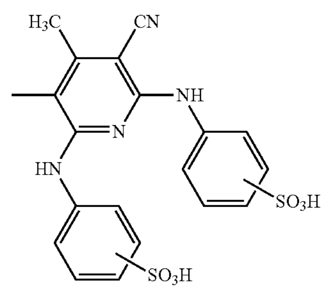 |
| (Da-14) | 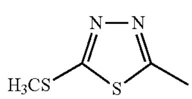 | 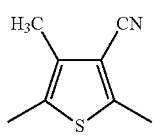 | 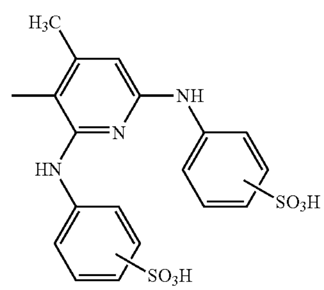 |
| (Da-15) | 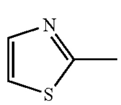 | 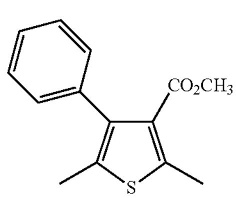 | 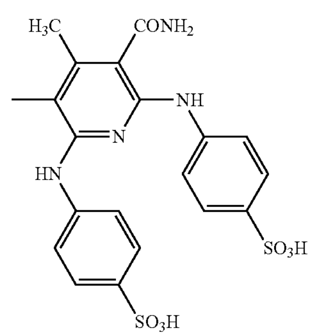 |

-continued
A—N═N—B—N═N—C
| | A | B | C |
|---|---|---|---|
| (Da-16) | 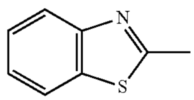 | 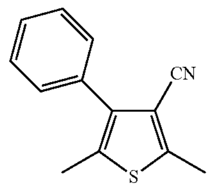 | 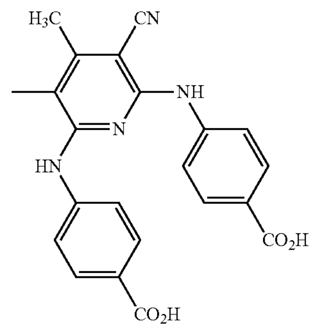 |
| (Da-17) | 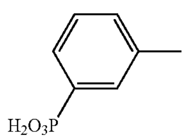 | 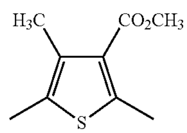 | 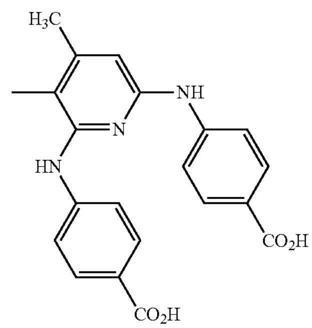 |
| (Da-18) | 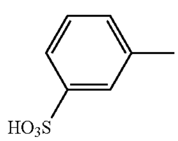 | 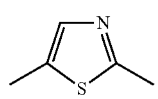 | 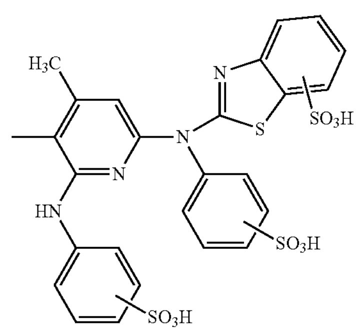 |
| (Da-19) | 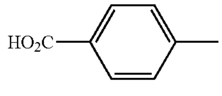 | 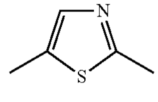 | 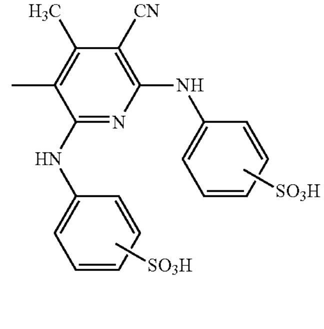 |

-continued
| | A—N=N—B—N=N—C | | |
|---|---|---|---|
| | A | B | C |
| (Da-20) | 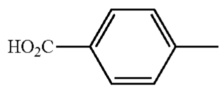 | 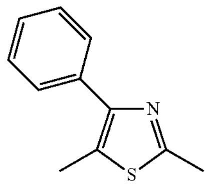 | 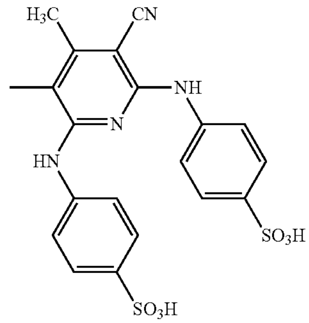 |
| (Da-21) | 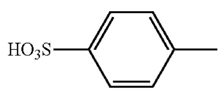 | 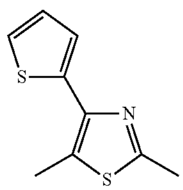 | 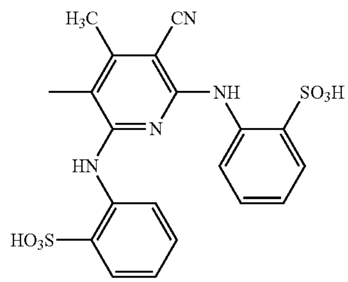 |
| (Da-22) | 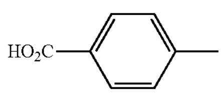 | 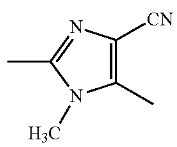 | 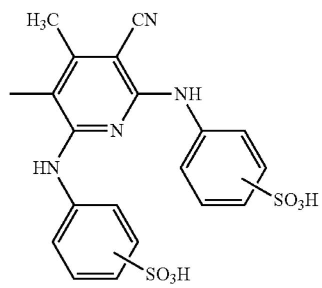 |
| (Da-23) | 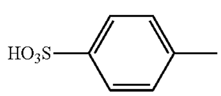 | 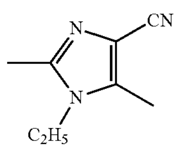 | 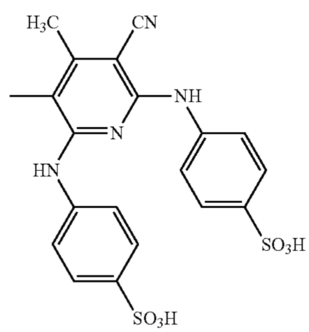 |
| (Da-24) | 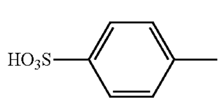 | 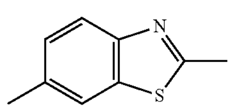 | 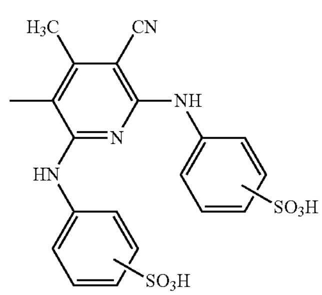 |

-continued
A—N=N—B—N=N—C
| | A | B | C |
|---|---|---|---|
| (Da-25) | 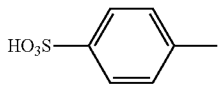 | 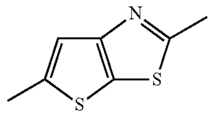 | 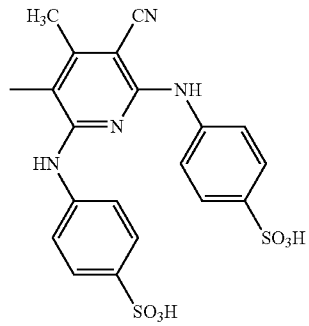 |
| (Da-26) | 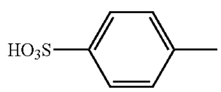 | 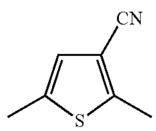 | 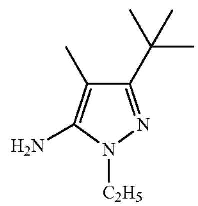 |
| (Da-27) | 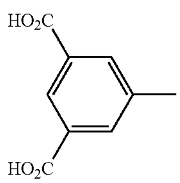 | 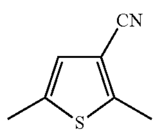 | 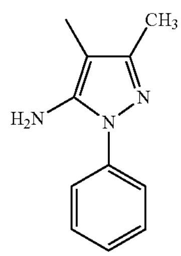 |
| (Da-28) | 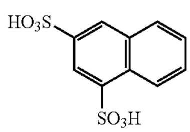 | 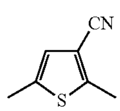 | 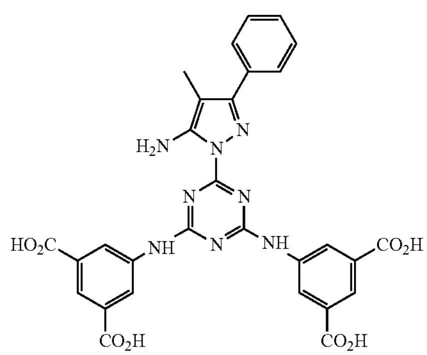 |
| (Da-29) | 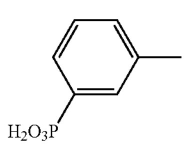 | 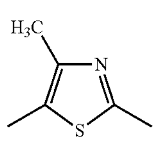 | 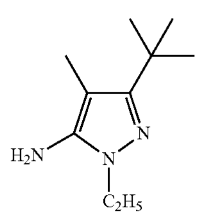 |

-continued
A—N=N—B—N=N—C
| | A | B | C |
|---|---|---|---|
| (Da-30) | 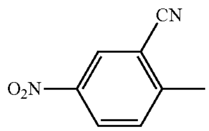 | 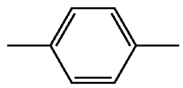 | 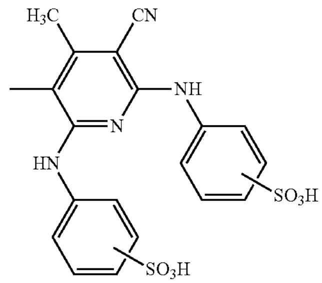 |
| (Da-31) | 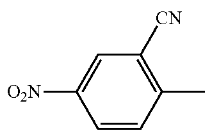 | 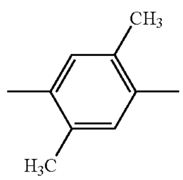 | 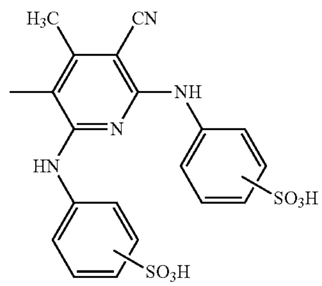 |
| (Da-32) | 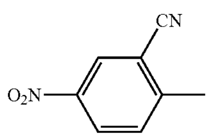 | 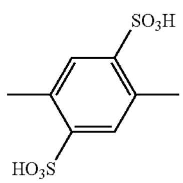 | 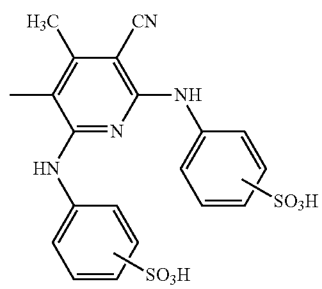 |
| (Da-33) | 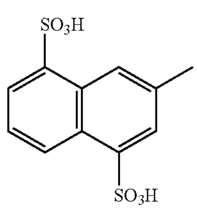 | 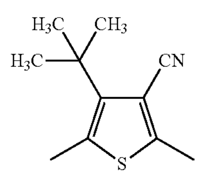 | 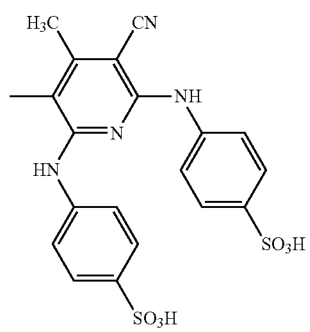 |
| (Da-34) | 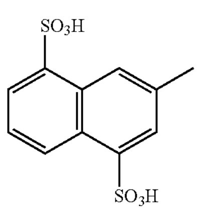 | 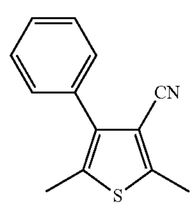 | 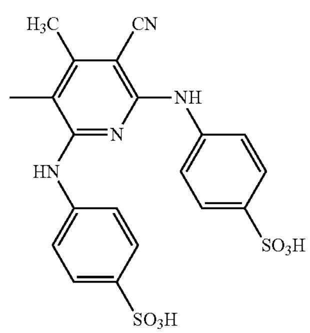 |

-continued
| | A—N═N—B—N═N—C | | |
|---|---|---|---|
| | A | B | C |
| (Da-35) | 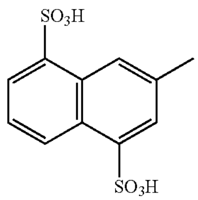 | 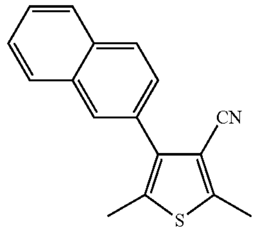 | 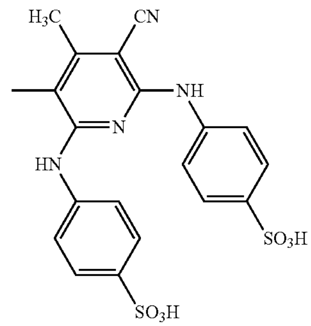 |
| (Da-36) | 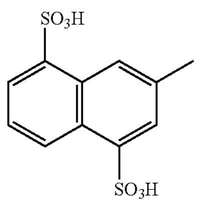 | 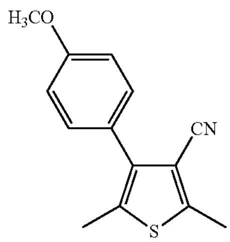 | 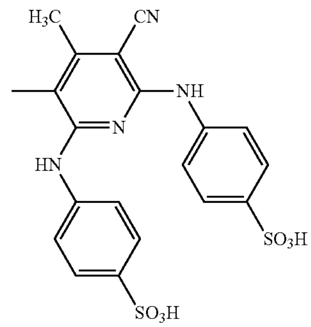 |
| (Da-37) | 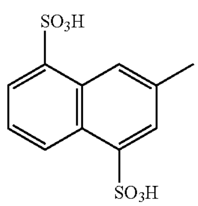 | 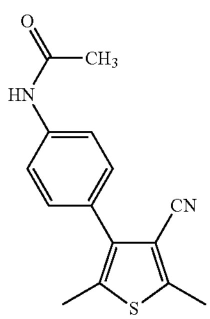 | 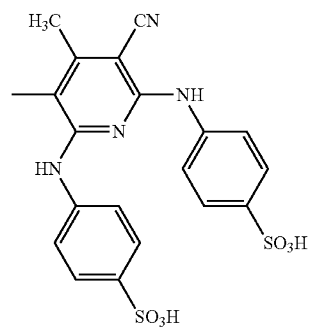 |
| (Da-38) | 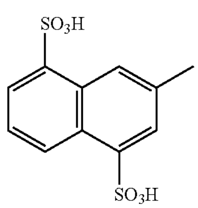 | 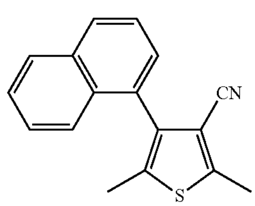 | 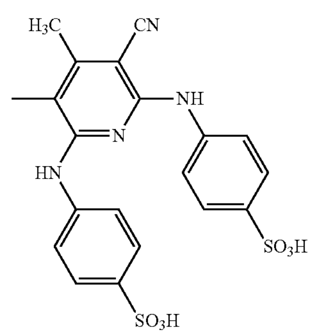 |

-continued
A—N=N—B—N=N—C
| | A | B | C |
|---|---|---|---|
| (Da-39) | 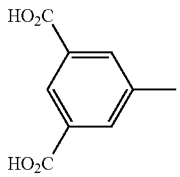 | 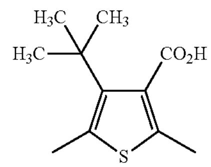 | 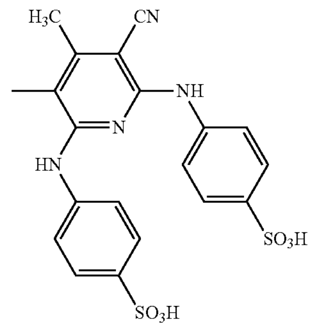 |
| (Da-40) | 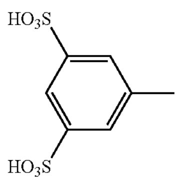 | 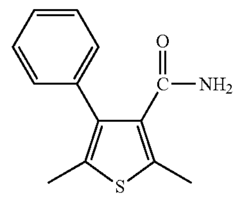 | 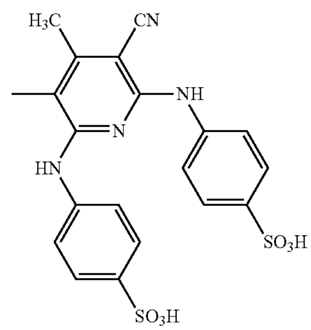 |
| (Da-41) | 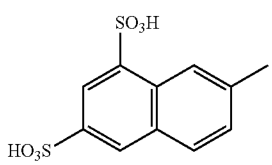 | 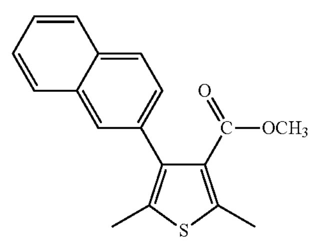 | 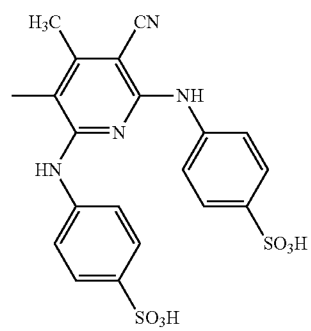 |
| (Da-42) | 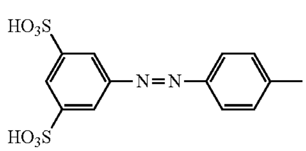 | 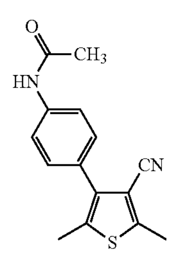 | 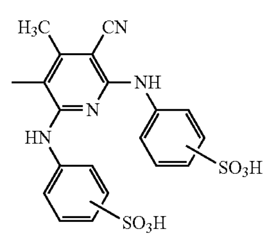 |
| (Da-43) | 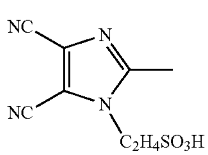 | 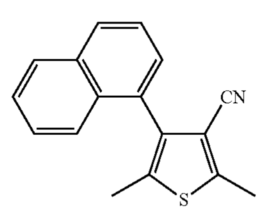 | 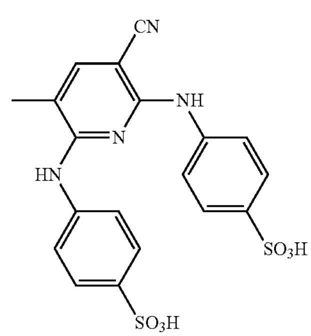 |

-continued
A—N═N—B—N═N—C
| | A | B | C |
|---|---|---|---|
| (Da-44) | 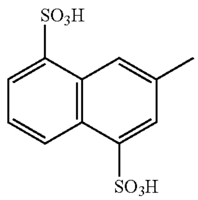 | 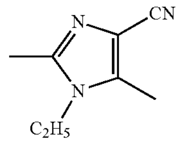 | 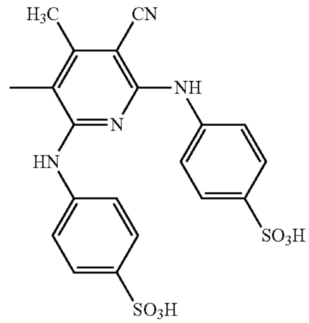 |
| (Da-45) | 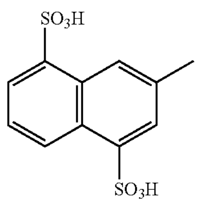 | 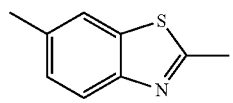 | 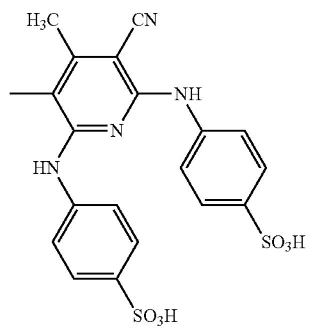 |
| (Da-46) | 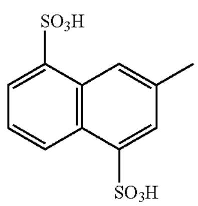 | 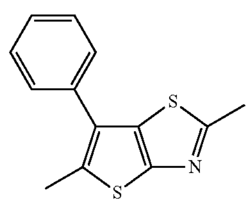 | 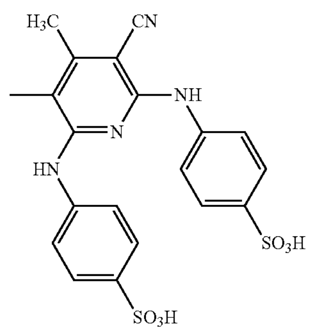 |
| (Da-47) | 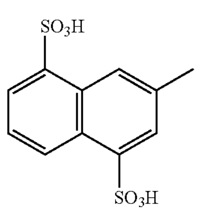 | 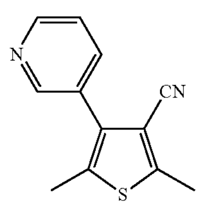 | 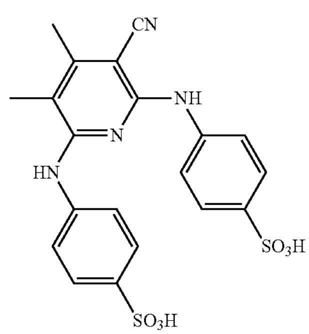 |

-continued

| A—N=N—B—N=N—C | | | |
|---|---|---|---|
| | A | B | C |
| (Da-48) | 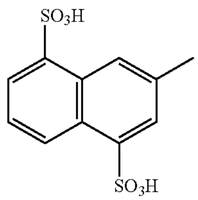 | 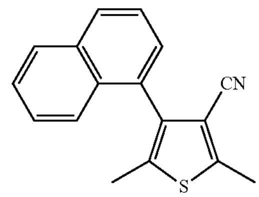 | 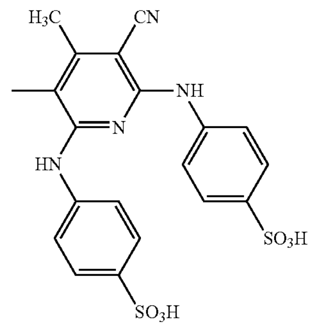 |
| (Da-49) | 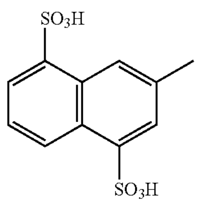 | 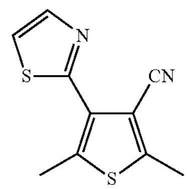 | 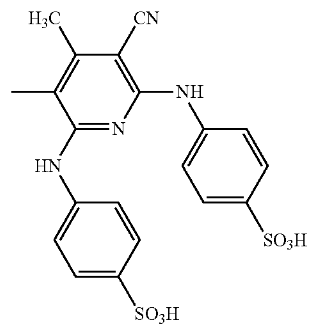 |
| (Da-50) | 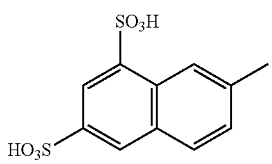 | 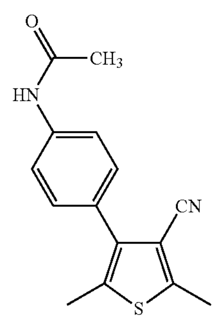 | 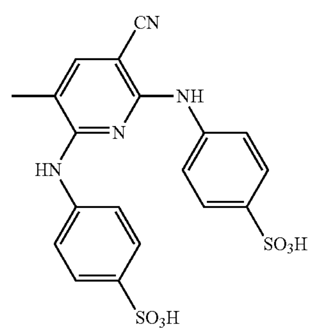 |

In the present invention, it is also preferred that the dye represented by Formula (A) is a dye represented by the following Formula (DC-1).

Although the dye is shown as a free acid structure in the following formula, it is understood that the dye may be used in a form of a salt in practical use.

In Formula (DC-1), $W_{DC}$, $R_{DC43}$ and $R_{DC44}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl, an acyl Formula (DC-1)

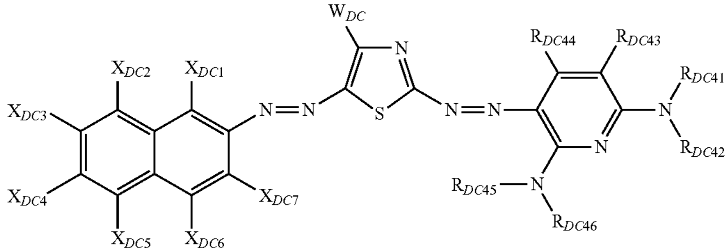

group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an alkylamino group, an arylamino group, and a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each groups may be further substituted. $R_{DC41}$, $R_{DC42}$, $R_{DC45}$ and $R_{DC46}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. However, $R_{DC41}$ and $R_{DC42}$ are not a hydrogen atom at the same time. Further, $R_{DC43}$ and $R_{DC41}$, $R_{DC41}$ and $R_{DC42}$, or $R_{DC45}$ and $R_{DC46}$ may be bound with each other to form a 5- or 6-membered ring. $X_{DC1}$, $X_{DC2}$, $X_{DC3}$, $X_{DC4}$, $X_{DC5}$, $X_{DC6}$ and $X_{DC7}$ represent a monovalent group. However, Formula (DC-1) contains at least one ionic hydrophilic group.

Formula (DC-1) of the present invention will be described in detail.

In Formula (DC-1), preferred $X_{DC1}$, $X_{DC2}$, $X_{DC3}$, $X_{DC4}$, $X_{DC5}$, $X_{DC6}$ and $X_{DC7}$ represent a hydrogen atom, a halogen atom, an alkyl group having 1 to 4 carbon atoms, an alkenyl group, an alkynyl group, an aralkyl group, an aryl group, a heterocyclic group, a hydroxyl group, an alkoxy group, an aryloxy group, a heterocyclic oxy group, a silyloxy group, an acyloxy group, an amino group, an alkylamino group, an arylamino group, a heterocyclic amino group, an acylamino group, a ureido group, a sulfamoylamino group, an alkoxycarbonylamino group, an aryloxycarbonylamino group, an alkyl- and arylthio group or a heterocyclic thio group, and each group may be further substituted.

Preferred $X_{DC1}$, $X_{DC2}$, $X_{DC3}$, $X_{DC4}$, $X_{DC5}$, $X_{DC6}$ and $X_{DC7}$ represent a hydrogen atom, a halogen atom, an alkyl group having 1 to 4 carbon atoms, a hydroxyl group, an alkoxy group, an aryloxy group, a heterocyclic oxy group, a silyloxy group, an acyloxy group, an amino group, an alkylamino group, an arylamino group, a heterocyclic amino group or an acylamino group, and among them, are preferably a hydrogen atom, an amino group, an alkylamino group, an arylamino group, a heterocyclic amino group or an acylamino group, particularly preferably an amino group having a substituent, and most preferably an amino group (substituted anilino group and the like) substituted with an aryl group having an ionic hydrophilic group as a substituent.

In Formula (DC-1), preferred $W_{DC}$ is a substituted phenyl group, a substituted or unsubstituted naphthyl group, a substituted or unsubstituted heterocyclic group (for example, a pyrrole ring, a thiophene ring, an imidazole ring, a thiazole ring, a benzothiazole ring, a pyridine ring or a pyridazine ring), and particularly preferably a substituted phenyl group (particularly, a para-substituted phenyl group), a substituted or unsubstituted β-naphthyl group, a pyridine ring or a thiazole ring. The substituent which may be possessed by $W_{DC}$ is preferably an alkyl group, an alkoxy group, an alkylamide group, a halogen group, a sulfo group (including a salt thereof) or a carboxyl group (including a salt thereof).

In Formula (DC-1), $R_{DC41}$ and $R_{DC42}$ each independently represent a hydrogen atom, an alkyl group having 1 to 4 carbon atoms, an alkenyl group, an alkynyl group, an aralkyl group, an aryl group, a heterocyclic group, an acyl group, an alkoxycarbonyl group, an aryloxycarbonyl group, a carbamoyl group, an alkyl- or arylsulfonyl group or a sulfamoyl group, and each group may further have a substituent. However, among them, preferred are a hydrogen atom, an alkyl group, an aryl group, a heterocyclic group, an acyl group or an alkyl- and arylsulfonyl group, more preferred are a hydrogen atom, an alkyl group, an aryl group and a heterocyclic group, particularly preferred are a hydrogen atom, an aryl group having a substituent and a heterocyclic group having a substituent, and most preferred are a hydrogen atom and an aryl group having a substituent. However, $R_{DC41}$ and $R_{DC42}$ are not a hydrogen atom at the same time. Further, $R_{DC43}$ and $R_{DC41}$, $R_{DC41}$ and $R_{DC42}$, or $R_{DC45}$ and $R_{DC46}$ may be bound with each other to form a 5- or 6-membered ring.

In Formula (DC-1), $R_{DC45}$ and $R_{DC46}$ have the same meaning as $R_{DC41}$ and $R_{DC42}$, and preferred examples thereof are also the same.

In Formula (DC-1), the ionic hydrophilic group includes a sulfo group, a carboxyl group, a phosphono group and a quaternary ammonium group. The ionic hydrophilic group is preferably a carboxyl group, a phosphono group and a sulfo group, particularly preferably a carboxyl group or a sulfo group, and most preferably a sulfo group from the viewpoint of enhancing the solubility in an aqueous solvent. The carboxyl group, the phosphono group and the sulfo group may be in a state of salt, and examples of an ion forming a salt (ion pair) by having an opposite charge to the soluble group (hereinafter, referred to as a counter salt or a counterion) include ammonium, alkali metal (e.g., lithium, sodium or potassium) and an organic cation (e.g., tetramethylammonium, tetramethylguanidium or tetramethylphosphonium). The counterion is preferably each ion of ammonium, lithium, sodium and potassium, and among them, more preferably a sodium ion or a lithium salt, and most preferably a lithium salt.

A particularly preferred combination as the compound represented by Formula (DC-1) includes the following (a) to (e).

(a) $X_{DC1}$, $X_{DC2}$, $X_{DC3}$, $X_{DC4}$, $X_{DC5}$, $X_{DC6}$ and $X_{DC7}$ are preferably a hydrogen atom, a halogen atom, an alkyl group having 1 to 4 carbon atoms, an aryl group, a heterocyclic group, a cyano group, an alkoxy group, an amide group, a ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including a salt thereof), a carboxyl group (including a salt thereof), a hydroxyl group (which may be a salt), a phosphono group (which may be a salt) or quarternary ammonium, among them, preferably a hydrogen atom, a halogen atom, an alkyl group, a sulfo group (including a salt thereof), a carboxyl group (including a salt thereof), a hydroxyl group (which may be a salt) (including a salt thereof), further preferably a hydrogen atom, a sulfo group (including a salt thereof), a carboxyl group (including a salt thereof), and particularly preferably a group in which at least one of $X_{DC1}$, $X_{DC2}$, $X_{DC3}$, $X_{DC4}$, $X_{DC5}$, $X_{DC6}$ and $X_{DC7}$ is a sulfo group (including a salt thereof) or a carboxyl group (including a salt thereof).

(b) Preferred $W_{DC}$ is a substituted phenyl group, a substituted or unsubstituted naphthyl group, a substituted or unsubstituted heterocyclic group (for example, a pyrrole ring, a thiophene ring, an imidazole ring, a thiazole ring, a benzothiazole ring, a pyridine ring or a pyridazine ring), and particularly preferably a substituted phenyl group (particularly, a para-substituted phenyl group), a substituted or unsubstituted β-a naphthyl group, a pyridine ring or a thiazole ring.

(c) $R_{DC41}$ and $R_{DC42}$ are preferably a hydrogen atom, an alkyl group having 1 to 4 carbon atoms, an aryl group, a heterocyclic group, an acyl group, or an alkyl- or arylsulfonyl group, more preferably a hydrogen atom, an alkyl group having 1 to 4 carbon atoms, an aryl group or a heterocyclic group, particularly preferably a hydrogen atom, an aryl group having a substituent or a heterocyclic group having a substituent, and most preferably a hydrogen atom or an aryl group having a substituent. However, $R_{DC41}$ and $R_{DC42}$ are not a hydrogen atom at the same time. Further, $R_{DC43}$ and $R_{DC41}$, or $R_{DC41}$ and $R_{DC42}$ may be bound with each other to form a 5- or 6-membered ring.

(d) Preferred examples of $R_{DC43}$ and $R_{DC44}$ each independently include a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl, a hydroxyl group, an amino group, an alkylamino group, an arylamino group, and a heterocyclic amino group, an acylamino group, a ureido group, a sulfamoylamino group, an alkoxycarbonylamino group, an aryloxycarbonylamino group, an alkyl- or arylsulfonylamino group, and a heterocyclic sulfonylamino group, and each group may be further substituted.

More preferred $R_{DC43}$ represents a hydrogen atom, a halogen atom, an aryl group, a heterocyclic group, a cyano group, a carboxyl group, a carbamoyl group, an alkoxycarbonyl group, an aryloxycarbonyl group or a heterocyclic oxycarbonyl, and among them, is preferably a cyano group, a carboxyl group, a carbamoyl group or an alkoxycarbonyl group, and particularly, most preferably a cyano group.

More preferred $R_{DC44}$ represents a hydrogen atom, a halogen atom, an alkyl group having 1 to 4 carbon atoms, an alkenyl group, an alkynyl group, an aralkyl group, an aryl group, a heterocyclic group, a hydroxyl group, an amino group, an alkylamino group, an arylamino group, and a heterocyclic amino group, an acylamino group, a ureido group, a sulfamoylamino group, an alkoxycarbonylamino group, an aryloxycarbonylamino group, an alkyl- or arylsulfonylamino group, or a heterocyclic sulfonylamino group, and among them, is preferably a hydrogen atom, a halogen atom, an alkyl group having 1 to 4 carbon atoms, an alkenyl group, an alkynyl group, an aralkyl group or an aryl group, and particularly, most preferably a methyl group.

(e) $R_{DC45}$ and $R_{DC46}$ are preferably a hydrogen atom, an alkyl group having 1 to 4 carbon atoms, an aryl group, a heterocyclic group, an acyl group, or an alkyl- or arylsulfonyl group, more preferably a hydrogen atom, an alkyl group having 1 to 4 carbon atoms, an aryl group or a heterocyclic group, particularly preferably a hydrogen atom, an aryl group having a substituent, or a heterocyclic group having a substituent, and most preferably a hydrogen atom or an aryl group having a substituent. However, $R_{DC45}$ and $R_{DC46}$ are not a hydrogen atom at the same time. Further, $R_{DC45}$ and $R_{DC46}$ may be bound with each other to form a 5- or 6-membered ring.

For combination of preferred substituents of the colorant represented by Formula (DC-1), preferred is a compound in which at least one of various substituents is the aforementioned preferred group, more preferred is a compound in which more substituents are the aforementioned preferred groups, and most preferred is a compound in which all substituents are the aforementioned preferred groups.

Specific examples of the azo dye represented by Formula (DC-1) are shown below, but the present invention is not limited to the following examples. Further, the carboxyl group, the phosphono group and the sulfo group in the following specific examples may be in a state of salt, and examples of countercations forming a salt include an ammonium ion, an alkali metal ion (e.g., a lithium ion, a sodium ion or a potassium ion) and an organic cation (e.g., a tetramethylammonium ion, a tetramethylguanidium ion or tetramethylphosphonium). Among them, preferred are an ammonium salt, an organic cation and a lithium salt, and most preferred is a lithium salt.

A—N=N—B—N=N—C

| | A | B | C |
|---|---|---|---|
| (Dc-1) | 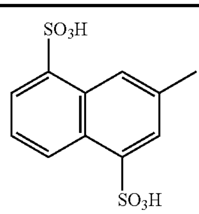 | 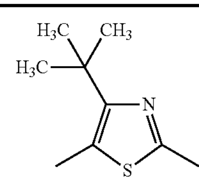 | 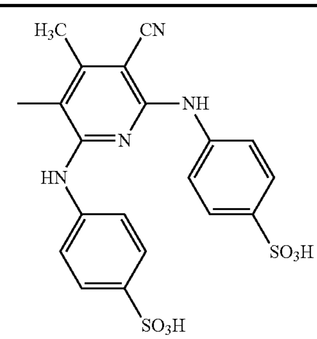 |

-continued
A—N=N—B—N=N—C
| | A | B | C |
|---|---|---|---|
| (Dc-2) | 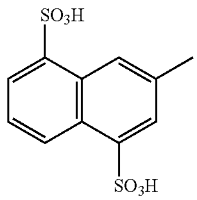 | 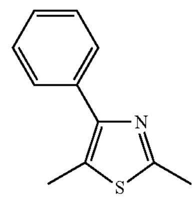 | 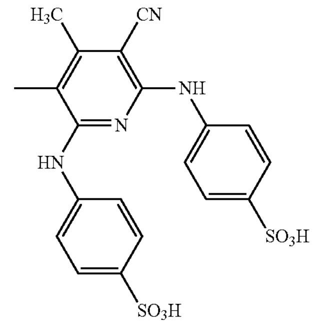 |
| (Dc-3) | 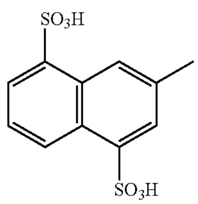 | 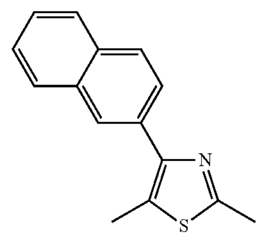 | 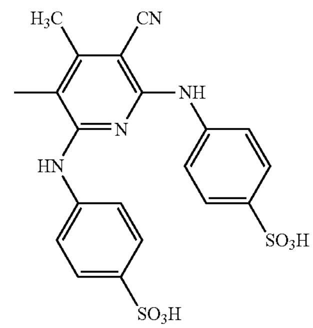 |
| (Dc-4) | 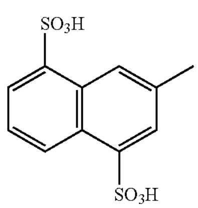 | 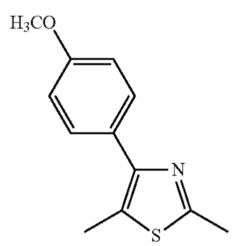 | 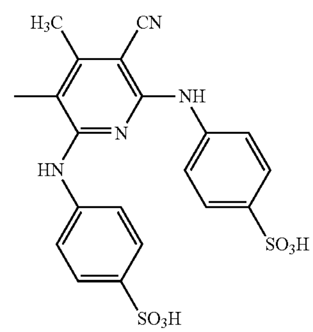 |
| (Dc-5) | 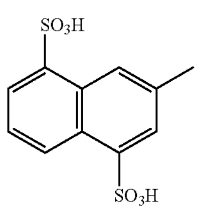 | 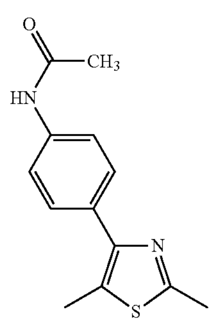 | 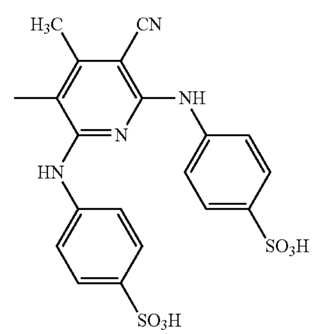 |

-continued
| A—N═N—B—N═N—C | | | |
|---|---|---|---|
| | A | B | C |
| (Dc-6) | 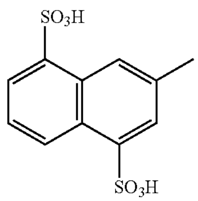 | 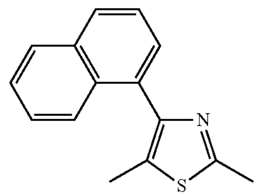 | 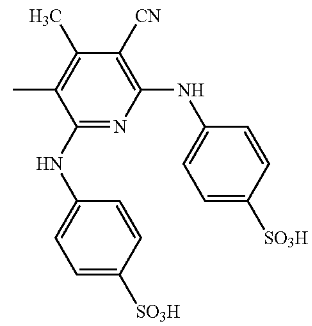 |
| (Dc-7) | 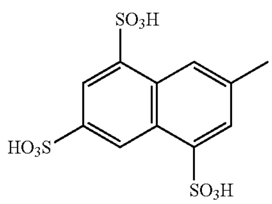 | 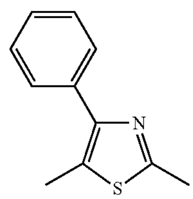 | 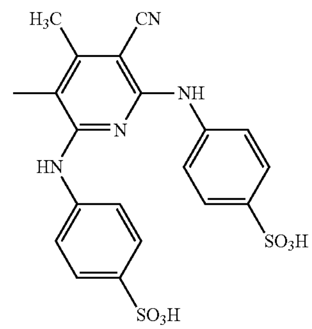 |
| (Dc-8) | 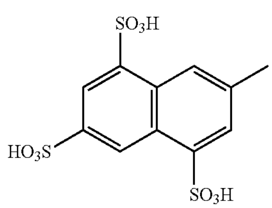 | 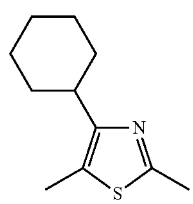 | 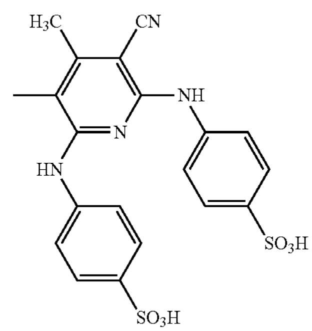 |
| (Dc-9) | 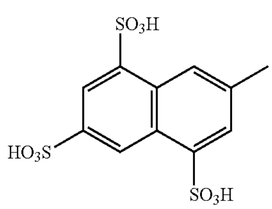 | 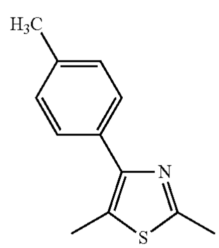 | 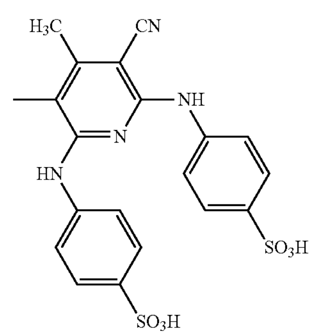 |

-continued
A—N═N—B—N═N—C
| | A | B | C |
|---|---|---|---|
| (Dc-10) | 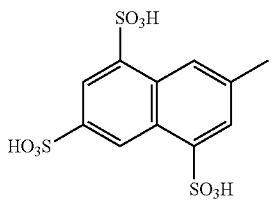 | 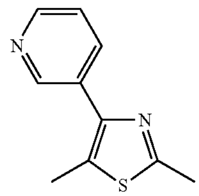 | 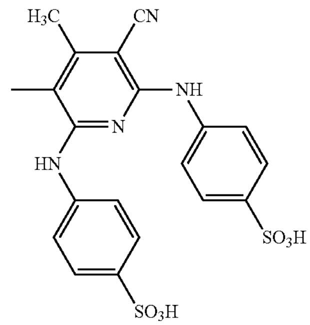 |
| (Dc-11) | 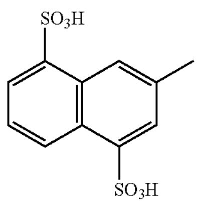 | 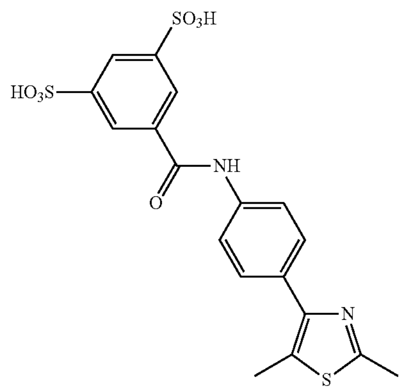 | 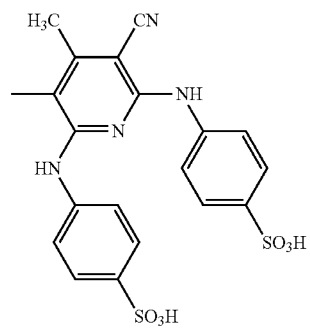 |
| (Dc-12) | 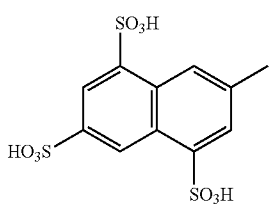 | 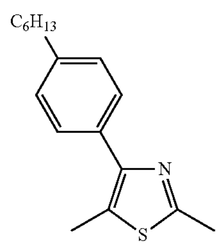 | 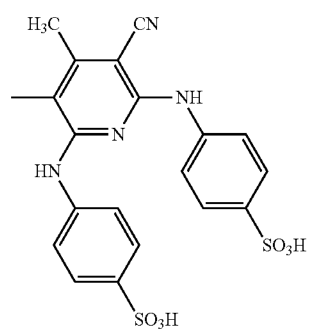 |
| (Dc-13) | 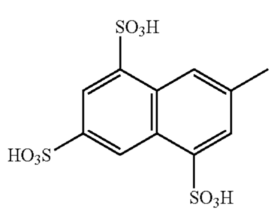 | 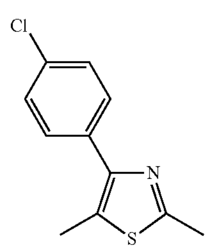 | 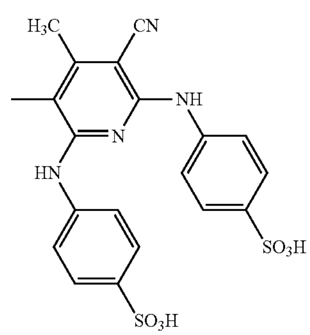 |

-continued
| A—N═N—B—N═N—C | | | |
|---|---|---|---|
| | A | B | C |
| (Dc-14) | 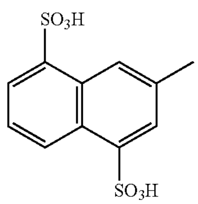 | 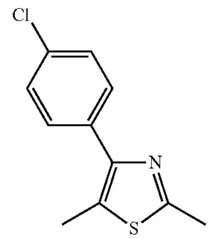 | 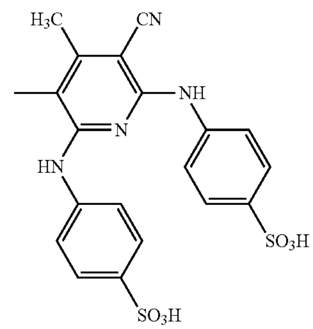 |
| (Dc-15) | 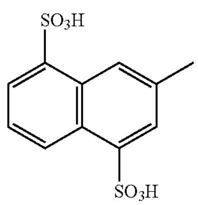 | 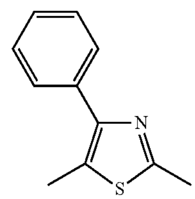 | 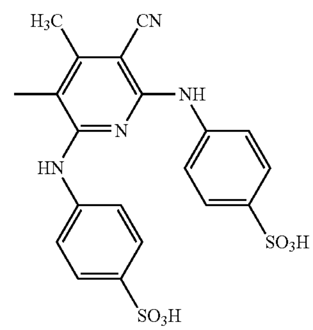 |
| (Dc-16) | 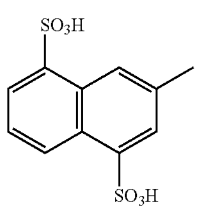 | 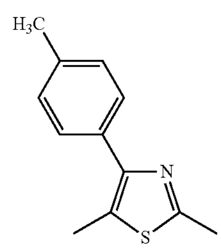 | 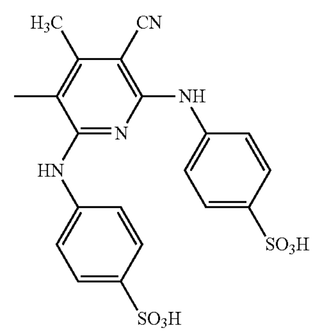 |
| (Dc-17) | 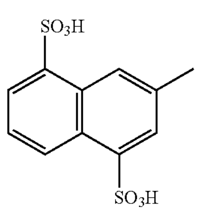 | 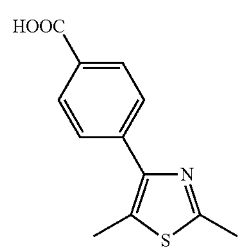 | 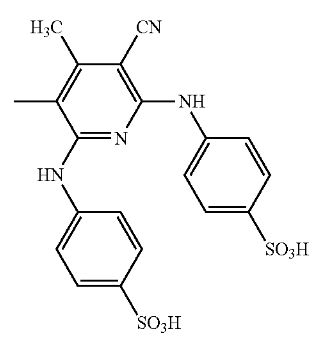 |

-continued
| A—N═N—B—N═N—C | | | |
|---|---|---|---|
| | A | B | C |
| (Dc-18) | 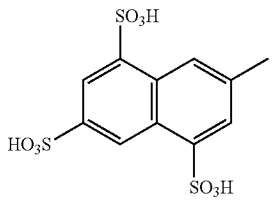 | 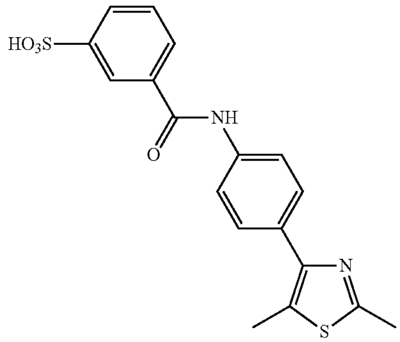 | 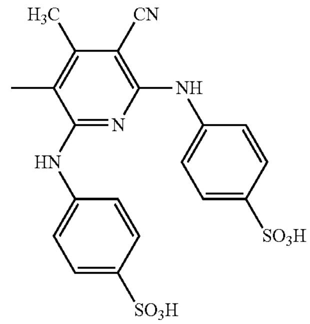 |
| (Dc-19) | 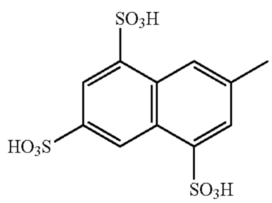 | 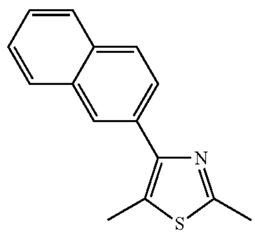 | 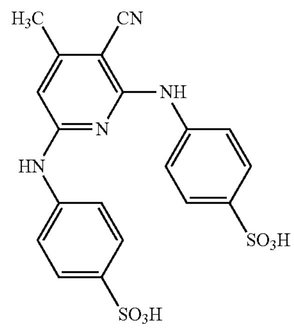 |
| (Dc-20) | 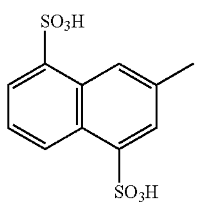 | 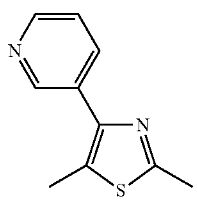 | 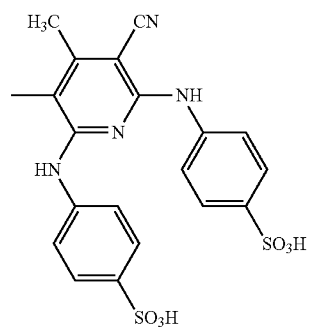 |
| (Dc-21) | 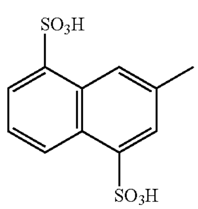 | 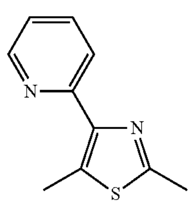 | 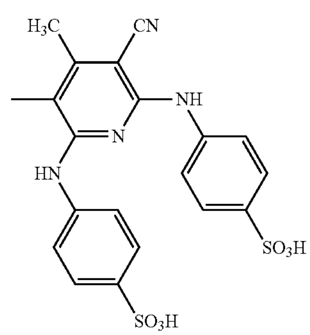 |

-continued

| | A—N═N—B—N═N—C | | |
|---|---|---|---|
| | A | B | C |
| (Dc-22) | 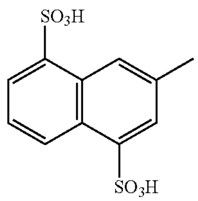 | 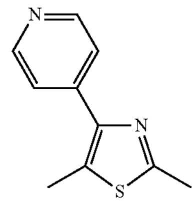 | 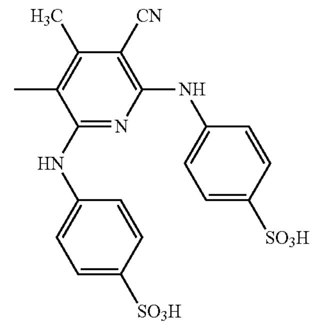 |
| (Dc-23) | 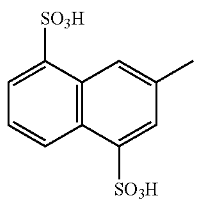 | 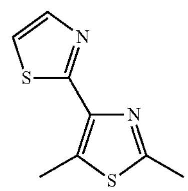 | 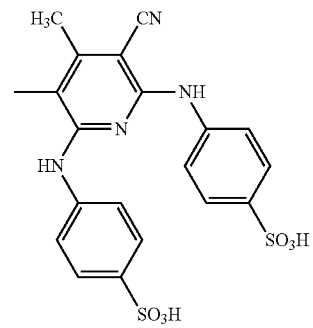 |
| (Dc-24) | 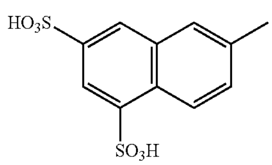 | 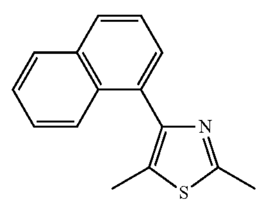 | 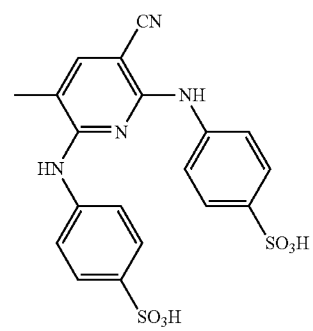 |

In the present invention, it is also preferred that the dye represented by Formula (A) is a dye represented by the following Formula (DE-1).

Although the dye is shown as a free acid structure in the following formula, it is understood that the dye may be used in a form of a salt in practical use.

In Formula (DE-1), $W_{DE}$, $R_{DE43}$, $R_{DE44}$, $X_{DE1}$, $X_{DE2}$, $X_{DE3}$, $X_{DE4}$, $X_{DE5}$, $X_{DE6}$ and $X_{DE7}$ each independently represent a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycar- Formula (DE-1)

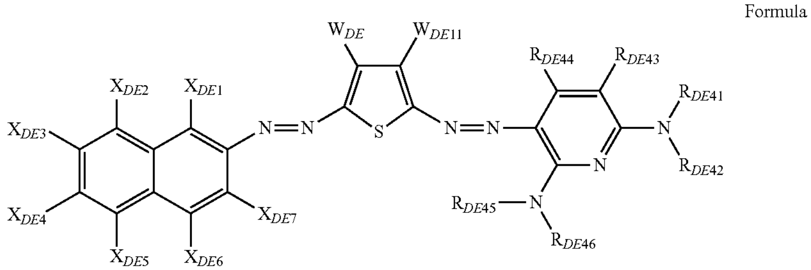

bonyl group, a heterocyclic oxycarbonyl, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted. In the present specification, the amino group has a meaning including an alkylamino group, an arylamino group, a heterocyclic amino group, in addition to an amino group in which the hydrogen atoms are not substituted.

$R_{DE41}$, $R_{DE42}$, $R_{DE45}$ and $R_{DE46}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. However, $R_{DE41}$ and $R_{DE42}$ are not a hydrogen atom at the same time. Further, $R_{DE43}$ and $R_{DE41}$, or $R_{DE41}$ and $R_{DE42}$ may be bound with each other to form a 5- or 6-membered ring.

$W_{DE11}$ represents an electron-withdrawing group having a Hammett's ap value of 0.20 or more.

Formula (DE-1) of the present invention will be described in detail.

In Formula (DE-1) of the present invention, the monovalent group represented by $X_{DE1}$, $X_{DE2}$, $X_{DE3}$, $X_{DE4}$, $X_{DE5}$, $X_{DE6}$ and $X_{DE7}$ represents a hydrogen atom or a monovalent substituent. The monovalent substituent will be described in more detail. Examples of the monovalent substituent may include a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (an alkylamino group and an allylamino group), an acylamino group (an amide group), aminocarbonylamino group (a ureido group), an alkoxycarbonylamino group, an aryloxycarbonylamino group, a sulfamoylamino group, an alkylsulfonylamino group, an arylsulfonylamino group, an alkylthio group, an arylthio group, a heterocyclic thio group, a sulfamoyl group, an alkylsulfinyl group, an arylsulfinyl group, an alkylsulfonyl group, an arylsulfonyl group, an acyl group, an aryloxycarbonyl group, an alkoxycarbonyl group, a carbamoyl group, a phosphino group, a phosphonyl group, a phosphinyloxy group, a phosphinylamino group, a silyl group, an azo group or an imide group, and each may further have a substituent.

Preferred $X_{DE1}$, $X_{DE2}$, $X_{DE3}$, $X_{DE4}$, $X_{DE5}$, $X_{DE6}$ and $X_{DE7}$ are a hydrogen atom, a halogen atom, an alkyl group, an aryl group, a heterocyclic group, a cyano group, an alkoxy group, an amide group, a ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including a salt thereof), a carboxyl group (including a salt thereof), a hydroxyl group (which may be a salt), a phosphono group (which may be a salt) or quarternary ammonium, and among them, preferably a hydrogen atom, a halogen atom, an alkyl group, a sulfo group (including a salt thereof), a carboxyl group (including a salt thereof) or a hydroxyl group (which may be a salt) (including a salt thereof), more preferably a hydrogen atom, a sulfo group (including a salt thereof) or a carboxyl group (including a salt thereof), and particularly preferably a group in which at least one of $X_{DE1}$, $X_{DE2}$, $X_{DE3}$, $X_{DE4}$, $X_{DE5}$, $X_{DE6}$ and $X_{DE7}$ is a sulfo group (including a salt thereof) or a carboxyl group (including a salt thereof).

In Formula (DE-1), preferred $W_{DE}$, $R_{DE43}$ and $R_{DE44}$ represent a hydrogen atom, a halogen atom, an alkyl group, an alkenyl group, an alkynyl group, an aralkyl group, an aryl group, a heterocyclic group, a hydroxyl group, an alkoxy group, an aryloxy group, a heterocyclic oxy group, a silyloxy group, an acyloxy group, an amino group, an acylamino group, a ureido group, a sulfamoylamino group, an alkoxycarbonylamino group, an aryloxycarbonylamino group, an alkyl- and arylthio group, or a heterocyclic thio group, and each group may be further substituted.

More preferred $W_{DE}$, $R_{DE43}$ and $R_{DE44}$ represent a hydrogen atom, a halogen atom, an alkyl group, a hydroxyl group, an alkoxy group, an aryloxy group, a heterocyclic oxy group, a silyloxy group, an acyloxy group, an amino group or an acylamino group, and among them, are preferably a hydrogen atom, an amino group or an acylamino group, particularly preferably an amino group having a substituent, and most preferably an amino group (substituted anilino group and the like) substituted with an aryl group having an ionic hydrophilic group as a substituent.

The ionic hydrophilic group includes a sulfo group, a carboxyl group, a phosphono group and a quaternary ammonium group. The ionic hydrophilic group is preferably a carboxyl group, a phosphono group and a sulfo group, particularly preferably a carboxyl group or a sulfo group, and most preferably a sulfo group from the viewpoint of enhancing the solubility in an aqueous solvent. The carboxyl group, the phosphono group and the sulfo group may be in a state of salt, and examples of the counter salt include ammonium, alkali metal (e.g., lithium, sodium or potassium) and an organic cation (e.g., tetramethylammonium, tetramethylguanidium or tetramethylphosphonium). The counter salt is preferably ammonium, lithium, sodium and potassium, and among them, more preferably sodium or lithium, and most preferably lithium.

In Formula (DE-1), $W_{DE11}$ represents an electron-withdrawing group having a Hammett's $\sigma p$ value of 0.20 or more. Among them, $W_{DE11}$ is preferably an electron-withdrawing group having a $\sigma p$ value of 0.30 or more, more preferably 0.45 or more, and particularly 0.60 or more, but preferably not more than 1.0. More specifically, preferred are an acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, a carbamoyl group having 1 to 20 carbon atoms and a halogenated alkyl group having 1 to 20 carbon atoms. Particularly preferred are a cyano group, an alkylsulfonyl group having 1 to 20 carbon atoms and an arylsulfonyl group having 6 to 20 carbon atoms, and most preferred is a cyano group.

In Formula (DE-1), $R_{DE41}$, $R_{DE42}$, $R_{DE45}$ and $R_{DE46}$ each independently represent a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkyl- or arylsulfonyl group and a sulfamoyl group, and each group may further have a substituent. However, among them, preferred are a hydrogen atom, an alkyl group, an aryl group, a heterocyclic group, an acyl group, and an alkyl- or arylsulfonyl group, more preferred are a hydrogen atom, an alkyl group, an aryl group and a heterocyclic group, particularly preferred are a hydrogen atom, an aryl group having a substituent, and a heterocyclic group having a substituent, and most preferred are a hydrogen atom and an aryl group having a substituent. However, $R_{DE41}$ and $R_{DE42}$ are not a hydrogen atom at the same time. Further, $R_{DE43}$ and $R_{DE41}$, or $R_{DE41}$ and $R_{DE42}$ may be bound with each other to form a 5- or 6-membered ring.

A particularly preferred combination as the compound represented by Formula (DE-1) includes the following (a) to (f).

(a) $X_{DE1}$, $X_{DE2}$, $X_{DE3}$, $X_{DE4}$, $X_{DE5}$, $X_{DE6}$ and $X_{DE7}$ are a hydrogen atom, a halogen atom, an alkyl group, an aryl group, a heterocyclic group, a cyano group, an alkoxy group, an amide group, a ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including a salt thereof), a carboxyl group (including a salt thereof), a hydroxyl group (which may be a salt), a phosphono group (which may be a salt) or quarternary ammonium, and among them, preferably a hydrogen atom, a halogen atom, an alkyl group, a sulfo group (including a salt thereof), a carboxyl group (including a salt thereof) or a hydroxyl group (which may be a salt) (including a salt thereof), more preferably a hydrogen atom, a sulfo group (including a salt thereof), a carboxyl group (including a salt thereof), and particularly preferably a group in which at least one of $X_{DE1}$, $X_{DE2}$, $X_{DE3}$, $X_{DE4}$, $X_{DE5}$, $X_{DE6}$ and $X_{DE7}$ is a sulfo group (including a salt thereof) or a carboxyl group (including a salt thereof).

(b) Preferred $W_{DE}$ is a substituted phenyl group, a substituted or unsubstituted naphthyl group, or a substituted or unsubstituted heterocyclic group (for example, a pyrrole ring, a thiophene ring, an imidazole ring, a thiazole ring, a benzothiazole ring, a pyridine ring or a pyridazine ring), and particularly preferably a substituted phenyl group (particularly, a para-substituted phenyl group), a substituted or unsubstituted β-naphthyl group, a pyridine ring or a thiazole ring.

(c) Preferred $W_{DE11}$ represents an electron-withdrawing group having a Hammett's σp value of 0.20 or more. Among them, $W_{DE11}$ is preferably an electron-withdrawing group having a σp value of 0.30 or more, more preferably 0.45 or more, and particularly 0.60 or more, but preferably not more than 1.0. More specifically, preferred are an acyl group having 2 to 20 carbon atoms, an alkyloxycarbonyl group having 2 to 20 carbon atoms, a nitro group, a cyano group, an alkylsulfonyl group having 1 to 20 carbon atoms, an arylsulfonyl group having 6 to 20 carbon atoms, an carbamoyl group having 1 to 20 carbon atoms and a halogenated alkyl group having 1 to 20 carbon atoms. Particularly preferred are a cyano group, an alkylsulfonyl group having 1 to 20 carbon atoms and an arylsulfonyl group having 6 to 20 carbon atoms, and most preferred is a cyano group.

(d) $R_{DE41}$ and $R_{DE42}$ are preferably a hydrogen atom, an alkyl group, an aryl group, a heterocyclic group, an acyl group, or an alkyl- or arylsulfonyl group, more preferably a hydrogen atom, an alkyl group, an aryl group or a heterocyclic group, particularly preferably a hydrogen atom, an aryl group having a substituent, or a heterocyclic group having a substituent, and most preferably a hydrogen atom, or an aryl group having a substituent. However, $R_{DE41}$ and $R_{DE42}$ are not a hydrogen atom at the same time. Further, $R_{DE43}$ and $R_{DE41}$, or $R_{DE41}$ and $R_{DE42}$ may be bound with each other to form a 5- or 6-membered ring.

(e) Preferred examples of $R_{DE43}$ and $R_{DE44}$ each independently include a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl, a hydroxyl group, an amino group (including an alkylamino group, an arylamino group and a heterocyclic amino group), an acylamino group, a ureido group, a sulfamoylamino group, an alkoxycarbonylamino group, an aryloxycarbonylamino group, an alkyl- or arylsulfonylamino group and a heterocyclic sulfonylamino group, and each group may be further substituted.

More preferred $R_{DE43}$ represents a hydrogen atom, a halogen atom, an aryl group, a heterocyclic group, a cyano group, a carboxyl group, a carbamoyl group, an alkoxycarbonyl group, an aryloxycarbonyl group or a heterocyclic oxycarbonyl, and among them, is preferably a cyano group, a carboxyl group, a carbamoyl group or an alkoxycarbonyl group, and particularly, most preferably a cyano group.

More preferred $R_{DE44}$ represents a hydrogen atom, a halogen atom, an alkyl group, an alkenyl group, an alkynyl group, an aralkyl group, an aryl group, a heterocyclic group, a hydroxyl group, an amino group (including an alkylamino group, an arylamino group and a heterocyclic amino group), an acylamino group, a ureido group, a sulfamoylamino group, an alkoxycarbonylamino group, an aryloxycarbonylamino group, an alkyl- or arylsulfonylamino group or a heterocyclic sulfonylamino group, and among them, is preferably a hydrogen atom, a halogen atom, an alkyl group, an alkenyl group, an alkynyl group, an aralkyl group or an aryl group, and particularly, most preferably a methyl group.

(f) $R_{DE45}$ and $R_{DE46}$ are preferably a hydrogen atom, an alkyl group, an aryl group, a heterocyclic group, an acyl group, or an alkyl- or arylsulfonyl group, more preferably a hydrogen atom, an alkyl group, an aryl group or a heterocyclic group, particularly a hydrogen atom, an aryl group having a substituent or a heterocyclic group having a substituent, and most preferably a hydrogen atom or an aryl group having a substituent. However, $R_{DE45}$ and $R_{DE46}$ are not a hydrogen atom at the same time. Further, $R_{DE45}$ and $R_{DE46}$ may be bound with each other to form a 5- or 6-membered ring.

For combination of preferred substituents of the colorant represented by Formula (DE-2), preferred is a compound in which at least one of various substituents is the aforementioned preferred group, more preferred is a compound in which more substituents are the aforementioned preferred groups, and most preferred is a compound in which all substituents are the aforementioned preferred groups.

In the present invention, among the compounds represented by Formula (DE-1), the compound represented by the following Formula (DE-1-I) is particularly preferred from the viewpoint that more excellent performance may be exhibited.

Formula (DE-1-1)

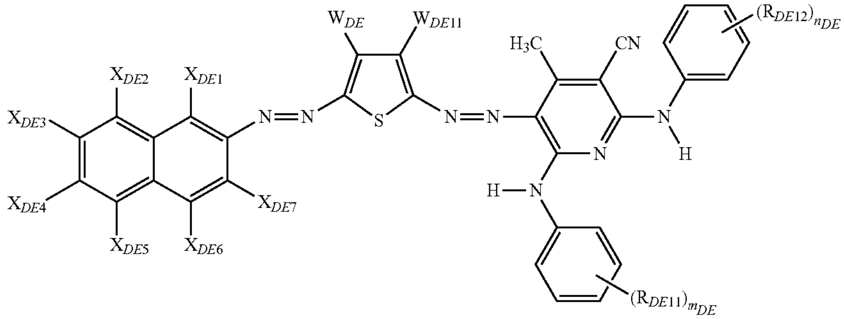

In Formula (DE-14), $R_{DE11}$ and $R_{DE12}$ represent an ionic hydrophilic group. Particularly preferred are a sulfo group (including a salt thereof) and a carboxyl group (including a salt thereof), and among them, preferred is a sulfo group. $m_{DE}$ and $n_{DE}$ represents an integer of 1 to 3, particularly preferred an integer of 1 to 2, and most preferably $m_{DE}$=1 and/or $n_{DE}$=1. $W_{DE}$ has the same meaning as $W_{DE}$ in Formula (DE-1), and preferred examples thereof are also the same. $W_{DE11}$ has the same meaning as $W_{DE11}$ in Formula (DE-1), and preferred examples thereof are also the same. $X_{DE1}$, $X_{DE2}$, $X_{DE3}$, $X_{DE4}$, $X_{DE5}$, $X_{DE6}$ and $X_{DE7}$ have the same meaning as $X_{DE1}$, $X_{DE2}$, $X_{DE3}$, $X_{DE4}$, $X_{DE5}$, $X_{DE6}$ and $X_{DE7}$ in Formula (DE-1), and preferred examples thereof are also the same.

Specific examples of the azo dye represented by Formula (DE-1) are shown below, but the present invention is not limited to the following examples. Further, the carboxyl group, the phosphono group and the sulfo group in the following specific examples may be in a state of salt, and examples of countercations forming a salt include an ammonium ion, an alkali metal ion (e.g., a lithium ion, a sodium ion or a potassium ion) and an organic cation (e.g., a tetramethylammonium ion, a tetramethylguanidium ion or tetramethylphosphonium). Among them, preferred are an ammonium salt, an organic cation and a lithium salt, and most preferred is a lithium salt.

It is preferred that the ink composition of the present invention contains the counterion.

A—N=N—B—N=N—C

| | A | B | C |
|---|---|---|---|
| (De-1) | 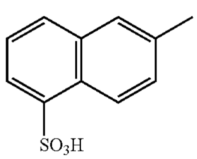 | 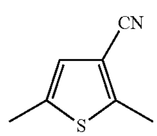 | 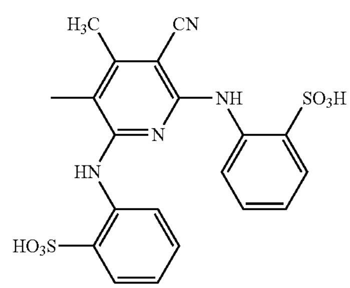 |
| (De-2) | 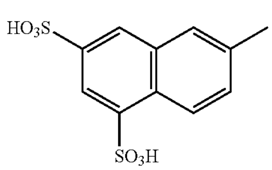 | 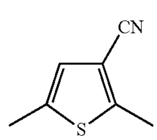 | 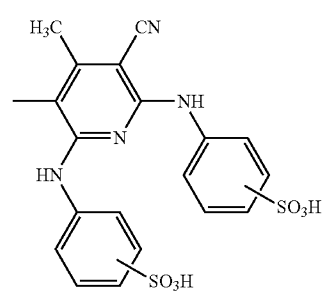 |

-continued
A—N=N—B—N=N—C
| | A | B | C |
|---|---|---|---|
| (De-3) | 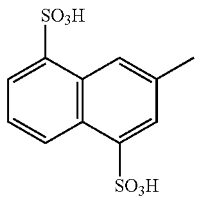 | 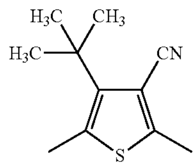 | 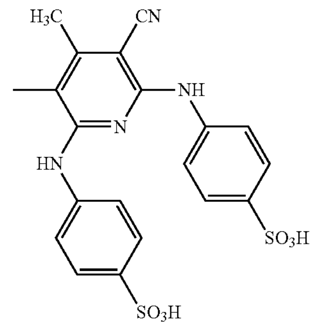 |
| (De-4) | 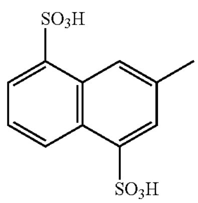 | 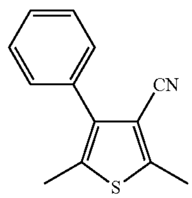 | 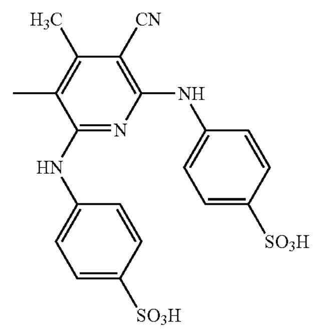 |
| (De-5) | 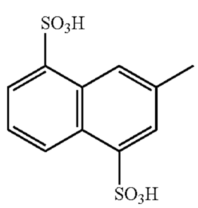 | 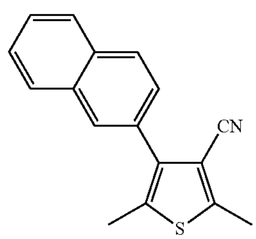 | 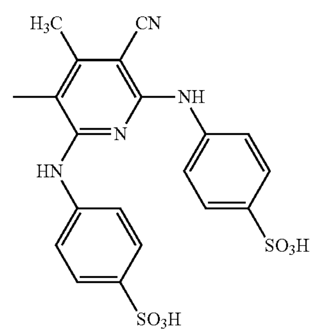 |
| (De-6) | 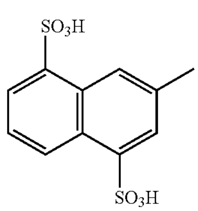 | 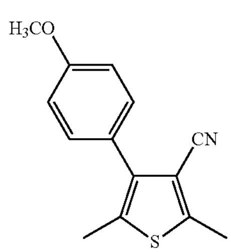 | 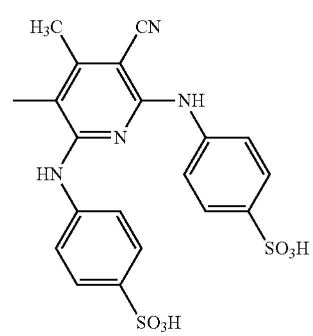 |

-continued
A—N═N—B—N═N—C
| | A | B | C |
|---|---|---|---|
| (De-7) | 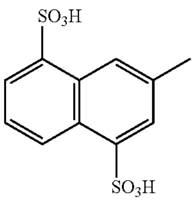 | 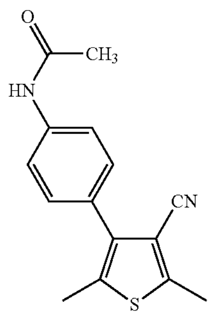 | 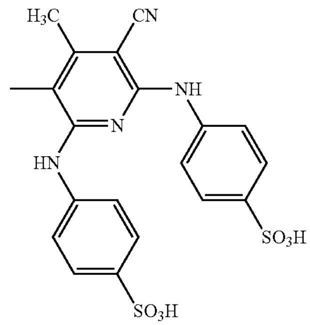 |
| (De-8) | 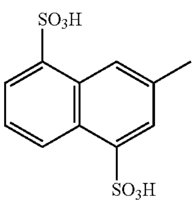 | 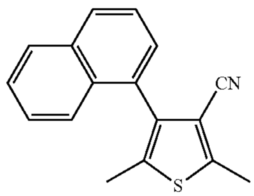 | 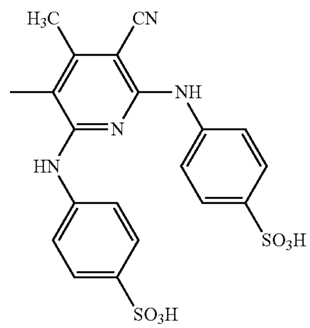 |
| (De-9) | 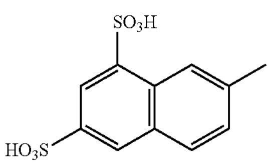 | 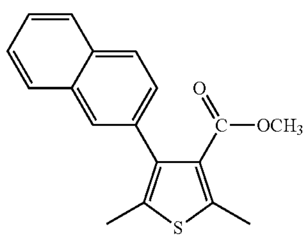 | 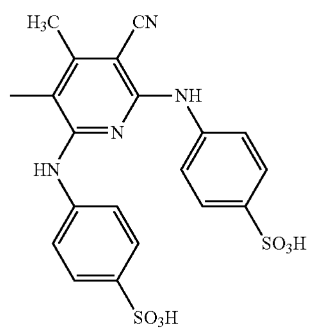 |
| (De-10) | 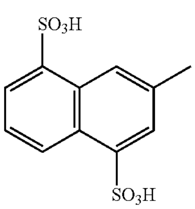 | 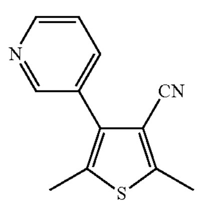 | 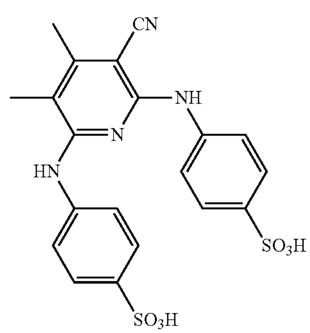 |

-continued
| A—N=N—B—N=N—C | | | |
|---|---|---|---|
| | A | B | C |
| (De-11) | 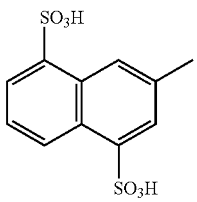 | 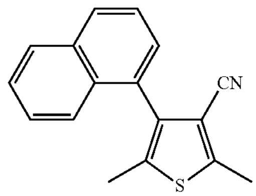 | 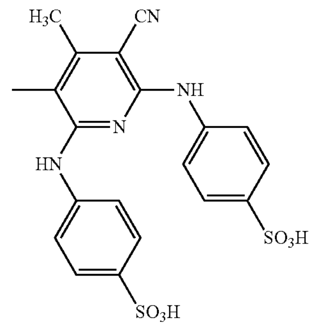 |
| (De-12) | 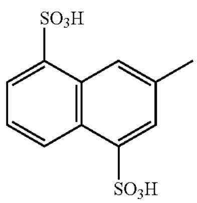 | 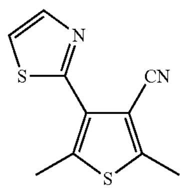 | 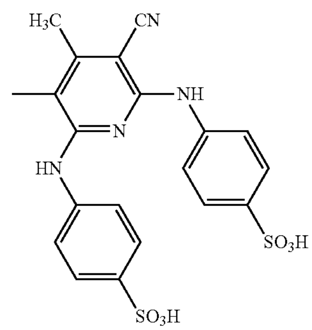 |
| (De-13) | 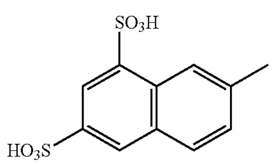 | 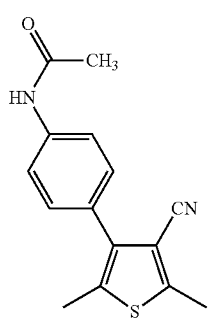 | 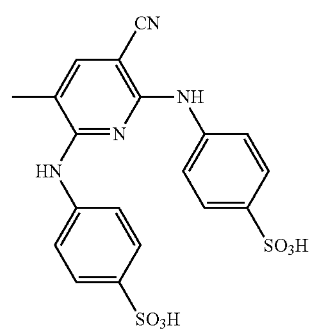 |
| (De-14) | 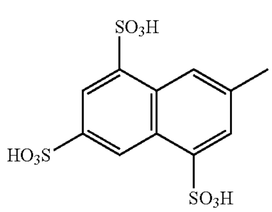 | 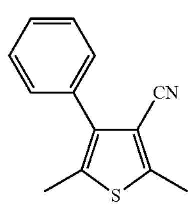 | 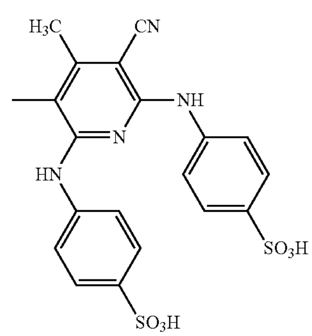 |

-continued
| A—N═N—B—N═N—C | | | |
|---|---|---|---|
| | A | B | C |
| (De-15) | 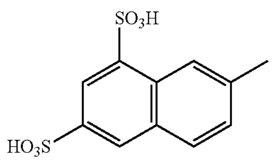 | 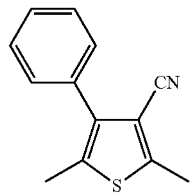 | 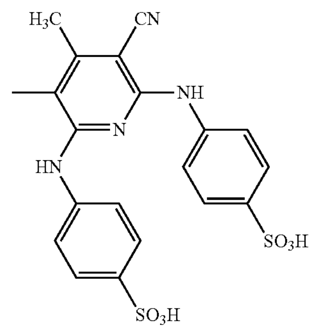 |
| (De-16) | 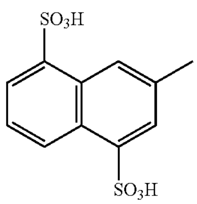 | 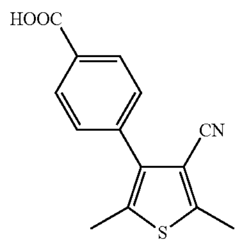 | 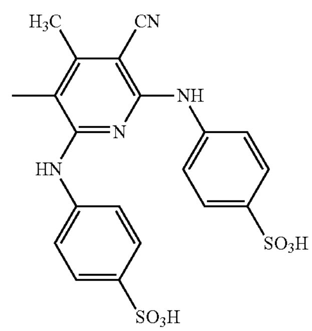 |
| (De-17) | 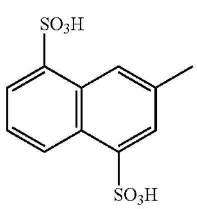 | 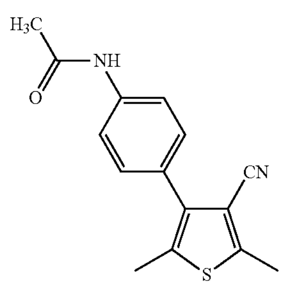 | 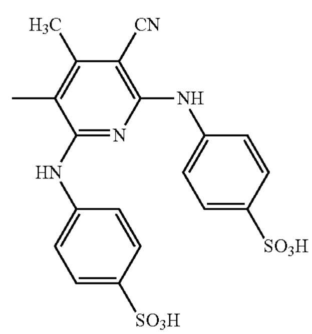 |
| (De-18) | 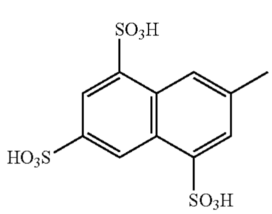 | 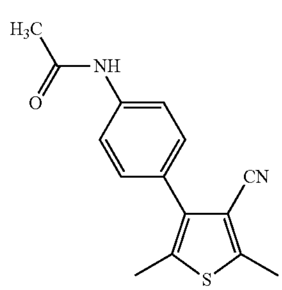 | 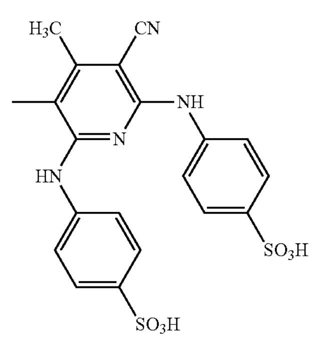 |

-continued

A—N=N—B—N=N—C

| | A | B | C |
|---|---|---|---|
| (De-19) | 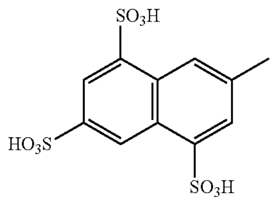 | 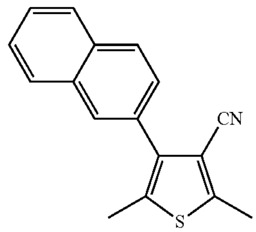 | 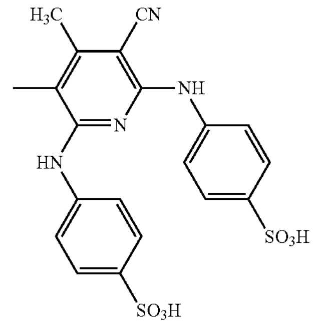 |

In the present invention, it is also preferred that the dye represented by Formula (A) is a dye represented by the following Formula (DG-1), or a salt thereof.

Formula (DG-1)

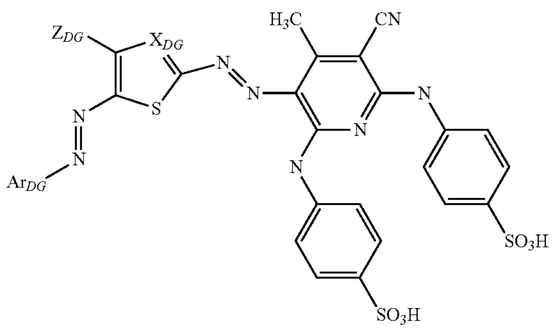

$X_{DG}$ represents N or C(CN). $Z_{DG}$ represents an alkyl group which may be substituted, an aryl group which may be substituted or a heterocyclic group which may be substituted. $Ar_{DG}$ is an aryl group substituted with at least one nitro group, and may further have a substituent.

$Z_{DG}$ is preferably an alkyl group having 1 to 12 carbon atoms which may be substituted (preferably an alkyl group having 1 to 4 carbon atoms which may be substituted), a phenyl group which may be substituted, or a naphthyl group which may be substituted.

Particularly, it is preferred that $Z_{DG}$ is a naphthyl group which may be substituted, from the viewpoint of the whole performance of the ink. When $Z_{DG}$ is a naphthyl group which may be substituted, it is preferred that the naphthyl group is linked at its 2-position. Further, it is more preferred that $Z_{DG}$ is an unsubstituted naphthyl group, from the viewpoint of the fastness to ozone.

The substituent which may be possessed by $Z_{DG}$ is selected from an alkoxy group which may have a substituent (preferably an alkoxy group having 1 to 4 carbon atoms), an aryl group which may have a substituent (preferably a phenyl group), an aryloxy group which may have a substituent (preferably a phenoxy group), a heterocyclic group which may have a substituent (preferably a heteroaryl group, and more preferably a 5- or 6-membered ring containing 1 or 2 heteroatoms selected from N, S and P), polyalkylene oxide (preferably polyethylene oxide or polypropylene oxide), a phosphate salt (preferably phosphoric acid or phosphonic acid), a nitro group, a sulfo group (preferably sulfonic acid), a cyano group, a halogen atom, a ureido group, a hydroxyl group, an ester group (including sulfuric ester and phosphoric ester, and preferably carboxylic ester), a sulfone group, $—NR_{DG}^{a}R_{DG}^{b}$, $—COR_{DG}^{a}$, $—CONR_{DG}^{a}R_{DG}^{b}$, $—NHCOR_{DG}^{a}$ and $—SO_2NR_{DG}^{a}R_{DG}^{b}$ (wherein $R_{DG}^{a}$ and $R_{DG}^{b}$ each independently represent H, an alkyl group which may have a substituent (preferably an alkyl group having 1 to 4 carbon atoms), an aryl group which may have a substituent or a heteroaryl group which may have a substituent.

When $Z_{DG}$ is an aryl group, an aryloxy group or a heterocyclic group, the group may have an alkyl group (preferably having 1 to 4 carbon atoms).

Further, the substituent which may be possessed by the alkoxy group, the aryl group, the aryloxy group, the heterocyclic group and the alkyl group as a substituent for $Z_{DG}$, is selected from a halogen atom, an amino group, a nitro group, a cyano group, a hydroxyl group, a sulfonate group, a carboxylate group and a phosphonate group.

The halogen atom is preferably a chlorine atom, a bromine atom or a fluorine atom.

The substituent for $Z_{DG}$ is preferably a water-soluble group, more preferably a carboxyl group, a sulfo group (preferably sulfonic acid) or a phosphate salt (preferably phosphoric acid), and still more preferably a carboxyl group or a sulfo group.

$Ar_{DG}$ is preferably substituted with 1 to 3 nitro groups, and more preferably with one nitro group.

When $Ar_{DG}$ is a naphthyl group, the following formula is preferred.

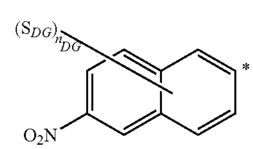

In the formula, $S_{DG}$'s each independently represent any substituent for $Z_{DG}$ as described above.

$n_{DG}$ represents an integer of 1 to 3. $n_{DG}$ is preferably 2.

* represents a bonding site to the azo compound represented by Formula (DG-1) or a salt thereof.

$S_{DG}$ is preferably the aforementioned water-soluble group. It is more preferred that $S_{DG}$ is selected from a carboxyl group and a sulfo group (preferably sulfonic acid).

It is most preferred that $Ar_{DG}$ is represented by the following formula.

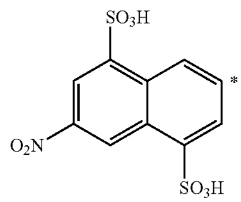 [SMILES: O=[N+]([O-])c1cc(S(=O)(=O)O)c2cccc(S(=O)(=O)O)c2c1]

The substituent which may be possessed by $Ar_{DG}$ is selected from an alkyl group which may have a substituent (preferably an alkyl group having 1 to 4 carbon atoms), an alkoxy group which may have a substituent (preferably an alkoxy group having 1 to 4 carbon atoms), an aryl group which may have a substituent (preferably a phenyl group), an aryloxy group which may have a substituent (preferably a phenoxy group), a heterocyclic group which may have a substituent (preferably a heteroaryl group), polyalkylene oxide (preferably polyethylene oxide or polypropylene oxide), a phosphate salt (preferably phosphoric acid or phosphonic acid), a nitro group, a sulfo group (preferably sulfonic acid), a cyano group, a halogen atom, a ureido group, a hydroxyl group, an ester group (including sulfuric ester and phosphoric ester, and preferably carboxylic ester), a sulfone group, —$NR_{DG}^aR_{DG}^b$, —$COR_{DG}^a$, —$CONR_{DG}^aR_{DG}^b$, —$NHCOR_{DG}^a$ and —$SO_2NR_{DG}^aR_{DG}^b$ (wherein $R_{DG}^a$ and $R_{DG}^b$ each independently represent H, an alkyl group which may have a substituent (preferably an alkyl group having 1 to 4 carbon atoms), an aryl group which may have a substituent or a heteroaryl group which may have a substituent.

Further, the substituent which may be possessed by the alkyl group, the alkoxy group, the aryl group, the aryloxy group and the heterocyclic group as a substituent for $Ar_{DG}$, is selected from a halogen atom, an amino group, a nitro group, a cyano group, a hydroxyl group, a sulfonate group, a carboxylate group and a phosphonate group.

The substituent for $Ar_{DG}$ is preferably a water-soluble group, more preferably a hydroxyl group, polyethylene oxy group, a carboxyl group, a sulfo group (preferably sulfonic acid) or a phosphate salt (preferably phosphoric acid), and still more preferably a carboxyl group or a sulfo group.

It is preferred that $Ar_{DG}$ has at least one water-soluble group. It is more preferred that $Ar_{DG}$ has one to three water-soluble groups, and it is particularly preferred that $Ar_{DG}$ has two water-soluble groups.

When a acid group or basic group is present in Formula (DG-1), it is preferred that the group is in a state of salt. Accordingly, the formula represented herein include a compound which is in a state of salt.

A preferred salt is an alkali metal salt (particularly, lithium, sodium or potassium), ammonium or a substituted ammonium salt (including quarternary amine such as $(CH_3)_4N^+$), or a mixture thereof. A particularly preferred salt is sodium, lithium, ammonia or volatile amine. It is more preferred that the compound represented by Formula (DG-1) contains a lithium salt. The compound represented by Formula (DG-1) is preferably in a state of a lithium salt. The compound represented by Formula (DG-1) may be converted into a salt by any known method.

Preferred examples of the compound represented by Formula (DG-1) will be shown below. These compounds are excellent in ozone fastness. Further, these compounds are preferably in a state of a lithium salt.

(Dg-1)

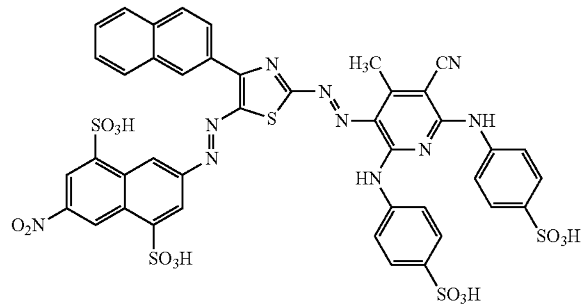

(Dg-2)

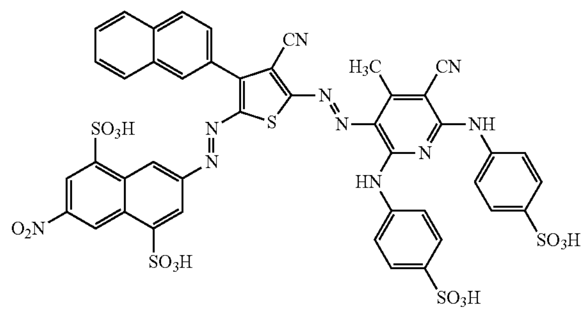

(Dg-3)

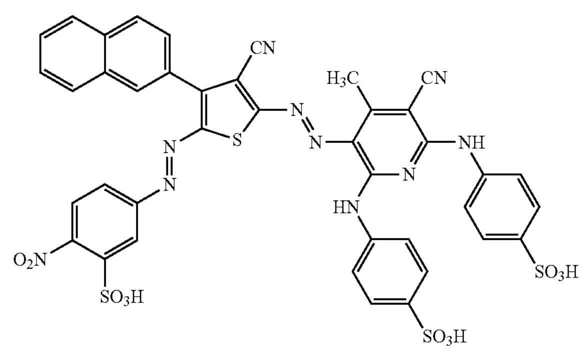

It is also preferred that the compound having two to four azo groups conjugated with each other per molecule used as the second water-soluble long-wavelength dye related to the present invention is a compound represented by any of the following Formulas (DB-1) to (DB-3).

Although the dye is shown as a free acid structure in the following formulas, it is understood that the dye may be used in a form of a salt in practical use.

Formula (DB-1)

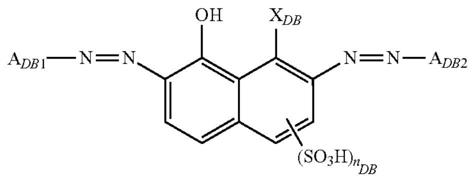

Formula (DB-2)

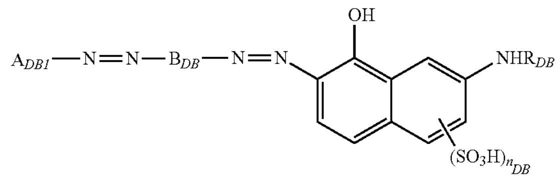

Formula (DB-3)

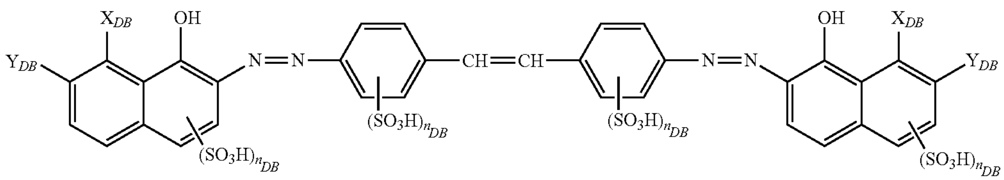

In Formula (DB-1) to (DB-3), in the case where a plurality of substituents represented by the same symbol is present in the same molecule, they may be the same or different. $X_{DB}$ represents an amino group, a hydroxyl group or a hydrogen atom. $Y_{DB}$ represents a hydrogen atom or an amino group. $R_{DB}$ represents a hydrogen atom, an alkyl group, an aralkyl group, an alkenyl group, an aryl group, a heterocyclic group, an acyl group or sulfonyl group, which may have a substituent. Representative examples of the substituent which may be possessed include a halogen atom, an ionic hydrophilic group (a sulfo group, a carboxyl group and the like), an alkoxy group, a hydroxyl group, an acylamino group, an acyl group, a carbamoyl group, a sulfamoyl group and the like. $Y_{DB}$ represents an integer of 0 to 3, and the sulfo group may be substituted at any position of a benzene ring or a naphthalene ring. $A_{DB1}$ and $A_{DB2}$ each represent a monovalent aromatic group or heterocyclic group. $B_{DB}$ represents a divalent aromatic group or heterocyclic group. $A_{DB1}$ and $A_{DB2}$ may be further substituted with an azo group. $A_{DB1}$, $A_{DB2}$ and $B_{DB}$ may further have a substituent. The number of heterocyclic rings contained in the chromophor of the dye is preferably 1 or less. Further, a part of the dye represented by any of these formulas may be dissociated to form a chelate dye coordinated with a transition metal.

Preferred examples of the compound represented by any of Formulas (DB-1) to (DB-3) may be exemplified by those described in Paragraphs [0029] to [0034] of Japanese Patent Application Laid-Open No. 2006-28260, and specific examples thereof may be exemplified by those described in Paragraphs [0035] to [0040] of the same patent document.

In the present invention, it is also preferred that the dye represented by Formula (A) is a dye represented by the following Formula (DF-1), or a salt thereof.

Formula (DF-1)

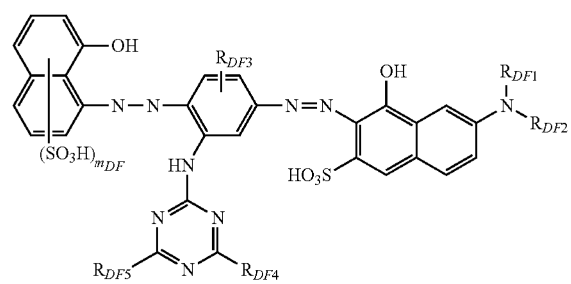

(In the formula, $R_{DF1}$ and $R_{DF2}$ each independently represent a hydrogen atom, an alkyl group, an alkanoyl group, a hydroxyalkyl group, a phenyl group, a benzoyl group or a benzyl group which may be substituted, $R_{DF3}$ represents a hydrogen atom, an alkyl group, an alkoxy group, an alkoxyalkoxy group, a carboxyl group or a sulfonate group, $R_{DF4}$ and $R_{DF5}$ each independently represent a substituted or unsubstituted amino group, a substituted or unsubstituted hydroxyl group or a chlorine atom, and $m_{DF}$ represents 1 or 2.)

In Formula (DF-1), it is preferred that $R_{DF1}$ is a hydrogen atom, $R_{DF2}$ is a hydrogen atom, a phenyl group, a benzoyl group or a benzyl group which may be substituted, $R_{DF3}$ is a hydrogen atom, a methoxy group, an ethoxy group, a methoxyethoxy group, a carboxyl group or a sulfonate group, $R_{DF4}$ and $R_{DF5}$ are each independently an amino group, a substituted or unsubstituted anilino group, a substituted or unsubstituted pyridinium group, a substituted or unsubstituted benzylamino group, an alkylamino group which may have one to two carboxyl groups, sulfonate groups, hydroxyl groups or alkoxy groups as a substituent, a dialkylamino group which may have one to two alkoxy groups having 1 to 4 carbon atoms, a morpholino group, an allylamino group, a diallylamino group, a substituted or unsubstituted quaternary ammonium group, or cyclohexylamino group, a hydroxyl group, an alkoxy group having 1 to 4 carbon atoms, a substituted or unsubstituted phenoxy group, a benzyloxy group, a cyclohexyloxy group or a chlorine atom, and $m_{DF}$ is 2.

Further, when the dye represented by Formula (DF-1) is a salt, it is preferred that the salt is a lithium salt, a sodium salt, a potassium salt, or an ammonium salt represented by the following Formula (DF-2).

Formula (DF-2)

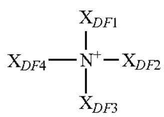

(In the formula, $X_{DF1}$ to $X_{DF4}$ each independently represent a hydrogen atom, an alkyl group, a hydroxyalkyl group or a hydroxyethoxyalkyl group.)

In Formula (DF-1), examples of the alkyl group include methyl, ethyl, n-propyl, propyl, n-butyl, i-butyl, secondary butyl, tertiary butyl and the like, and preferably methyl and ethyl. Examples of the alkoxy group include methoxy, ethoxy, n-propoxy, i-propoxy, n-butoxy, i-butoxy, secondary butoxy, tertiary butoxy and the like, and preferably methoxy and ethoxy. Methoxy is particularly preferred. Examples of the alkoxyalkoxy group include methoxymethoxy, methoxyethoxy, methoxypropoxy, methoxybutoxy, ethoxymethoxy, ethoxyethoxy, ethoxypropoxy, ethoxybutoxy, n-propoxypropoxy, i-propoxybutoxy, n-propoxybutoxy and the like, and preferably methoxyethoxy or ethoxyethoxy. Examples of the alkanoyl group include acetyl, n-propionyl, i-propionyl, hydroxyacetyl, 2- or 3-hydroxy-n-propionyl or butyroyl and the like, and preferably acetyl or n-propionyl. Examples of the alkoxyalkanoyl group include methoxypropionyl and ethoxypropionyl. Examples of the phenyl group, the benzoyl group or the benzyl group which may be substituted include an alkyl group having 1 to 4 carbon atoms, an alkoxy group having 1 to 4 carbon atoms, an amino group, an acylamino group, a hydroxyl group, halogen, a sulfonate group or a carboxyl group and the like, and the sulfonate group or the carboxyl group may be in a form of salt. Preferred is a phenyl, benzoyl or benzyl group which is unsubstituted or substituted with a sulfonate group or a carboxyl group. Halogen is fluorine, chlorine, bromine or iodine, and preferably chlorine and bromine.

In the above description, examples of the substituted or unsubstituted amino group include an amino group, a substituted or unsubstituted anilino group, a substituted or unsubstituted pyridinium group, a substituted or unsubstituted benzylamino group, an alkylamino group which may have one to two carboxyl groups, sulfonate groups, hydroxyl groups or alkoxy groups as a substituent, a dialkylamino group which may have one to two alkoxy groups having 1 to 4 carbon atoms, a morpholino group, an allylamino group, a diallylamino group, a substituted or unsubstituted quaternary ammonium group, a cyclohexylamino group and the like, and examples of the substituted or unsubstituted hydroxyl group include a hydroxyl group, an alkoxy group having 1 to 4 carbon atoms, a substituted or unsubstituted phenoxy group, a benzyloxy group, a cyclohexyloxy group and the like.

Examples of the substituted or unsubstituted anilino group include an anilino group, a 4-butylanilino group, a 4-octylanilino group, a 3-sulfoanilino group, a 4-sulfoanilino group, a 3,5-disulfoanilino group, a 2-carboxyanilino group, a 3,5-dicarboxyanilino group, a 4-hydroxy-3-carboxyanilino group and the like. Examples of the substituted or unsubstituted pyridinium group include a 3-carboxypyridinium group, a 4-methylpyridinium group, a 3-carbamoylpyridinium group, a 4-sulfopyridinium group and the like. Examples of the substituted or unsubstituted benzylamino group include a benzylamino group, a 4-methylbenzylamino group, a 4-chlorobenzylamino group and the like. Examples of the alkylamino group or the dialkylamino group which may have one to two carboxyl groups, sulfonate groups, hydroxyl groups or alkoxy groups as a substituent include a dimethylamino group, an ethylamino group, a n-butylamino group, an octylamino group, a 2-sulfoethylamino group, a carboxymethylamino group, a di(carboxymethyl)amino group, a 1,2-dicarboxypropylamino group, a 2-hydroxyethylamino group, a di(2-hydroxyethyl)amino group, a 2-hydroxypropylamino group and the like. Examples of the substituted or unsubstituted quaternary ammonium group include a trimethylamino group, a triethylamino group, a 1,4-diazabicyclo-(2,2,2)-octane group and the like.

Examples of the alkoxy group having 1 to 4 carbon atoms include a methoxy group, an ethoxy group, an isopropoxy group, a n-butoxy group and the like. Examples of the substituted or unsubstituted phenoxy group include a phenoxy group, a 4-carboxyphenoxy group, a 3-methylphenoxy group, a 4-sulfophenoxy group and the like.

The salt of the compound of Formula (DF-1) of the present invention is an inorganic or organic cation. Conventional inorganic salts are particularly alkali metal salts and alkaline earth metal salts. Preferred inorganic salts are salts of lithium and sodium, and similarly, organic salts may include an ammonium salt represented by Formula (DF-2).

Examples of the alkyl group having 1 to 4 carbon atoms are the same as above, examples of the hydroxyalkyl group having 1 to 4 carbon atoms include a hydroxymethyl group, a hydroxyethyl group, a 3-hydroxypropyl group, a 2-hydroxypropyl group, a 4-hydroxybutyl group, a 3-hydroxybutyl group, a 2-hydroxybutyl group and the like, and examples of the hydroxyethoxy-alkyl group (having 1 to 4 carbon atoms) include a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, a 2-hydroxyethoxybutyl group and the like.

Specific examples of the ammonium salt of Formula (DF-2) are shown in the table below.

TABLE 1

| Comopund No. | $X_{DF1}$ | $X_{DF2}$ | $X_{DF3}$ | $X_{DF4}$ |
|---|---|---|---|---|
| 2-1 | H | $—C_2H_4OH$ | $—C_2H_4OH$ | $—C_2H_4OH$ |
| 2-2 | $CH_3$ | $—C_2H_4OH$ | $—C_2H_4OH$ | $—C_2H_4OH$ |
| 2-3 | H | $—CH_2CH(OH)CH_3$ | $—CH_2CH(OH)CH_3$ | $—CH_2CH(OH)CH_3$ |
| 2-4 | $CH_3$ | $—CH_2CH(OH)CH_3$ | $—CH_2CH(OH)CH_3$ | $—CH_2CH(OH)CH_3$ |
| 2-5 | H | $—C_2H_4OH$ | H | $—C_2H_4OH$ |
| 2-6 | $CH_3$ | $—C_2H_4OH$ | H | $—C_2H_4OH$ |
| 2-7 | H | $—CH_2CH(OH)CH_3$ | H | $—CH_2CH(OH)CH_3$ |

TABLE 1-continued
| Comopund No. | $X_{DF1}$ | $X_{DF2}$ | $X_{DF3}$ | $X_{DF4}$ |
|---|---|---|---|---|
| 2-8 | $CH_3$ | —$CH_2CH(OH)CH_3$ | H | —$CH_2CH(OH)CH_3$ |
| 2-9 | $CH_3$ | —$C_2H_4OH$ | $CH_3$ | —$C_2H_4OH$ |
| 2-10 | $CH_3$ | —$CH_2CH(OH)CH_3$ | $CH_3$ | —$CH_2CH(OH)CH_3$ |
Specific examples of the dye represented by Formula (DF-1) are shown below, but the present invention is not limited to the following examples.
(Df-1)
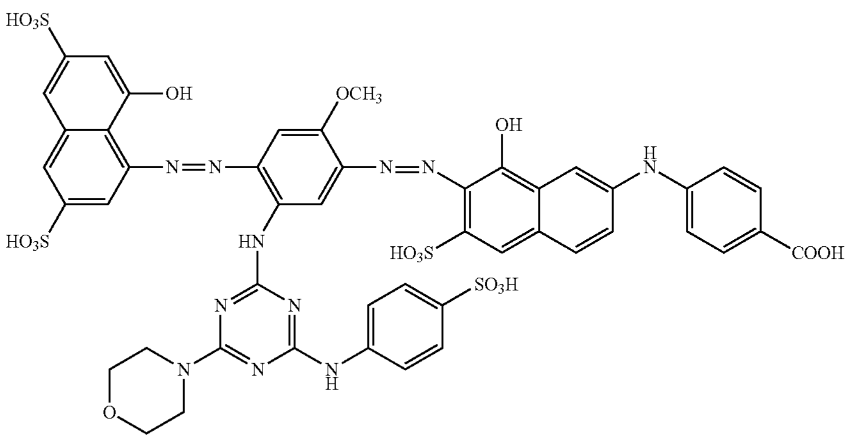
(Df-2)
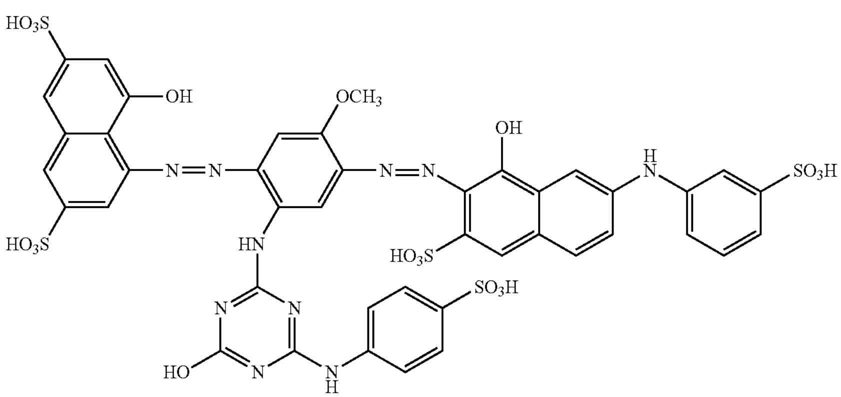
(Df-3)
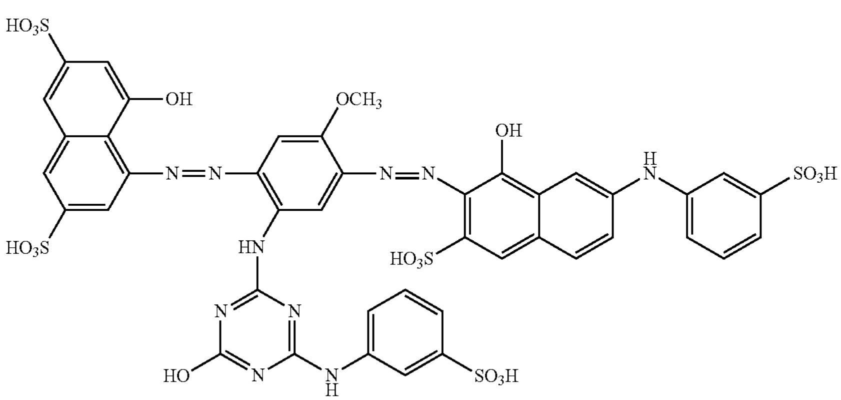

-continued (Df-4)

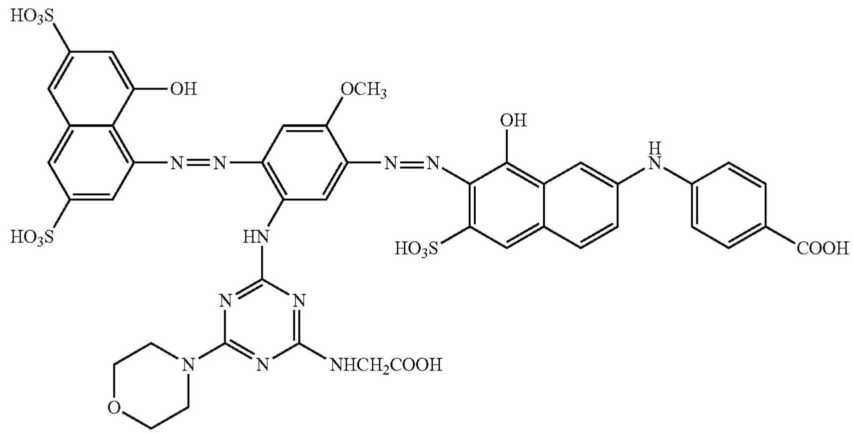

[Compound Having Three Azo Groups Conjugated with Each Other Per Molecule (Trisazo Compound)]

A compound having three azo groups conjugated with each other per molecule may be used as the second water-soluble long-wavelength dye related to the present invention.

The compound having three azo groups conjugated with each other per molecule is preferably a compound having a naphthalene ring substituted at least one hydroxyl group, and three or more azo groups.

By using the compound having a naphthalene ring substituted at least one hydroxyl group, and three or more azo groups, it is possible to obtain an image which is excellent in image fastness and has less spreading when stored under high humidity.

As the compound has more azo groups, the molecular weight is high and there is a tendency to suppress spreading of images when stored under high humidity. However, the solubility in ink tends to deteriorate and the storage stability of ink may become problematic. In order to combining them, the number of azo groups is preferably 3 to 5.

The compound having a naphthalene ring substituted at least one hydroxyl group, and three or more azo groups preferably has a hydrophilic group.

The hydrophilic group includes a sulfo group, a carboxyl group, a phosphono group, an amino group, a nitro group and a quaternary ammonium group. The hydrophilic group is preferably a carboxyl group, a phosphono group, an amino group, a nitro group or a sulfo group, and among them, preferably a carboxyl group or a sulfo group, and most preferably a sulfo group from the viewpoint of enhancing the solubility in an aqueous solvent.

The hydrophilic group may be in a state of salt, and examples of an ion forming a salt (ion pair) by having an opposite charge to the hydrophilic group (hereinafter, referred to as a counter salt or a counterion) include ammonium, alkali metal (e.g., lithium, sodium or potassium) and an organic cation (e.g., tetramethylammonium, tetramethylguanidium or tetramethylphosphonium). The counterion is preferably each ion of ammonium, lithium, sodium and potassium, and among them, more preferably a sodium ion or a lithium salt, and most preferably a lithium salt.

The compound having a naphthalene ring substituted at least one hydroxyl group, and three or more azo groups is preferably a compound selected from the compounds represented by Formulas (TA-1) and (TA-3).

(TA-1)

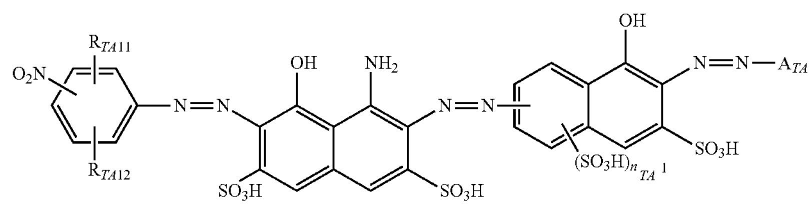

In Formula (TA-1), $R_{TA11}$ and $R_{TA12}$ each independently represent a hydrogen atom, a halogen atom, a cyano group, a carboxyl group, a sulfo group, a sulfamoyl group which may be substituted with an alkyl group having 1 to 4 carbon atoms or a phenyl group, a phosphate group, a nitro group, an acyl group, a ureido group, an alkyl group having 1 to 4 carbon atoms which may be substituted with a hydroxyl group or an alkoxy group having 1 to 4 carbon atoms, a hydroxyl group, an alkoxy group which may be substituted with an alkoxy group having 1 to 4 carbon atoms, a sulfo group or a carboxyl group, or an acylamino group, $A_{TA}$ represents a phenyl group or a naphthyl group, and may be substituted with a halogen atom, a cyano group, a carboxyl group, a sulfo group, a sulfamoyl group which may be substituted with an alkyl group having 1 to 4 carbon atoms or a phenyl group, a phosphate group, a nitro group, an acyl group, a ureido group, an alkyl group having 1 to 4 carbon atoms which may be substituted with a hydroxyl group or an alkoxy group having 1 to 4 carbon atoms, an alkoxy group which may be substituted with a hydroxyl group, an alkoxy group having 1 to 4 carbon atoms, a sulfo group or a carboxyl group. $E_{TA}1$ is 0 or 1.

Among the compounds represented by Formula (TA-1), the compound represented by the following Formula (TA-4) is preferred.

(TA-4)

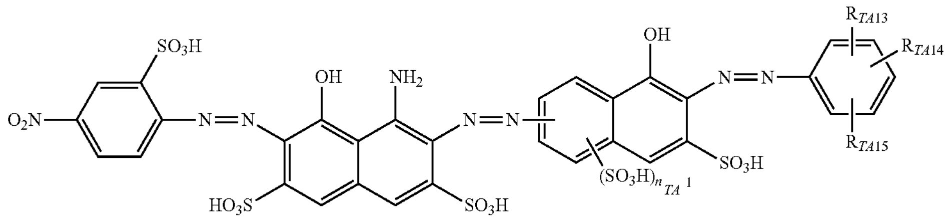

In Formula (TA-4), $R_{TA13}$, $R_{TA14}$ and $R_{TA15}$ each independently represent a hydrogen atom, a halogen atom, a cyano group, a carboxyl group, a sulfo group, a sulfamoyl group which may be substituted with an alkyl group having 1 to 4 carbon atoms or a phenyl group, a phosphate group, a nitro group, an acyl group, a ureido group, an alkyl group having 1 to 4 carbon atoms which may be substituted with a hydroxyl group or an alkoxy group having 1 to 4 carbon atoms, an alkoxy group having 1 to 4 carbon atoms which may be substituted with a hydroxyl group, an alkoxy group having 1 to 4 carbon atoms, a sulfo group or a carboxyl group, or an acylamino group, and at least one of $R_{TA13}$, $R_{TA14}$ and $R_{TA15}$ is a sulfo group or a carboxyl group. $n_{TA}1$ is 0 or 1.

Specific examples of preferred compounds of the compound represented by Formula (TA-4) and a salt thereof are shown below, but are not limited thereto. Further, although the following specific examples are shown as a free acid structure, it is understood that any salt may be used.

(Ta-1)

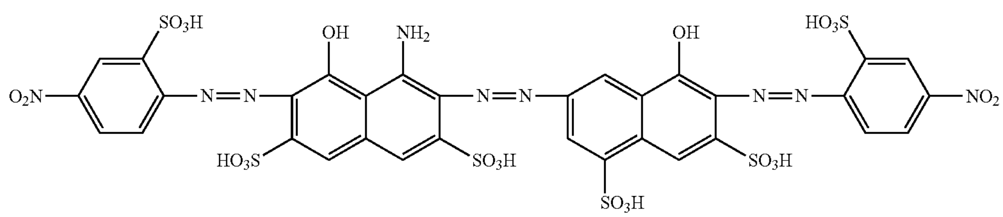

(Ta-2)

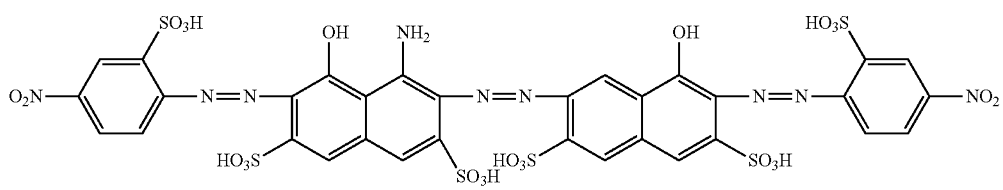

(Ta-3)

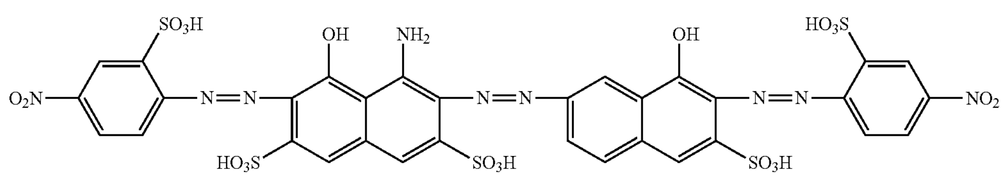

(Ta-4)

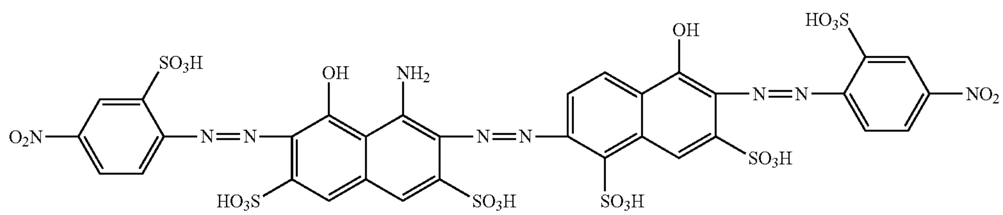

(Ta-5)

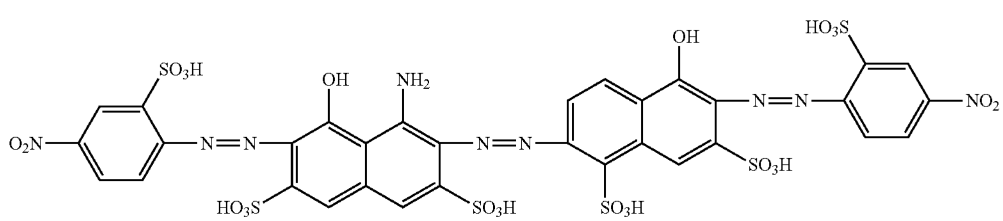

-continued (Ta-6)

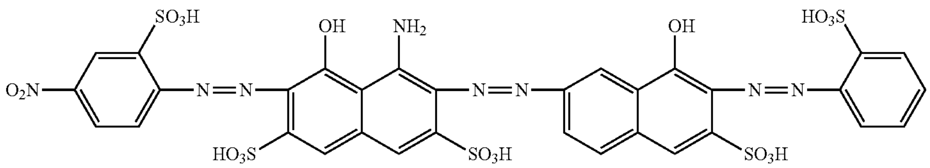

(Ta-7)

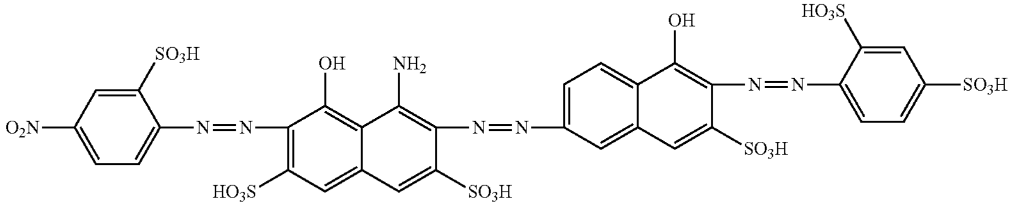

(Ta-8)

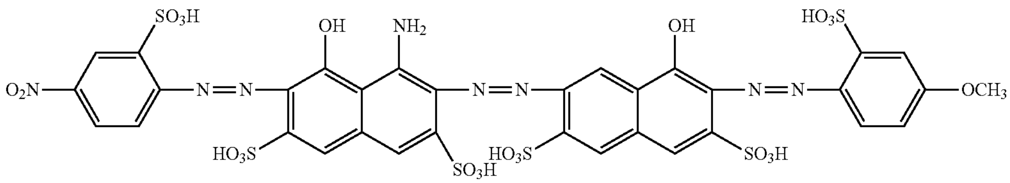

(Ta-9)

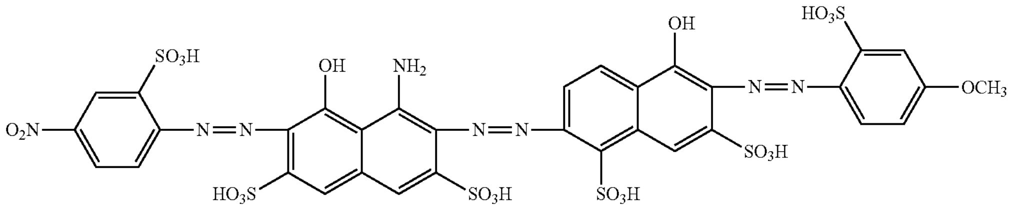

Detailed description of the compound represented by Formula (TA-1) and a salt thereof is found in Japanese Patent Application Laid-Open No. 2005-220211, and the compounds described in the publication may be preferably used.

(TA-3)

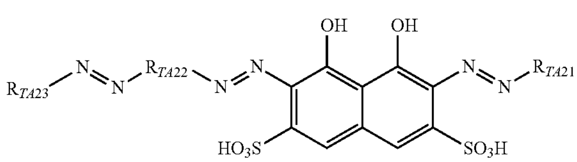

In Formula (TA-3), $R_{TA21}$ represents a phenyl group having a substituent or a naphthyl group having a substituent, $R_{TA22}$ represents a phenylene group having a substituent or a naphthylene group having a substituent, and $R_{TA23}$ represents a 5- to 7-membered heterocyclic group having at least one double bond and a substituent. Further, the substituents in $R_{TA21}$ to $R_{TA23}$ are independently selected from the group consisting of OH, $SO_3H$, $PO_3H_2$, $CO_2H$, $NO_2$, $NH_2$, an alkyl group having 1 to 4 carbon atoms, an alkyl group having a substituent, an alkoxy group having 1 to 4 carbon atoms, an alkoxy group having a substituent, an amino group, an amino group having a substituent, and a phenyl group having a substituent.

In the present invention, among the compounds represented by Formula (TA-3), the compound represented by the following Formula (TA-6) is preferred.

(TA-6)

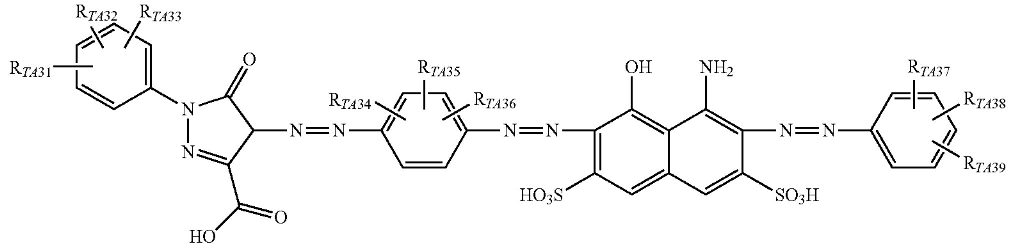

In Formula (TA-6), $R_{TA31}$ to $R_{TA39}$ independently represent a group selected from the group consisting of H, OH, $SO_3H$, $PO_3H_2$, $CO_2H$, $NO_2$ and $NH_2$.

Specific examples of the compounds represented by Formulas (TA-3) and (TA-6), and a salt thereof are shown below, but are not limited thereto. Further, although the following specific examples are shown as a free acid structure, it is understood that any salt may be used.

(Ta-10)

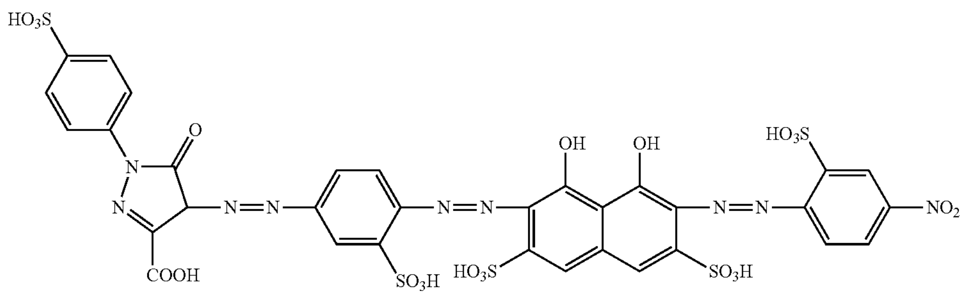

(Ta-11)

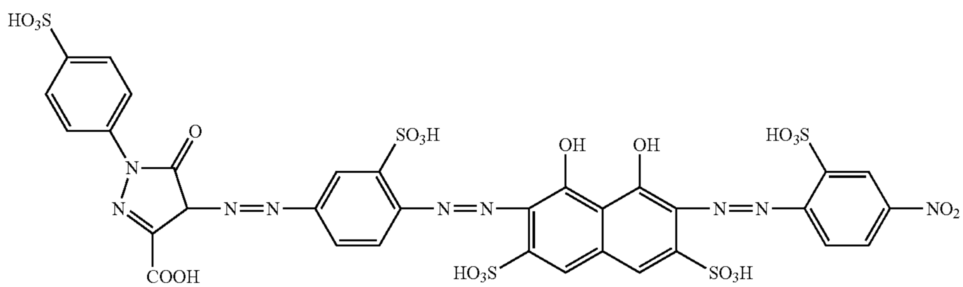

(Ta-12)

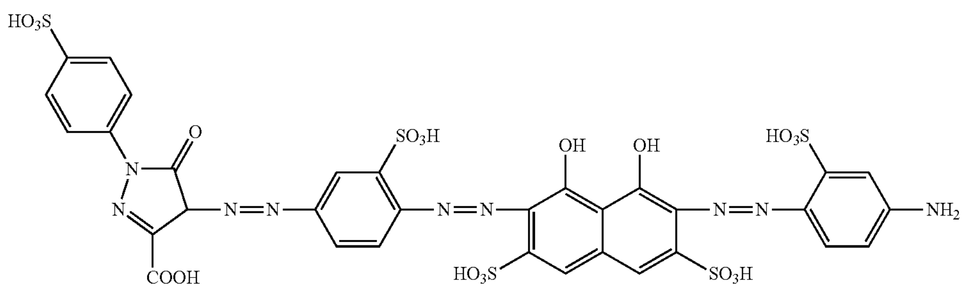

(Ta-13)

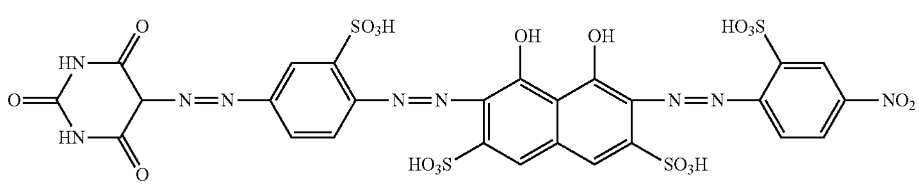

(Ta-14)

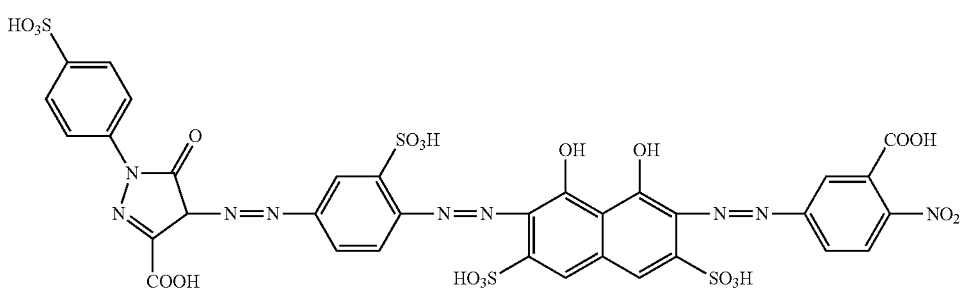

-continued (Ta-15)

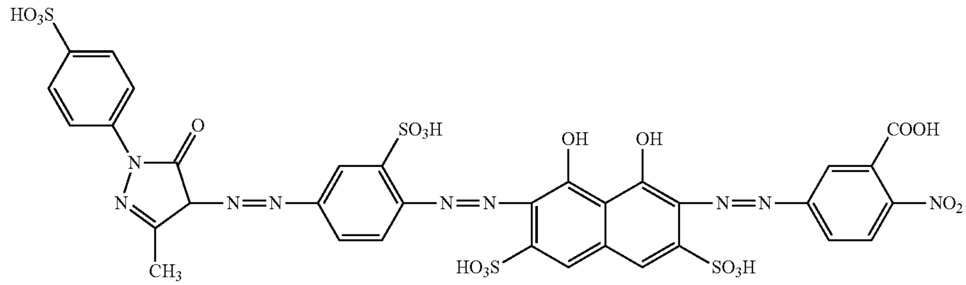

(Ta-16)

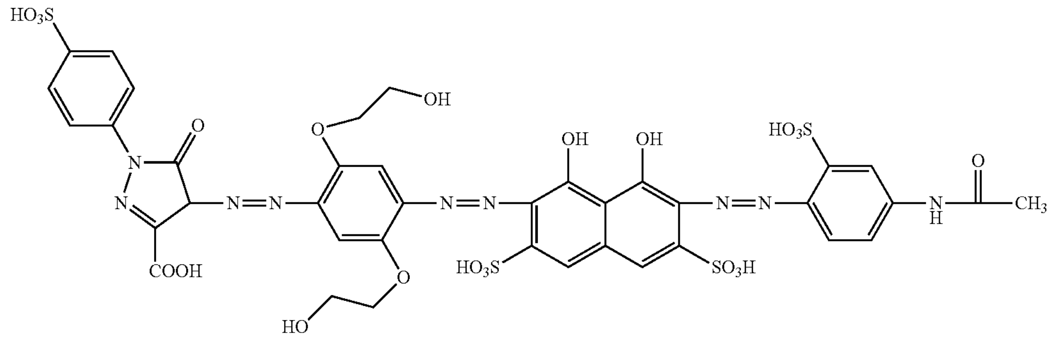

Detailed description of the compounds represented by Formula (TA-3) and (TA-6), and a salt thereof is found in International Publication No. 03/106572 and Japanese Patent Application Laid-Open No. 2005-2271, and the compounds described in the publications may be preferably used.

It is also preferred that the compound having three azo groups conjugated with each other per molecule is an azo compound represented by the following Formula (TB-1) or a salt thereof.

Formula (TB-1)

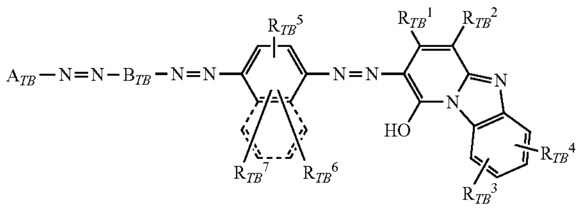

[In Formula (TB-1), $R_{TB}^1$ represents an unsubstituted alkyl group having 1 to 4 carbon atoms; a carboxy-substituted alkyl group having 2 to 5 carbon atoms; an unsubstituted phenyl group; a sulfo-substituted phenyl group; or a carboxyl group, $R_{TB}^2$ represents a cyano group; a carbamoyl group; or a carboxyl group, $R_{TB}^3$ and $R_{TB}^4$ each independently represent a hydrogen atom; a methyl group; a chlorine atom; or sulfo group, $R_{TB}^5$, $R_{TB}^6$ and $R_{TB}^7$ represent a benzene ring when the ring shown as broken lines is not present; or a naphthalene ring when the ring shown as broken lines is present, $R_{TB}^5$, $R_{TB}^6$ and $R_{TB}^7$ each independently represent a hydrogen atom; a carboxyl group; a sulfo group; a hydroxyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a hydroxyalkoxy group having 1 to 4 carbon atoms, a sulfo group or a carboxyl group; an acetylamino group, Group $A_{TB}$ is a substituted phenyl group or a substituted naphthyl group, the substituent of Group $A_{TB}$ is a group selected from the group consisting of a carboxyl group; a sulfo group; a hydroxyl group; an unsubstituted benzenesulfonyloxy group; a benzenesulfonyloxy group whose benzene ring is substituted with a methyl group, a nitro group or a chlorine atom; a chlorine atom; a cyano group; a nitro group; a sulfamoyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a sulfo group or a carboxyl group; an unsubstituted alkylsulfonyl group having 1 to 4 carbon atoms; an alkylsulfonyl group having 1 to 4 carbon atoms substituted with a hydroxyl group, a sulfo group or a carboxyl group; an unsubstituted alkylaminosulfonyl group having 1 to 8 carbon atoms; an alkylaminosulfonyl group having 1 to 8 carbon atoms substituted with a hydroxyl group, a sulfo group or a carboxyl group; an unsubstituted alkylcarbonylamino group having 1 to 8 carbon atoms; a carboxy-substituted alkylcarbonylamino group having 2 to 9 carbon atoms; an unsubstituted benzoylamino group; a benzoylamino group whose benzene ring is substituted with a sulfo group, a carboxyl group, a chlorine atom or an alkyl group having 1 to 4 carbon atoms; an unsubstituted benzenesulfonylamino group; a benzenesulfonylamino group whose benzene ring is substituted with a methyl group, a nitro group or a chlorine atom; a trifluoromethyl group; an acetyl group; and a benzoyl group, Group $B_{TB}$ is a substituted phenylene group, or a divalent substituted thiophene group or a divalent substituted thiazole group which is bound with an azo group at the 2- and 5-positions, and the substituent of Group $B_{TB}$ is a group selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms, or a sulfo-substituted alkoxy group having 1 to 4 carbon atoms.]

It is preferred that the azo compound represented by Formula (TB-1) or a salt thereof is an azo compound represented by the following Formula (TB-2) or a salt thereof.

Formula (TB-2)

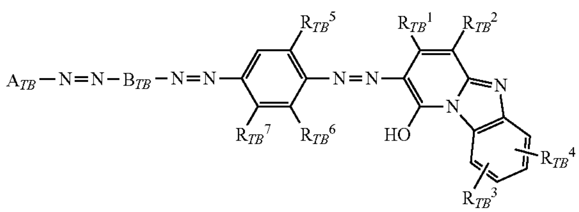

[In Formula (TB-2), $R_{TB}^1$ to $R_{TB}^7$, Group $A_{TB}$ and Group $B_{TB}$ have the same meaning as those in Formula (TB-1).]

In Formulas (TB-1) and (TB-2), Group $B_{TB}$ is preferably represented by the following Formula (TB-3) or (TB-4).

Formula (TB-3)

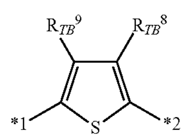

[In Formula (TB-3), $R_{TB}^8$ represents a cyano group or a carbamoyl group, $R_{TB}^9$ represents a group selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms or a sulfo-substituted alkoxy group having 1 to 4 carbon atoms, *1 represents a bonding hand to the azo group bound to Group $A_{TB}$, and *2 represents a bonding hand to the azo group bound to the ring on which $R_{TB}^5$ to $R_{TB}^7$ are substituted.]

Formula (TB-4)

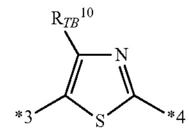

[In Formula (TB-4), $R_{TB}^{10}$ represents a group selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms or a sulfo-substituted alkoxy group having 1 to 4 carbon atoms, *3 represents a bonding hand to the azo group bound to Group $A_{TB}$, and *4 represents a bonding hand to the azo group bound to the ring on which $R_{TB}^5$ to $R_{TB}^7$ are substituted.]

In Formulas (TB-1) and (TB-2), Group A is preferably represented by the following Formula (TB-5) or (TB-6).

Formula (TB-5)

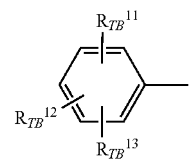

[In Formula (TB-5), $R_{TB}^{11}$ to $R_{TB}^{13}$ each independently represent a hydrogen atom; a carboxyl group; a sulfo group; a hydroxyl group; an unsubstituted benzenesulfonyloxy group; a benzenesulfonyloxy group whose benzene ring is substituted with a methyl group, a nitro group or a chlorine atom; a chlorine atom; a cyano group; a nitro group; a sulfamoyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an alkoxy group having 1 to 4 carbon atoms, a sulfo group or a carboxyl group; an unsubstituted alkylsulfonyl group having 1 to 4 carbon atoms; an alkylsulfonyl group having 1 to 4 carbon atoms substituted with a hydroxyl group, a sulfo group or a carboxyl group; an unsubstituted alkylaminosulfonyl group having 1 to 8 carbon atoms; an alkylaminosulfonyl group having 1 to 8 carbon atoms substituted with a hydroxyl group, a sulfo group or a carboxyl group; an unsubstituted alkylcarbonylamino group having 1 to 8 carbon atoms; a carboxy-substituted alkylcarbonylamino group having 2 to 9 carbon atoms; an unsubstituted benzoylamino group; a benzoylamino group whose benzene ring is substituted with a sulfo group or an unsubstituted alkyl group having 1 to 4 carbon atoms; an unsubstituted benzenesulfonylamino group; a benzenesulfonylamino group whose benzene ring is substituted with a methyl group, a nitro group or a chlorine atom; a trifluoromethyl group; an acetyl group; or a benzoyl group.]

Formula (TB-6)

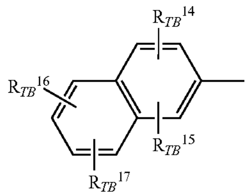

[In (TB-6), $R_{TB}^{14}$ to $R_{TB}^{17}$ each independently represent a hydrogen atom; a carboxyl group; a sulfo group; a hydroxyl group; an unsubstituted benzenesulfonyloxy group; a benzenesulfonyloxy group whose benzene ring is substituted with a methyl group, a nitro group or a chlorine atom; a chlorine atom; a cyano group; a nitro group; a sulfamoyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an alkoxy group having 1 to 4 carbon atoms, a sulfo group or a carboxyl group; an unsubstituted alkylsulfonyl group having 1 to 4 carbon atoms; an alkylsulfonyl group having 1 to 4 carbon atoms substituted with a hydroxyl group, a sulfo group or a carboxyl group; an unsubstituted alkylaminosulfonyl group having 1 to 8 carbon atoms; an alkylaminosulfonyl group having 1 to 8 carbon atoms substituted with a hydroxyl group, a sulfo group or a carboxyl group; an unsubstituted alkylcarbonylamino group having 1 to 8 carbon atoms; carboxy-substituted alkylcarbonylamino group having 2 to 9 carbon atoms; an unsubstituted benzoylamino group; a benzoylamino group whose benzene ring is substituted with a sulfo group or an unsubstituted alkyl group having 1 to 4 carbon atoms; an unsubstituted benzenesulfonylamino group; a benzenesulfonylamino group whose benzene ring is substituted with a methyl group, a nitro group or a chlorine atom; trifluoromethyl group; an acetyl group; or a benzoyl group.]

The azo compound represented by Formula (TB-1) has tautomers, and in addition to the compound represented by Formula (TB-1), compounds represented by the following Formulas (TB-7) and (TB-8) may be considered as the tautomers. These compounds are also included in the present invention. Further, in Formulas (TB-7) and (TB-8), $R_{TB}^1$ to $R_{TB}^7$, Group $A_{TB}$ and Group $B_{TB}$ have the same meaning as those in Formula (TB-1).

Formula (TB-7)

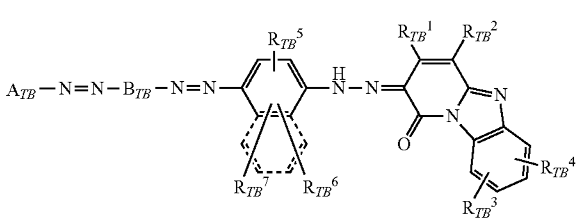

-continued

Formula (TB-8)

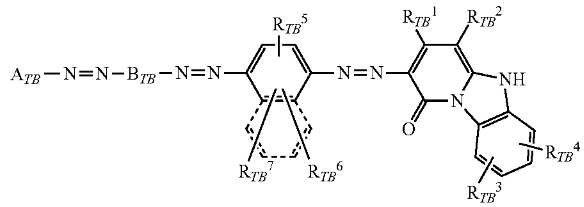

In Formulas (TB-1) and (TB-2), the unsubstituted alkyl group having 1 to 4 carbon atoms in $R_{TB}^1$ may include a straight or branced group, and is preferably a straight group. Specific examples thereof may include a straight group such as methyl, ethyl, n-propyl and n-butyl; and a branched group such as isopropyl, isobutyl, sec-butyl and tert-butyl; and the like.

The carboxy-substituted alkyl group having 2 to 5 carbon atoms in $R_{TB}^1$ may include a group in which carboxy is substituted on any carbon atom of the unsubstituted alkyl group having 1 to 4 carbon atoms. The substitution position of carboxy is not particularly limited, but it is preferred to be substituted at an end, and the substitution number of carboxy is 1 or 2, and preferably 1. Specific examples thereof may include carboxymethyl, 2-carboxyethyl and the like.

The sulfo-substituted phenyl group in $R_{TB}^1$ may include a phenyl group substituted with 1 to 3 sulfo groups, preferably 1 or 2 sulfo groups, and the substation position of sulfo is not particularly limited. Specific examples thereof may include 3-sulfophenyl, 4-sulfophenyl, 2,4-disulfophenyl, 3,5-disulfophenyl and the like.

Preferred $R_{TB}^1$ may include an unsubstituted alkyl group having 1 to 4 carbon atoms, a carboxy-substituted alkyl group having 2 to 5 carbon atoms, a sulfo-substituted phenyl group, and is more preferably an unsubstituted alkyl group having 1 to 4 carbon atoms. Specific examples thereof include preferably methyl, n-propyl, carboxymethyl and 4-sulfophenyl, more preferably methyl and n-propyl, and still more preferably methyl.

In Formula (TB-1), $R_{TB}^2$ represents a cyano group; a carbamoyl group; or a carboxyl group. Preferred is a cyano group or a carbamoyl group, and more preferred is a cyano group.

In Formula (TB-1), $R_{TB}^3$ and $R_{TB}^4$ each independently represent a hydrogen atom; a methyl group; a chlorine atom; or a sulfo group, and are preferably a hydrogen atom; a methyl group; or a sulfo group, and more preferably a hydrogen atom or a sulfo group. Preferred combination of $R_{TB}^3$ and $R_{TB}^4$ may be a combination in which $R_{TB}^3$ is a hydrogen atom and $R_{TB}^4$ is a sulfo group; or $R_{TB}^3$ is sulfo and $R_{TB}^4$ is a hydrogen atom.

In Formula (TB-1), the ring on which $R_{TB}^5$ to $R_{TB}^7$ are substituted represents a benzene ring when the ring shown as broken lines is not present; or a naphthalene ring when the ring shown as broken lines is present. The ring on which $R_{TB}^5$ to $R_{TB}^7$ are substituted is preferably a benzene ring.

In Formula (TB-1), the unsubstituted alkyl group having 1 to 4 carbon atoms in $R_{TB}^5$ to $R_{TB}^7$ may be the same as the unsubstituted alkyl group having 1 to 4 carbon atoms in $R_{TB}^1$ including preferred examples thereof The unsubstituted alkoxy group having 1 to 4 carbon atoms in $R_{TB}^5$ to $R_{TB}^7$ may include a straight or branced group, and is preferably a straight group. Specific examples thereof may include a straight group such as methoxy, ethoxy, n-propoxy and n-butoxy; and a branched group such as isopropoxy, sec-butoxy and tert-butoxy; and the like.

In $R_{TB}^5$ to $R_{TB}^7$, the hydroxyl group, the unsubstituted alkoxy group having 1 to 4 carbon atoms, the hydroxyalkoxy group having 1 to 4 carbon atoms, and the alkoxy group having 1 to 4 carbon atoms substituted with a sulfo group or a carboxyl group may include groups having the aforementioned substituents on any carbon atom of the unsubstituted alkyl group having 1 to 4 carbon atoms, and the number of the substituents is generally 1 or 2, preferably 1. The positions of the substituents are not particularly limited, but it is preferred to be substituted at an end of the alkoxy group.

Specific examples thereof may include a hydroxyl-substituted group such as 2-hydroxyethoxy, 2-hydroxypropoxy and 3-hydroxypropoxy; an alkoxy-substituted group such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy and n-propoxybutoxy; a hydroxyalkoxy-substituted group having 1 to 4 carbon atoms such as 2-hydroxyethoxyethoxy; a carboxy-substituted group such as carboxymethoxy, 2-carboxyethoxy and 3-carboxypropoxy; a sulfo-substituted group such as 2-sulfoethoxy, 3-sulfopropoxy and 4-sulfobutoxy; and the like.

In the case where the ring on which $R_{TB}^5$ to $R_{TB}^7$ are substituted is a benzene ring in which the ring shown as broken lines is not present, among the above, preferred $R_{TB}^5$ to $R_{TB}^7$ may be a hydrogen atom, an unsubstituted alkyl group having 1 to 4 carbon atoms, an unsubstituted alkoxy group having 1 to 4 carbon atoms, a hydroxyl-substituted alkoxy group having 1 to 4 carbon atoms, a sulfo-substituted alkoxy group having 1 to 4 carbon atoms, a carboxy-substituted alkoxy group having 2 to 5 carbon atoms or an acetylamino group, and more preferably a hydrogen atom, an unsubstituted alkyl group having 1 to 4 carbon atoms or a sulfo-substituted alkoxy group having 1 to 4 carbon atoms.

The combination of $R_{TB}^5$ to $R_{TB}^7$ is preferably a combination in which any one is a hydrogen atom and the remaining two are other than a hydrogen atom, more preferably a combination in which $R_{TB}^6$ is a hydrogen atom and $R_{TB}^5$ and $R_{TB}^7$ are other than a hydrogen atom, still more preferably a combination in which $R_{TB}^5$ is a sulfo-substituted alkoxy group having 1 to 4 carbon atoms or a carboxy-substituted alkoxy group having 2 to 5 carbon atoms, $R_{TB}^6$ is a hydrogen atom, and $R_{TB}^7$ is an unsubstituted alkyl group having 1 to 4 carbon atoms, an unsubstituted alkoxy group having 1 to 4 carbon atoms, a carboxy-substituted alkoxy group having 2 to 5 carbon atoms or an acetylamino group, and particularly preferably a combination in which $R_{TB}^5$ is a sulfo-substituted alkoxy group having 1 to 4 carbon atoms, $R_{TB}^6$ is a hydrogen atom, and $R_{TB}^7$ is an unsubstituted alkyl group having 1 to 4 carbon atoms.

Specific examples of particularly preferred combinations may include a combination in which $R_{TB}^5$ is a sulfo-substituted alkoxy group having 2 to 4 carbon atoms (most preferably 3-sulfopropoxy), $R_{TB}^6$ is a hydrogen atom, and $R_{TB}^7$ is methyl.

In the case where the ring on which $R_{TB}^5$ to $R_{TB}^7$ are substituted is a naphthalene ring in which the ring shown as broken lines is present, among the above, preferred $R_{TB}^5$ to $R_{TB}^7$ may include a hydrogen atom and sulfo.

The combination of $R_{TB}^5$ to $R_{TB}^7$ is preferably a combination in which any two are a hydrogen atom and the remaining one is sulfo, and more preferably a combination in which $R_{TB}^5$ is a hydrogen atom, any one of $R_{TB}^6$ and $R_{TB}^7$ is a hydrogen atom, and the other is sulfo.

In Formula (TB-1), Group $A_{TB}$ represents a substituted phenyl group or a substituted naphthyl group.

Among the substituents in Group $A_{TB}$, the benzenesulfonyloxy group whose benzene ring is substituted with a methyl group, a nitro group or a chlorine atom may be, for example, a methyl-substituted group such as 4-toluenesulfonyloxy; a nitro-substituted group such as 4-nitrobenzenesulfonyloxy; a chlorine atom-substituted group such as 4-chlorobenzenesulfonyloxy; and the like.

Among the substituents in Group $A_{TB}$, the unsubstituted alkyl group having 1 to 4 carbon atoms may be the same as the unsubstituted alkyl group having 1 to 4 carbon atoms in $R_{TB}^1$ including preferred examples thereof.

Among the substituents in Group $A_{TB}$, the unsubstituted alkoxy group having 1 to 4 carbon atoms may be the same as the unsubstituted alkoxy group having 1 to 4 carbon atoms in $R_{TB}^5$ to $R_{TB}^7$ including preferred examples thereof.

Among the substituents in Group $A_{TB}$, the alkoxy group having 1 to 4 carbon atoms substituted with a hydroxyl group, an unsubstituted alkoxy group having 1 to 4 carbon atoms, a hydroxyalkoxy group having 1 to 4 carbon atoms, a sulfo group or a carboxyl group may be the same as the corresponding substituted alkoxy group having 1 to 4 carbon atoms in $R_{TB}^5$ to $R_{TB}^7$ including preferred examples thereof Among the substituents in Group $A_{TB}$, the unsubstituted alkylsulfonyl group having 1 to 4 carbon atoms may be a straight or branched group, and preferably a straight group. Specific examples thereof may include a straight group such as methylsulfonyl, ethylsulfonyl, propylsulfonyl and butylsulfonyl; and a branched group such as isopropylsulfonyl and isobutylsulfonyl; and the like.

Among the substituents in Group $A_{TB}$, the alkylsulfonyl group having 1 to 4 carbon atoms substituted with a hydroxyl group, a sulfo group or a carboxyl group may be a group having the aforementioned substituents on any carbon atom in the unsubstituted alkylsulfonyl group having 1 to 4 carbon atoms, and the number of the substituents is generally 1 or 2, preferably 1. The positions of the substituents are not particularly limited, but it is preferred to be substituted at an end of the alkyl group.

Specific examples thereof may include a hydroxyl-substituted group such as hydroxyethylsulfonyl and 2-hydroxypropylsulfonyl; a sulfo-substituted group such as 2-sulfoethylsulfonyl and 3-sulfopropylsulfonyl; a carboxy-substituted group such as 2-carboxyethylsulfonyl and 3-carboxypropylsulfonyl; and the like.

Among the substituents in Group $A_{TB}$, the unsubstituted alkylaminosulfonyl group having 1 to 8 carbon atoms may be a straight or branched group, and preferably a straight group. Specific examples thereof may include a straight group such as methylaminosulfonyl, ethylaminosulfonyl, propylaminosulfonyl, butylaminosulfonyl, pentylaminosulfonyl, hexylaminosulfonyl and octylaminosulfonyl; a branched group such as isopropylaminosulfonyl and isobutylaminosulfonyl; and the like.

Among the substituents in Group $A_{TB}$, the alkylaminosulfonyl group having 1 to 8 carbon atoms substituted with a hydroxyl group, a sulfo group or a carboxyl group may be a group having the aforementioned substituents on any carbon atom in the unsubstituted alkylaminosulfonyl group having 1 to 8 carbon atoms, and the number of the substituents is generally 1 or 2, preferably 1. The positions of the substituents are not particularly limited, but it is preferred to be substituted at an end of the alkyl group. More preferred is a group having 1 to 6 carbon atoms substituted with the aforementioned group, and still more preferred is a group having 2 to 4 carbon atoms.

Specific examples thereof may include a hydroxyl-substituted group having 2 to 4 carbon atoms such as hydroxyethylaminosulfonyl and 2-hydroxypropylaminosulfonyl; a sulfo-substituted group having 2 to 4 carbon atoms such as 2-sulfoethylaminosulfonyl and 3-sulfopropylaminosulfonyl; a carboxy-substituted group having 3 to 5 carbon atoms such as 2-carboxyethylaminosulfonyl and 3-carboxypropylaminosulfonyl; and the like.

Among the substituents in Group $A_{TB}$, the unsubstituted alkylcarbonylamino group having 1 to 8 carbon atoms may be a straight or branched group, and preferably a straight group.

Specific examples thereof may include an unsubstituted straight group such as acetylamino, propionylamino, butyrylamino, valerylamino, hexanoylamino, heptanoylamino, octanoylamino and nonaylamino; an unsubstituted branched group such as isobutyrylamino, pivaloylamino, isovalerylamino and 2-ethylhexanoylamino; and the like.

Among the substituents in Group $A_{TB}$, the alkylcarbonylamino group having 1 to 8 carbon atoms substituted with a carboxyl group may be a group having carboxyl groups on any carbon atom in the unsubstituted alkylcarbonylamino group having 1 to 8 carbon atoms, the number of the substituents is generally 1 or 2, preferably 1. The positions of the substituents are not particularly limited, but it is preferred to be substituted at an end of the alkyl group. More preferred is a group having 1 to 6 carbon atoms substituted with the aforementioned group, and still more preferred is a group having 2 to 4 carbon atoms. Specific examples thereof may include 3-carboxypropionylamino, 4-carboxybutyrylamino and the like.

Among the substituents in Group $A_{TB}$, the benzoylamino group whose benzene ring is substituted with a sulfo group, a carboxyl group, a chlorine atom or an alkyl group having 1 to 4 carbon atoms may be a group having the aforementioned substituents on any carbon atom of the benzene ring in the unsubstituted benzoylamino group, and the number of the substituents is generally 1 or 3, preferably 1 or 2. The positions of the substituents are not particularly limited.

Specific examples thereof may include a sulfo-substituted group such as 2-sulfobenzoylamino; a carboxy-substituted group such as 2-carboxybenzoylamino and 2,5-dicarboxybenzoylamino; a chlorine atom-substituted group such as 2-chlorobenzoylamino, 3-chlorobenzoylamino and 4-chlorobenzoylamino; an alkyl-substituted group such as 3-methylbenzoylamino, 4-methylbenzoylamino, 4-ethylbenzoylamino and 4-propylbenzoylamino; and the like.

Among the substituents in Group $A_{TB}$, the benzenesulfonylamino group whose benzene ring is substituted with a methyl group, a nitro group or a chlorine atom may be a group having the aforementioned substituents on any carbon atom of the benzene ring in the unsubstituted benzenesulfonylamino group, and the number of the substituents is generally 1 or 2, preferably 1. The positions of the substituents are not particularly limited, it is preferred to be substituted at the 4-position.

Specific examples thereof may include a methyl-substituted group such as 4-toluenesulfonylamino; a nitro-substituted group such as 4-nitrobenzenesulfonylamino; a chlorine atom-substituted group such as 4-chlorobenzenesulfonylamino; and the like.

In the case where Group $A_{TB}$ is a substituted phenyl group, the number of the substituents is generally 1 to 4, preferably 1 to 3, more preferably 1 or 2, and still more preferably 2. the positions of the substituents are not particularly limited, but, when the bonding position of the azo group is regarded as the 1-position, it is preferred to be substituted at the 4-position when the number of the substituents is 1; similarly, at the-2 and 4-positions, the 3- and 4-positions, or the 3- and 5-positions when the number of the substituents is 2; similarly, at the 2-, 4- and 5-positions when the number of the substituents is 3. In the case of having a plurality of substituents, the kind of the substituents may be the same or different.

The substituent in the case where Group $A_{TB}$ is a substituted phenyl group may be, among the substituents in Group $A_{TB}$, a carboxyl group, a sulfo group, a chlorine atom, a sulfamoyl group, a nitro group, an unsubstituted alkoxy group having 1 to 4 carbon atoms, an alkylsulfonyl group having 1 to 4 carbon atoms substituted with a carboxyl group, an unsubstituted alkylcarbonylamino group having 1 to 8 carbon atoms, or an unsubstituted benzoylamino group.

Preferred examples thereof may include sulfo, carboxy, sulfamoyl, a chlorine atom, acetylamino, nitro, benzoylamino, methoxy or carboxyethylsulfonyl, and more preferably sulfo or nitro.

In the case where Group $A_{TB}$ is a substituted naphthyl group, the bonding position of the azo group is the 1-position or the 2-position, and preferably the 2-position. Further, the number of the substituents is generally 1 to 4, and preferably 2 or 3. The positions of the substituents are not particularly limited, but the preferred positions of the substituents are as follows.

When the bonding position of the azo group is the 1-position, and the number of the substituents is 1, the position of the substituent is preferably the 4-position.

When the bonding position of the azo group is the 2-position, and the number of the substituents is 2, the positions of the substituents are preferably the 4- and 6-positions, or the 4- and 8-positions, and similarly, when the number of the substituents is 3, the positions of the substituents are the 4-, 6- and 8-positions; the 4-, 6- and 9-positions; or the 1-, 5- and 7-positions.

In the case where Group $A_{TB}$ is a substituted naphthyl group, preferred substituents may be, among the substituents in Group $A_{TB}$, a sulfo group, an unsubstituted alkoxy group having 1 to 4 carbon atoms, and an alkoxy group having 1 to 4 carbon atoms substituted with a sulfo group or a carboxyl group.

Preferred examples thereof include sulfo, methoxy, sulfoethoxy, sulfopropoxy, carboxymethoxy, and more preferably sulfo.

In Formula (TB-1), Group $B_{TB}$ represents a substituted phenylene group, or a divalent substituted thiophene group or a divalent substituted thiazole group, both of which is bound to the azo group at the 2- and 5-positions, and is preferably a divalent substituted thiophene group or a divalent substituted thiazole group which is bound to the azo group at the 2- and 5-positions, and more preferably a divalent substituted thiazole group which is bound to the azo group at the 2- and 5-positions. In the case where Group $B_{TB}$ is a divalent substituted thiophene group which is bound to the azo group at the 2- and 5-positions (hereinafter, simply referred to as a “divalent substituted thiophene group”), the number of the substituents is generally 1 or 2, preferably 2. In the case where the thiophene group has two substituents, the kind of the substituents may be the same or different.

In the case where Group $B_{TB}$ is a divalent substituted thiazole group which is bound to the azo group at the 2- and 5-positions (hereinafter, simply referred to as a “divalent substituted thiazole group”), the number of the substituents possessed by the thiazole group is 1.

In the case where Group $B_{TB}$ is a substituted phenylene group, the number of the substituents is generally 1 or 2, preferably 1. In the case where the phenylene group has two substituents, the kind of the substituents may be the same or different.

Among the substituents in Group $B_{TB}$, the unsubstituted alkyl group having 1 to 4 carbon atoms may be the same as the unsubstituted alkyl group having 1 to 4 carbon atoms in $R_{TB}^1$ including the preferred examples thereof.

Among the substituents of Group $B_{TB}$, the phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom may be a methyl-substituted group such as 3-tolyl and 4-tolyl; a methoxy-substituted group such as 3-methoxyphenyl and 4-methoxyphenyl; an acetylamino-substituted group such as 3-(acetylamino)phenyl and 4-(acetylamino)phenyl; a nitro-substituted group such as 3-nitrophenyl and 4-nitrophenyl; a sulfo-substituted group such as 3-sulfophenyl and 4-sulfophenyl; a carboxy-substituted group such as 3-carboxyphenyl and 4-carboxyphenyl; a cyano-substituted group such as 4-cyanophenyl; a carbamoyl-substituted group such as 4-carbamoylphenyl; a fluorine atom-substituted group such as 2-fluorophenyl, 4-fluorophenyl and 2,4-difluorophenyl; a chlorine atom-substituted group such as 2-chlorophenyl, 4-chlorophenyl and 2,4-dichlorophenyl; a bromine atom-substituted group such as 4-bromophenyl; and the like.

Among the substituents in Group $B_{TB}$, the unsubstituted naphthyl group may be 1-naphthyl or 2-naphthyl.

Among the substituents in Group $B_{TB}$, the naphthyl group whose naphthalene ring is substituted with a methyl group, a bromine atom, a carboxyl group, a sulfo group, an unsubstituted alkoxy group having 1 to 4 carbon atoms or a sulfo-substituted alkoxy group having 1 to 4 carbon atoms may be a group in which the unsubstituted naphthyl group has these substituents. The number of the substituents is generally 1 to 4, and preferably 1 or 2. The positions of the substituents are not particularly limited, but, when the bonding position to Group $B_{TB}$ is the 1-position, di-substitution at the 2- and 3-positions is preferred. Further, when the bonding position to Group $B_{IB}$ is the 2-position, mono-substitution at the 6-position, or di-substitution at the 5- and 6-positions is preferred.

Specific examples thereof may include a methyl-substituted group such as 4-methyl-1-naphthyl; a sulfo-substituted group such as 6-sulfo-1-naphthyl and 8-sulfo-2-naphthyl; a group substituted with an unsubstituted alkoxy-substituted group having 1 to 4 carbon atoms such as 2-methoxy-1-naphthyl, 2-ethoxy-1-naphthyl, 6-methoxy-2-naphthyl, 1-methoxy-2-naphthyl, 1-ethoxy-2-naphthyl, 1-propoxy-2-naphthyl and 1-butoxy-2-naphthyl; a group substituted with a sulfo-substituted alkoxy having 1 to 4 carbon atoms such as 2-(sulfoethoxy)-1-naphthyl, 2-(sulfopropoxy)-1-naphthyl, 1-(sulfopropoxy)-2-naphthyl and 1-(sulfobutoxy)-2-naphthyl; a group substituted with a bromine atom and an unsubstituted alkoxy group having 1 to 4 carbon atoms such as 5-bromo-6-methoxy-2-naphthyl; a group substituted with sulfo and an unsubstituted alkoxy group having 1 to 4 carbon atoms such as 5-sulfo-6-methoxy-2-naphthyl; a group substituted with carboxy and an unsubstituted alkoxy group having 1 to 4 carbon atoms such as 2-methoxy-3-carboxy-1-naphthyl; and the like.

Preferred substituents in the divalent substituted thiophene group may be, among the substituents in Group B, a cyano group; a carbamoyl group; an unsubstituted phenyl group; a phenyl group whose benzene ring is substituted with a methyl group, a methoxy group or an acetylamino group; an unsubstituted naphthyl group; or a naphthyl group substituted with an unsubstituted alkoxy group having 1 to 4 carbon atoms or an unsubstituted alkoxy group having 1 to 4 carbon atoms and a sulfo group.

Specific examples of the preferred substituents may include cyano, carbamoyl, unsubstituted phenyl, 4-tolyl, 3-methoxyphenyl, unsubstituted 2-naphthyl, 6-methoxy-2-naphthyl, 5-sulfo-6-methoxy-2-naphthyl and the like.

Preferred substituents in the substituted thiazole group may be, among the substituents in Group B, an unsubstituted phenyl group; a phenyl group whose benzene ring is substituted with a methyl group, a methoxy group, an acetylamino group and a chlorine atom; an unsubstituted naphthyl group; or a naphthyl group substituted with an unsubstituted alkoxy group having 1 to 4 carbon atoms and a sulfo group.

Preferred examples thereof may include unsubstituted phenyl, 4-tolyl, 4-methoxyphenyl, 3-(acetylamino)phenyl, 3-chlorophenyl, unsubstituted 2-naphthyl, 5-sulfo-6-methoxy-2-naphthyl and the like.

Among the compounds represented by Formula (TB-1), preferred is a compound represented by Formula (TB-2). In Formula (TB-2), $R_{TB}^1$ to $R_{TB}^7$, Group $A_{TB}$ and Group $B_{TB}$ have the same meaning as those in Formula (TB-1) including preferred examples and specific examples thereof.

In Formula (TB-1) or (TB-2), in Group $B_{TB}$, a preferred group as a divalent substituted thiophene group is a group represented by Formula (TB-3), and a preferred group as a divalent substituted thiazole group is a group represented by Formula (TB-4).

In Formula (TB-3), $R_{TB}^8$ is a cyano group or a carbamoyl group, and preferably cyano.

In Formula (TB-3), $R_{TB}^9$ represents a group selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms or a sulfo-substituted alkoxy group having 1 to 4 carbon atoms,

*1 represents a bonding hand to the azo group bound to Group $A_{TB}$, and *2 represents a bonding hand to the azo group bound to the ring on which $R_{TB}^5$ to $R_{TB}^7$ are substituted.

In Formula (TB-3), the unsubstituted alkyl group having 1 to 4 carbon atoms in $R_{TB}^9$ may be the same as the unsubstituted alkyl group having 1 to 4 carbon atoms in $R_{TB}^1$, including preferred examples thereof.

In Formula (TB-3), the phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom in $R_{TB}^9$ may be the same as the corresponding substituent in Group $B_{TB}$, including preferred examples thereof.

In Formula (TB-3), the naphthyl group whose naphthalene ring is substituted with a methyl group, a bromine atom, a carboxyl group, a sulfo group, an unsubstituted alkoxy group having 1 to 4 carbon atoms or a sulfo-substituted alkoxy group having 1 to 4 carbon atoms in $R_{TB}^9$ may be the same as the corresponding substituent in Group $B_{TB}$, including preferred examples thereof.

In Formula (TB-3), preferred $R_{TB}^9$ may be, among the above, an unsubstituted alkyl group having 1 to 4 carbon atoms; an unsubstituted phenyl group; a phenyl group whose benzene ring is substituted with a methyl group, an acetylamino group, a nitro group, a sulfo group, a carboxyl group or a chlorine atom; an unsubstituted naphthyl group; or a naphthyl group whose naphthalene ring is substituted with an unsubstituted alkoxy group having 1 to 4 carbon atoms, a sulfo group or a carboxyl group.

More preferred $R_{TB}^{9}$ may be an unsubstituted phenyl group; a phenyl group whose benzene ring is substituted with a methyl group, a methoxy group, an acetylamino group or a chlorine atom; an unsubstituted naphthyl group; or a naphthyl group whose naphthalene ring is substituted with a methoxy group and/or sulfo group.

In Formula (TB-3), a preferred combination of $R_{TB}^{8}$ and $R_{TB}^{9}$ is a combination in which $R_{TB}^{8}$ is cyano, and $R_{TB}^{9}$ is phenyl, 4-tolyl, 4-(acetylamino)phenyl or 2-naphthyl.

In Formula (TB-4), $R_{TB}^{10}$ represents a group selected from a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms or a sulfo-substituted alkoxy group having 1 to 4 carbon atoms,

*3 represents a bonding hand to the azo group bound to Group $A_{TB}$, and *4 represents a bonding hand to the azo group bound to the ring on which $R_{TB}^{5}$ to $R_{TB}^{7}$ are substituted.

In Formula (TB-4), the unsubstituted alkyl group having 1 to 4 carbon atoms in $R_{TB}^{10}$ may be the same as the unsubstituted alkyl group having 1 to 4 carbon atoms in $R_{TB}^{1}$, including preferred examples thereof In Formula (TB-4), the phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom in $R_{TB}^{10}$ may be the same as the corresponding substituent in Group $B_{TB}$, including preferred examples thereof.

In Formula (TB-4), the naphthyl group whose naphthalene ring is substituted with a methyl group, a bromine atom, a carboxyl group, a sulfo group, an unsubstituted alkoxy group having 1 to 4 carbon atoms or a sulfo-substituted alkoxy group having 1 to 4 carbon atoms in $R_{TB}^{10}$ may be the same as the corresponding substituent in Group $B_{TB}$, including preferred examples thereof.

In Formula (TB-4), preferred $R_{TB}^{10}$ may be, among the above, an unsubstituted alkyl group having 1 to 4 carbon atoms; an unsubstituted phenyl group; a phenyl group whose benzene ring is substituted with a methyl group, an acetylamino group, a nitro group, a sulfo group, a carboxyl group or a chlorine atom; an unsubstituted naphthyl group; or a naphthyl group whose naphthalene ring is substituted with an alkoxy group having 1 to 4 carbon atoms, a sulfo group or a carboxyl group.

More preferred $R_{TB}^{10}$ may be an unsubstituted phenyl group; a phenyl group whose benzene ring is substituted with a methyl group, a methoxy group, an acetylamino group or a chlorine atom; an unsubstituted naphthyl group; or a naphthyl group whose naphthalene ring is substituted with a methoxy group or a sulfo group.

Still more preferred $R_{TB}^{10}$ may be unsubstituted phenyl or 2-naphthyl, and particularly preferably unsubstituted phenyl.

In Formula (TB-1), preferred Group $A_{TB}$ is a group represented by Formula (TB-5) or Formula (TB-6).

In $R_{TB}^{11}$ to $R_{TB}^{13}$ in Formula (TB-5) or $R_{TB}^{14}$ to $R_{TB}^{17}$ in Formula (TB-6), the benzenesulfonyloxy group whose benzene ring is substituted with a methyl group, a nitro group or a chlorine atom may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the unsubstituted alkyl group having 1 to 4 carbon atoms may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the unsubstituted alkoxy group having 1 to 4 carbon atoms may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the alkoxy group having 1 to 4 carbon atoms substituted with a hydroxyl group, an alkoxy group having 1 to 4 carbon atoms, a sulfo group or a carboxyl group may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the unsubstituted alkylsulfonyl group having 1 to 4 carbon atoms may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the alkylsulfonyl group having 1 to 4 carbon atoms substituted with a hydroxyl group, a sulfo group or a carboxyl group may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the unsubstituted alkylaminosulfonyl group having 1 to 8 carbon atoms may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the alkylaminosulfonyl group having 1 to 8 carbon atoms substituted with a hydroxyl group, a sulfo group or a carboxyl group may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the unsubstituted alkylcarbonylamino group having 1 to 8 carbon atoms may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the carboxy-substituted alkylcarbonylamino group having 2 to 9 carbon atoms may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the benzoylamino group whose benzene ring is substituted with a sulfo group or an alkyl group having 1 to 4 carbon atoms may be the same as the corresponding substituent in Group $A_{TB}$, including preferred examples thereof.

In $R_{TB}^{11}$ to $R_{TB}^{13}$ in Formula (TB-5) or $R_{TB}^{14}$ to $R_{TB}^{17}$ in Formula (TB-6), the benzenesulfonylamino group whose benzene ring is substituted with a methyl group, a nitro group or a chlorine atom may be the same as the corresponding substituent in Group $A_{TB}$, including preferred examples thereof.

In Formula (TB-5), preferred $R_{TB}^{11}$ to $R_{TB}^{13}$ may be, among the above, a hydrogen atom, a carboxyl group, a sulfo group, a chlorine atom, a sulfamoyl group, a nitro group, an unsubstituted alkoxy group having 1 to 4 carbon atoms, an alkylsulfonyl group having 1 to 4 carbon atoms substituted with a carboxyl group, an unsubstituted alkylcarbonylamino group having 1 to 8 carbon atoms, or an unsubstituted benzoylamino group.

Preferred specific examples thereof may include a hydrogen atom, sulfo, carboxy, sulfamoyl, a chlorine atom, acetylamino, nitro, benzoylamino, methoxy or carboxyethylsulfonyl.

In Formula (TB-5), a preferred combination of $R_{TB}^{11}$ to $R_{TB}^{13}$ is a combination in which $R_{TB}^{11}$ is a hydrogen atom, carboxy or sulfo, $R_{TB}^{12}$ is a hydrogen atom, sulfo, a chlorine atom, nitro, sulfamoyl, an unsubstituted alkoxy group having 1 to 4 carbon atoms, an unsubstituted alkylcarbonylamino group having 1 to 8 carbon atoms or an unsubstituted benzoylamino group, and $R_{TB}^{13}$ is a hydrogen atom, carboxy or sulfo, and among the aforementioned combinations, more preferred is a combination in which at least one or two of $R_{TB}^{11}$ to $R_{TB}^{13}$ are independently selected from sulfo and carboxy.

Further, when the substitution position of the azo group in Formula (TB-5) is regarded as the 1-position, it is preferred that, in the case where two of $R_{TB}^{11}$ to $R_{TB}^{13}$ are hydrogen atoms, the group other than hydrogen atoms is substituted at the 4-position; in the case where one is a hydrogen atom, the groups other than a hydrogen atom are substituted at the 2- and 4-positions, the 3- and 4-positions or the 3- and 5-positions; and in the case where all of them are groups other than a hydrogen atom, the groups is substituted at the 2-, 4- and 5-positions.

In Formula (TB-6), preferred $R_{TB}^{14}$ to $R_{TB}^{17}$ may be a hydrogen atom, a sulfo group, an unsubstituted alkoxy group having 1 to 4 carbon atoms, a sulfo group or an alkoxy group having 1 to 4 carbon atoms substituted with a carboxyl group.

Preferred specific examples thereof include sulfo, methoxy, sulfoethoxy, sulfopropoxy and carboxymethoxy, and more preferably a hydrogen atom and sulfo.

In Formula (TB-6), a preferred combination of $R_{TB}^{14}$ to $R_{TB}^{17}$ is a combination in which $R_{TB}^{14}$ is sulfo or a hydrogen atom, $R_{TB}^{15}$ is a hydrogen atom, $R_{TB}^{16}$ is sulfo or a hydrogen atom, and $R_{TB}^{17}$ is sulfo, and more preferably a combination in which $R_{TB}^{14}$ is sulfo, $R_{TB}^{15}$ is a hydrogen atom, $R_{TB}^{16}$ is a hydrogen atom, and $R_{TB}^{17}$ is sulfo.

The substitution position of $R_{TB}^{14}$ to $R_{TB}^{17}$ is not particularly limited, but when the substitution position of the azo group is regarded as the 2-position, it is preferred that $R_{TB}^{14}$ is substituted at the 4-position, $R_{TB}^{15}$ is substituted at the 1-position, $R_{TB}^{16}$ is substituted at the 6-position, and $R_{TB}^{17}$ is substituted at the 8-position.

More preferred is a compound formed by combining preferred groups as described with respect to the various substituents of Formulas (TB-1) to (TB-5), and still more preferred is a compound formed by combining more preferred groups. The same is applied to a compound formed by combining still more preferred groups. Further, the matters describing the preferred combinations are the same as matters with respect to compounds formed by combining the preferred combinations.

Among the aforementioned combinations, particularly preferred is a combination in which $R_{TB}^{1}$ is an unsubstituted alkyl group having 1 to 4 carbon atoms, preferably a methyl group, $R_{TB}^{2}$ is a cyano group or carbamoyl group, preferably a cyano group, $R_{TB}^{3}$ is a hydrogen atom, $R_{TB}^{4}$ is a sulfo group, $R_{TB}^{5}$ is an alkoxy group having 1 to 4 carbon atoms substituted with a sulfo group, preferably a sulfopropoxy group, $R_{TB}^{6}$ is a hydrogen atom, $R_{TB}^{7}$ is an unsubstituted alkyl group having 1 to 4 carbon atoms, preferably a methyl group, Group $A_{TB}$ is represented by Formula (TB-6), $R_{TB}^{14}$ a sulfo group at the 4-position, $R_{TB}^{15}$ and $R_{TB}^{16}$ are a hydrogen atom, $R_{TB}^{17}$ is a sulfo group at the 8-position, Group $B_{TB}$ is represented by Formula (TB-4), and $R_{TB}^{10}$ is a phenyl group.

The salt of the azo compound represented by Formula (TB-1) is an inorganic or organic cation. Among them, specific examples of the inorganic salt may include an alkali metal salt, an alkaline earth metal salt and an ammonium salt, and preferred inorganic salt is a salt of lithium, sodium or potassium, and an ammonium salt. Further, a salt of the organic cation may be, for example, a quaternary ammonium ion represented by the following Formula (TB-9), but is not limited thereto. Further, a free acid of the azo compound of the present invention, tautomers and various salts thereof may be mixtures. For example, any combination may be used, such as a mixture of a sodium salt and an ammonium salt, a mixture of a free acid and a sodium salt and a mixture of a lithium salt, a sodium salt and an ammonium salt. Since properties such as solubility may be different depending on the kind of salts, it is possible to obtain a mixture having desired properties by selecting an appropriate kind of the salt as necessary, or changing a ratio when a plurality of salts is contained.

Formula (TB-9)

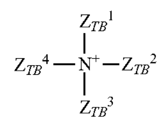

In (TB-9), $Z_{TB}^{1}$, $Z_{TB}^{2}$, $Z_{TB}^{3}$ and $Z_{TB}^{4}$ each independently represent a group selected from the group consisting of a hydrogen atom, an unsubstituted alkyl group, a hydroxyalkyl group and hydroxyalkoxyalkyl group, and at least one is a group other than a hydrogen atom.

In Formula (TB-9), specific examples of the alkyl group of $Z_{TB}^{1}$, $Z_{TB}^{2}$, $Z_{TB}^{3}$, $Z_{TB}^{3}$ and $Z_{TB}^{4}$ may include methyl, ethyl, n-propyl, isopropyl, n-butyl, isobutyl, sec-butyl, tert-butyl and the like, specific examples of the hydroxyalkyl group may include a hydroxyalkyl group having 1 to 4 carbon atoms such as hydroxymethyl, hydroxyethyl, 3-hydroxypropyl, 2-hydroxypropyl, 4-hydroxybutyl, 3-hydroxybutyl, 2-hydroxybutyl, and specific examples of the hydroxyalkoxyalkyl group may include a hydroxyalkoxy- (the alkoxy moiety has 1 to 4 carbon atoms) alkyl group (the alkyl moiety has 1 to 4 carbon atoms) such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl, and among them, preferably hydroxyethoxyalkyl (the alkyl moiety has 1 to 4 carbon atoms). Particularly preferred examples thereof may include a hydrogen atom; a hydroxyalkyl group having 1 to 4 carbon atoms such as methyl, hydroxymethyl, hydroxyethyl, 3-hydroxypropyl, 2-hydroxypropyl, 4-hydroxybutyl, 3-hydroxybutyl and 2-hydroxybutyl, and a hydroxyethoxyalkyl group (the alkyl moiety has 1 to 4 carbon atoms) such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl.

Specific examples of the combination of $Z_{TB}^{1}$, $Z_{TB}^{2}$, $Z_{TB}^{3}$ and $Z_{TB}^{4}$ of the preferred compounds represented by Formula (TB-9) are shown in the following table.

TABLE 2

| Comopund No | $Z_{TB}^1$ | $Z_{TB}^2$ | $Z_{TB}^3$ | $Z_{TB}^4$ |
|---|---|---|---|---|
| 1-1 | H | $CH_3$ | $CH_3$ | $CH_3$ |
| 1-2 | $CH_3$ | $CH_3$ | $CH_3$ | $CH_3$ |
| 1-3 | H | —$C_2H_4OH$ | —$C_2H_4OH$ | —$C_2H_4OH$ |
| 1-4 | $CH_3$ | —$C_2H_4OH$ | —$C_2H_4OH$ | —$C_2H_4OH$ |
| 1-5 | H | —$CH_2CH(OH)CH_3$ | —$CH_2CH(OH)CH_3$ | —$CH_2CH(OH)CH_3$ |
| 1-6 | $CH_3$ | —$CH_2CH(OH)CH_3$ | —$CH_2CH(OH)CH_3$ | —$CH_2CH(OH)CH_3$ |
| 1-7 | H | —$C_2H_4OH$ | H | —$C_2H_4OH$ |
| 1-8 | $CH_3$ | —$C_2H_4OH$ | H | —$C_2H_4OH$ |
| 1-9 | H | —$CH_2CH(OH)CH_3$ | H | —$CH_2CH(OH)CH_3$ |
| 1-10 | $CH_3$ | —$CH_2CH(OH)CH_3$ | H | —$CH_2CH(OH)CH_3$ |
| 1-11 | $CH_3$ | —$C_2H_4OH$ | $CH_3$ | —$C_2H_4OH$ |
| 1-12 | $CH_3$ | —$CH_2CH(OH)CH_3$ | $CH_3$ | —$CH_2CH(OH)CH_3$ |

The azo compound represented by Formula (TB-1) may be synthesized, for example, by the method described in Japanese Patent Application Laid-Open No. 2010-155936.

Specific examples suitable for the azo compound of the present invention represented by Formula (TB-1) may be, but not particularly limited, compounds represented by structural formulas exemplified in the following table.

In each table, the functional groups such as a sulfo group and a carboxyl group are shown in a form of free acid for convenience.

TABLE 3

| Compound No. | Structural Formula |
|---|---|
| Tb-1 | 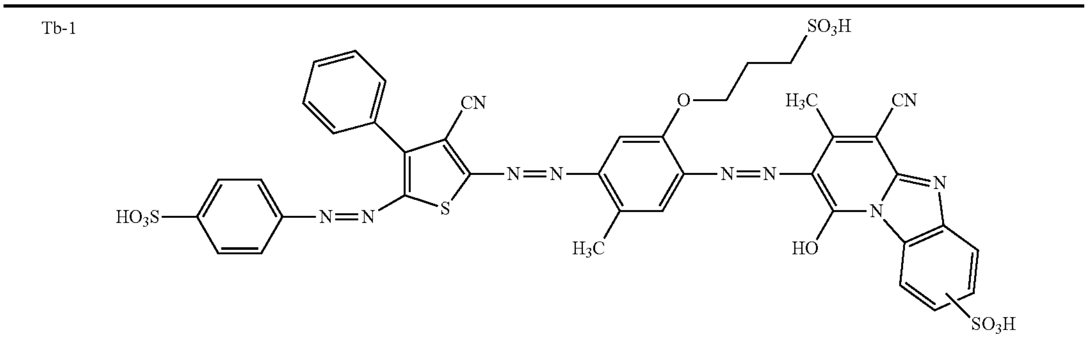 |
| Tb-2 | 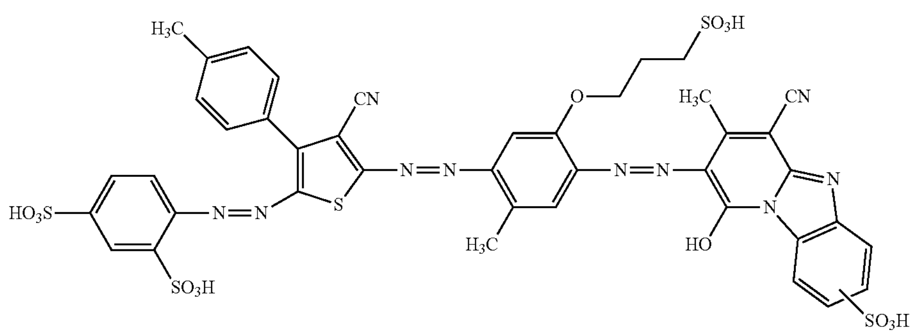 |
| Tb-3 | 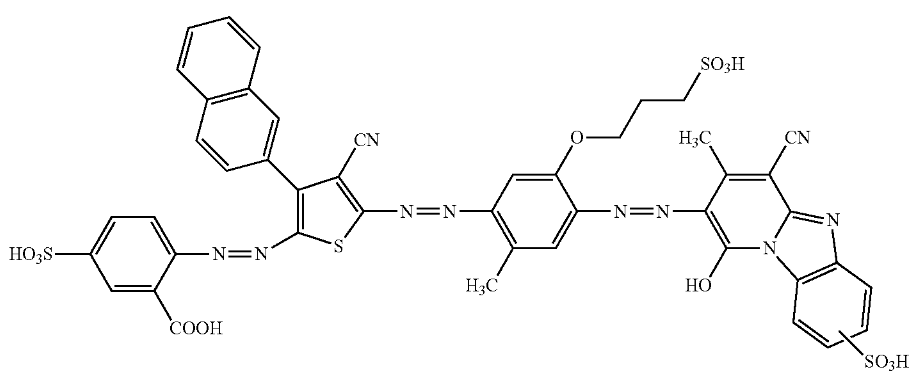 |

TABLE 3-continued
| Compound No. | Structural Formula |
|---|---|
| Tb-4 | 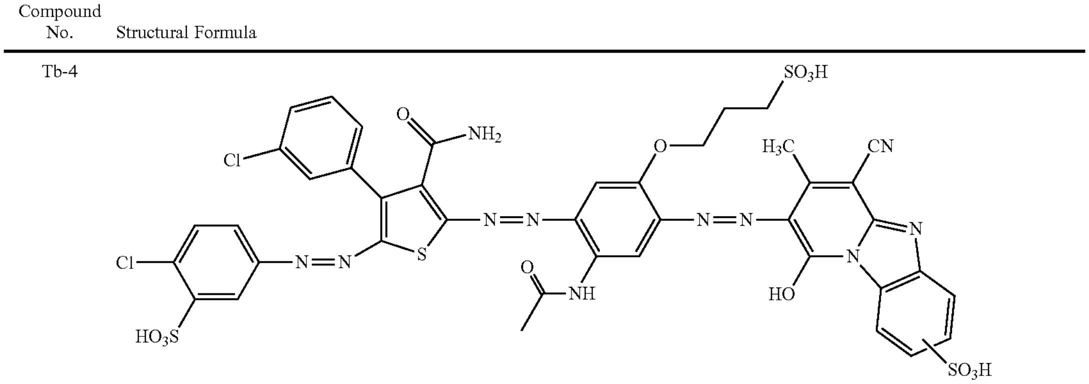 |
| Tb-5 | 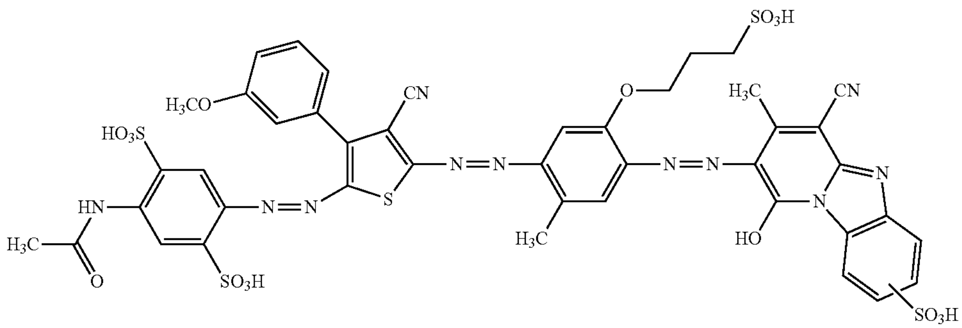 |
TABLE 4
| Compound No. | Structural Formula |
|---|---|
| Tb-6 | 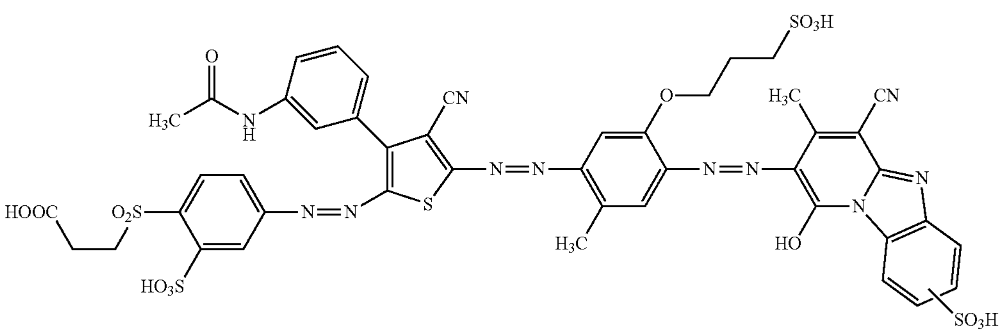 |
| Tb-7 | 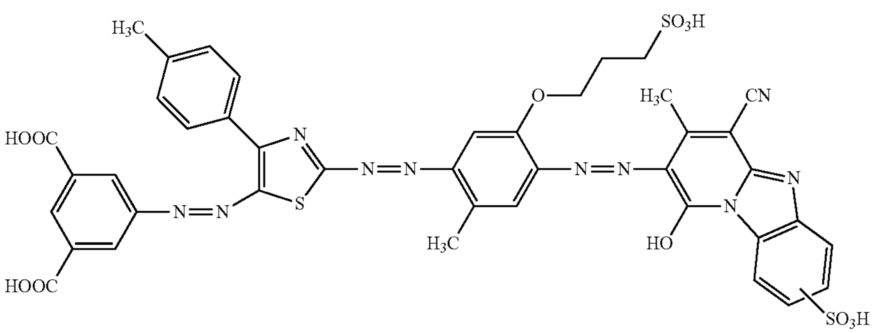 |

TABLE 4-continued
| Compound No. | Structural Formula |
| --- | --- |
| Tb-8 | 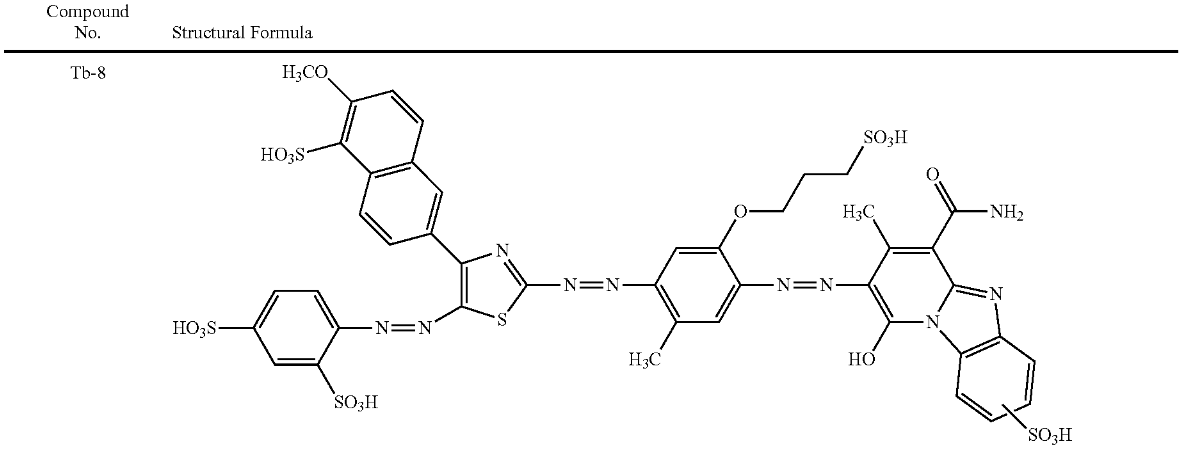 |
| Tb-9 | 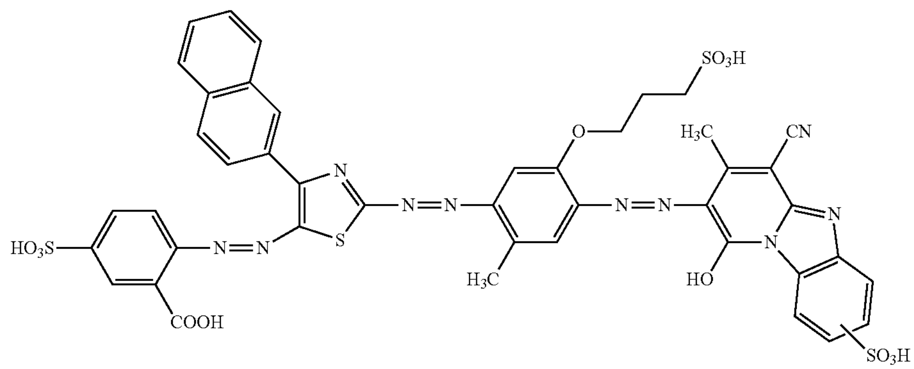 |
| Tb-10 | 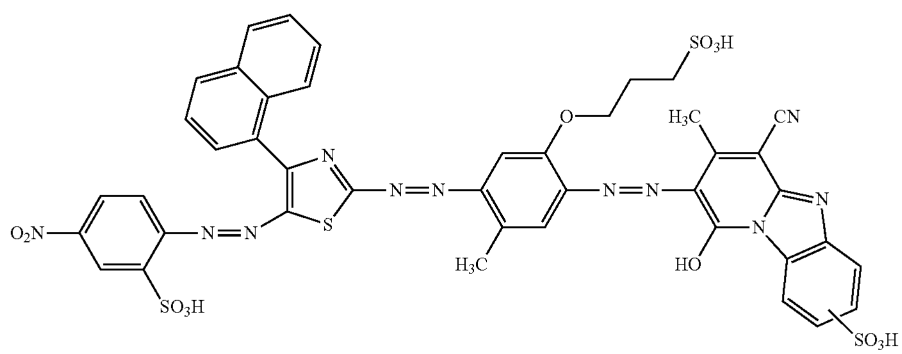 |
TABLE 5
| Compound No. | Structural Formula |
| --- | --- |
| Tb-11 | 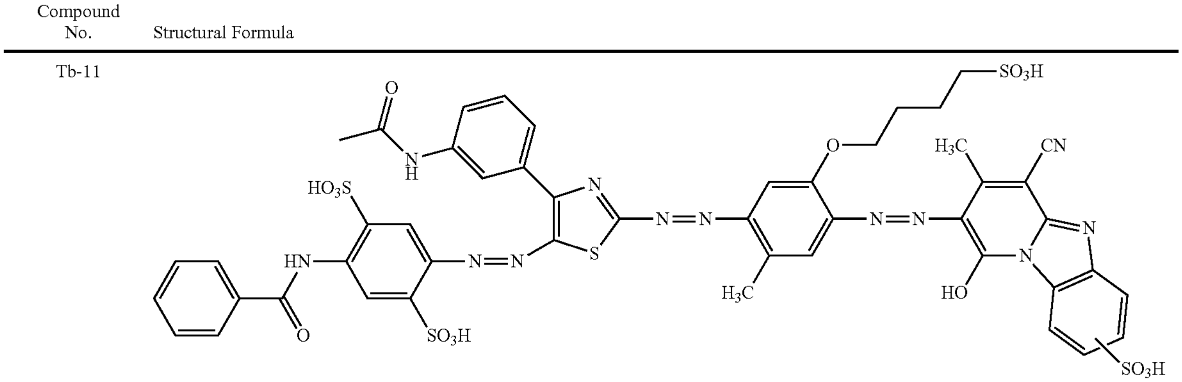 |

TABLE 5-continued
| Compound No. | Structural Formula |
| --- | --- |
| Tb-12 | 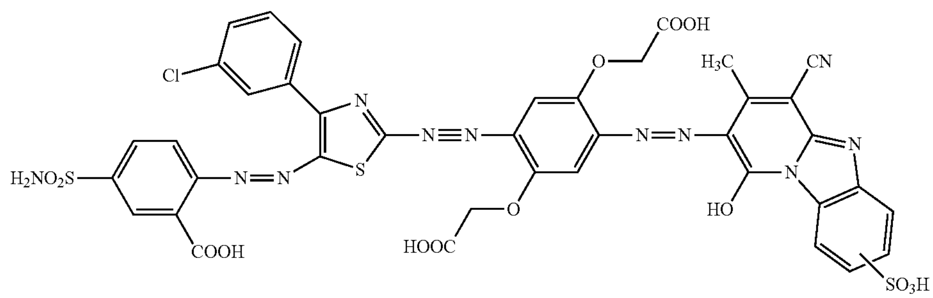 |
| Tb-13 | 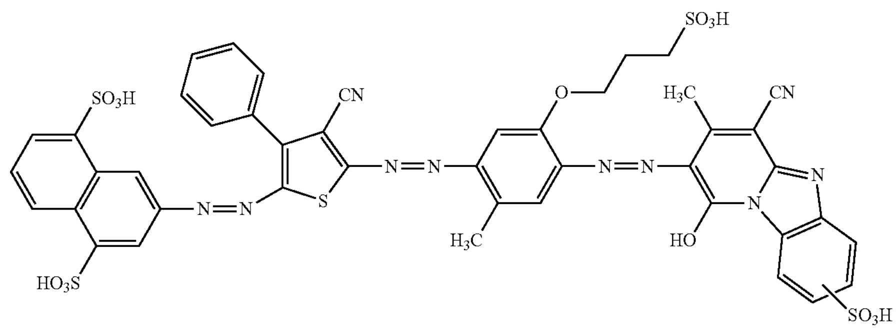 |
| Tb-14 | 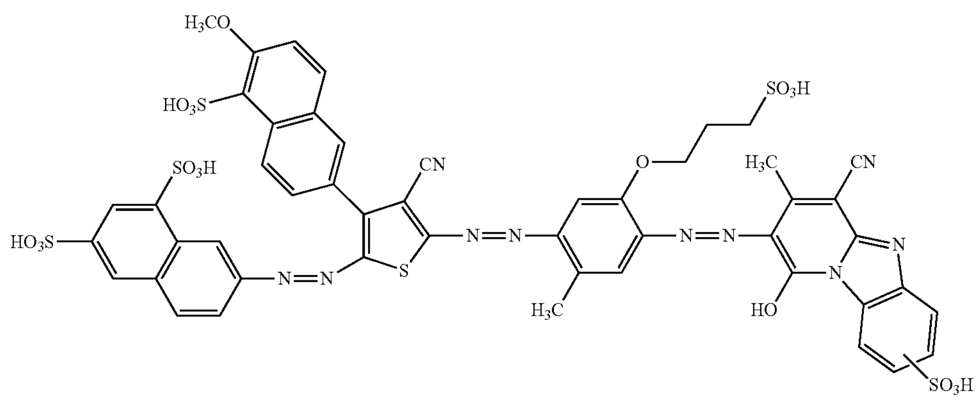 |
| Tb-15 | 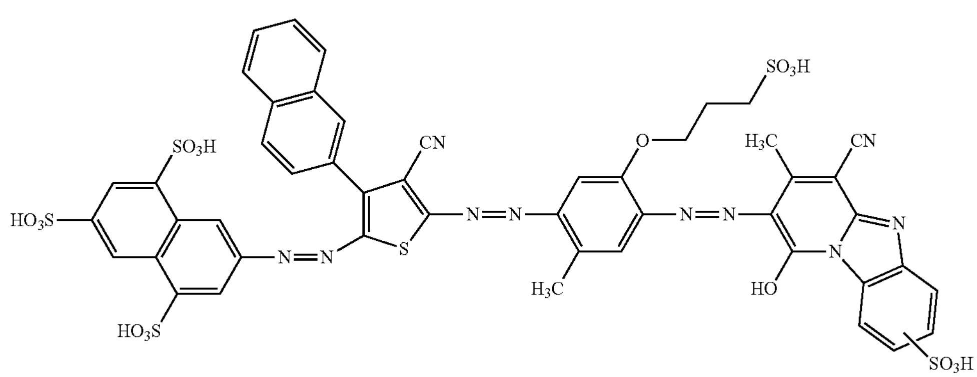 |

TABLE 6
| Compound No. | Structural Formula |
|---|---|
| Tb-16 | 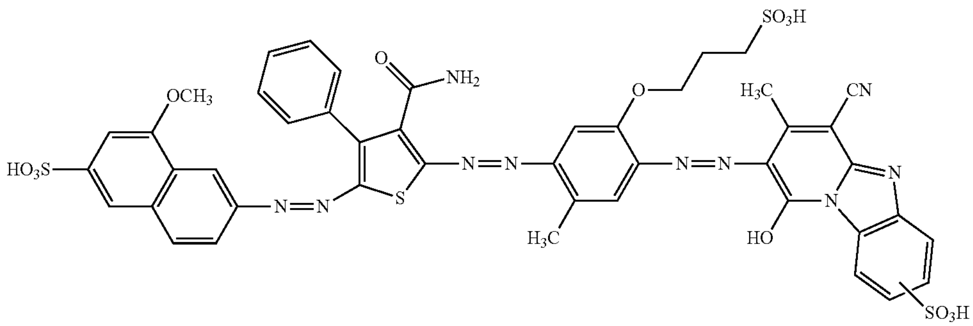 |
| Tb-17 | 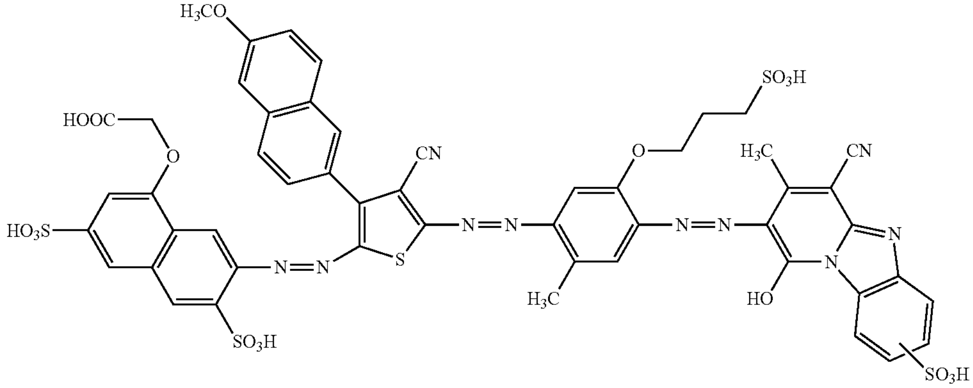 |
| Tb-18 | 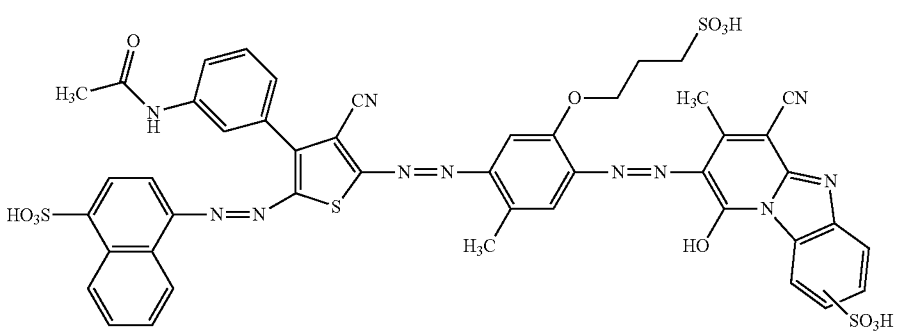 |
| Tb-19 | 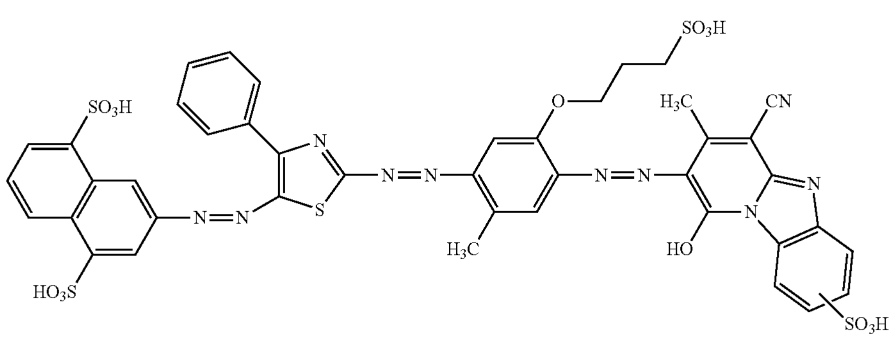 |

TABLE 6-continued
| Compound No. | Structural Formula |
| --- | --- |
| Tb-20 | 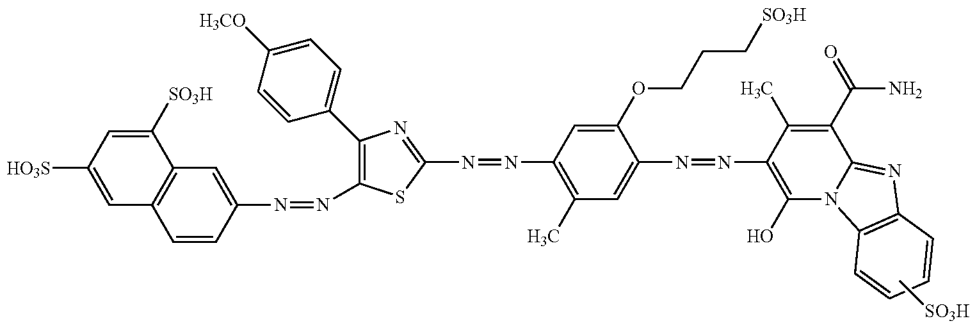 |
TABLE 7
| Compound No. | Structural Formula |
| --- | --- |
| Tb-21 | 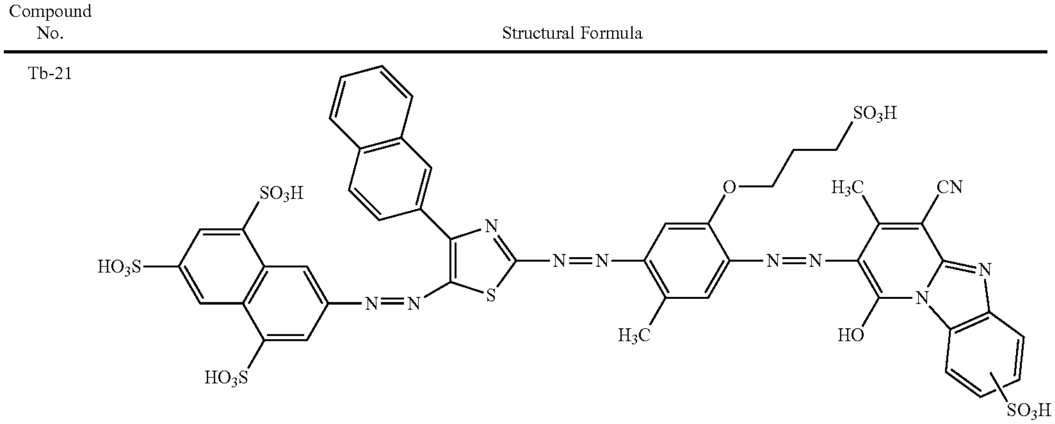 |
| Tb-22 | 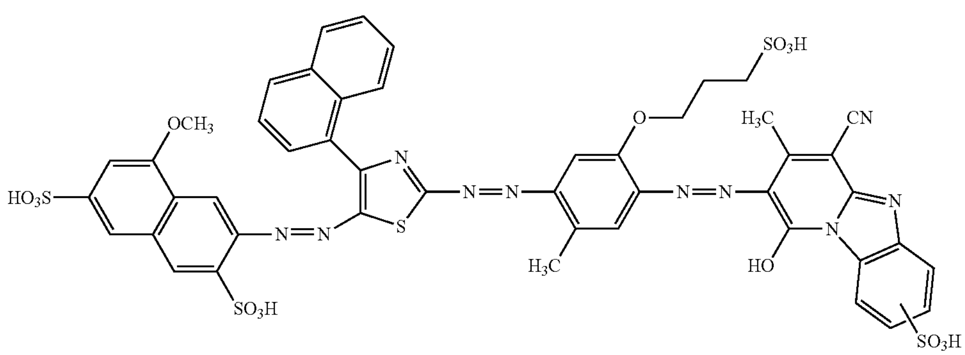 |
| Tb-23 | 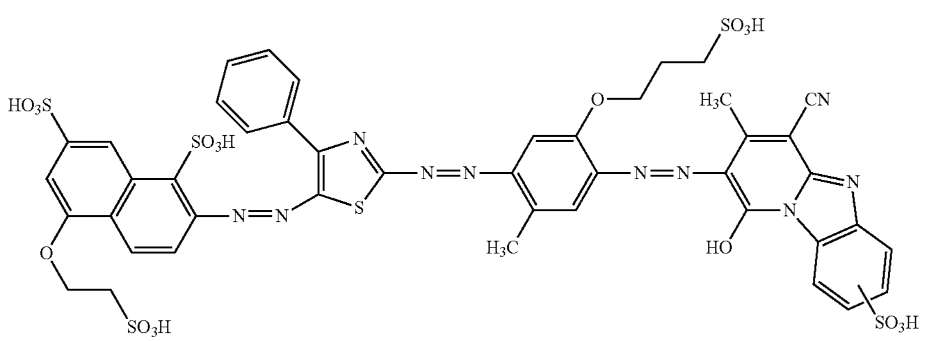 |

TABLE 7-continued
| Compound No. | Structural Formula |
| --- | --- |
| Tb-24 | 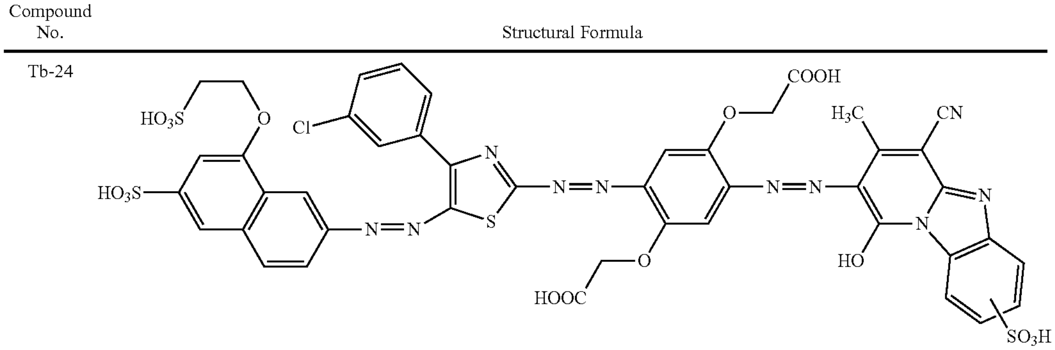 |
| Tb-25 | 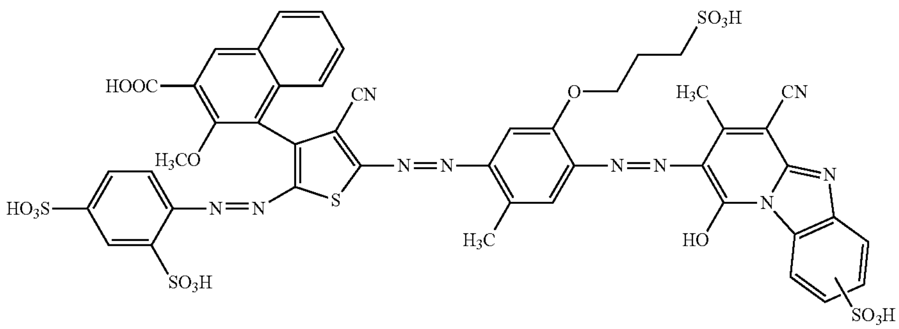 |
TABLE 8
| Compound No. | Structural Formula |
| --- | --- |
| Tb-26 | 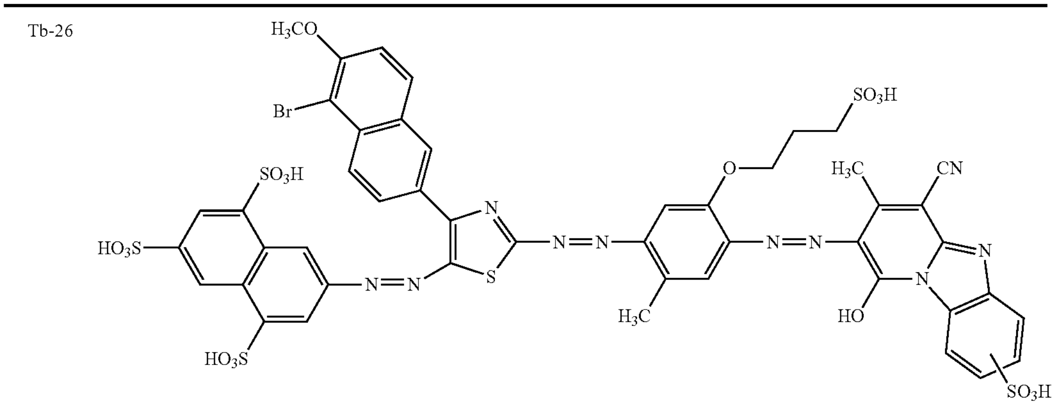 |
| Tb-27 | 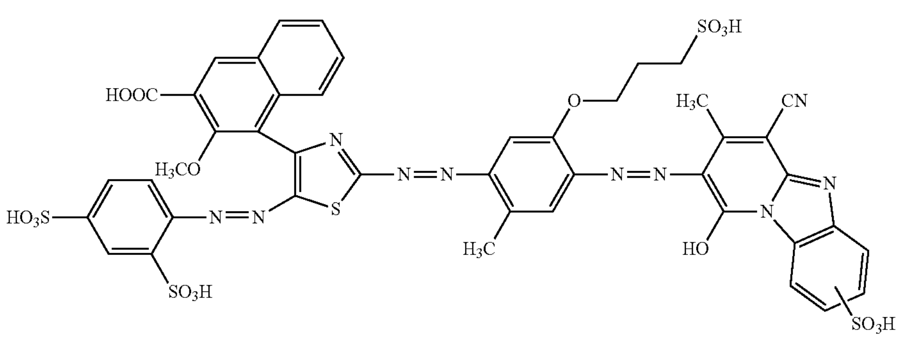 |

TABLE 8-continued
| Compound No. | Structural Formula |
| --- | --- |
| Tb-28 | 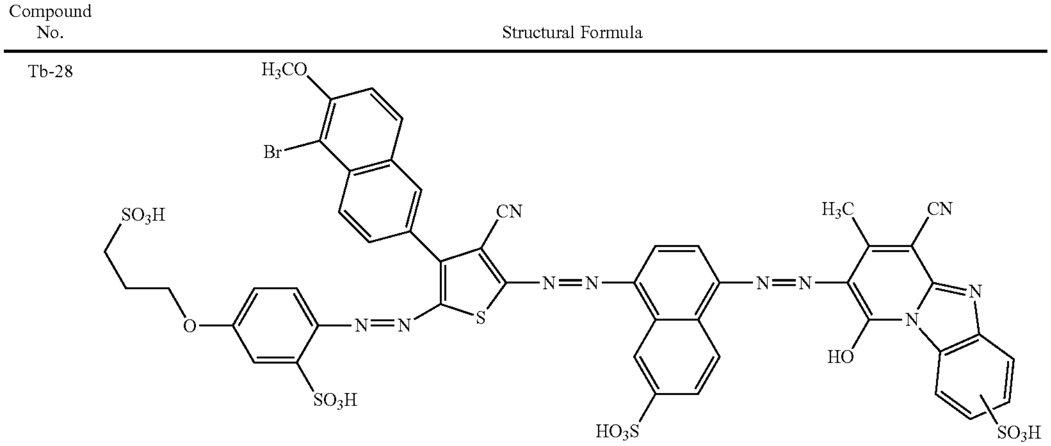 |
| Tb-29 | 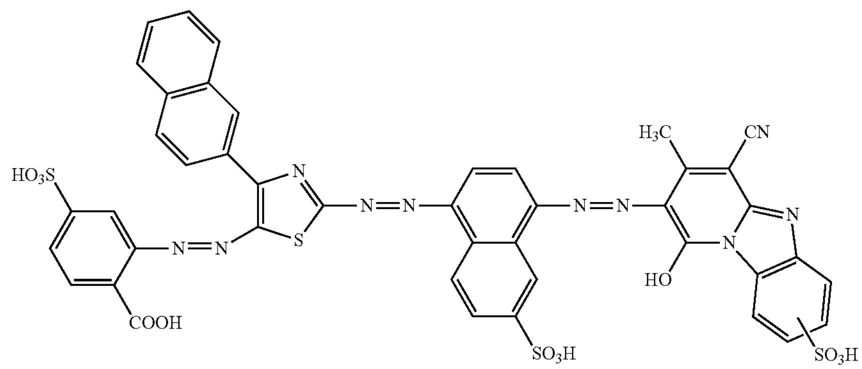 |
| Tb-30 | 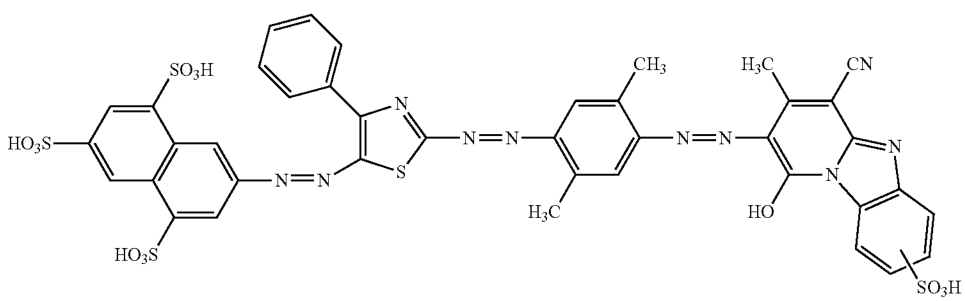 |
TABLE 9
| Compound No. | Structural Formula |
| --- | --- |
| Tb-31 | 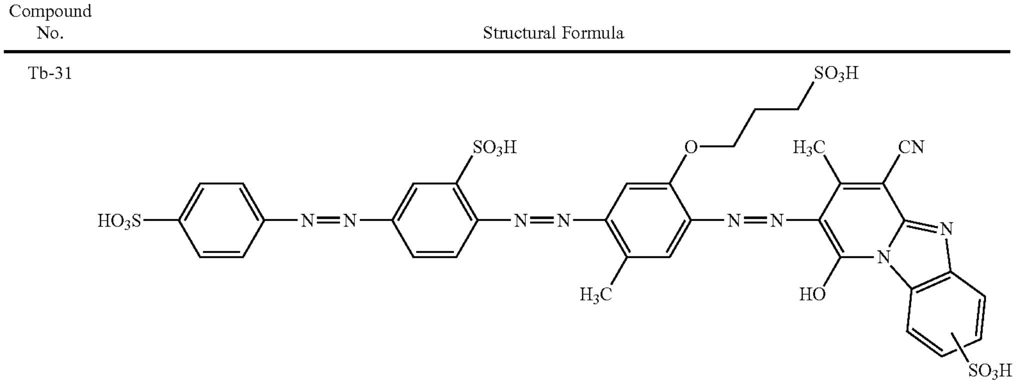 |

TABLE 9-continued
| Compound No. | Structural Formula |
| --- | --- |
| Tb-32 | 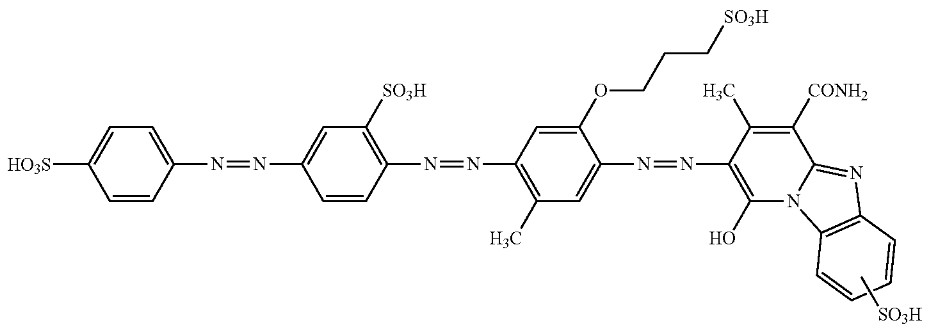 |
| Tb-33 | 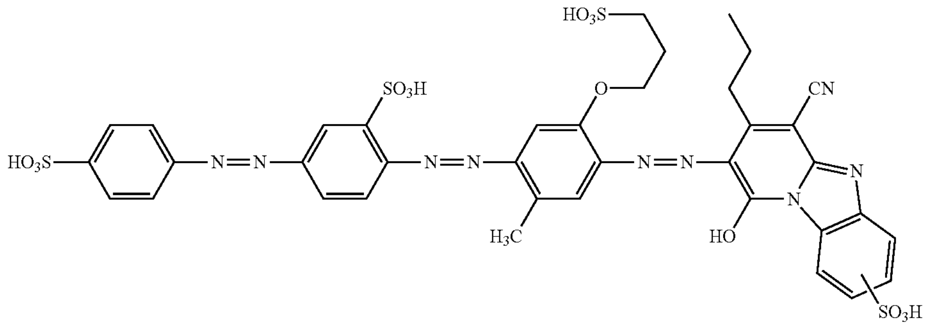 |
| Tb-34 | 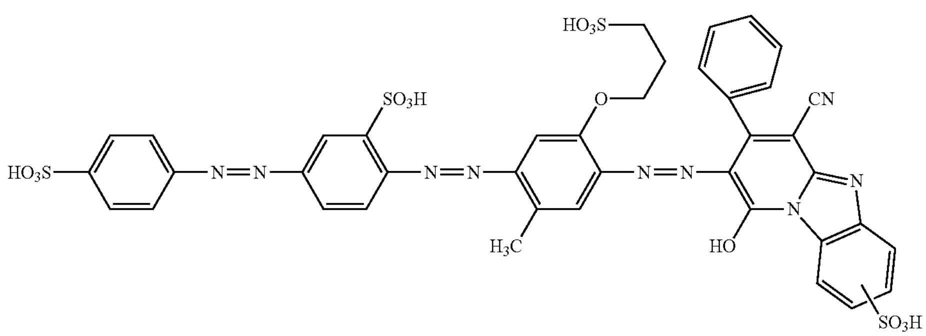 |
| Tb-35 | 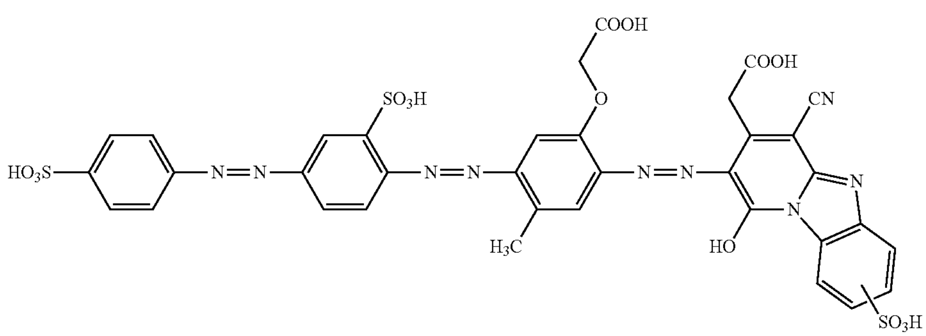 |

TABLE 9-continued
| Compound No. | Structural Formula |
|---|---|
| Tb-36 | 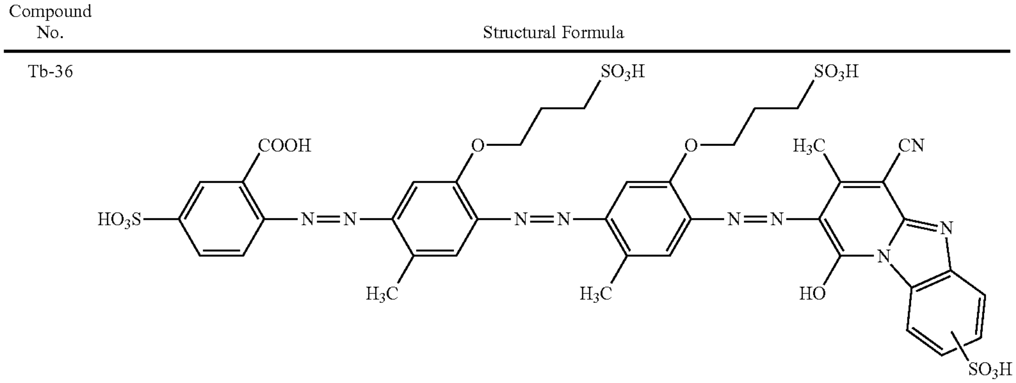 |
TABLE 10
| Compound No. | Structural Formula |
|---|---|
| Tb-37 | 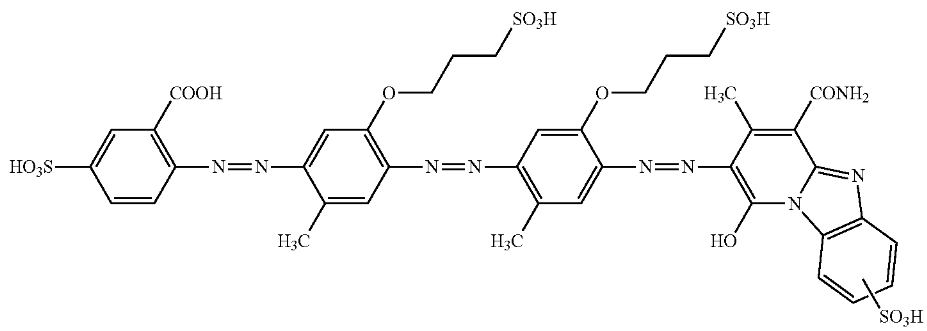 |
| Tb-38 | 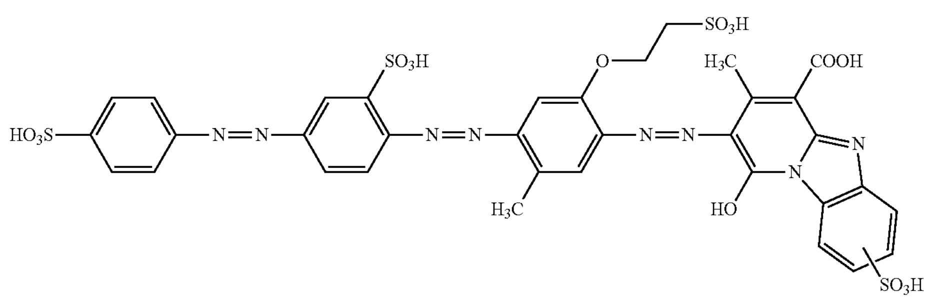 |
| Tb-39 | 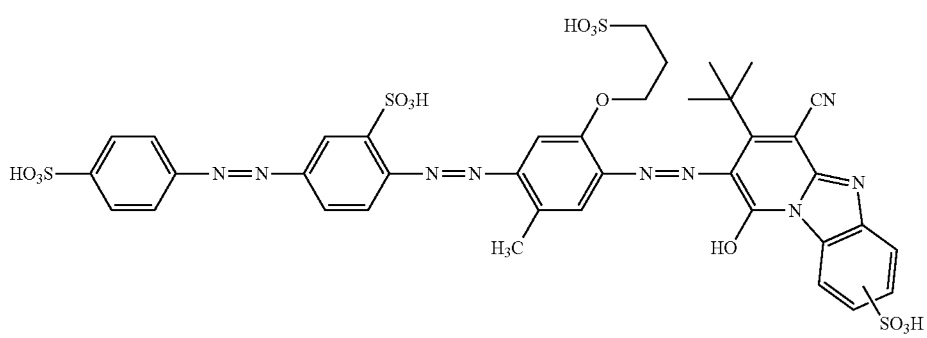 |

TABLE 10-continued
| Compound No. | Structural Formula |
|---|---|
| Tb-40 | 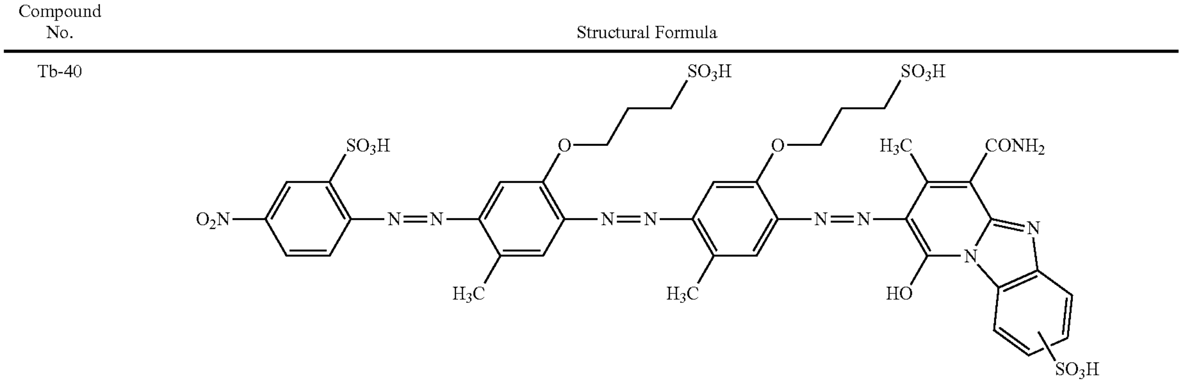 |
| Tb-41 | 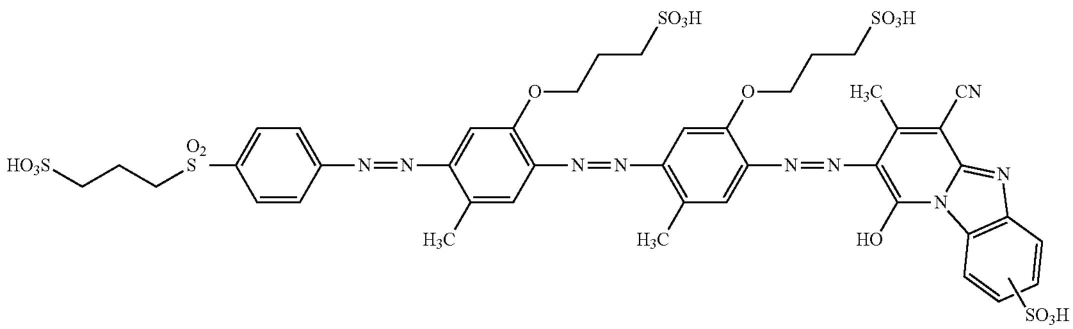 |
| Tb-42 | 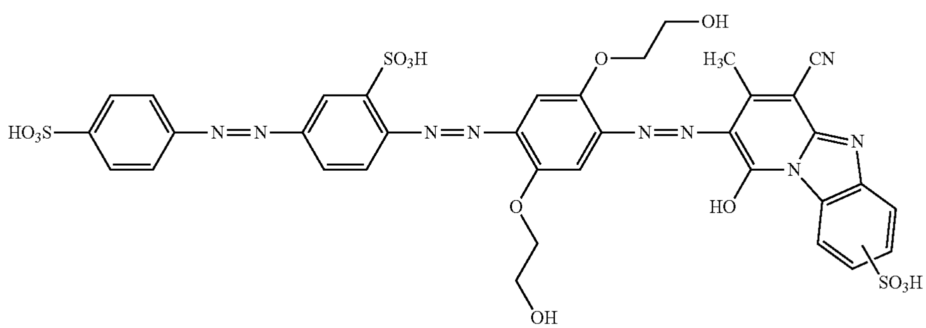 |
TABLE 11
| Compound No. | Structural Formula |
|---|---|
| Tb-43 | 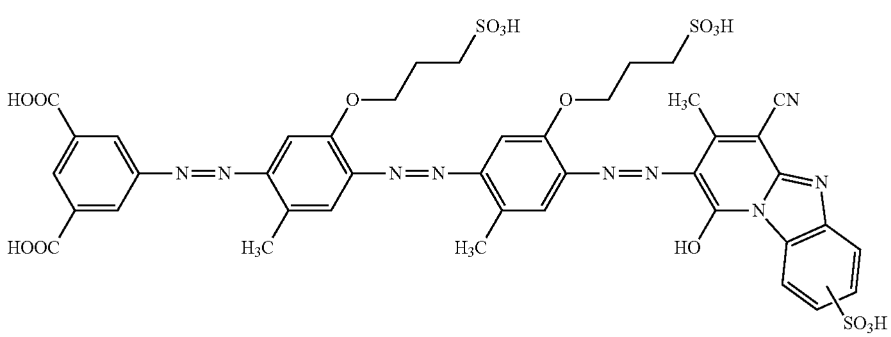 |

TABLE 11-continued
| Compound No. | Structural Formula |
|---|---|
| Tb-44 | 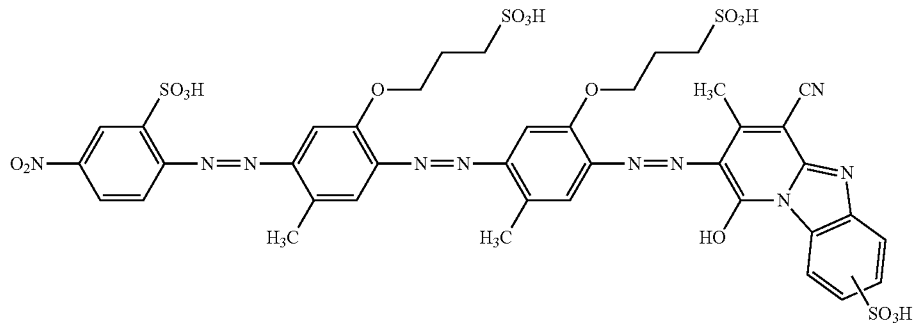 |
| Tb-45 | 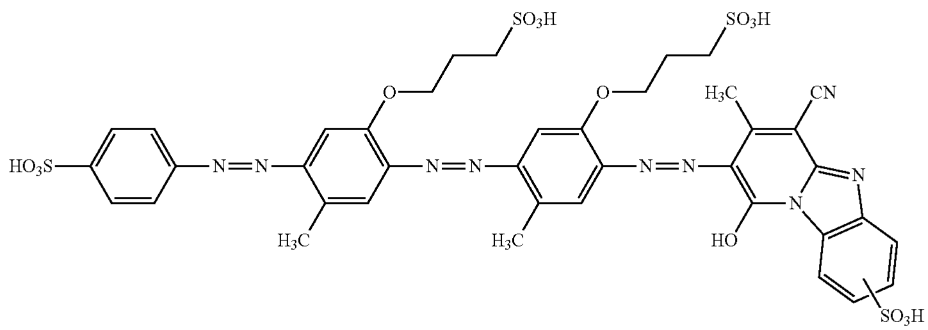 |
| Tb-46 | 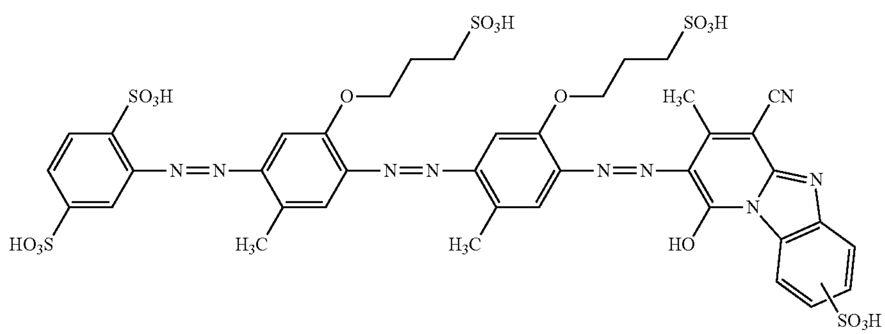 |
| Tb-47 | 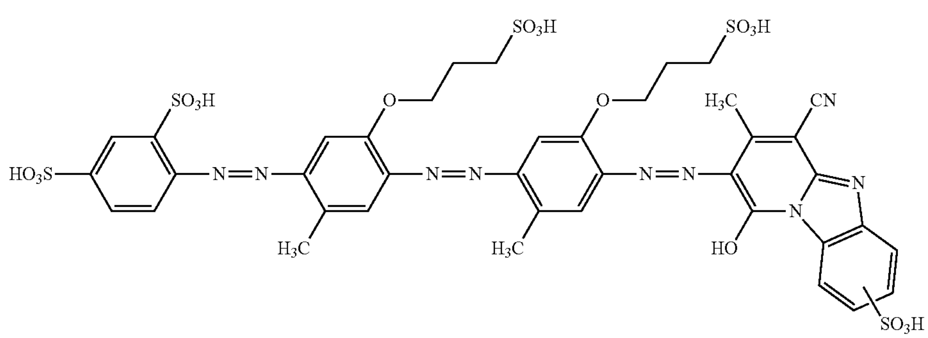 |

TABLE 11-continued
| Compound No. | Structural Formula |
|---|---|
| Tb-48 | 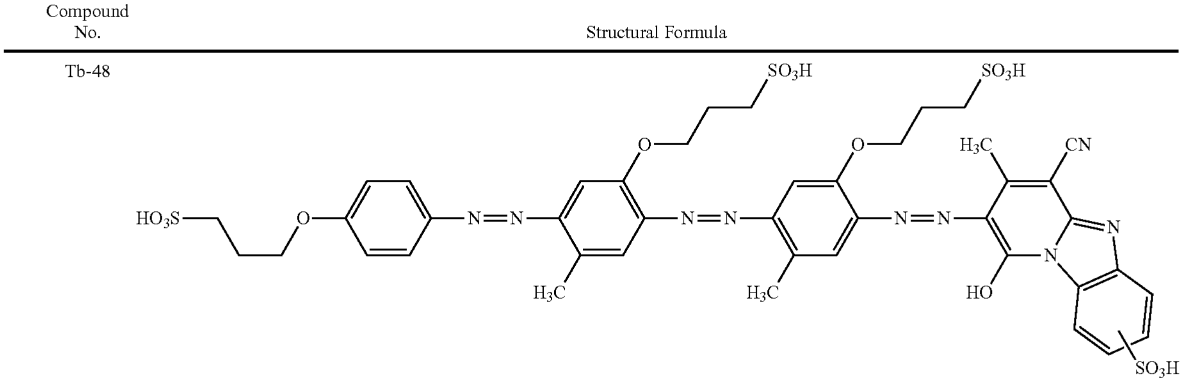 |
TABLE 12
| Compound No. | Structural Formula |
|---|---|
| Tb-49 | 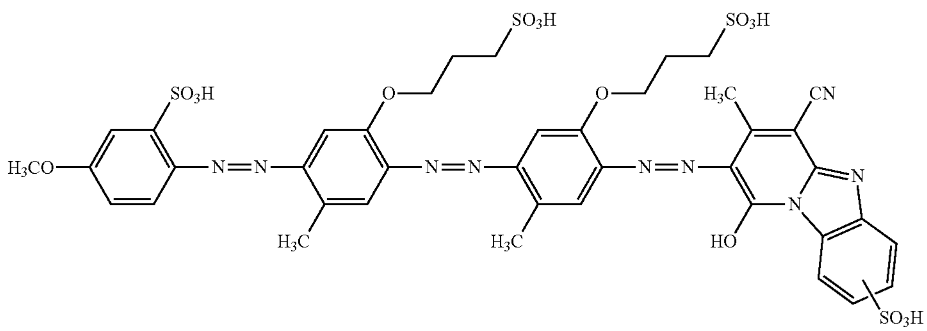 |
| Tb-50 | 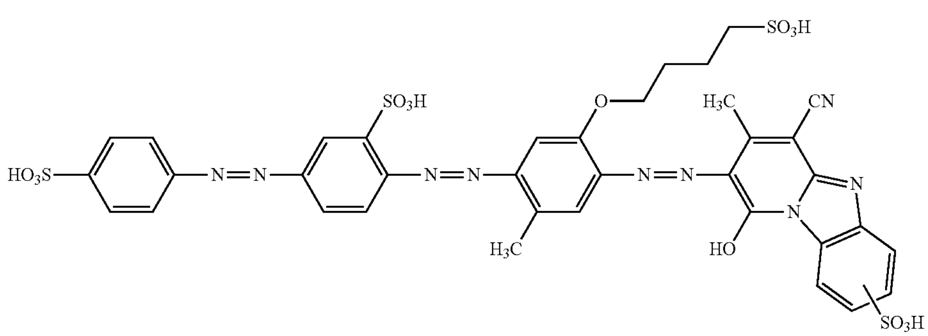 |

It is also preferred that the compound having three azo groups per molecule is a compound represented by the following Formula (TC-1).

Formula (TC-1)

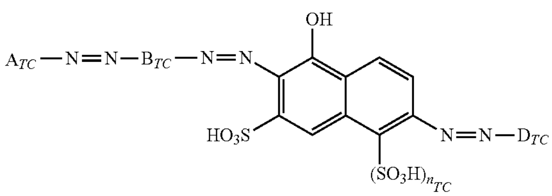

[In the formula, $A_{TC}$ is phenyl or naphthyl which may be substituted; $B_{TC}$ is phenylene or naphthylene which may be substituted; $n_{TC}$ is 0 or 1; and $D_{TC}$ is a pyrazolyl group which may be substituted. However, in the case where $A_{TC}$ is a phenyl group which may be substituted, and $B_{TC}$ is a phenylene group of Formula T:

Formula T

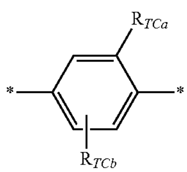

(In the formula, $R_{TCa}$ is OH or an alkoxy group having 1 to 4 carbon atoms; and $R_{TCb}$ is H or an alkyl group having 1 to 4 carbon atoms, a hydroxyl group, an alkoxy group having 1 to 4 carbon atoms, a dialkylamino group having 1 to 3 carbon atoms or a group of Formula $NHCOR_{TCc}$ (wherein, $R_{TCc}$ is an alkyl group having 1 to 3 carbon atoms or an amino group); and * is a bonding point of $B_{TC}$ to the azo linking group in Formula (TC-1)), $A_{TC}$ does not contain a nitro group]

Optional substituents which may be present on $A_{TC}$ or $B_{TC}$ are, preferably, each independently selected from hydroxy, halo, nitro, cyano, carboxy, sulfo, phosphate, amino which may be substituted (particularly, amino having one or more alkyl groups having 1 to 4 carbon atoms), acylamino which may be substituted (particularly, acylamino having 1 to 4 carbon atoms or phenylacylamino, and each group may have a sulfo or carboxyl group), ureido which may be substituted (particularly, ureido having one or two alkyl groups having 1 to 4 carbon atoms), alkyl having 1 to 6 carbon atoms which may be substituted, cycloalkyl having 1 to 6 carbon atoms which may be substituted, alkoxy having 1 to 6 carbon atoms which may be substituted, alkylthio having 1 to 6 carbon atoms which may be substituted, aryl which may be substituted, alkylsulfonyl having 1 to 6 carbon atoms which may be substituted and sulfonamide which may be substituted (particularly, sulfonamide having one or two alkyl groups having 1 to 4 carbon atoms).

In the case where $A_{TC}$ is substituted phenyl or naphthyl, optional substituents on $A_{TC}$ are more preferably selected from nitro, carboxy, sulfo, phosphate, amino which may be substituted (particularly, amino having one or more alkyl groups having 1 to 4 carbon atoms), acylamino which may be substituted (particularly, acylamino having 1 to 4 carbon atoms or phenylacylamino, and each group may have a sulfo or carboxyl group), ureido which may be substituted (particularly, ureido having one or two alkyl groups having 1 to 4 carbon atoms), alkyl having 1 to 6 carbon atoms which may be substituted, cycloalkyl having 1 to 6 carbon atoms which may be substituted, alkoxy having 1 to 6 carbon atoms which may be substituted and sulfonamide ($SO_2NR_{TC}{}^6R_{TC}{}^7$) which may be substituted (particularly, sulfonaminde having one or two alkyl groups having 1 to 4 carbon atoms) and carbonamide ($CONR_{TC}{}^6R_{TC}{}^7$) (wherein, $R_{TC}{}^6$ and $R_{TC}{}^7$ each independently represent H or alkyl having 1 to 6 carbon atoms which may be substituted) which may be substituted.

In the case where $A_{TC}$ is substituted phenyl or naphthyl, optional substituents on $A_{TC}$ are most preferably selected from nitro, carboxy, sulfo, phosphate, amino which may be substituted (particularly, amino having one or more alkyl groups having 1 to 4 carbon atoms), acylamino which may be substituted (particularly, acylamino having 1 to 4 carbon atoms or phenylacylamino, and each group may have a sulfo or carboxyl group), alkyl having 1 to 6 carbon atoms which may be substituted, cycloalkyl having 1 to 6 carbon atoms which may be substituted and alkoxy having 1 to 6 carbon atoms which may be substituted. Further, $A_{TC}$ also preferably have at least one water-solubilizing group selected from carboxy, sulfo and phosphate.

Examples of the phenyl or naphthyl group which may be substituted, represented by $A_{TC}$ may include 4-amino-2,5-disulfophenyl, 2-sulfo-4-methoxyphenyl, 2-carboxy-4-sulfophenyl, 2-sulfo-4-methylphenyl, 2-methoxy-5-methyl-4-sulfophenyl and 2-sulfo-4,5-dimethylphenyl. However, $A_{TC}$ is most suitably a phenyl group which may be substituted (most preferably, substituted as described above).

In the case where $B_{TC}$ is substituted phenylene or naphthylene, optional substituents on $B_{TC}$ are preferably selected from carboxy, sulfo, phosphate, amino which may be substituted, acylamino which may be substituted, ureido which may be substituted, alkyl which may be substituted, alkoxy which may be substituted and aryl which may be substituted.

In the case where $B_{TC}$ is substituted phenylene, the phenylene ring preferably has one or more groups selected from alkyl having 1 to 6 carbon atoms which may be substituted, alkylthio having 1 to 6 carbon atoms which may be substituted, alkoxy having 1 to 6 carbon atoms which may be substituted, amino which may be substituted, ureido which may be substituted, carboxy and sulfo.

In the case where $B_{TC}$ is naphthylene which may be substituted, the naphthylene ring preferably has one or more water-solubilizing group, more preferably one or two groups selected from carboxylic acid, sulfonic acid and phosphonic acid.

Examples of the phenylene and naphthylene group which may be substituted, represented by $B_{TC}$, may include 2,5-di(2-hydroxyethoxy)phen-1,4-ylene, 2,5-dimethoxyphen-1,4-ylene, 2,5-diepoxyphen-1,4-ylene, 2-methoxy-5-aminophen-1,4-ylene, 2-methoxy-5-acetylaminophen-1,4-ylene, 7-sulfonaphtho-1,4-ylene, 6-sulfonaphtho-1,4-ylene and 2-ethoxy-6-sulfonaphtho-1,4-ylene. However, $B_{TC}$ is most suitably a phenylene group which may be substituted (the phenylene group is most preferably substituted as described above).

Preferably, $D_{TC}$ is a pyrazolyl group having at least one carboxy, sulfo or phosphate group. More preferably, $D_{TC}$ is a group of Formula ($3_{TCa}$), ($3_{TCb}$), or ($3_{TCc}$), still more preferably, $D_{TC}$ is a group of Formula ($3_{TCa}$) or ($3_{TCb}$), and most preferably, $D_{TC}$ is a group of Formula ($3_{TCa}$).

$(3_{TCa})$

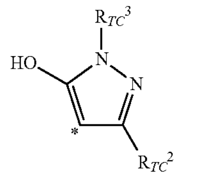

$(3_{TCb})$

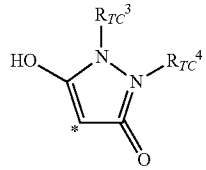

$(3_{TCc})$

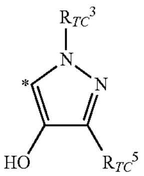

In the formulas, $R_{TC}^2$ and $R_{TC}^5$ are each independently H, carboxy, cyano or alkyl having 1 to 6 carbon atoms which may be substituted, alkoxy having 1 to 6 carbon atoms, acyl, aryl, amino, aminde, carbonamide ($CONR_{TC}^6R_{TC}^7$), carboxyl ester, sulfonamide ($SO_2NR_{TC}^6R_{TC}^7$) or an alkylsulfonyl group (in the formulas, $R_{TC}^6$ and $R_{TC}^7$ are each independently H or alkyl having 1 to 6 carbon atoms which may be substituted);

$R_{TC}^3$ and $R_{TC}^4$ are each independently H, hydroxy, halo, nitro, cyano, carboxy, sulfo, phosphate, amino which may be substituted (particularly, amino having one or more alkyl groups having 1 to 4 carbon atoms), acylamino which may be substituted (particularly, acylamino having 1 to 4 carbon atoms or phenylacylamino, each group may have a sulfo or carboxyl group), ureido which may be substituted (particularly, ureido having one or two alkyl groups having 1 to 4 carbon atoms), alkyl having 1 to 6 carbon atoms which may be substituted, cycloalkyl having 1 to 6 carbon atoms which may be substituted, alkoxy having 1 to 6 carbon atoms which may be substituted, alkylthio having 1 to 6 carbon atoms which may be substituted, aryl which may be substituted, alkylsulfonyl having 1 to 6 carbon atoms which may be substituted and sulfonamide which may be substituted (particularly, sulfonamide having one or two alkyl groups having 1 to 4 carbon atoms); and * represents a bonding point to the azo linking group in Formula (TC-1).

$R_{TC}^2$ is preferably an alkyl having 1 to 6 carbon atoms which may be substituted, alkoxy having 1 to 6 carbon atoms, acyl having 1 to 6 carbon atoms or amino group, or a group such as carboxy capable of forming a hydrogen bond with the adjacent azo group in a form of free acid.

Examples of the most suitable group represented by $R_{TC}^2$ may include methyl, carboxy, $CONR_{TC}^6R_{TC}^7$ and H. However, most preferably, $R_{TC}^2$ is carboxy or $CONR_{TC}^6R_{TC}^7$ ($R_{TC}^6$ and $R_{TC}^7$ are each independently H or alkyl having 1 to 6 carbon atoms which may be substituted).

$R_{TC}^3$ and $R_{TC}^4$ are each independently, most preferably aryl group which may be substituted, and more preferably a phenyl or naphthyl group having one or more substituent selected from carboxy, sulfo, nitro, phosphate, alkyl having 1 to 4 carbon atoms which may be substituted, alkoxy having 1 to 4 carbon atoms which may be substituted, amino which may be substituted or acylamino having 1 to 4 carbon atoms which may be substituted.

Examples of the group represented by $R_{TC}^3$ and $R_{TC}^4$ may include 4-sulfophenyl and 2-sulfonaphthyl, but not limited thereto. $R_{TC}^5$ is most preferably a carboxy or alkylcarboxyl ester having 1 to 4 carbon atoms.

The suitable alkyl group having 1 to 6 carbon atoms and alkoxy group having 1 to 6 carbon atoms which may be substituted, which is present in $A_{TC}$, $B_{TC}$, $R_{TC}^2$, $R_{TC}^3$, $R_{TC}^4$ and $R_{TC}^5$, respectively, are an alkyl group having 1 to 4 carbon atoms which may be substituted or an alkoxy group having 1 to 4 carbon atoms which may be substituted, and more preferably an alkyl group having 1 to 4 carbon atoms or an alkoxy group having 1 to 4 carbon atoms which is unsubstituted or has a halo atom, or a carboxy, sulfo or phosphate group, and the like.

The suitable aryl group which may be substituted, in $R_{TC}^2$, $R_{TC}^3$, $R_{TC}^4$ and $R_{TC}^5$, is a phenyl group which may be substituted, and the phenyl group may be substituted with nitro, carboxy, sulfo, phosphate, amino which may be substituted (particularly, amino having one or more alkyl groups having 1 to 4 carbon atoms), acylamino which may be substituted (particularly, acylamino having 1 to 4 carbon atoms or phenylacylamino, and each group may have a sulfo or carboxyl group), alkyl having 1 to 6 carbon atoms which may be substituted, cycloalkyl having 1 to 6 carbon atoms which may be substituted, and alkoxy having 1 to 6 carbon atoms which may be substituted. Further, the phenyl group which may be substituted preferably has at least one water-solubilizing group selected from carboxy, sulfo and phosphate.

The suitable carbonamide or sulfonamide group which may be substituted, which is present in $A_{TC}$, $B_{TC}$, $R_{TC}^2$, $R_{TC}^3$, $R_{TC}^4$ and $R_{TC}^5$, is a group of Formula $CONR_{TC}^6R_{TC}^7$ or $SO_2NR_{TC}^6R_{TC}^7$, respectively, and $R_{TC}^6$ and $R_{TC}^7$ are each independently H or alkyl having 1 to 6 carbon atoms which may be substituted.

The suitable amino group which may be substituted, which is present in $A_{TC}$, $B_{TC}$, $R_{TC}^2$, $R_{TC}^3$, $R_{TC}^4$ and $R_{TC}^5$, respectively, is acylamino which may be substituted, particularly acylamino having 1 to 4 carbon atoms, and more preferably ureido which may be substituted (which is unsubstituted or has a carboxy, sulfo or phosphate group).

Preferably, the acyl group which is present in $A_{TC}$, $B_{TC}$, $R_{TC}^2$, $R_{TC}^3$, $R_{TC}^4$ and $R_{TC}^5$, respectively, is alkylacyl having 1 to 4 carbon atoms which may be substituted or phenylacyl which may be substituted, and preferably acetyl or benzoyl.

The suitable substituents which may be present in alkyl having 1 to 6 carbon atoms which may be substituted, alkoxy having 1 to 6 carbon atoms, alkylthio having 1 to 6 carbon atoms, aryl and alkylsulfonyl substituent having 1 to 6 carbon atoms, which is in any of $A_{TC}$, $B_{TC}$, $R_{TC}^2$, $R_{TC}^3$, $R_{TC}^4$, $R_{TC}^5$, $R_{TC}^6$ and $R_{TC}^7$, are independently selected from hydroxy, halo, nitro, cyano, carboxy, sulfo, phosphate, acylamino, ureido, alkyl having 1 to 6 carbon atoms, preferably alkyl having 1 to 6 carbon atoms, more preferably methyl or ethyl, alkoxy having 1 to 6 carbon atoms, preferably alkoxy having 1 to 4 carbon atoms, more preferably methoxy or ethoxy, alkylthio having 1 to 10 carbon atoms, aryl, preferably phenyl or naphthyl, alkylsulfonyl having 1 to 6 carbon atoms and sulfonamide.

Considering the preference, in a suitable aspect, $A_{TC}$ is phenyl having one or two substituents selected from carboxy, sulfo, phosphate, amino, methyl, methoxy and acetamide;

$B_{TC}$ is phenylene or naphthylene having one or two substituents selected from sulfo, methyl, methoxy and 2-hydroxyethoxy;

$n_{TC}$ is 0 or 1;

$D_{TC}$ is a group of Formula ($3_{TCa}$), ($3_{TCb}$), or ($3_{TCc}$):

($3_{TCa}$)

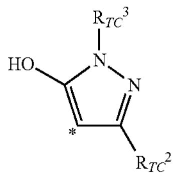

($3_{TCb}$)

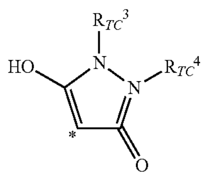

($3_{TCc}$)

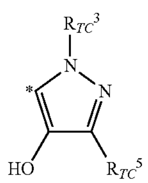

[In the formulas, $R_{TC}^2$ is H, methyl or carboxy; $R_{TC}^3$ and $R_{TC}^4$ are each independently phenyl having one or two substituents selected from sulfo and carboxy; $R_{TC}^5$ is alkylcarboxyl ester having 1 to 4 carbon atoms; and * represents a bonding point to the azo linking group in Formula (TC-1)].

In a further suitable aspect, $A_{TC}$ is phenyl having one or two substituents selected from carboxy, sulfo, amino, methyl, methoxy and acetamide;

$B_{TC}$ is phenylene or naphthylene having one or two substituents selected from sulfo, methyl, methoxy and 2-hydroxyethoxy;

$n_{TC}$ is 0 or 1; and $D_{TC}$ is a group of Formula ($3_{TCa}$), ($3_{TCb}$) or ($3_{TCc}$):

($3_{TCa}$)

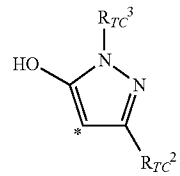

($3_{TCb}$)

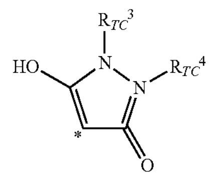

($3_{TCc}$)

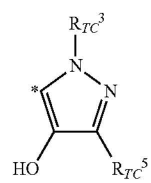

[In the formulas, $R_{TC}^2$ and $R_{TC}^5$ are each independently H, carboxy, cyano or alkyl which may be substituted, alkoxy, acyl, aryl, amino, amide, carbonamide, carboxyl ester, sulfamoyl or alkylsulfonyl; $R_{TC}^3$ and $R_{TC}^4$ are each independently H, or aryl or alkyl which may be substituted; and * represents a bonding point to the azo linking group in Formula (TC-1)].

In a further suitable aspect of the present invention, provided is a compound of Formula (TC-2):

Formula (TC-2)

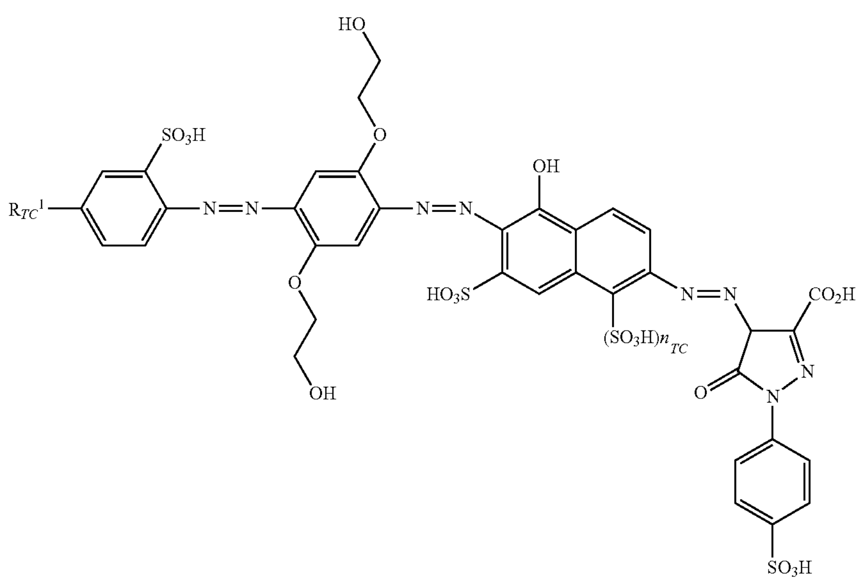

[In the formula, $R_{TC}^1$ is alkyl having 1 to 4 carbon atoms or alkoxy having 1 to 4 carbon atoms; and $n_{TC}$ is 0 or 1]. In the compound of Formula (TC-2), $R_{TC}^1$ is preferably methyl or methoxy.

Specific examples of the compounds of Formulas (TC-1) and (TC-2) may be exemplified by those described in Paragraphs [0095] to [0115] of Japanese National Publication of International Patent Application No. 2007-517082.

The compounds of Formula (TC-1) and (TC-2) may be prepared, for example by the method described in Japanese National Publication of International Patent Application No. 2007-517082.

Further, the compounds of Formula (TC-1) and (TC-2) may be converted into a desired salt by using any known technologies. For example, the method described in Japanese National Publication of International Patent Application No. 2007-517082 may be exemplified.

It is also preferred that the compound having three azo groups conjugated with each other per molecule is a trisazo compound represented by the following Formula (TD-1) or a salt thereof.

Formula (TD-1)

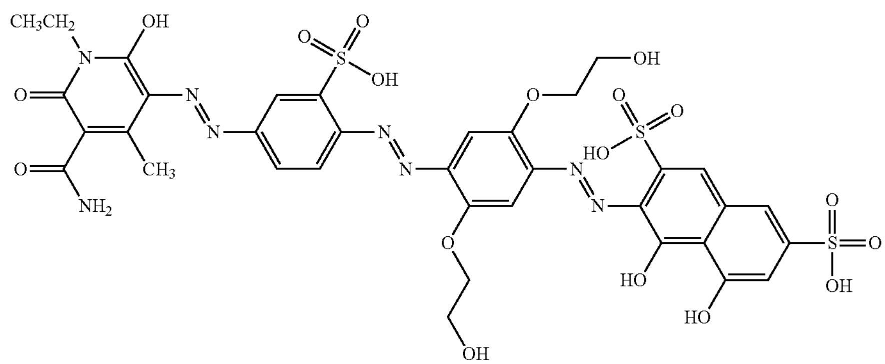

When the compound of Formula (TD-1) is in a form of salt, a preferred salt is an alkali metal salt, particularly each salt of lithium, sodium and potassium, or each salt of ammonium and substituted ammonium. A particularly preferred salt is a salt with ammonia and volatile amine. The free acid form of the compound may be converted into a salt by using any known techniques. For example, an alkali metal salt may be converted into a salt with ammonia or amine by dissolving the alkali metal salt having the composition in water, acidifying the solution with an inorganic acid, adjusting pH of the solution to 9 to 9.5 with ammonia or amine, and then removing the alkali metal cation by dialysis.

[Compound having four azo groups conjugated with each other per molecule (tetrakisazo compound)]

A compound having four azo groups conjugated with each other per molecule may be used as the second water-soluble long-wavelength dye related to the present invention.

The compound having four azo groups conjugated with each other per molecule is preferably a compound represented by the following Formula (QA-1).

Formula (QA-1)

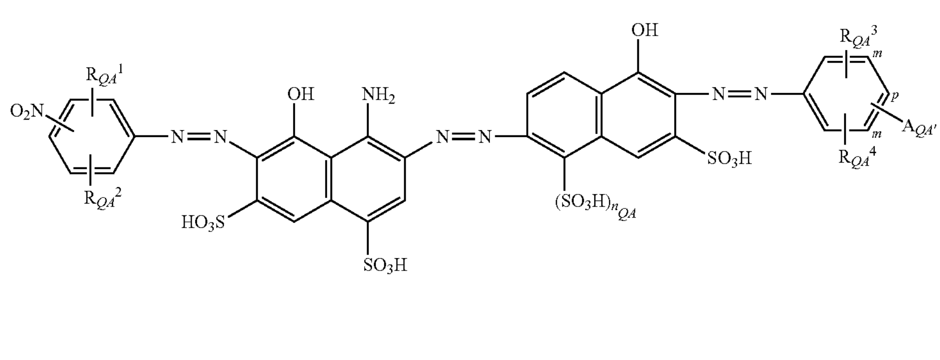

In Formula (QA-1), $A_{QA}'$ is represented by the following Formula (QA-1a-1), the substitution position of $A_{QA}'$ is the m-position or p-position with respect to the azo group, $R_{QA}^1$ and $R_{QA}^2$ each independently represent a hydrogen atom; a halogen atom; a cyano group; carboxyl group; a sulfo group; a sulfamoyl group; an N-alkylaminosulfonyl group; an N-phenylaminosulfonyl group; a phospho group; a nitro group; an acyl group; a ureido group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfo group or a carboxyl group; or an acylamino group which may be substituted with an alkoxy group having 1 to 4 carbon atoms, a sulfo group or a carboxyl group, $R_{QA}^3$ and $R_{QA}^4$ each independently represent a hydrogen atom; a halogen atom; a cyano group; a carboxyl group; a sulfo group; a nitro group; an alkyl group having 1 to 4 carbon atoms; a hydroxyl group; or an alkoxy group having 1 to 4 carbon atoms which may be substituted with an alkoxy group having 1 to 4 carbon atoms or a sulfo group, and $n_{QA}$ is 0 or 1.

Formula (QA-1a-1)

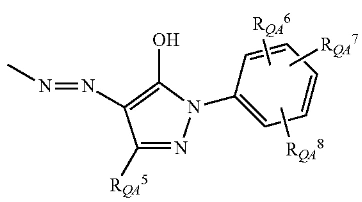

In Formula (QA-1a-1), $R_{QA}^5$ represents a cyano group; a carboxyl group; an alkyl group having 1 to 4 carbon atoms; an alkoxycarbonyl group having 1 to 4 carbon atoms or a phenyl group, and $R_{QA}^6$, $R_{QA}^7$ and $R_{QA}^8$ each independently represent a hydrogen atom; a halogen atom; a cyano group; a carboxyl group; a sulfo group; a nitro group, an alkyl group having 1 to 4 carbon atoms; an alkoxy group having 1 to 4 carbon atoms which may be substituted with a hydroxyl group, an alkoxy group having 1 to 4 carbon atoms or a sulfo group; or an acylamino group which may be substituted with a hydroxyl group, an alkoxy group having 1 to 4 carbon atoms or a sulfo group.

Specific examples of preferred compounds of the compound represented by Formula (QA-1) and a salt thereof are shown below, but not limited thereto. Further, although the following specific examples (Compound Nos. Qa-1 to Qa-27) are shown as a free acid structure, it is understood that any salt may be used.

TABLE 13

| Compound No. | Structural Formula |
|---|---|
| Qa-1 | 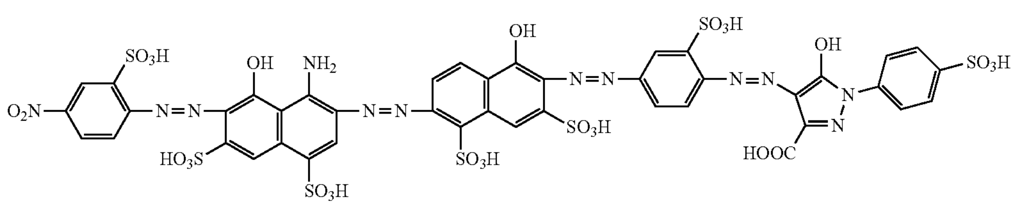 [SMILES: Nc1c(N=Nc2ccc3c(O)c(N=Nc4ccc(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| Qa-2 | 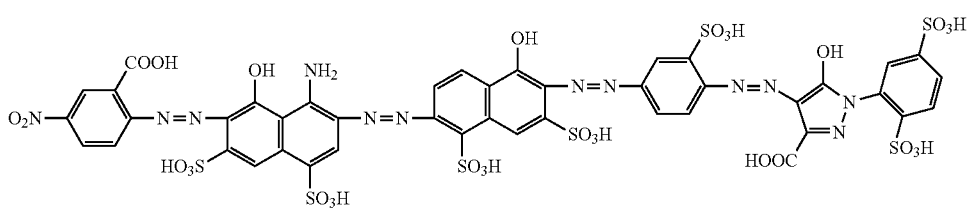 [SMILES: Nc1c(N=Nc2ccc3c(O)c(N=Nc4ccc(N=Nc5c(C(=O)O)nn(-c6cc(S(=O)(=O)O)ccc6S(=O)(=O)O)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3C(=O)O)c(O)c12] |
| Qa-3 | 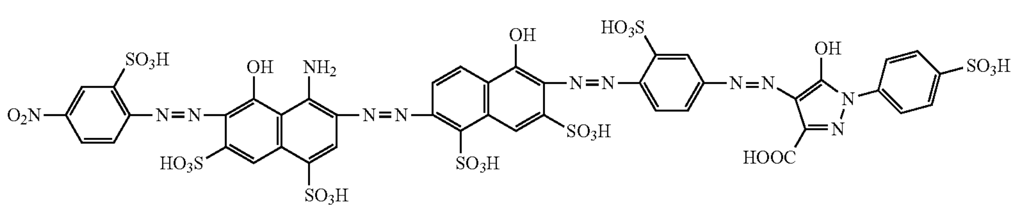 [SMILES: Nc1c(N=Nc2ccc3c(O)c(N=Nc4ccc(N=Nc5c(C(=O)O)nn(-c6ccc(S(=O)(=O)O)cc6)c5O)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

TABLE 13-continued
| Compound No. | Structural Formula |
|---|---|
| Qa-4 | 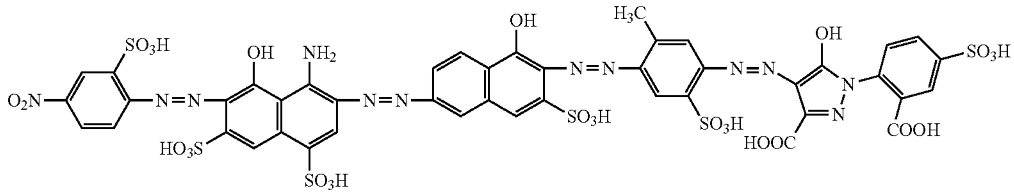 [SMILES: Cc1cc(N=Nc2c(C(=O)O)nn(-c3ccc(S(=O)(=O)O)cc3C(=O)O)c2O)c(S(=O)(=O)O)cc1N=Nc1c(S(=O)(=O)O)cc2cc(N=Nc3cc(S(=O)(=O)O)c4cc(S(=O)(=O)O)c(N=Nc5ccc([N+](=O)[O-])cc5S(=O)(=O)O)c(O)c4c3N)ccc2c1O] |
| Qa-5 | 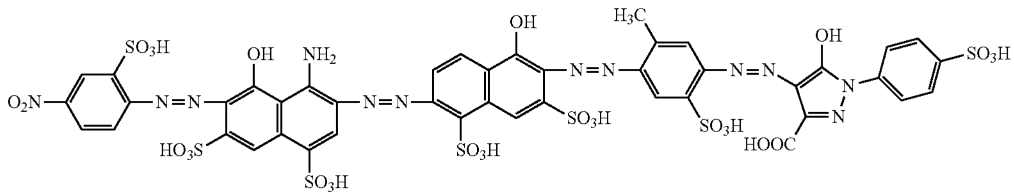 [SMILES: Cc1cc(N=Nc2c(C(=O)O)nn(-c3ccc(S(=O)(=O)O)cc3)c2O)c(S(=O)(=O)O)cc1N=Nc1c(S(=O)(=O)O)cc2c(S(=O)(=O)O)c(N=Nc3cc(S(=O)(=O)O)c4cc(S(=O)(=O)O)c(N=Nc5ccc([N+](=O)[O-])cc5S(=O)(=O)O)c(O)c4c3N)ccc2c1O] |
| Qa-6 | 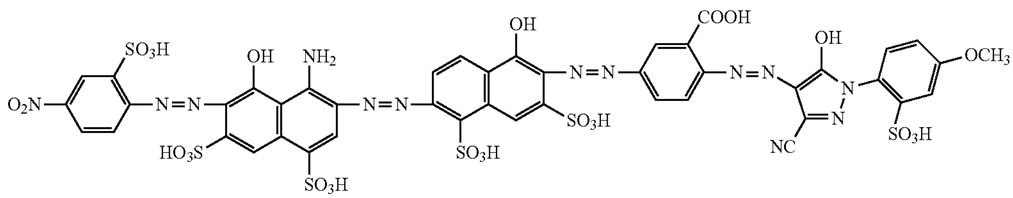 [SMILES: COc1ccc(-n2nc(C#N)c(N=Nc3ccc(N=Nc4c(S(=O)(=O)O)cc5c(S(=O)(=O)O)c(N=Nc6cc(S(=O)(=O)O)c7cc(S(=O)(=O)O)c(N=Nc8ccc([N+](=O)[O-])cc8S(=O)(=O)O)c(O)c7c6N)ccc5c4O)cc3C(=O)O)c2O)c(S(=O)(=O)O)c1] |
| Qa-7 | 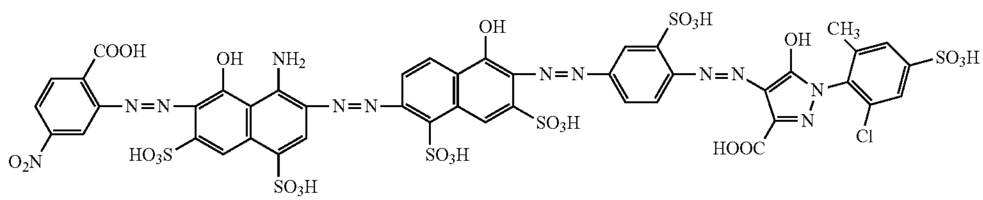 [SMILES: Cc1cc(S(=O)(=O)O)cc(Cl)c1-n1nc(C(=O)O)c(N=Nc2ccc(N=Nc3c(S(=O)(=O)O)cc4c(S(=O)(=O)O)c(N=Nc5cc(S(=O)(=O)O)c6cc(S(=O)(=O)O)c(N=Nc7cc([N+](=O)[O-])ccc7C(=O)O)c(O)c6c5N)ccc4c3O)cc2S(=O)(=O)O)c1O] |
TABLE 14
| Compound No. | Structural Formula |
|---|---|
| Qa-8 | 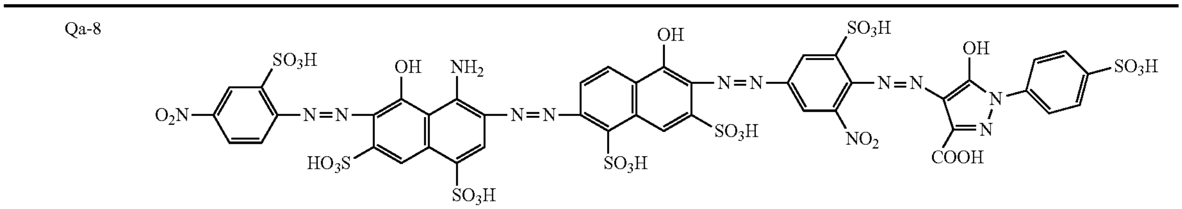 |
| Qa-9 | 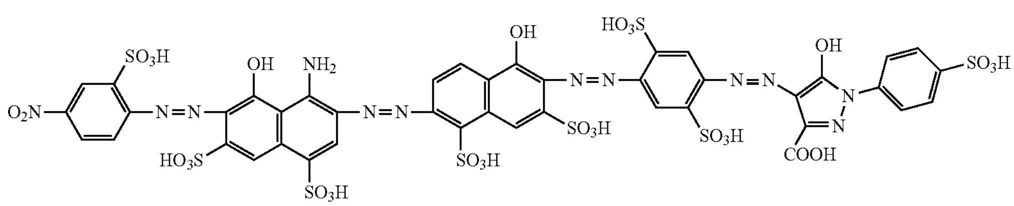 [SMILES: Nc1c(N=Nc2ccc3c(O)c(N=Nc4cc(S(=O)(=O)O)c(N=Nc5c(C(=O)O)nn(-c6ccc(S(=O)(=O)O)cc6)c5O)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

TABLE 14-continued
| Compound No. | Structural Formula |
| --- | --- |
| Qa-10 | 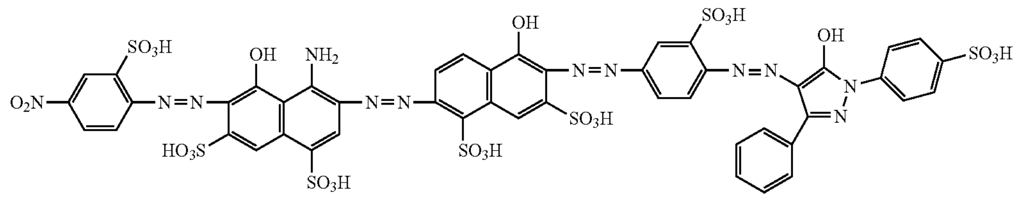 [SMILES: Nc1c(N=Nc2ccc3c(O)c(N=Nc4ccc(N=Nc5c(-c6ccccc6)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| Qa-11 | 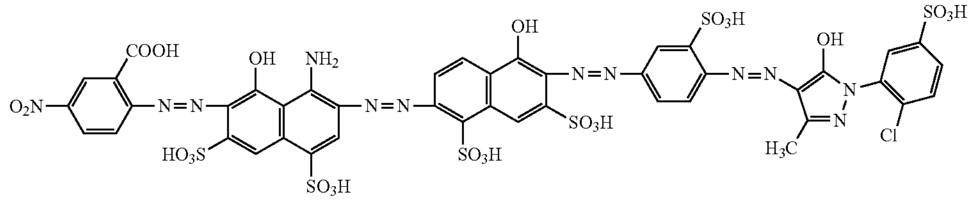 [SMILES: Cc1nn(-c2cc(S(=O)(=O)O)ccc2Cl)c(O)c1N=Nc1ccc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6C(=O)O)c(O)c5c4N)ccc3c2O)cc1S(=O)(=O)O] |
| Qa-12 | 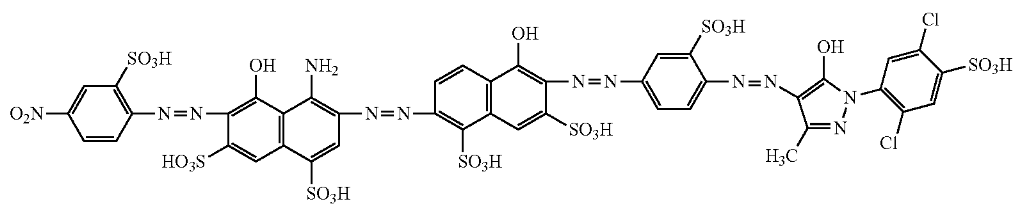 [SMILES: Cc1nn(-c2cc(Cl)c(S(=O)(=O)O)cc2Cl)c(O)c1N=Nc1ccc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6S(=O)(=O)O)c(O)c5c4N)ccc3c2O)cc1S(=O)(=O)O] |
| Qa-13 | 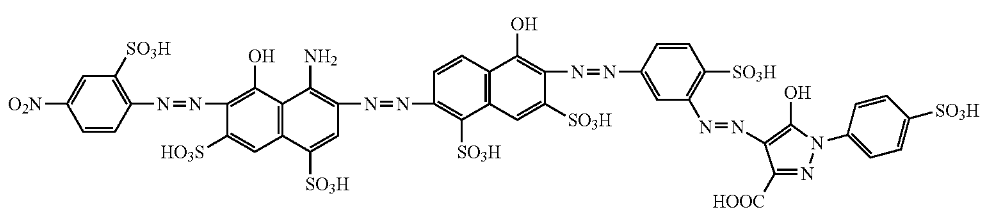 [SMILES: Nc1c(N=Nc2ccc3c(O)c(N=Nc4ccc(S(=O)(=O)O)c(/N=N/c5c(C(=O)O)nn(-c6ccc(S(=O)(=O)O)cc6)c5O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| Qa-14 | 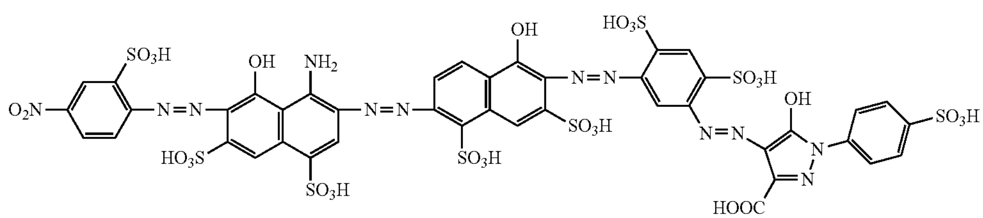 [SMILES: Nc1c(N=Nc2ccc3c(O)c(N=Nc4cc(/N=N/c5c(C(=O)O)nn(-c6ccc(S(=O)(=O)O)cc6)c5O)c(S(=O)(=O)O)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
TABLE 15
| Compound No. | Structural Formula |
| --- | --- |
| Qa-15 | 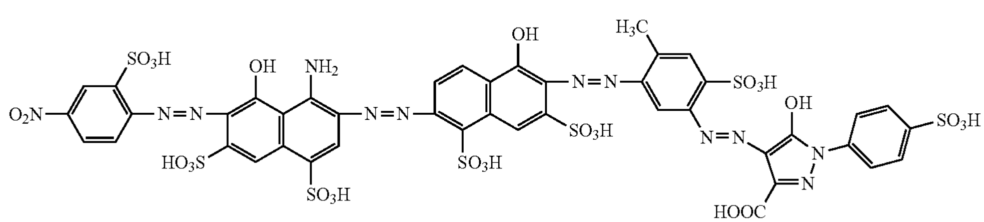 [SMILES: Cc1cc(S(=O)(=O)O)c(/N=N/c2c(C(=O)O)nn(-c3ccc(S(=O)(=O)O)cc3)c2O)cc1N=Nc1c(S(=O)(=O)O)cc2c(S(=O)(=O)O)c(N=Nc3cc(S(=O)(=O)O)c4cc(S(=O)(=O)O)c(N=Nc5ccc([N+](=O)[O-])cc5S(=O)(=O)O)c(O)c4c3N)ccc2c1O] |

TABLE 15-continued
| Compound No. | Structural Formula |
|---|---|
| Qa-16 | 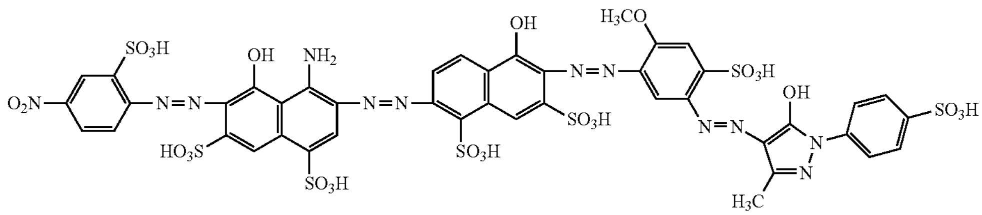 [SMILES: COc1cc(S(=O)(=O)O)c(/N=N/c2c(C)nn(-c3ccc(S(=O)(=O)O)cc3)c2O)cc1N=Nc1c(S(=O)(=O)O)cc2c(S(=O)(=O)O)c(N=Nc3cc(S(=O)(=O)O)c4cc(S(=O)(=O)O)c(N=Nc5ccc([N+](=O)[O-])cc5S(=O)(=O)O)c(O)c4c3N)ccc2c1O] |
| Qa-17 | 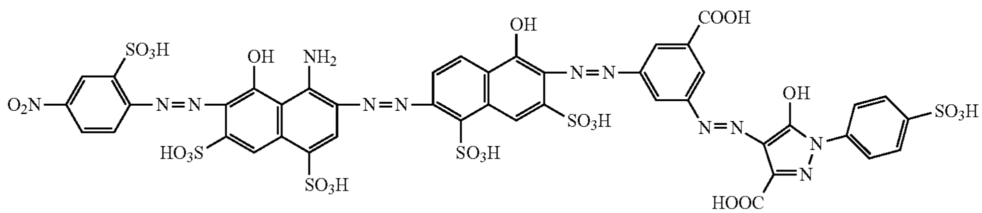 [SMILES: Nc1c(N=Nc2ccc3c(O)c(N=Nc4cc(/N=N/c5c(C(=O)O)nn(-c6ccc(S(=O)(=O)O)cc6)c5O)cc(C(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| Qa-18 | 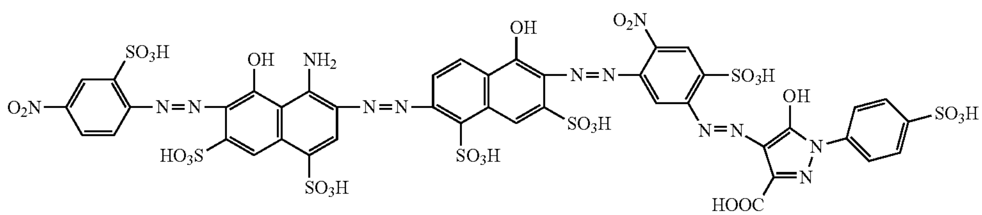 [SMILES: Nc1c(N=Nc2ccc3c(O)c(N=Nc4cc(/N=N/c5c(C(=O)O)nn(-c6ccc(S(=O)(=O)O)cc6)c5O)c(S(=O)(=O)O)cc4[N+](=O)[O-])c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| Qa-19 | 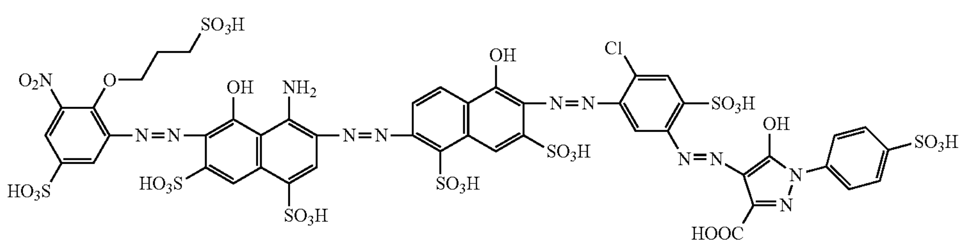 [SMILES: Nc1c(N=Nc2ccc3c(O)c(N=Nc4cc(/N=N/c5c(C(=O)O)nn(-c6ccc(S(=O)(=O)O)cc6)c5O)c(S(=O)(=O)O)cc4Cl)c(S(=O)(=O)O)cc3c2S(=O)(=O)O)cc(S(=O)(=O)O)c2cc(S(=O)(=O)O)c(N=Nc3cc(S(=O)(=O)O)cc([N+](=O)[O-])c3OCCCS(=O)(=O)O)c(O)c12] |
| Qa-20 | 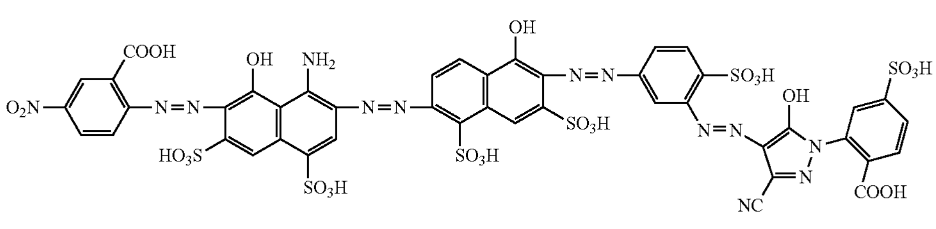 [SMILES: N#Cc1nn(-c2cc(S(=O)(=O)O)ccc2C(=O)O)c(O)c1/N=N/c1cc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6C(=O)O)c(O)c5c4N)ccc3c2O)ccc1S(=O)(=O)O] |
| Qa-21 | 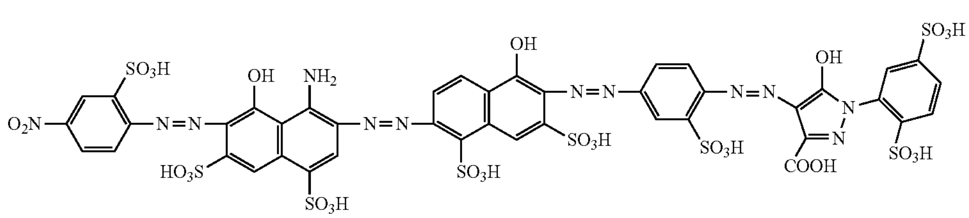 [SMILES: Nc1c(N=Nc2ccc3c(O)c(N=Nc4ccc(N=Nc5c(C(=O)O)nn(-c6cc(S(=O)(=O)O)ccc6S(=O)(=O)O)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

TABLE 16
| Compound No. | Structural Formula |
| --- | --- |
| Qa-22 | 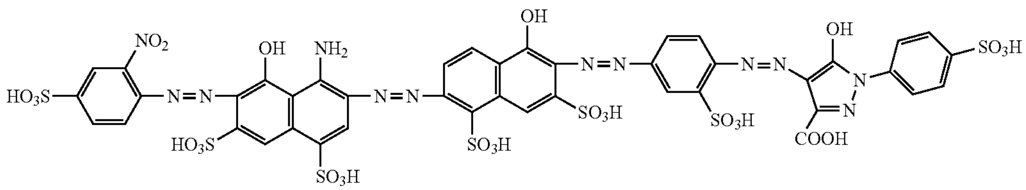 [SMILES: Nc1c(N=Nc2ccc3c(O)c(N=Nc4ccc(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc(S(=O)(=O)O)cc3[N+](=O)[O-])c(O)c12] |
| Qa-23 | 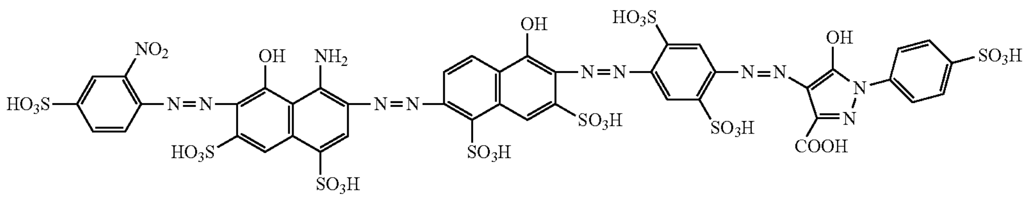 [SMILES: Nc1c(N=Nc2ccc3c(O)c(N=Nc4cc(S(=O)(=O)O)c(N=Nc5c(C(=O)O)nn(-c6ccc(S(=O)(=O)O)cc6)c5O)cc4S(=O)(=O)O)c(S(=O)(=O)O)cc3c2S(=O)(=O)O)cc(S(=O)(=O)O)c2cc(S(=O)(=O)O)c(N=Nc3ccc(S(=O)(=O)O)cc3[N+](=O)[O-])c(O)c12] |
| Qa-24 | 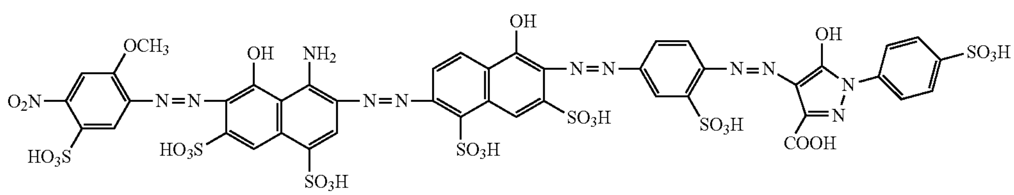 [SMILES: COc1cc([N+](=O)[O-])c(S(=O)(=O)O)cc1N=Nc1c(S(=O)(=O)O)cc2c(S(=O)(=O)O)cc(N=Nc3ccc4c(O)c(N=Nc5ccc(N=Nc6c(C(=O)O)nn(-c7ccc(S(=O)(=O)O)cc7)c6O)c(S(=O)(=O)O)c5)c(S(=O)(=O)O)cc4c3S(=O)(=O)O)c(N)c2c1O] |
| Qa-25 | 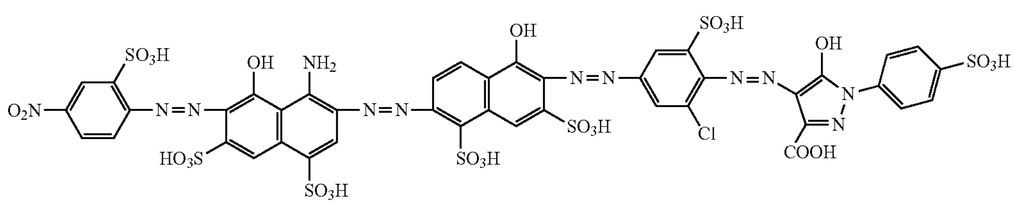 [SMILES: Nc1c(N=Nc2ccc3c(O)c(N=Nc4cc(Cl)c(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| Qa-26 | 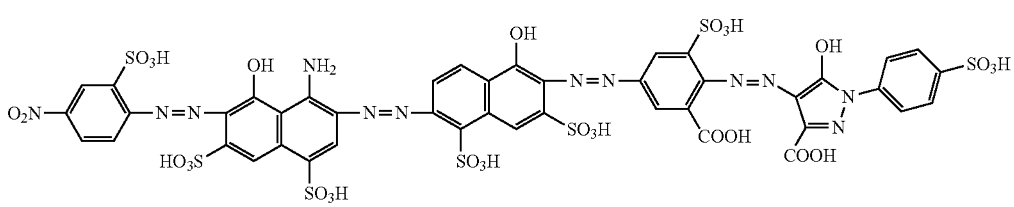 [SMILES: Nc1c(N=Nc2ccc3c(O)c(N=Nc4cc(C(=O)O)c(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| Qa-27 | 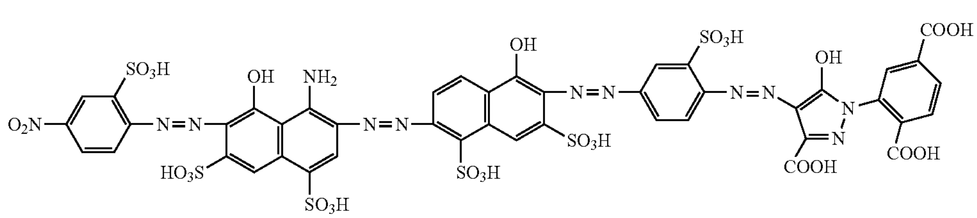 [SMILES: Nc1c(N=Nc2ccc3c(O)c(N=Nc4ccc(N=Nc5c(C(=O)O)nn(-c6cc(C(=O)O)ccc6C(=O)O)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |

Detailed description of the compound represented by Formula (QA-1) and a salt thereof is found in International Publication No. WO05/097912, and the compounds described in the publication may be preferably used.

It is also preferred that the compound having four azo groups conjugated with each other per molecule is a teterakisazo compound represented by Formula (QB-1) or a salt thereof.

Formula (QB-1)

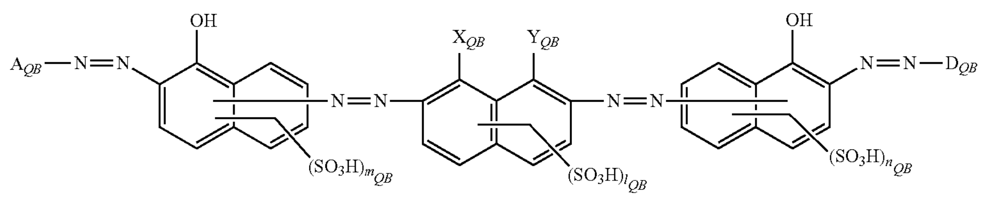

(In the formula, $A_{QB}$ and $D_{QB}$ each independently represent a phenyl group, a naphthyl group or a 5- or 6-membered aromatic heterocyclic group bound via a carbon atom to an azo group, which may be substituted, and each component contains at least one carboxyl group or sulfo group. One of $X_{QB}$ and $Y_{QB}$ is a hydroxyl group and the other is an amino group, and $l_{QB}$, $m_{QB}$ and $n_{QB}$ represent 1 or 2.)

It is preferred that the tetrakisazo compound represented by Formula (QB-1) or a salt thereof is a teterakisazo compound represented by the following Formula (QB-2) or a salt thereof.

It is more preferred that $A_{QB}$ and $D_{QB}$ are each independently a phenyl group which has a sulfo group at the o-position with respect to the azo group, and may be substituted with a nitro group, an alkoxy group or a sulfo group.

In Formulas (QB-1) and (QB-2), it is preferred that the salt is a lithium salt, a sodium salt, a potassium salt, an ammonium salt or an ammonium salt represented by Formula (QB-3).

Formula (QB-3)

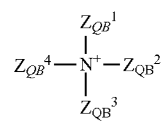

(In Formula (QB-3), $Z_{QB}^1$, $Z_{QB}^2$, $Z_{QB}^3$ and $Z_{QB}^4$ each independently represent a hydrogen atom, an alkyl group, a hydroxyalkyl group or a hydroxyalkoxyalkyl group.)

Formula (QB-2)

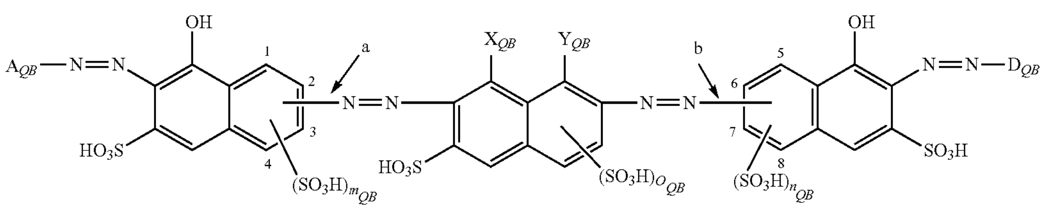

(In the formula, $A_{QB}$ and $D_{QB}$ each independently represent a phenyl group, a naphthyl group or a 5- or 6-membered aromatic heterocyclic group bound via a carbon atom to an azo group, which may be substituted, and each component contains at least one carboxyl group or sulfo group. a and b each represent a single bond, the bonding position of Bond a is the 2- or 3-position, and the bonding position of Bond b is the 6- or 7-position. One of $X_{QB}$ and $Y_{QB}$ is a hydroxyl group and the other is an amino group, and $m_{QB}$, $n_{QB}$ and $o_{QB}$ each represent 0 or 1.)

In Formulas (QB-1) and (QB-2), it is preferred that $A_{QB}$ and $D_{QB}$ are each independently a phenyl group or a naphthyl group which may be substituted with a substituent containing at least one carboxyl group and/or sulfo group.

Further, it is preferred that the substituent with which $A_{QB}$ and $D_{QB}$ are substituted is a halogen atom; a hydroxyl group; an amino group; a carboxyl group; a sulfo group; a nitro group; an alkyl group; an alkoxy group; an acyl group; a phenyl group; a ureido group; an alkyl group substituted with a hydroxyl group, an alkoxy group, a sulfo group or a carboxyl group; an alkoxy group substituted with a hydroxyl group, an alkoxy group, a sulfo group or a carboxyl group; a phenyl group, an alkyl group or an amino group substituted with an acyl group, which may be substituted with a carboxyl group or a sulfo group.

In Formulas (QB-1) to (QB-3), the alkyl group or the alkoxy group refers to an alkyl group or an alkoxy group having generally about 1 to 20 carbon atoms, preferably about 1 to 6 carbon atoms, and more preferably an alkyl group (having 1 to 4 carbon atoms) or an alkoxy group (having 1 to 4 carbon atoms). Examples of the alkyl group (having 1 to 4 carbon atoms) may include methyl, ethyl, n-propyl, isopropyl, n-butyl, isobutyl, sec-butyl, tert-butyl and the like. Further, examples of the alkoxy group (having 1 to 4 carbon atoms) may include methoxy, ethoxy, n-propoxy, isopropoxy, n-butoxy, sec-butoxy, tert-butoxy and the like.

In Formulas (QB-1) and (QB-2), $A_{QB}$ and $D_{QB}$ each independently represent a phenyl group, a naphthyl group or a 5- or 6-membered aromatic heterocyclic group bound via a carbon atom to an azo group, which may be substituted, and each component of $A_{QB}$ and $D_{QB}$ contains at least one carboxyl group and/or sulfo group. The sulfo group may be substituted directly on the phenyl group or the naphthyl group, or may be contained in the substituent on the phenyl group or the naphthyl group. Examples of the 5- or 6-membered aromatic heterocyclic group bound via a carbon atom to an azo group may include a heterocyclic ring having at least one heteroatom selected from a nitrogen atom, an oxygen atom and a sulfur atom in the ring. The heterocyclic group may be condensed with another ring, and among the condensed ring, it is preferred that a 5- or 6-membered ring is condensed. Further, $A_{QB}$ and $D_{QB}$ are, among them, more preferably a phenyl group or a naphthyl group. Examples of the substituent with which $A_{QB}$ to $D_{QB}$ may be substituted may include methyl, methoxy, ethyl, ethoxy, 2-hydroxyethoxy, 2-methoxyethoxy, 3-sulfopropoxy, 4-sulfobutoxy, chlorine, bromine, carboxyl, sulfonate, hydroxyl, amino, carboxymethylamino, carboxypropylamino, bis-carboxymethylamino, acetylamino, ureido, phenylamino, sulfophenylamino, carboxyphenylamino, dicarboxyphenylamino and the like, more preferably methyl, methoxy, sulfonate, hydroxyl, amino, acetylamino, phenylamino, sulfophenylamino, carboxyphenylamino and dicarboxyphenylamino. Preferred are methoxy, amino, hydroxyl, sulfonate, carboxyl, acetylamino and phenylamino.

Preferred $A_{QB}$ may be a phenyl group having at least one sulfonate group directly or as a sulfoalkoxy (having 1 to 4 carbon atoms) group at the ortho- or meta-position, more preferably at the ortho-position with respect to the azo group, or a naphthyl group having one to three sulfonate groups, more preferably a phenyl group. The phenyl group may have one to two, more preferably one of the aforementioned group as a preferred substituent of $A_{QB}$ and $D_{QB}$. In the case where the phenyl group has two substituents including the sulfonate group, preferred are the 2- and 4-positions, the 2- and 5-positions or the 3- or 4-positions on the phenyl group, and more preferred are the 2- and 4-positions.

Preferred $D_{QB}$ may be, independently from $A_{QB}$, the same groups as the aforementioned preferred $A_{QB}$.

A preferred compound of Formula (QB-2) may be a compound which has the aforementioned preferred $A_{QB}$ and $D_{QB}$, and in which $m_{QB}$ and $n_{QB}$ are all independently 0 or 1, $o_{QB}$ is 1 or 2, more preferably 2, Bond a is at the 2- or 3-position, Bond b is at the 6- or 7-position, one of $X_{QB}$ and $Y_{QB}$ is a hydroxyl group, and the other is an amino group.

Specifically, the following structures may be exemplified as suitable examples of the compound represented by Formula (QB-1) of the present invention, but not particularly limited thereto.

TABLE 17

| Compound No. | Structural Formula |
|---|---|
| Qb-1 | 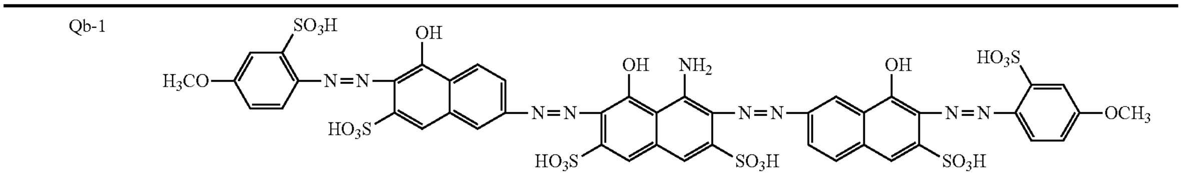 |
| Qb-2 | 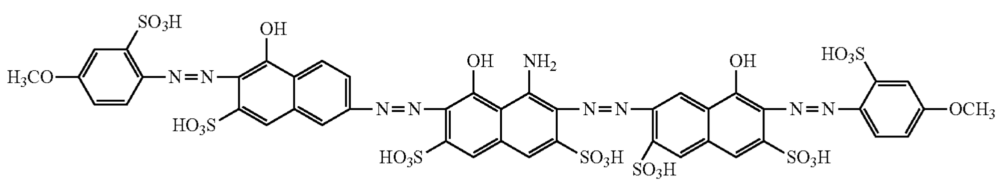 [SMILES: COc1ccc(N=Nc2c(S(=O)(=O)O)cc3cc(N=Nc4c(S(=O)(=O)O)cc5cc(S(=O)(=O)O)c(N=Nc6cc7c(O)c(N=Nc8ccc(OC)cc8S(=O)(=O)O)c(S(=O)(=O)O)cc7cc6S(=O)(=O)O)c(N)c5c4O)ccc3c2O)c(S(=O)(=O)O)c1] |
| Qb-3 | 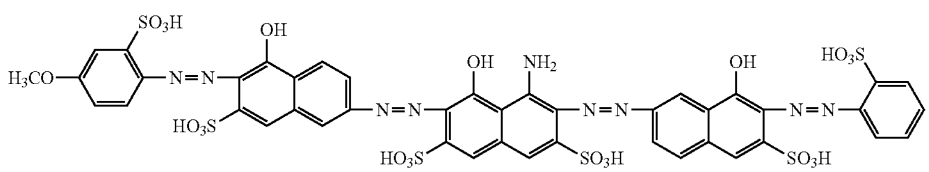 [SMILES: COc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8ccccc8S(=O)(=O)O)c(O)c7c6)c(N)c5c4O)ccc3c2O)c(S(=O)(=O)O)c1] |
| Qb-4 | 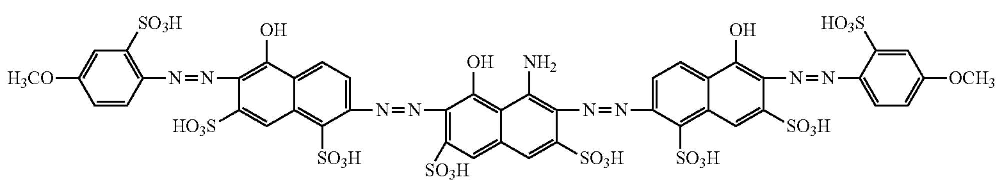 [SMILES: COc1ccc(N=Nc2c(S(=O)(=O)O)cc3c(S(=O)(=O)O)c(N=Nc4c(S(=O)(=O)O)cc5cc(S(=O)(=O)O)c(N=Nc6ccc7c(O)c(N=Nc8ccc(OC)cc8S(=O)(=O)O)c(S(=O)(=O)O)cc7c6S(=O)(=O)O)c(O)c5c4N)ccc3c2O)c(S(=O)(=O)O)c1] |
| Qb-5 | 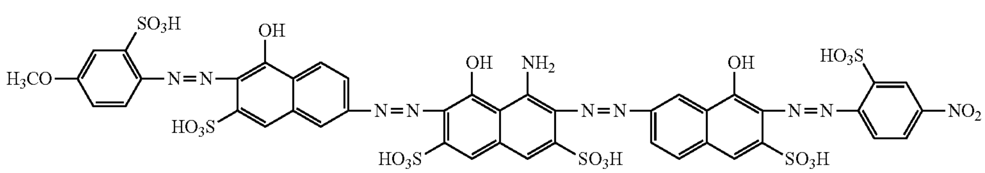 [SMILES: COc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8ccc([N+](=O)[O-])cc8S(=O)(=O)O)c(O)c7c6)c(N)c5c4O)ccc3c2O)c(S(=O)(=O)O)c1] |
| Qb-6 | 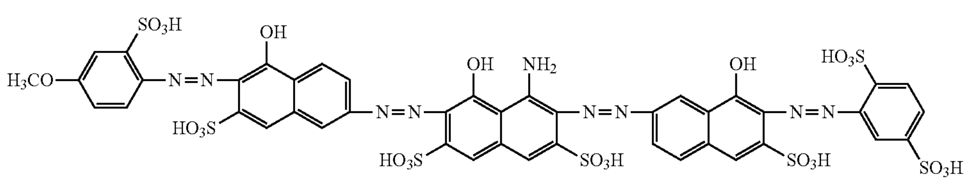 [SMILES: COc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8cc(S(=O)(=O)O)ccc8S(=O)(=O)O)c(O)c7c6)c(N)c5c4O)ccc3c2O)c(S(=O)(=O)O)c1] |

TABLE 17-continued
| Compound No. | Structural Formula |
| --- | --- |
| Qb-7 | 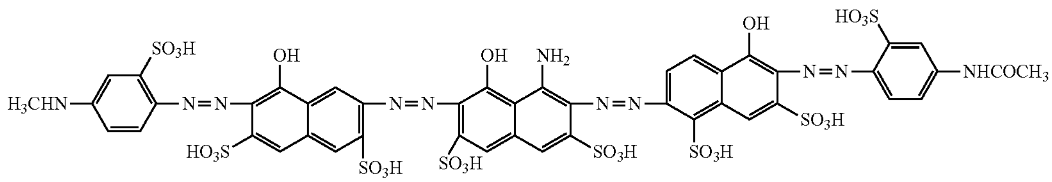 |
| Qb-8 | 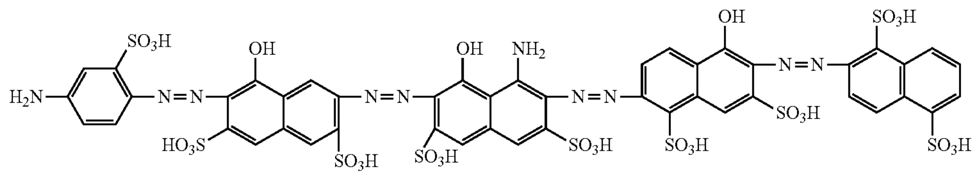 [SMILES: Nc1ccc(N=Nc2c(S(=O)(=O)O)cc3cc(S(=O)(=O)O)c(N=Nc4c(S(=O)(=O)O)cc5cc(S(=O)(=O)O)c(N=Nc6ccc7c(O)c(N=Nc8ccc9c(S(=O)(=O)O)cccc9c8S(=O)(=O)O)c(S(=O)(=O)O)cc7c6S(=O)(=O)O)c(N)c5c4O)cc3c2O)c(S(=O)(=O)O)c1] |
| Qb-9 | 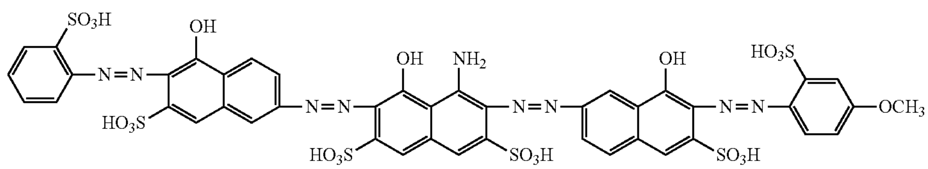 [SMILES: COc1ccc(N=Nc2c(S(=O)(=O)O)cc3ccc(N=Nc4c(S(=O)(=O)O)cc5cc(S(=O)(=O)O)c(N=Nc6ccc7c(O)c(N=Nc8ccccc8S(=O)(=O)O)c(S(=O)(=O)O)cc7c6)c(O)c5c4N)cc3c2O)c(S(=O)(=O)O)c1] |
TABLE 18
| Compound No. | Structural Formula |
| --- | --- |
| Qb-10 | 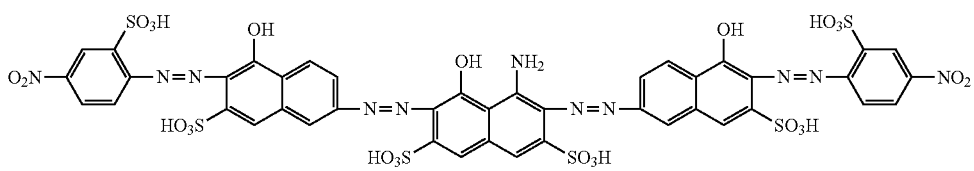 [SMILES: Nc1c(N=Nc2ccc3c(O)c(N=Nc4ccc([N+](=O)[O-])cc4S(=O)(=O)O)c(S(=O)(=O)O)cc3c2)c(S(=O)(=O)O)cc2cc(S(=O)(=O)O)c(N=Nc3ccc4c(O)c(N=Nc5ccc([N+](=O)[O-])cc5S(=O)(=O)O)c(S(=O)(=O)O)cc4c3)c(O)c12] |
| Qb-11 | 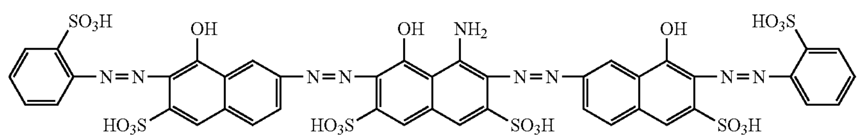 [SMILES: Nc1c(N=Nc2ccc3cc(S(=O)(=O)O)c(N=Nc4ccccc4S(=O)(=O)O)c(O)c3c2)c(S(=O)(=O)O)cc2cc(S(=O)(=O)O)c(N=Nc3ccc4cc(S(=O)(=O)O)c(N=Nc5ccccc5S(=O)(=O)O)c(O)c4c3)c(O)c12] |
| Qb-12 | 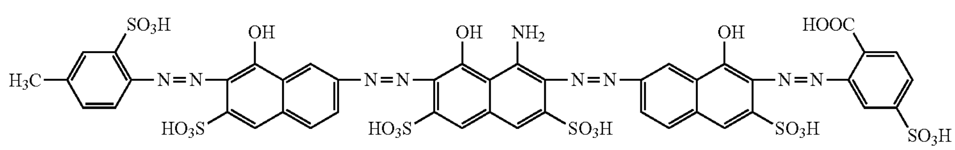 [SMILES: Cc1ccc(N=Nc2c(S(=O)(=O)O)cc3ccc(N=Nc4c(S(=O)(=O)O)cc5cc(S(=O)(=O)O)c(N=Nc6ccc7cc(S(=O)(=O)O)c(N=Nc8cc(S(=O)(=O)O)ccc8C(=O)O)c(O)c7c6)c(N)c5c4O)cc3c2O)c(S(=O)(=O)O)c1] |
| Qb-13 | 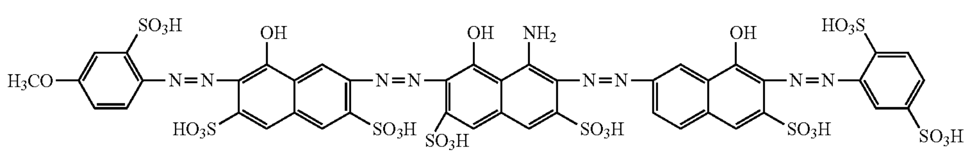 [SMILES: COc1ccc(N=Nc2c(S(=O)(=O)O)cc3cc(S(=O)(=O)O)c(N=Nc4c(S(=O)(=O)O)cc5cc(S(=O)(=O)O)c(N=Nc6ccc7cc(S(=O)(=O)O)c(N=Nc8cc(S(=O)(=O)O)ccc8S(=O)(=O)O)c(O)c7c6)c(N)c5c4O)cc3c2O)c(S(=O)(=O)O)c1] |
| Qb-14 | 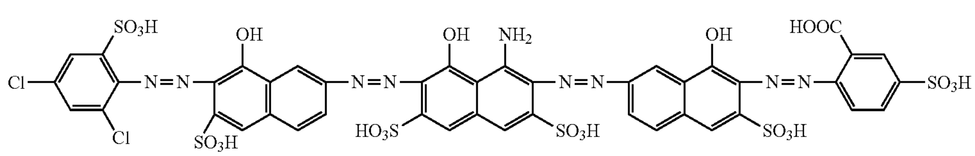 [SMILES: Nc1c(N=Nc2ccc3cc(S(=O)(=O)O)c(N=Nc4ccc(S(=O)(=O)O)cc4C(=O)O)c(O)c3c2)c(S(=O)(=O)O)cc2cc(S(=O)(=O)O)c(N=Nc3ccc4cc(S(=O)(=O)O)c(N=Nc5c(Cl)cc(Cl)cc5S(=O)(=O)O)c(O)c4c3)c(O)c12] |

TABLE 18-continued
| Compound No. | Structural Formula |
|---|---|
| Qb-15 | 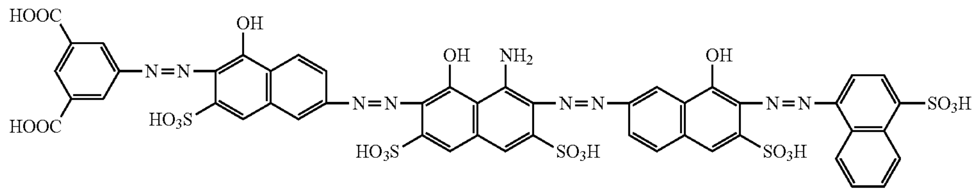 [SMILES: Nc1c(N=Nc2ccc3cc(S(=O)(=O)O)c(N=Nc4ccc(S(=O)(=O)O)c5ccccc45)c(O)c3c2)c(S(=O)(=O)O)cc2cc(S(=O)(=O)O)c(N=Nc3ccc4c(O)c(N=Nc5cc(C(=O)O)cc(C(=O)O)c5)c(S(=O)(=O)O)cc4c3)c(O)c12] |
| Qb-16 | 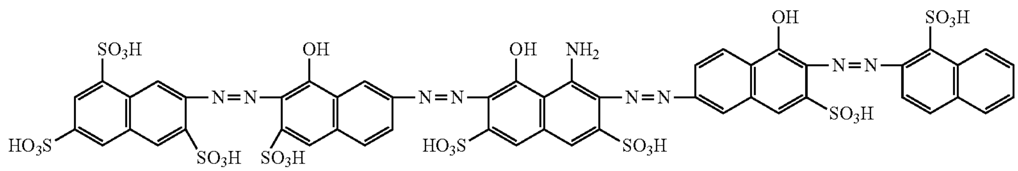 [SMILES: Nc1c(N=Nc2ccc3c(O)c(N=Nc4ccc5ccccc5c4S(=O)(=O)O)c(S(=O)(=O)O)cc3c2)c(S(=O)(=O)O)cc2cc(S(=O)(=O)O)c(N=Nc3ccc4cc(S(=O)(=O)O)c(N=Nc5cc6c(S(=O)(=O)O)cc(S(=O)(=O)O)cc6cc5S(=O)(=O)O)c(O)c4c3)c(O)c12] |
| Qb-17 | 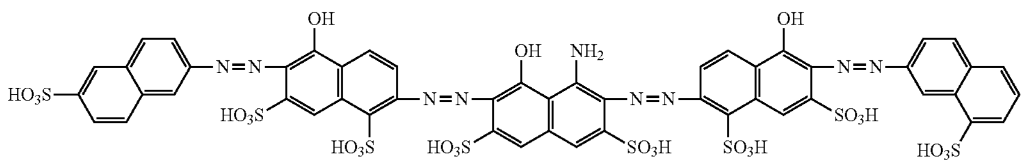 [SMILES: Nc1c(N=Nc2ccc3c(O)c(N=Nc4ccc5cccc(S(=O)(=O)O)c5c4)c(S(=O)(=O)O)cc3c2S(=O)(=O)O)c(S(=O)(=O)O)cc2cc(S(=O)(=O)O)c(N=Nc3ccc4c(O)c(N=Nc5ccc6cc(S(=O)(=O)O)ccc6c5)c(S(=O)(=O)O)cc4c3S(=O)(=O)O)c(O)c12] |
| Qb-18 | 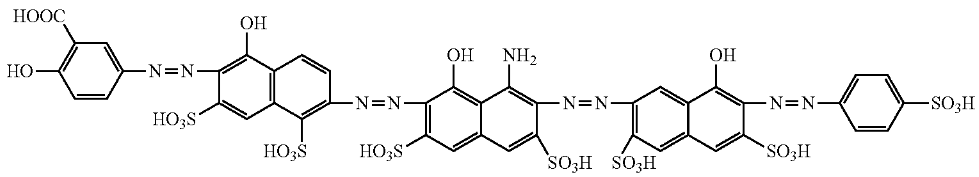 [SMILES: Nc1c(N=Nc2cc3c(O)c(N=Nc4ccc(S(=O)(=O)O)cc4)c(S(=O)(=O)O)cc3cc2S(=O)(=O)O)c(S(=O)(=O)O)cc2cc(S(=O)(=O)O)c(N=Nc3ccc4c(O)c(N=Nc5ccc(O)c(C(=O)O)c5)c(S(=O)(=O)O)cc4c3S(=O)(=O)O)c(O)c12] |
TABLE 19
| Compound No. | Structural Formula |
|---|---|
| Qb-19 | 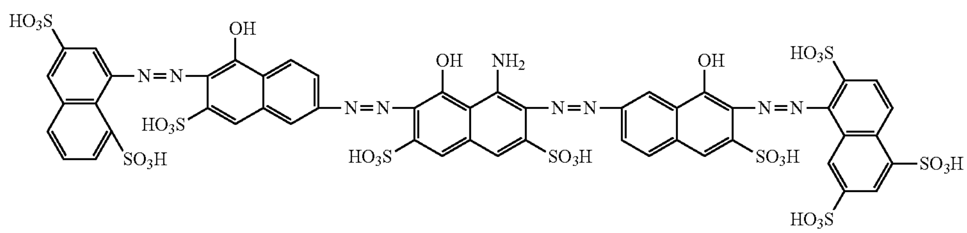 [SMILES: Nc1c(N=Nc2ccc3cc(S(=O)(=O)O)c(N=Nc4c(S(=O)(=O)O)ccc5c(S(=O)(=O)O)cc(S(=O)(=O)O)cc45)c(O)c3c2)c(S(=O)(=O)O)cc2cc(S(=O)(=O)O)c(N=Nc3ccc4c(O)c(N=Nc5cc(S(=O)(=O)O)cc6cccc(S(=O)(=O)O)c56)c(S(=O)(=O)O)cc4c3)c(O)c12] |
| Qb-20 | 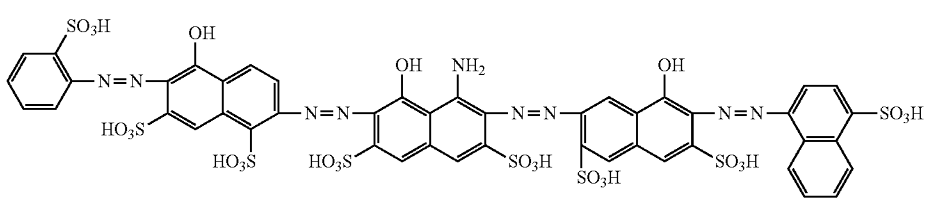 [SMILES: Nc1c(N=Nc2cc3c(O)c(N=Nc4ccc(S(=O)(=O)O)c5ccccc45)c(S(=O)(=O)O)cc3cc2S(=O)(=O)O)c(S(=O)(=O)O)cc2cc(S(=O)(=O)O)c(N=Nc3ccc4c(O)c(N=Nc5ccccc5S(=O)(=O)O)c(S(=O)(=O)O)cc4c3S(=O)(=O)O)c(O)c12] |
| Qb-21 | 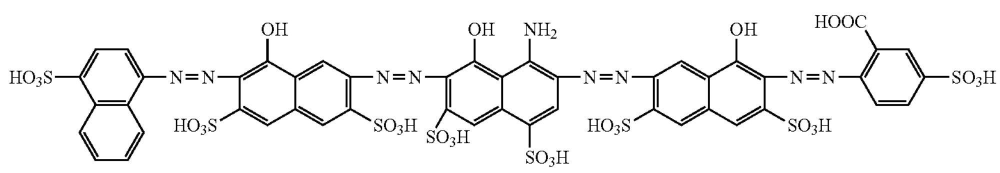 [SMILES: Nc1c(N=Nc2cc3c(O)c(N=Nc4ccc(S(=O)(=O)O)cc4C(=O)O)c(S(=O)(=O)O)cc3cc2S(=O)(=O)O)cc(S(=O)(=O)O)c2cc(S(=O)(=O)O)c(N=Nc3cc4c(O)c(N=Nc5ccc(S(=O)(=O)O)c6ccccc56)c(S(=O)(=O)O)cc4cc3S(=O)(=O)O)c(O)c12] |

TABLE 19-continued
| Compound No. | Structural Formula |
|---|---|
| Qb-22 | 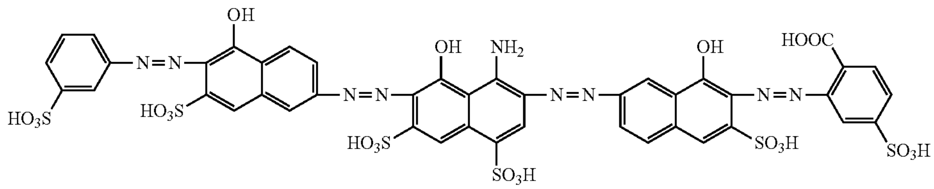 [SMILES: Nc1c(N=Nc2ccc3cc(S(=O)(=O)O)c(N=Nc4cc(S(=O)(=O)O)ccc4C(=O)O)c(O)c3c2)cc(S(=O)(=O)O)c2cc(S(=O)(=O)O)c(N=Nc3ccc4c(O)c(N=Nc5cccc(S(=O)(=O)O)c5)c(S(=O)(=O)O)cc4c3)c(O)c12] |
| Qb-23 | 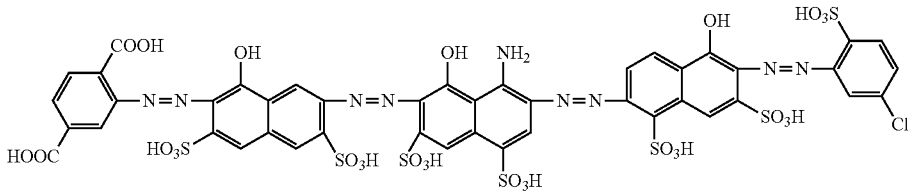 [SMILES: Nc1c(N=Nc2ccc3c(O)c(N=Nc4cc(Cl)ccc4S(=O)(=O)O)c(S(=O)(=O)O)cc3c2S(=O)(=O)O)cc(S(=O)(=O)O)c2cc(S(=O)(=O)O)c(N=Nc3cc4c(O)c(N=Nc5cc(C(=O)O)ccc5C(=O)O)c(S(=O)(=O)O)cc4cc3S(=O)(=O)O)c(O)c12] |
| Qb-24 | 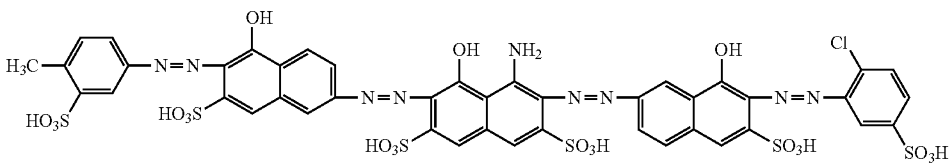 [SMILES: Cc1ccc(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8cc(S(=O)(=O)O)ccc8Cl)c(O)c7c6)c(N)c5c4O)ccc3c2O)cc1S(=O)(=O)O] |
| Qb-25 | 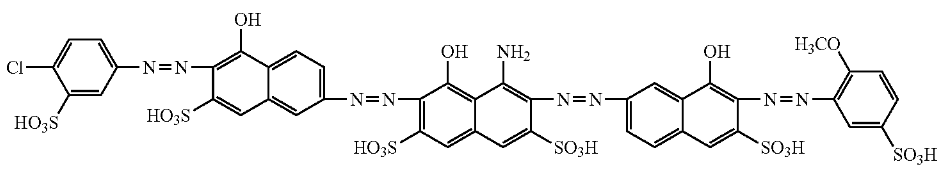 [SMILES: COc1ccc(S(=O)(=O)O)cc1N=Nc1c(S(=O)(=O)O)cc2ccc(N=Nc3c(S(=O)(=O)O)cc4cc(S(=O)(=O)O)c(N=Nc5ccc6c(O)c(N=Nc7ccc(Cl)c(S(=O)(=O)O)c7)c(S(=O)(=O)O)cc6c5)c(O)c4c3N)cc2c1O] |
| Qb-26 | 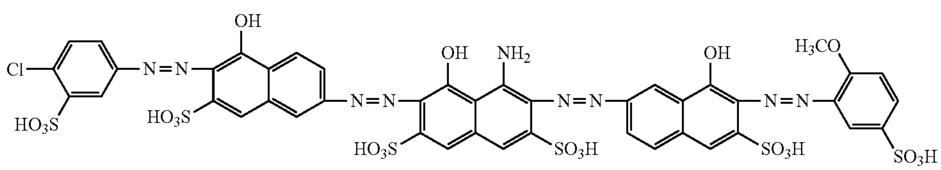 |
| Qb-27 | 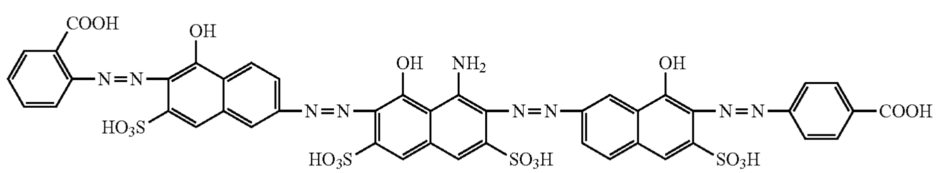 [SMILES: Nc1c(N=Nc2ccc3cc(S(=O)(=O)O)c(N=Nc4ccc(C(=O)O)cc4)c(O)c3c2)c(S(=O)(=O)O)cc2cc(S(=O)(=O)O)c(N=Nc3ccc4c(O)c(N=Nc5ccccc5C(=O)O)c(S(=O)(=O)O)cc4c3)c(O)c12] |
TABLE 20
| Compound No. | Structural Formula |
|---|---|
| Qb-28 | 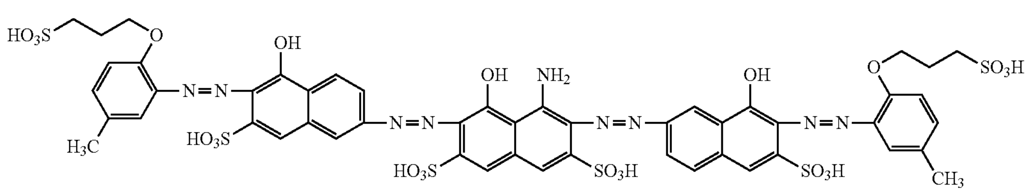 [SMILES: Cc1ccc(OCCCS(=O)(=O)O)c(N=Nc2c(S(=O)(=O)O)cc3cc(N=Nc4c(S(=O)(=O)O)cc5cc(S(=O)(=O)O)c(N=Nc6ccc7cc(S(=O)(=O)O)c(N=Nc8cc(C)ccc8OCCCS(=O)(=O)O)c(O)c7c6)c(N)c5c4O)ccc3c2O)c1] |

TABLE 20-continued

| Compound No. | Structural Formula |
|---|---|
| Qb-29 | 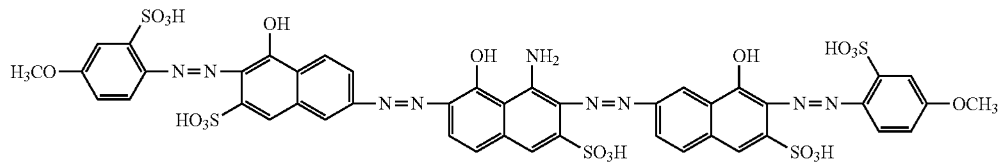 [SMILES: COc1ccc(N=Nc2c(S(=O)(=O)O)cc3cc(N=Nc4ccc5cc(S(=O)(=O)O)c(N=Nc6ccc7cc(S(=O)(=O)O)c(N=Nc8ccc(OC)cc8S(=O)(=O)O)c(O)c7c6)c(N)c5c4O)ccc3c2O)c(S(=O)(=O)O)c1] |
| Qb-30 | 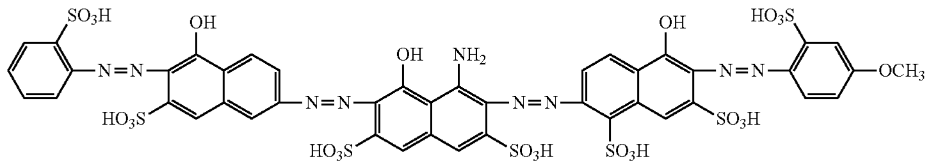 [SMILES: COc1ccc(N=Nc2c(S(=O)(=O)O)cc3c(S(=O)(=O)O)c(N=Nc4c(S(=O)(=O)O)cc5cc(S(=O)(=O)O)c(N=Nc6ccc7c(O)c(N=Nc8ccccc8S(=O)(=O)O)c(S(=O)(=O)O)cc7c6)c(O)c5c4N)ccc3c2O)c(S(=O)(=O)O)c1] |
| Qb-31 | 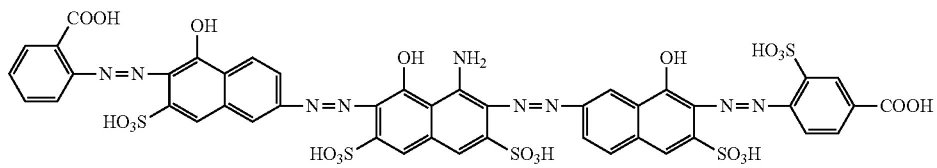 |
| Qb-32 | 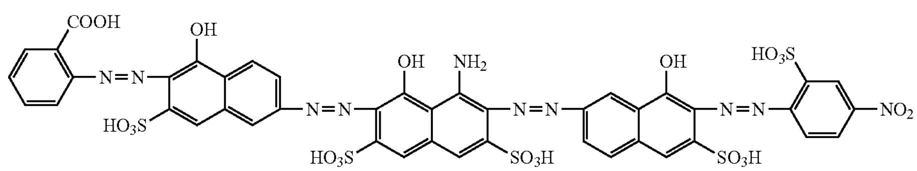 [SMILES: Nc1c(N=Nc2ccc3cc(S(=O)(=O)O)c(N=Nc4ccc([N+](=O)[O-])cc4S(=O)(=O)O)c(O)c3c2)c(S(=O)(=O)O)cc2cc(S(=O)(=O)O)c(N=Nc3ccc4c(O)c(N=Nc5ccccc5C(=O)O)c(S(=O)(=O)O)cc4c3)c(O)c12] |
| Qb-33 | 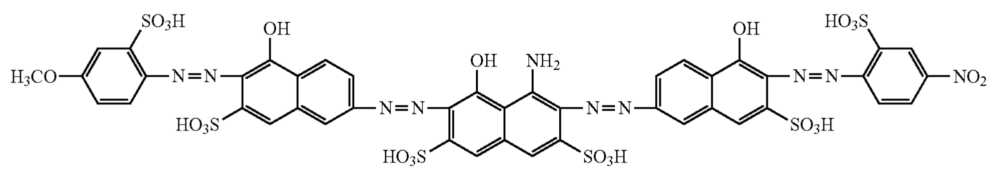 [SMILES: COc1ccc(N=Nc2c(S(=O)(=O)O)cc3cc(N=Nc4c(S(=O)(=O)O)cc5cc(S(=O)(=O)O)c(N=Nc6ccc7c(O)c(N=Nc8ccc([N+](=O)[O-])cc8S(=O)(=O)O)c(S(=O)(=O)O)cc7c6)c(N)c5c4O)ccc3c2O)c(S(=O)(=O)O)c1] |

The salts of the compounds represented by Formulas (QB-1) and (QB-2) are salts of inorganic or organic cations. Among them, specific examples of the inorganic salt may include an alkali metal salt, an alkaline earth metal salt and an ammonium salt, and preferred inorganic salt is a salt of lithium, sodium and potassium, and an ammonium salt, and further, examples of the salt of the organic cation may include a salt of the compound represented by Formula (QB-3), but not limited thereto.

In Formula (QB-3), examples of the alkyl group of $Z_{QB}^1$, $Z_{QB}^2$, $Z_{QB}^3$ and $Z_{QB}^4$ may include methyl, ethyl, n-propyl, isopropyl, n-butyl, isobutyl, sec-butyl, tert-butyl and the like, examples of the hydroxyalkyl group may include a hydroxyalkyl (having 1 to 4 carbon atoms) group such as a hydroxymethyl group, a hydroxyethyl group, a 3-hydroxypropyl group, a 2-hydroxypropyl group, a 4-hydroxybutyl group, a 3-hydroxybutyl group and a 2-hydroxybutyl group, examples of the hydroxyalkoxyalkyl group may include a hydroxyalkoxy (having 1 to 4 carbon atoms)-alkyl (having 1 to 4 carbon atoms) group such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group and a 2-hydroxyethoxybutyl group, and among them, preferably a hydroxyethoxy-alkyl (having 1 to 4 carbon atoms) group. Particularly preferred are a hydrogen atom; a methyl group; a hydroxyalkyl (having 1 to 4 carbon atoms) group such as a hydroxymethyl group, a hydroxyethyl group, a 3-hydroxypropyl group, a 2-hydroxypropyl group, a 4-hydroxybutyl group, a 3-hydroxybutyl group and a 2-hydroxybutyl group; and a hydroxyethoxy-alkyl (having 1 to 4 carbon atoms) group such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group and a 2-hydroxyethoxybutyl group. Specific examples of $Z_{QB}^1$, $Z_{QB}^2$, $Z_{QB}^3$ and $Z_{QB}^4$ in Formula (QB-3) are shown below.

TABLE 21

| Comopund No. | $Z_{QB}^1$ | $Z_{QB}^2$ | $Z_{QB}^3$ | $Z_{QB}^4$ |
|---|---|---|---|---|
| 4-1 | H | —$C_2H_4OH$ | —$C_2H_4OH$ | —$C_2H_4OH$ |
| 4-2 | $CH_3$ | —$C_2H_4OH$ | —$C_2H_4OH$ | —$C_2H_4OH$ |
| 4-3 | H | —$CH_2CH(OH)CH_3$ | —$CH_2CH(OH)CH_3$ | —$CH_2CH(OH)CH_3$ |
| 4-4 | $CH_3$ | —$CH_2CH(OH)CH_3$ | —$CH_2CH(OH)CH_3$ | —$CH_2CH(OH)CH_3$ |

TABLE 21-continued

| Comopund No. | $Z_{QB}^1$ | $Z_{QB}^2$ | $Z_{QB}^3$ | $Z_{QB}^4$ |
|---|---|---|---|---|
| 4-5 | H | —$C_2H_4OH$ | H | —$C_2H_4OH$ |
| 4-6 | $CH_3$ | —$C_2H_4OH$ | H | —$C_2H_4OH$ |
| 4-7 | H | —$CH_2CH(OH)CH_3$ | H | —$CH_2CH(OH)CH_3$ |
| 4-8 | $CH_3$ | —$CH_2CH(OH)CH_3$ | H | —$CH_2CH(OH)CH_3$ |
| 4-9 | $CH_3$ | —$C_2H_4OH$ | $CH_3$ | —$C_2H_4OH$ |
| 4-10 | $CH_3$ | —$CH_2CH(OH)CH_3$ | $CH_3$ | —$CH_2CH(OH)CH_3$ |

The tetrakisazo compound represented by Formula (QB-1) and (QB-2) of the present invention may be synthesized, for example, by the method described in Japanese Patent No. 4517174.

In the ink composition (preferably, the ink for inkjet recording) of the present invention, the first water-soluble long-wavelength dye and the second water-soluble long-wavelength dye may be used in combination with another dye in order to adjust the color tone or maintain the balance of performance. Further, for the purpose of obtaining a full color image, the ink composition of the present invention may be used in combination with an ink including another dye. Examples of the dye which may be used in combination therewith include those described as follows.

Examples of the yellow dye include aryl or heteryl azo dyes having, for example, phenols, naphthols, anilines, pyrazolones, pyridones, and open-chain type active methylene compounds as a coupling component; azomethine dyes having, for example, open-chain type active methylene compounds as a coupling component; methine dyes such as, for example, benzylidene dyes, monomethine oxonol dyes, or the like; and quinone-based dyes such as, for example, naphthoquinone dyes, anthraquinone dyes, or the like, and examples of the other dye species include quinophthalone dyes, nitro.nitroso dyes, acridine dyes, acridinone dyes and the like. These dyes may be dyes that exhibit yellow only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these compounds in the partial structure thereof.

Examples of the magenta dyes include aryl or heteryl azo dyes having, for example, phenols, naphthols, and anilines as a coupling component; azomethine dyes having, for example, pyrazolones and pyrazolotriazoles as a coupling component; methine dyes such as, for example, arylidene dyes, styryl dyes, merocyanine dyes, and oxonol dyes; carbonium dyes such as diphenylmethane dyes, triphenylmethane dyes, and xanthene dyes; quinone-based dyes such as, for example, naphthoquinone, anthraquinone, anthrapyridone and the like; condensed polycyclic dyes such as, for example, dioxazine dyes and the like, and the like. These dyes may be dyes that exhibit magenta only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these cations in the partial structure thereof.

Examples of the cyan dyes include azomethine dyes such as, for example, indoaniline dyes and indophenol dyes; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; and aryl or heteryl azo dyes having, for example, phenols, naphthols, and anilines as a coupling component; and indigo.thioindigo dyes. These dyes may be dyes that exhibit cyan only after a part of the chromophore is dissociated, and in that case, the counter cation may be an inorganic cation such as an alkali metal or ammonium, and an organic cation such pyridinium and a quaternary ammonium salt, and furthermore, may be a polymer cation having these cations in the partial structure thereof.

Further, a black dye such as polyazo dyes and the like may also be used.

Examples of the aqueous dyes include direct dyes, acid dyes, edible dyes, basic dyes, reactive dyes and the like. Examples of the preferred aqueous dyes include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247, C.I. Direct Violet 7, 9, 47, 48, 51, 66, 90, 93, 94, 95, 98, 100, and 101, C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397, C.I. Acid Violet 5, 34, 43, 47, 48, 90, 103, and 126, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, and 326, C.I. Acid Black 7, 24, 29, 48, 52:1, and 172, C.I. Reactive Red 3, 13, 17, 19, 21, 22, 23, 24, 29, 35, 37, 40, 41, 43, 45, 49, and 55, C.I. Reactive Violet 1, 3, 4, 5, 6, 7, 8, 9, 16, 17, 22, 23, 24, 26, 27, 33, and 34, C.I. Reactive Yellow 2, 3, 13, 14, 15, 17, 18, 23, 24, 25, 26, 27, 29, 35, 37, 41, and 42, C.I. Reactive Blue 2, 3, 5, 8, 10, 13, 14, 15, 17, 18, 19, 21, 25, 26, 27, 28, 29, and 38, C.I. Reactive Black 4, 5, 8, 14, 21, 23, 26, 31, 32, and 34, C.I. Basic Red 12, 13, 14, 15, 18, 22, 23, 24, 25, 27, 29, 35, 36, 38, 39, 45, and 46, C.I. Basic Violet 1, 2, 3, 7, 10, 15, 16, 20, 21, 25, 27, 28, 35, 37, 39, 40, and 48, C.I. Basic Yellow 1, 2, 4, 11, 13, 14, 15, 19, 21, 23, 24, 25, 28, 29, 32, 36, 39, and 40, C.I. Basic Blue 1, 3, 5, 7, 9, 22, 26, 41, 45, 46, 47, 54, 57, 60, 62, 65, 66, 69, and 71, C.I. Basic Black 8, Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, and 247, C.I. Direct Violet 7, 9, 47, 48, 51, 66, 90, 93, 94, 95, 98, 100, and 101, C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, and 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, and 291, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, and 397, C.I. Acid Violet 5, 34, 43, 47, 48, 90, 103, and 126, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326, C.I. Acid Black 7, 24, 29, 48, 52:1, 172, C.I. Reactive Red 3, 13, 17, 19, 21, 22, 23, 24, 29, 35, 37, 40, 41, 43, 45, 49, and 55, C.I. Reactive Violet 1, 3, 4, 5, 6, 7, 8, 9, 16, 17, 22, 23, 24, 26, 27, 33, and 34, C.I. Reactive Yellow 2, 3, 13, 14, 15, 17, 18, 23, 24, 25, 26, 27, 29, 35, 37, 41, and 42, C.I. Reactive Blue 2, 3, 5, 8, 10, 13, 14, 15, 17, 18, 19, 21, 25, 26, 27, 28, 29, and 38, C.I. Reactive Black 4, 5, 8, 14, 21, 23, 26, 31, 32, and 34, C.I. Basic Red 12, 13, 14, 15, 18, 22, 23, 24, 25, 27, 29, 35, 36, 38, 39, 45, and 46, C.I. Basic Violet 1, 2, 3, 7, 10, 15, 16, 20, 21, 25, 27, 28, 35, 37, 39, 40, and 48, C.I. Basic Yellow 1, 2, 4, 11, 13, 14, 15, 19, 21, 23, 24, 25, 28, 29, 32, 36, 39, and 40, C.I. Basic Blue 1, 3, 5, 7, 9, 22, 26, 41, 45, 46, 47, 54, 57, 60, 62, 65, 66, 69, and 71, C.I. Basic Black 8 and the like.

Further, in the ink of the present invention, pigment may also be used in combination.

As the pigment used in the present technology, it is possible to use pigments known described in various documents in addition to commercially available pigments. Examples of the documents include Colour Index (edited by The Society of Dyers and Colourists), "New Edition Pigment Handbook," edited by the Japanese Pigment Technology Society (published in 1989), "Latest Pigment Application Technology," CMC Publishing Co., Ltd. (published in 1986), "Printing Ink Technology," CMC Publishing Co., Ltd. (published in 1984), "Industrial Organic Pigments" co-written by W. Herbst & K. Hunger (VCH Verlagsgesellshaft, published in 1993), and the like. Specifically, examples of organic pigments include azo pigments (azo lake pigments, insoluble azo pigments, condensed azo pigments, and chelate azo pigments), polycyclic pigments (phthalocyanine-based pigments, anthraquinone-based pigments, perylene and perynone-based pigments, indigo-based pigments, quinacridone-based pigments, dioxazine-based pigments, isoindolinone-based pigments, quinophthalone-based pigments, diketopyrrolopyrrole-based pigments, and the like), dye lake pigments (lake pigments of acid or basic dyes), azine pigments, and the like, and examples of inorganic pigments include the yellow pigments of C.I. Pigment Yellow 34, 37, 42, 53 and the like, the red-based pigments of C.I. Pigment Red 101, 108 and the like, the blue-based pigments of C.I. Pigment Blue 27, 29, 17:1 and the like, the black-based pigments of C.I. Pigment Black 7, magnetite and the like, and the white-based pigments of C.I. Pigment White 4, 6, 18, 21 and the like.

As pigments color tones preferred for image formation, blue to cyan pigments are preferably phthalocyanine pigments, anthraquinone-based indanthrone pigments (for example, C.I. Pigment Blue 60 and the like), and dye lake pigment-based triarylcarbonium pigments, and particularly, most preferably phthalocyanine pigments (preferred examples thereof include copper phthalocyanines such as C.I. Pigment Blue 15:1, 15:2, 15:3, 15:4, 15:6 and the like, monochloro to low-chlorinated copper phthalocyanines, pigments described in European Patent No. 860475 as aluminum phthalocyanines, the metal-free phthalocyanine that is C.I. Pigment Blue 16, phthalocyanines containing Zn, Ni, and Ti as the respective central metals and the like, and among them, C.I. Pigment Blue 15:3 and 15:4 and the aluminum phthalocyanines are most preferred).

In red to violet pigments, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146, and 184) and the like, and among them, preferred examples thereof include C.I. Pigment Red 57:1, 146, and 184), quinacridone-based pigments (preferred examples thereof include C.I. Pigment Red 122, 192, 202, 207, and 209 and C.I. Pigment Violet 19 and 42, and among them, C.I. Pigment Red 122 is particularly preferred), dye lake pigment-based triarylcarbonium pigments (preferred examples include the xanthene-based pigments of C.I. Pigment Red 81:1 and C.I. Pigment Violet 1, 2, 3, 27, and 39), dioxazine-based pigments (for example, C.I. Pigment Violet 23 and 37), diketopyrrolopyrrole-based pigments (for example, C.I. Pigment Red 254), perylene pigments (for example, C.I. Pigment Violet 29), anthraquinone-based pigments (examples thereof include C.I. Pigment Violet 5:1, 31, and 33), and thioindigo-based pigments (examples thereof include C.I. Pigment Red 38 and 88) are preferably used.

As yellow pigments, azo pigments (preferred examples thereof include the monoazo-based pigments of C.I. Pigment Yellow 1, 3, 74 and 98, the disazo-based pigments of C.I. Pigment Yellow 12, 13, 14, 16, 17 and 83, general azo-based pigments of C.I. Pigment Yellow 93, 94, 95, 128 and 155, the benzimidazolone-based pigments of C.I. Pigment Yellow 120, 151, 154, 156 and 180, and the like, and among them, it is preferred that benzidine-based compounds are not used as a raw material), isoindoline.isoindolinone-based pigments (preferred examples thereof include C.I. Pigment Yellow 109, 110, 137 and 139, and the like), quinophthalone pigments (preferred examples thereof include C.I. Pigment Yellow 138 and the like), and flavanthrone pigments (for example, C.I. Pigment Yellow 24 and the like) are preferably used.

Preferred examples of black pigments include inorganic pigments (preferred examples thereof include carbon black and magnetite) or aniline black.

Further, orange pigments (C.I. Pigment Orange 13 and 16, and the like) or green pigments (C.I. Pigment 7, and the like) may be used.

The pigments which may be used in the present technology may be the above-described bare pigments or surface-treated pigments. As a surface-treatment method, a method of coating a surface with resin or wax, a method of attaching a surfactant, a method of binding a reactive material (for example, a silane coupling agent, radicals produced from epoxy compounds, polyisocyanates, and diazonium salts, and the like) to a pigment surface, and the like may be contemplated, and these methods are described in the following documents or patents.

(1) Properties and Application of Metal Soap (Saiwaishobo)

(2) Printing of Printing Ink (CMC Publishing Co., Ltd. 1984)

(3) Latest Pigment Application Technology (CMC Publishing Co., Ltd. 1986)

(4) U.S. Pat. Nos. 5,554,739 and 5,571,311

(5) Japanese Patent Application Laid-Open Nos. H9-151342, 10-140065, 10-292143, and 11-166145

In particular, self-dispersible pigments prepared by reacting diazonium salts with carbon black, which are disclosed in the above U.S. patents of (4), or the encapsulated pigments prepared by the methods disclosed in the above Japanese Patents of (5) are particularly effective because dispersion stability may be obtained without excessively using any dispersant in ink.

In the present invention, pigments may be dispersed by further using dispersants. It is possible to use various known dispersants to suit the pigments used, for example, low molecular dispersants of surfactant type or polymer type dispersants as dispersants. Examples of the dispersants include dispersants described in Japanese Patent Application Laid-Open No. H3-69949, European Patent No. 549486, and the like. Further, when a dispersant is used, pigment derivatives called as synergists may be added in order to promote adsorption of the dispersant to the pigment.

The particle diameter of pigments, which may be used in the present technology, preferably ranges from 0.01 μm to 10 μm, and more preferably 0.05 μm to 1 μm after the dispersion.

As a method of dispersing pigments, a known dispersing technology used for preparation of ink or toner may be used. Examples of a dispersing machine include a vertical or horizontal agitator mill, an Attritor, a colloid mill, a ball mill, a three-roll mill, a pearl mill, a super mill, an impeller, a disperser, a KD mill, a dynatron, a pressure kneader, and the like. The details thereof are described in "Latest Pigment Application Technology" (CMC Publishing Co., Ltd., 1986).

[pH of Ink]

It is preferred that the ink of the present invention has a pH of 7.0 to 10.0 from the viewpoint of storage stability and discharge properties of the ink.

[Surfactant]

Next, description will be made with respect to a surfactant which may be contained in the ink composition (preferably, the ink for inkjet recording) of the present invention.

The surfactant used in the present invention may include an anionic surfactant such as fatty acid salts, ester salts of higher alcohol, alkylbenzenesulfonic acid salts, sulfosuccinic acid ester salts and phosphoric acid ester salts of high alcohol, an cationic surfactant such as aliphatic amine salts and quaternary ammonium salts, a nonionic surfactant such as ethylene oxide adducts of high alcohol, ethylene oxide adducts of alkylphenol, ethylene oxide adducts of polyhydric alcohol fatty acid ester, acetylene glycol and ethylene oxide adducts thereof, an ampholytic surfactant such as amino acid type and betaine type, a fluorine-based compound, a silicon-based compound and the like. They may be used either alone or in combination of two or more thereof.

By containing the surfactant in the ink composition of the present invention and adjusting liquid properties of the ink such as surface tension, it is possible to enhance the discharge stability of the ink and provide effects of enhancing the water resistance of the images or suppressing spreading of the printed ink, and the like. Further, the surfactant may be used in combination of two or more thereof.

The ink composition used in the present invention contains the surfactant in an amount of preferably 0.005% by mass to 5% by mass, and more preferably 0.005% by mass to 3% by mass. When the content of the surfactant in the ink composition is in a range of 0.005% by mass to 5% by mass, degradation of printing quality does not occur, such as degradation of discharge stability, occurrence of spreading when mixing colors and occurrence of feathering, and thus, it is possible to suppress printing defects caused by attachment of the ink to the periphery of a nozzle when discharging.

The ink composition of the present invention may be prepared by dissoloving the dye in an aqueous medium, if necessary, adding a specific amount of a surfactant, and further, if necessary, dissolving and/or dispersing other additives. As used in the present invention, the term "aqueous medium" refers to a medium formed by adding additives such as a wetting agent and a stabilizer, as necessary, to water or a mixture of water and a small amount of a water-miscible organic solvent.

When the ink liquid of the present invention is prepared, in the case of a water-soluble ink, it is preferred to first dissolve the ink in water. After that, various solvents or additives are added, followed by dissolving and mixing to prepare a homogeneous ink liquid.

At this time, as a dissolution method, various methods such as dissolution by agitation, dissolution by radiation of an ultrasonic wave, and dissolution by shaking may be used. Among the methods, the agitation method is particularly preferably used. In the case where the agitation is performed, various methods known in the art, such as fluidization agitation and agitation using shearing stress using an inversion agitator or a dissolver, may be used. Meanwhile, an agitation method using shearing stress to a vessel bottom surface like a magnetic agitator may be preferably used.

A method for preparing a water-based ink for inkjet is described in detail in Japanese Patent Application Laid-Open Nos. H5-148436, H5-295312, H7-97541, H7-82515, H7-118584 and 2002-060663, which may be used to prepare the ink for inkjet recording of the present invention.

The ink composition of the present invention contains at least one first water-soluble long-wavelength dye represented by Formula (1) and a second water-soluble long-wavelength dye in an aqueous medium. A water-miscible organic solvent may be contained in the aqueous medium, and the water-miscible organic solvent contained in the aqueous medium is preferably a solvent in which the solubility at 25° C. of the dye used is 10 (g/100 g solvent) or less. Herein, the solubility refers to a mass of solute soluble in 100 g of solvent at a certain temperature, and the unit is "g/100 g solvent".

Although the solubility of the dye of the present invention may vary depending on the structure, it is preferred to appropriately select a water-miscible organic solvent whose solubility is 10 (g/100 g solvent) depending on dye species for the ink of the present invention. The solubility at 25° C. of the dye of the present invention is more preferably 8 (g/100 g solvent) or less, and still more preferably 5 (g/100 g solvent) or less.

Further, the water-miscible organic solvent is preferably a mixture of two or more kinds in which at least one kind contains alcohol and/or a derivative thereof. The amount of the water-miscible organic solvent added is preferably 1% by mass to 60% by mass, and more preferably 5% by mass to 50% by mass. Within this range, the stability, the discharge stability and dryness of the ink tend to become better.

Examples of the water-miscible organic solvent may include the followings. The water-miscible organic solvent suitable for the present invention may be selected among the followings.

Alcohol (e.g., methanol, ethanol, propanol, isopropanol, butanol, isobutanol, sec-butanol, t-butanol, pentanol, hexanol, cyclohexanol, benzyl alcohol), polyhydric alcohols (e.g., ethylene glycol, diethylene glycol, thiodiethylene glycol, triethylene glycol, tetraethylene glycol, polyethylene glycol, 2-butene-1,4-diol, 2-methyl-2,4-pentanediol, 1,3-butanediol, 1,5-pentanediol, 1,2-hexanediol, propylene glycol, dipropylene glycol, polypropylene glycol, butylene glycol, hexanediol, pentanediol, glycerin, hexanetriol, thiodiglycol), a glycol derivative (e.g., ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, triethylene glycol monobutyl ether, propylene glycol monomethyl ether, propylene glycol monobutyl ether, dipropylene glycol monomethyl ether, triethylene glycol monomethyl ether, polyethylene glycol monomethyl ether, ethylene glycol monoisopropyl ether, triethylene glycol monobutyl ether, ethylene glycol monoisobutyl ether, diethylene glycol monoisobutyl ether, propylene glycol monopropyl ether, ethylene glycol diacetate, ethylene glycol monomethyl ether acetate, triethylene glycol monomethyl ether, triethylene glycol monoethyl ether, ethylene glycol monophenyl ether), amine (e.g., ethanolamine, diethanolamine, triethanolamine, N-methyldiethanolamine, N-ethyldiethanolamine, morpholine, N-ethylmorpholine, ethylene diamine, diethylene triamine, triethylene tetramine, polyethylene imine, tetramethylpropylene diamine) and other polar solvents (e.g., formamide, N,N-dimethylformamide, N,N-dimethyl acetamide, dimethylsulfoxide, sulfolan, 2-pyrrolidone, N-methyl-2-pyrrolidone, N-vinyl-2-pyrrolidone, 2-oxazolidone, ethylene urea (2-imidazolidinone), 1,3-dimethyl-2-imidazolidinone, acetonitril, acetone, diacetone alcohol). Further, the water-miscible organic solvent may be in combination of two or more thereof In the case where the other dye used in combination in the present invention is an oil-soluble dye, the ink composition of the present invention may be prepared by dissolving the oil-soluble dye in an organic solvent, and emulsifying and dispersing the solution in a high-boiling point organic solvent.

The boiling point of the high-boiling point organic solvent used is 150° C. or higher and preferably 170° C. or higher. The high-boiling point organic solvent may be used in a mass ratio of 0.01 to 3 multiple amount and preferably 0.01 to 1.0 multiple amount based on the oil-soluble dye.

The high-boiling point organic solvent may be used either alone or as a mixture of various kinds.

In the present invention, it is preferred that the oil-soluble dye or the high-boiling point organic solvent is emulsified and dispersed in the aqueous medium. When emulsification and dispersion are performed, from the viewpoint of emulsibility, a low-boiling point organic solvent may be used in some cases. The low-boiling point organic solvent is an organic solvent having a boiling point of about 30° C. or higher and 150° C. or lower at normal pressure.

The emulsification and dispersion are performed by dispersing an oil phase where the dye is dissolved in a mixture solvent of the high-boiling point organic solvent and, in some cases, the low-boiling point organic solvent in an aqueous phase including water as a main component to form oily fine drops. In this case, the component such as a surfactant, a wetting agent, a dye stabilizer, an emulsion stabilizer, a preservative, and a mycostats may be added to any one or both of the aqueous phase and the oil phase if necessary. A method of adding the oil phase to the aqueous phase is generally used as the emulsification method, but a so-called phase inversion emulsification method, in which the aqueous phase is added dropwise on the oil phase, may be preferably used.

In the present invention, in the case of using as an ink for inkjet recording other than the compound, it is possible to appropriately select and use an additive such as a drying preventing agent for preventing clogging of the nozzle by drying of the ink, a permeation promoting agent for allowing the ink to permeate through paper well, a UV absorbent, an antioxidant, a viscosity regulator, a surface tension regulator, a dispersant, a dispersion stabilizer, a rust inhibitor, a preservative, a mycostats, a pH adjusting agent, an antifoaming agent, a chelating agent or the like in an appropriate amount.

It is preferred that the drying preventing agent used in the present invention is a water-soluble organic solvent having vapor pressure that is lower than that of water. Specific examples thereof may include polyvalent alcohols represented by ethylene glycol, propylene glycol, diethylene glycol, polyethylene glycol, thiodiglycol, dithiodiglycol, 2-methyl-1,3-propandiol, 1,2,6-hexanetriol, an acetylene glycol derivative, glycerin, or trimethylolpropan, lower alkyl ethers of polyhydric alcohol such as ethylene glycol monomethyl (or ethyl)ether, diethylene glycol monomethyl (or ethyl) ether, or triethylene glycol monoethyl (or butyl)ether, heterocyclic rings such as 2-pyrrolidone, N-methyl-2-pyrrolidone, 1,3-dimethyl-2-imidazolidinone, or N-ethylmorpholine, a sulfur-containing compound such as sulfolan, dimethylsulfoxide, or 3-sulfolene, a polyfunctional compound such as diacetone alcohol or diethanolamine, or a urea derivative. Among them, polyhydric alcohol such as glycerin or diethylene glycol is more preferred. Further, the drying preventing agent may be used either alone or in combination of two or more thereof. It is preferred that the drying preventing agent is contained in an amount of 10% by mass to 50% by mass in the ink composition.

As the permeation promoting agent used in the present invention, alcohols such as ethanol, isopropanol, butanol, di(tri)ethylene glycol monobutyl ether, or 1,2-hexanediol, sodium lauryl sulfate, sodium oleate, a nonionic surfactant or the like may be used. If the aforementioned permeation promoting agent is contained in an amount of 10% by mass to 30% by mass in the ink composition, there is a sufficient effect, and it is preferred to use the permeation promoting agent in an addition amount not causing spreading of print and print-through.

As the UV absorbent used to improve a preservation property of the image in the present invention, a compound absorbing UV to emit fluorescence, that is, a so-called fluorescent brightening agent, which is represented by a benzotriazole-based compound described in Japanese Patent Application Laid-Open Nos. S58-185677, S61-190537, H2-782, H5-197075 and H9-34057, a benzophenone-based compound described in Japanese Patent Application Laid-Open Nos. S46-2784 and H5-194483, and U.S. Pat. No. 3,214,463, a cinnamic acid-based compound described in Japanese Patent Publication Nos. S48-30492, S56-21141 and H10-88106, a triazine-based compound described in Japanese Patent Application Laid-Open Nos. H4-298503, H8-53427, H8-239368 and H10-182621, and Japanese National Publication of International Patent Application No. H8-501291, a compound described in Research Disclosure No. 24239, and stilbene and benzoxazole-based compounds may be used.

In the present invention, as the antioxidant used in order to improve a preservation property of the image, various kinds of organic and metal complex-based discoloration prevention agents may be used. The organic discoloration prevention agent includes hydroquinones, alkoxyphenols, dialkoxyphenols, phenols, anilines, amines, indanes, cromanes, alkoxyanilines, heterocyclics or the like, and the metal complex includes a nickel complex, a zinc complex or the like. More specifically, the compound described in the patents cited in Paragraphs I to J of VII of Research Disclosure No. 17643, Research Disclosure Nos. 15162, the left column on page 650 of Research Disclosure No. 18716, page 527 of Research Disclosure No. 36544, page 872 of Research Disclosure No. 307105, and Research Disclosure No. 15162, or a compound included in formulas of representative compounds and examples of the compounds described on pages 127 to 137 of Japanese Patent Application Laid-Open No. S62-215272 may be used.

The rust inhibitor used in the present invention may be, for example, an acid sulfite salt, sodium thiosulfate, thioglycolic acid ammon, diisopropylammonium nitrite, pentaerythritol tetranitrate, dicyclohexylammonium nitrite, benzotriazole or the like. It is preferred that the rust inhibitor is used in an amount of 0.02% by mass to 5.00% by mass in the ink composition.

The pH adjusting agent may be suitably used from the viewpoint of adjusting pH, imparting dispersion stability and the like, and adjusts the pH of the ink to 8 to 11 at 25° C. If the pH is lower than 8, the solubility of the dye is lowered, and thus, the nozzle is easily clogged. If the pH is higher than 11, the water resistance deteriorates. Examples of the pH adjusting agent may include a basic agent such as an organic base and an inorganic base, and an acidic agent such as an organic acid and an inorganic acid.

The organic base may include triethanolamine, diethanolamine, N-methyldiethanolamine, dimethylethanolamine and the like. The inorganic alkali may include hydroxides of alkali metal (for example, sodium hydroxide, lithium hydroxide, potassium hydroxide and the like), carbonate salts (for example, sodium carbonate, sodium hydrogen carbonate and the like), ammonium and the like. Further, the organic acid may include acetic acid, propionic acid, trifluoroacetic acid, alkylsulfonic acid and the like. The inorganic acid may include hydrochloric acid, sulfuric acid, phosphoric acid and the like.

Surface tension of the ink composition used in the present invention is preferably 20 mN/m to 50 mN/m, and more preferably 20 mN/m to 40 mN/m at 25° C. Within this range, the discharge stability and the printing quality tend to become better, and it is easy to suppress printing defects caused by attachment of the ink to the periphery of a nozzle when discharging.

The viscosity of the ink composition of the present invention is preferably 30 mPa·s or less at 25° C. Further, since it is more preferred to adjust the viscosity to 20 mPa·s or less, a viscosity regulator is used in some cases for the purpose of adjusting the viscosity. The viscosity regulator may be, for example, a water-soluble polymer such as celluloses and polyvinyl alcohol, a nonionic surfactant, or the like. More details are described in Ch.9 of "Viscosity Adjustment Technology" (Technical Information Institute Co., Ltd. 1999) and pages 162 to 174 of "Chemicals for Inkjet Printer (98 enlarged)-Investigation of trend and prospect of development of materials-" (CMC, 1997).

Further, in the present invention, polymer fine particles may be used. Detailed description thereof is described in Japanese Patent Application Laid-Open No. 2002-264490.

In the present invention, various cationic, anionic or nonionic surfactants described as a dispersant or dispersion stabilizer, fluorine-based or silicon-based compounds as an antiforming agent, or a chelating agent represented by EDTA may be used as necessary.

<Recording Medium>

The ink of the present invention may be used to form an image on known materials to be recorded, that is, plain paper, resin-coated paper, inkjet-dedicated paper described in, for example, Japanese Patent Application Laid-Open Nos. H8-169172, H8-27693, H2-276670, 117-276789, H9-323475, S62-238783, H10-153989, 1110-217473, H10-235995, H10-337947, H10-217597, and H10-337947, film, paper for use in electrophotography, fabric, glass, metal, ceramic, or the like.

Hereinafter, the recording paper and the recording film used to perform inkjet printing by using the ink of the present invention will be described. In the recording paper and the recording film, a support is formed of a chemical pulp such as LBKP and NBKP, a mechanical pulp such as GP, PGW, RMP, TMP, CTMP, CMP and CGP, a used-paper pulp such as DIP, or the like, and, if necessary, a matter manufactured by various kinds of devices such as a fourdrinier machine and a rotoformer machine by mixing additives known in the art, such as a pigment, a binder, a sizing agent, a settlement agent, a cationic agent, and a strength additive for paper, may be used. In addition to the aforementioned support, any matter of a synthetic paper and a plastic film sheet may be used, and it is preferred that the thickness of the support ranges from 10 μm to 250 μm, and the basis weight thereof ranges from 10 $g/m^2$ to 250 $g/m^2$. The support may be provided with an ink-receiving layer and a back coat layer at once, or may be provided with an ink-receiving layer and a back coat layer after a size press or an anchor coat layer is formed by starch, polyvinyl alcohol or the like. Further, the support may be subjected to planarization treatment by a calendar device such as a machine calendar, a TG calendar, and a soft calendar. In the present invention, paper and plastic films in which polyolefins (for example, polyethylene, polystyrene, polyethylene terephthalate, polybutene, and a copolymer thereof) are laminated on both surfaces thereof are more preferably used as the support. It is preferred that a white pigment (e.g., titanium oxide or zinc oxide) or a coloring dye (e.g., cobalt blue, navy blue or neodymium oxide) is added to polyolefins.

The ink-receiving layer formed on the support contains a pigment or an aqueous binder. As the pigment, a white pigment is preferred, and examples of the white pigment may include an inorganic white pigment such as calcium carbonate, kaolin, talc, clay, diatomite, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and an organic pigment such as a styrene-based pigment, an acrylic pigment, a urea resin and a melamine resin. As the white pigment contained in the ink-receiving layer, a porous inorganic pigment is preferred, and in particular, for example, synthetic amorphous silica having a large fine pore area is appropriate. As the synthetic amorphous silica, any of silicic acid anhydride obtained by a dry manufacturing method (vapor-phase method) and water-containing silicic acid obtained by a wet manufacturing method may be used. In particular, water-containing silicic acid is preferably used. These dyes may be used in combination of twor or more thereof.

As the recording paper including the pigment in an image-receiving layer, specifically, matters disclosed in Japanese Patent Application Laid-Open Nos. H10-81064, H10-119423, H10-157277, H10-217601, H11-348409, 2001-138621, 2000-43401, 2000-211235, 2000-309157, 2001-96897, 2001-138627, H11-91242, H8-2087, H8-2090, H8-2091, H8-2093, H8-174992, H11-192777, 2001-301314, and the like may be used.

Examples of the aqueous binder contained in the ink-receiving layer may include a water-soluble polymer such as polyvinyl alcohol, silanol denatured polyvinyl alcohol, starch, cationic starch, casein, gelatin, carboxymethyl cellulose, hydroxyethyl cellulose, polyvinylpyrrolidone, polyalkylene oxide and a polyalkylene oxide derivative, and a water dispersible polymer such as a styrenebutadiene latex and an acryl emulsion. The aqueous binder may be used either alone or in combination of two kinds or more thereof. In the present invention, among them, polyvinyl alcohol or silanol denatured polyvinyl alcohol is particularly suitable from the viewpoints of the attachment property to the pigment and the stripping resistance of an ink-receiving layer.

The ink-receiving layer may contain a mordant, an insolubilizer, a light resistance improving agent, a surfactant or other additives in addition to the pigment and the aqueous binder.

It is preferred that the mordant to be added to the ink-receiving layer is immobilized.

To this end, a polymer-mordant is preferably used. The polymer-mordant is described in Japanese Patent Application Laid-Open Nos. S48-28325, S54-74430, S54-124726, S55-22766, S55-142339, S60-23850, S60-23851, S60-23852, S60-23853, S60-57836, S60-60643, S60-118834, S60-122940, S60-122941, S60-122942, S60-235134 and H1-161236, and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material including the polymer-mordant described on pages 212 to 215 of Japanese Patent Application Laid-Open No. H1-161236 is particularly preferred. If the polymer-mordant described in the aforementioned patent document is used, an image having an excellent image quality may be obtained, and at the same time, the light resistance of the image is improved.

The insolubilizer is effective to insolubilization of the image, and it is particularly preferred that the insolubilizer is a cation resin. The cation resin may be polyamidepolyamineepichlorohydrin, polyethyleneimine, polyaminesulfone, dimethyldiallylammonium chloride polymer, cation polyacrylamide, colloidal silica or the like. Among the cation resins, polyamidepolyamineepichlorohydrin is particularly appropriate. The content of the cation resin is preferably 1% by mass to 15% by mass and particularly preferably 3% by mass to 10% by mass based on the total solid of the ink-receiving layer.

The light resistance improving agent and the gas resistance improving agent may be a phenol compound, a hindered phenol compound, a thioether compound, a thiourea compound, a thiocyanic acid compound, an amine compound, a hindered amine compound, a TEMPO compound, a hydrazine compound, a hydrazide compound, an amidine compound, a vinyl group-containing compound, an ester compound, an amide compound, an ether compound, an alcohol compound, a sulfinic acid compound, saccharides, a water-soluble reducing compound, organic acid, inorganic acid, hydroxy group-containing organic acid, a benzotriazole compound, a benzophenone compound, a triazine compound, a heterocyclic compound, a water-soluble metal salt, an organic metal compound, a metal complex, or the like.

Specific examples of the compounds may include compounds described in Japanese Patent Application Laid-Open No. H10-182621, Japanese Patent Application Laid-Open No. 2001-260519, Japanese Patent Application Laid-Open No. 2000-260519, Japanese Patent Publication No. H4-34953, Japanese Patent Publication No. H4-34513, Japanese Patent Publication No. H4-34512, Japanese Patent Application Laid-Open No. H11-170686, Japanese Patent Application Laid-Open No. S60-67190, Japanese Patent Application Laid-Open No. H7-276808, Japanese Patent Application Laid-Open No. 2000-94829, Japanese National Publication of International Patent Application No. H8-512258, Japanese Patent Application Laid-Open No. H11-321090, and the like.

The surfactant serves as a coating aid, a stripping improving agent, a slipping preventing agent or an antistatic agent. The surfactant is described in Japanese Patent Application Laid-Open Nos. S62-173463 and S62-183457.

An organic fluoro compound may be used instead of the surfactant. It is preferred that the organic fluoro compound is hydrophobic. Examples of the organic fluoro compound include a fluorine-based surfactant, an oil phase fluorine-based compound (for example, fluorine oil), and a solid type fluorine compound resin (for example, a tetrafluoroethylene resin). The organic fluoro compound is described in Japanese Patent Publication No. S57-9053 (8th to 17th columns), and Japanese Patent Application Laid-Open Nos. S61-20994 and S62-135826.

As the hardening agent, materials and the like described on page 222 of Japanese Patent Application Laid-Open No. H1-161236, Japanese Patent Application Laid-Open No. H9-263036, Japanese Patent Application Laid-Open No. H10-119423, and Japanese Patent Application Laid-Open No. 2001-310547 may be used.

The other additives added to the image-receiving layer may be a pigment dispersant, a thickener, an antifoaming agent, a dye, a fluorescent brightening agent, a preservative, a pH adjusting agent, a matting agent, or the like. Meanwhile, the ink-receiving layer may have one layer or two layers.

The back coat layer may be provided into the recording paper and the recording film, and the component that may be added to the layer may be a white pigment, a water-based binder or other components. Examples of the white pigment that may be contained in the back coat layer may include a white inorganic pigment such as precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomite, calcium silicate, magnesium silicate, synthetic amorphous silica, colloidal silica, colloidal alumina, pseudo boehmite, aluminum hydroxide, alumina, lithopone, zeolite, hydrate halloysite, magnesium carbonate and magnesium hydroxide, an organic pigment such as a styrene-based plastic pigment, an acrylic plastic pigment, polyethylene, microcapsules, a urea resin and a melamine resin, and the like.

Examples of the water-based binder that may be contained in the back coat layer may include a water-soluble polymer such as a styrene/maleate copolymer, a styrene/acrylate copolymer, polyvinyl alcohol, silanol-modified polyvinyl alcohol, starch, cationic starch, casein, gelatin, carboxymethyl cellulose, hydroxyethyl cellulose and polyvinylpyrrolidone, a water-dispersible polymer such as a styrene butadiene latex and an acryl emulsion, and the like. Examples of the other components that may be contained in the back coat layer may include an antifoaming agent, a defomaing agent, a dye, a fluorescent brightening agent, a preservative, an insolubilizer and the like.

Polymer latex may be added to a constitutional layer (including the back coat layer) of the inkjet recording paper and the recording film. Polymer latex is used for the purpose of improvement in physical properties of the layer, such as dimensional stabilization, curling prevention, attachment prevention, and crack prevention of the layer. Polymer latex is described in Japanese Patent Application Laid-Open Nos. S62-245258, S62-136648 and S62-110066. When polymer latex having a low glass transition temperature (40° C. or less) is added to the layer including the mordant, cracks or curling of the layer may be prevented. Further, even though polymer latex having a high glass transition temperature is added to the back coat layer, curling may be prevented.

<Inkjet Recording Method>

The present invention also relates to an inkjet recording method using the ink for inkjet recording related to the present invention.

The inkjet recording method using the ink of the present invention is not limited, and is used in a known manner, for example, a charge control manner discharging an ink using electrostatic force, a drop-on-demand manner (pressure pulse manner) using vibration pressure of a piezo element, a sound inkjet manner discharging an ink using radiation pressure by changing an electric signal into a sound beam and radiating the beam to the ink, a thermal inkjet manner using pressure generated by heating an ink to form bubbles, and the like.

In the inkjet recording method, a manner of injecting an ink that is called a photo ink at a low concentration in a plurality of small volumes, a manner of improving an image quality by using a plurality of inks having substantially the same color and different concentrations, and a manner of using a colorless transport ink are included.

A preferred combination of a material to be recorded and a recording method is an inkjet recording method of recording an image on an image-receiving material by discharging ink droplets on the image-receiving material having an image-receiving layer containing white inorganic pigment particles on a support according to a recording signal.

The ink for inkjet recording of the present invention may also be used for use other than inkjet recording. For example, it is possible to use the ink for inkjet recording in a material for a display image, a material for forming an image on interior decoration materials, a material for forming an image on exterior decoration materials, and the like.

Examples of the material for a display image include various materials such as posters, wallpaper, decorative articles (ornaments, dolls or the like), advertising fliers, wrapping paper, wrapping materials, paper bags, plastic bags, package materials, billboards, images painted on or attached to sides of transport facilities (cars, buses, trains and the like), clothes with logo types, and the like. When the dye of the present invention is used as a material for forming a display image, the term "image" includes all of patterns formed by the dye, which are recognizable by humans, from images in a narrow sense to abstract designs, characters, geometrical patterns and the like.

Examples of interior decoration materials include various materials such as wallpaper, decorative articles (ornaments, dolls or the like), members of lighting fixtures, members of furniture, design members of a floor or a ceiling, and the like. When the dye of the present invention is used as a material for forming an image, the term "image" includes all of patterns formed by the dye, which are recognizable by humans, from images in a narrow sense to abstract designs, characters, geometrical patterns and the like.

Examples of exterior decoration materials include various materials such as wall materials, roofing materials, signboards, gardening materials, outdoor decorative articles (ornaments, dolls or the like), members of outdoor lighting fixtures, and the like. When the dye of the present invention is used as a material for forming an image, the term "image" includes all of patterns formed by the dye, which are recognizable by human, from images in a narrow sense to abstract designs, characters, geometrical patterns and the like.

In the uses described above, examples of media on which patterns are formed include various articles such as paper, texture, cloth (including nonwoven fabric), plastics, metals, ceramics and the like. As the dyeing form, colorants may be fixed in the form of mordanting, textile printing or a reactive dye into which a reactive group is introduced. Among them, the dyeing in the form of mordanting is preferred.

<Other Inks>

In order to form a full-color image and the like, it is possible to use the ink of the present invention in combination with an ink having a color tone separate from the ink of the present invention. It is preferred that the ink of the present invention is used along with at least one ink selected from, for example, black ink, cyan ink, magenta ink, yellow ink, red ink, green ink, blue ink and the like. Further, it is also possible to use the ink of the present invention further in combination with a light shade ink having substantially the same color tone as these inks. A known dye, or an aqueous dye newly synthesized may also be used as an aqueous dye of these inks or light shade ink.

EXAMPLES

Hereinafter, the present invention will be described in more detail with reference to Examples, but the present invention is not limited to the following Examples.

The dye, BLACK-11, used in the present invention may be derived from, for example, the following synthesis route.

Synthesis Example 1

The synthesis scheme of BLACK-11 (M:Li/Na≈70/30 (mol/mol)) is shown as follows.

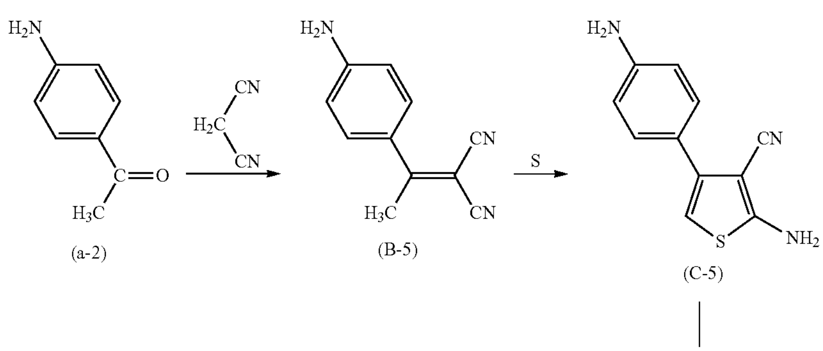

-continued
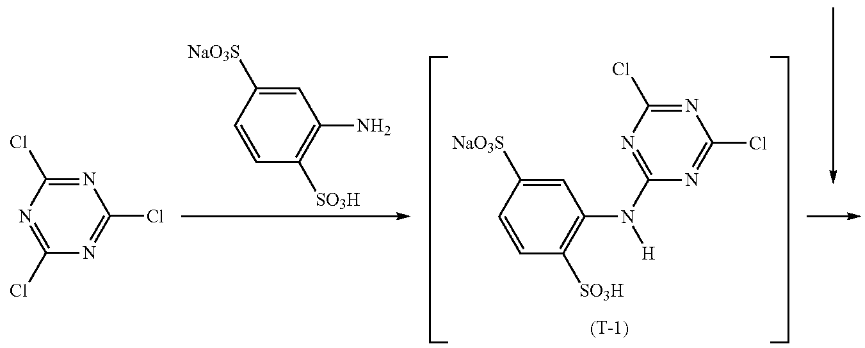
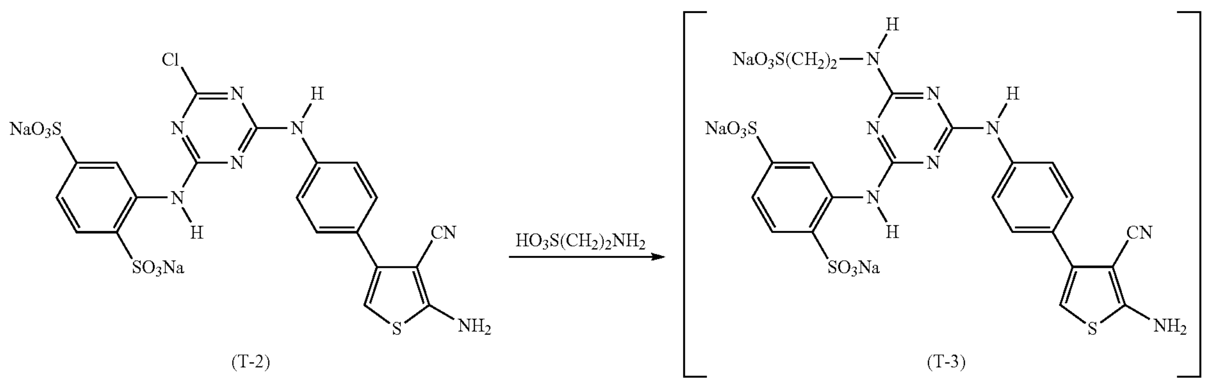
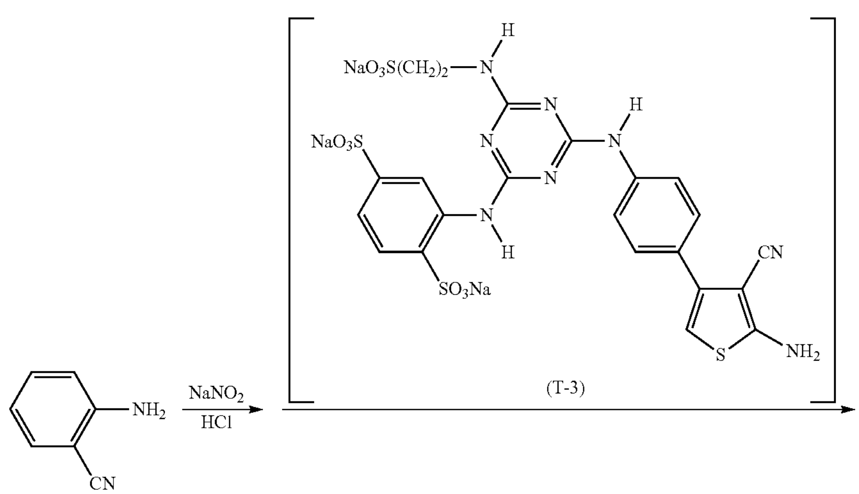

-continued

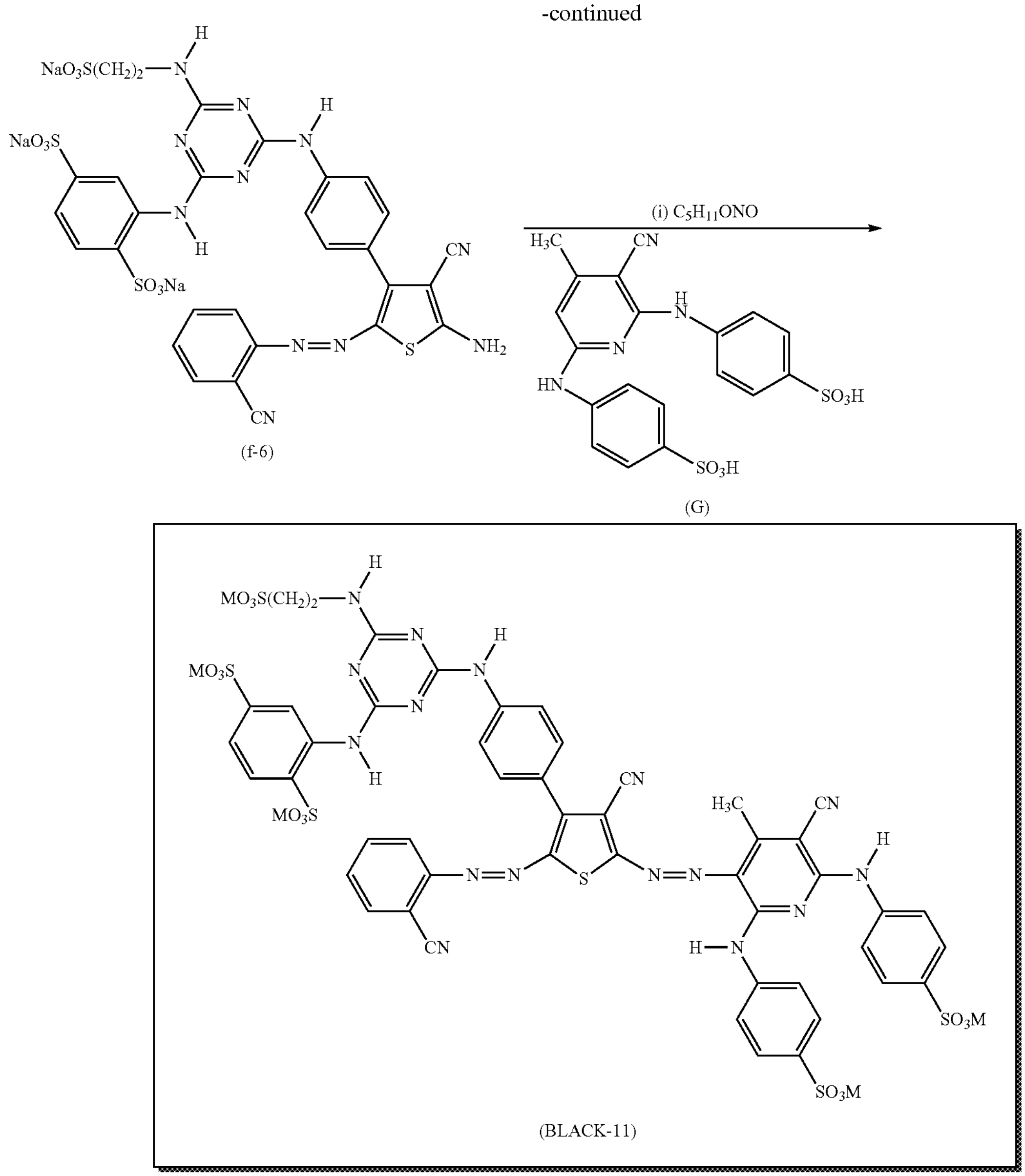

(BLACK-11)

(1) Synthesis of Intermediate (B-5):

After 8.5 g of aminoacetophenone (a-2), 4.9 g of malononitrile, 26.5 mL of toluene, 5.0 g of ammonium acetate, and 5.9 g of acetic acid were added at room temperature, the internal temperature was increased to 100° C., and stirring was performed at the same temperature for 3 hours. After the reaction solution was cooled to 40° C., 31.8 mL of methanol was poured to be added, and stirred for 20 minutes, and the reaction solution was filtered. Washing was performed with 42.4 mL of isopropyl alcohol, and drying was performed at 60° C. for 8 hours. 11.1 g of (B-5) was obtained.

(2) Synthesis of Intermediate (C-5):

After 8.0 g of (B-5), 2.8 g of sulfur, 7.4 g of sodium hydrogen carbonate, 160 mL of dimethylacetamide, 80 mL of acetonitrile, and 80 mL of water were mixed at room temperature, the internal temperature was increased to 40° C., and stirring was performed at the same temperature for 1 hour. After the reaction solution was cooled to 25° C., an insoluble material was filtered to obtain (C-5) in a solution state.

(3) Synthesis of Intermediate (T-1):

100 mL of acetone was cooled to the internal temperature of 0° C., and 18.4 g of cyanuric chloride was added. Subsequently, 27.5 g of 2,5-disulfoaniline and 10.6 g of sodium carbonate were dissolved in 95 g of water, and added dropwise at the internal temperature of 0° C. to 4° C. or below for 30 minutes. After stirring at the internal temperature of 0° C. to 5° C. for 2.5 hours, 200 mL of methanol and 200 mL of isopropyl alcohol were added dropwise at the internal temperature of 5° C. or below, and the precipitated insoluble material was filtered to obtain (T-1) in a solution state.

(4) Synthesis of Intermediate (T-2):

While (T-1) obtained in (3) was maintained at the internal temperature of 20° C., 240.0 g of (C-5) was added dropwise. After the dropwise addition of (C-5), the internal temperature was increased to 30° C., and stirring was performed for 2.0 hours. 2.3 L of isopropyl alcohol was added dropwise at the internal temperature of 30° C. to 35° C. for 1 hour, and stirred at the same temperature for 30 minutes. The reaction solution was filtered, washed with isopropyl alcohol, and dried to obtain 24.0 g of (T-2).

(5) Synthesis of Intermediate (T-3):

8.0 g of taurine and 6.8 g of sodium carbonate were completely dissolved in 650 mL of water at room temperature, and 24.0 g of (T-2) was added as a powder to the solution. The internal temperature was increased to 100° C., and stirring was performed at the same temperature for 1.5 hours. The reaction solution was cooled to the internal temperature of 25° C. to obtain Intermediate (T-3) in a solution state.

(6) Synthesis of Intermediate (f-6):

58 mL of water was added to 4.4 g of 2-aminobenzonitrile (e-1), and stirred at room temperature, 10.5 mL of 12 M hydrochloric acid solution was added dropwise, and the reaction solution was cooled to the internal temperature of 0° C. While the internal temperature was maintained at 0° C. to 4° C., a 25% aqueous solution of 2.8 g of sodium nitrite was added dropwise, and stirred at the internal temperature of 0° C. to 5° C. for 1.5 hours. Thereafter, 0.4 g of urea was added and stirred for 15 minutes to obtain a diazonium salt solution. Separately from the diazonium salt solution, 300 mL of water was added to Intermediate (T-3) and cooled to the internal temperature of 2° C., the adjusted aforementioned diazonium salt solution was added dropwise at the internal temperature of 2° C. to 4° C. for 15 minutes. The internal temperature was maintained at 2° C. to 4° C. and stirring was performed for 2 hours to obtain (f-6) in a solution state.

(7) Synthesis of BLACK-11:

(f-6) obtained in (6) was stirred at room temperature, 17.7 g of Intermediate (G) was completely dissolved in 60 mL of water and added dropwise. 4.5 g of isoamyl nitrite was added dropwise at the internal temperature of 22° C., and stirred at the same temperature for 30 minutes. Thereafter, 0.2 g of isoamyl nitrite was further added dropwise, and stirred at the internal temperature of 22° C. for 2 hours. After the reaction solution was subjected to dust removal by filtration to remove insoluble material, 183 mL of dimethylacetamide was added to the reaction solution, and 1.1 L of isopropyl alcohol was added dropwise for 30 minutes. The slurry type reaction solution was filtered, and washed with 2 L of methanol to obtain coarse BLACK-11.

220 mL of water was added to the coarse powder, and dissolved therein, and 370 mL of isopropyl alcohol was added dropwise and filtered again to obtain a wet cake. The wet cake was completely dissolved in 220 mL of water, 1 N-lithium hydroxide aqueous solution was added to adjust the pH value to 8.3 (25° C.), and 100 mL of methanol was added to perform dust removal by filtration. The internal temperature of the solution was increased to 40° C., 300 mL of saturated LiCl isopropyl alcohol solution was added dropwise at the same temperature, and the precipitated crystal was filtered to obtain the wet crystal. 170 mL of water and 100 mL of methanol were added to the obtained wet crystal, and 430 mL of saturated LiCl isopropyl alcohol solution was added dropwise with stirred at the internal temperature of 40° C. and the precipitated crystal was separated by filtration. After washing with 500 mL of isopropyl alcohol, drying was performed at 40° C. for 12 hours to obtain 11.3 g of fine BLACK-11 (M:Li/Na≈70/30 (mol/mol)).

Further, the Li salt type ion exchange resin (manufactured by ORGANO CORPORATION, IR-120B was a Li type) was used with regard to the thus-obtained BLACK-11 (M:Li/Na≈70/30(mol/mol)) to obtain BLACK-11 (M:Li (that is, M is completely Li)).

Synthesis Example 2

The synthesis scheme of BLACK-32 (M:Li) is shown as follows.

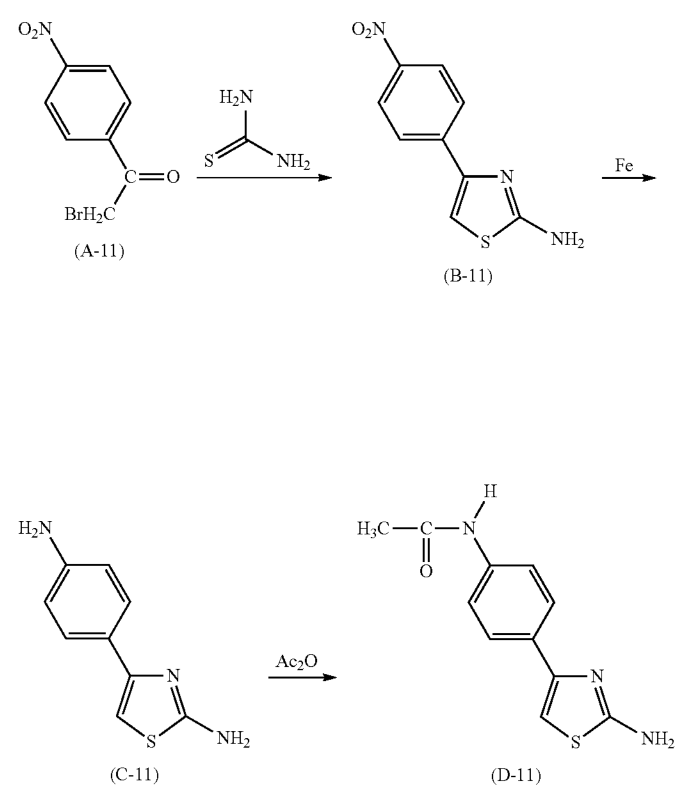

-continued

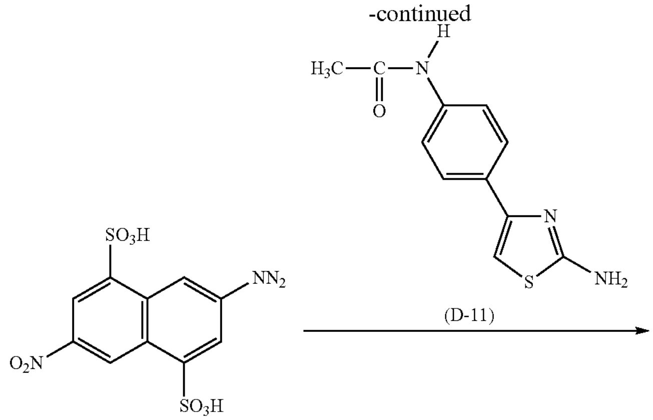

(E-11)

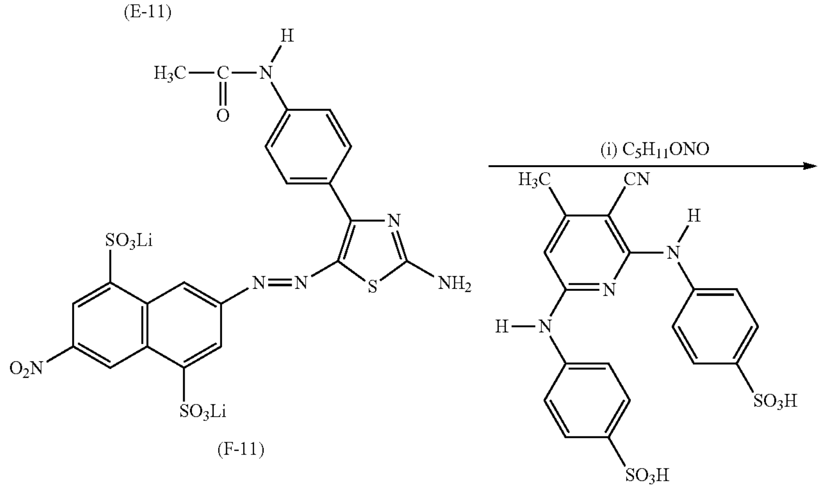

(F-11)

(G)

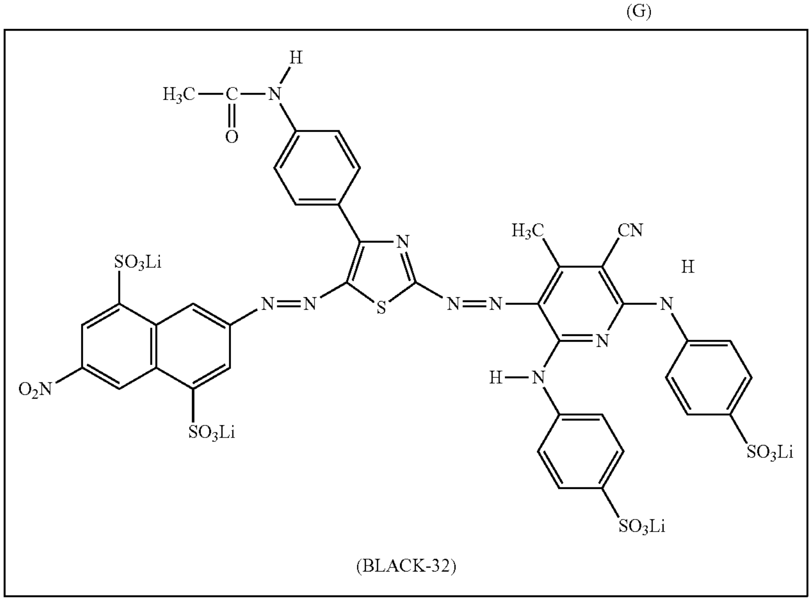

(BLACK-32)

(1) Synthesis of Intermediate (B-11):

In 12.5 g of thiourea and 120 ml of water, 40 g of a raw material (A-11: a product manufactured by Wako Pure Chemical Industries, Ltd) was added, followed by stirring at 70° C. for 5 hours. The precipitated crystal was separated by filtration, 400 ml of a 5% NaOH solution was added, followed by stirring at room temperature for 3 hours and then filtration to obtain 35.5 g of a yellow crystal of Intermediate (B-11).

(2) Synthesis of Intermediate (C-11):

57.0 g of reduced iron, 5.0 g of ammonium chloride, 35 ml of water, and 250 ml of isopropyl alcohol were refluxed for 30 minutes, and 22.0 g of the intermediate (B-11) was added thereto, and refluxed and stirred for 1 hour. After the filtration, the filtrate was concentrated to obtain 15.0 g of a yellow crystal of Intermediate (C-11).

(3) Synthesis of Intermediate (D-11)

9.6 g of Intermediate (C-11) was added to 125 ml of acetone, and stirred and dissolved at the internal temperature of 50° C. After cooling was performed in an ice bath to the internal temperature of 4° C., 5.6 g of acetic anhydride was added dropwise for 15 minutes. After the temperature was increased to room temperature, 50 mL of water was added, and acetone was distilled off under reduced pressure. The crystal was separated by filtration, washed twice with 50 mL of water, and dried at 80° C. for 6 hours to obtain 9.9 g of a white crystal of Intermediate (D-11).

(4) Synthesis of Intermediate (F-11)

4.3 g of Intermediate (E-11) was added to 43 mL of water, and stirred at room temperature. 4.0 mL of 12N hydrochloric acid was added dropwise, followed by cooling to the internal temperature of 5° C. or below. 3 mL of the aqueous solution of 0.9 g of sodium nitrite was added dropwise thereto, followed by stirring at the internal temperature of 5° C. or below for 2 hours. After that, 0.1 g of urea was added, and stirred at the internal temperature of 4° C. for 15 minutes to obtain a diazonium solution. Separately, 2.4 g of Intermediate (D-11) and 8.6 g of lithium acetate were dissolved in 55 mL of methanol and 3.5 mL of dimethylacetamide, and cooled to the internal temperature of 5° C. The diazonium solution was added dropwise at the internal temperature of 5° C. or below for 5 minutes. After stirring for 1.5 hours, 15.0 g of lithium chloride was added, and subsequently, 150 mL of isopropyl alcohol was added dropwise. The crystal was separated by filtration, and then washed with 100 mL of isopropyl alcohol. Drying was performed at 80° C. to obtain 5.4 g of a brown crystal of Intermediate (F-11).

(5) Synthesis of BLACK-32

The pH of a solution of 5.0 g of Intermediate (F-11), 3.8 g of Intermediate (G) and 150 mL of water was adjusted to 2 or below by 12N hydrochloric acid, and 1.5 g of isoamyl nitrite was added dropwise at the internal temperature of 35° C. to 40° C. After stirring at the internal temperature 40° C. for 4 hours, 20 g of lithium chloride were added, and subsequently, 25 mL of isopropyl alcohol was added dropwise. After cooling to room temperature, the crystal was separated by filtration, and then washed with 50 mL of isopropyl alcohol. 60 mL of water was added to the crystal, the internal temperature was increased to 40° C., and then, 100 mL of isopropyl alcohol was added dropwise. After cooling to the internal temperature of 25° C., the crystal was separated by filtration. The obtained crystal was added to 35 mL of water, and the pH was adjusted to 8.3 with addition of 4 mol/L lithium hydroxide aqueous solution. 250 mL of isopropyl alcohol was added dropwise thereto, and the precipitated crystal was separated by filtration. The isolated crystal was washed with 30 mL of isopropyl alcohol, and then dried at 80° C. to obtain 2.7 g of a black crystal of (BLACK-32) (M:Li).

Synthesis Example 3

The synthesis scheme of BLACK-31 (M:Li) was shown below.

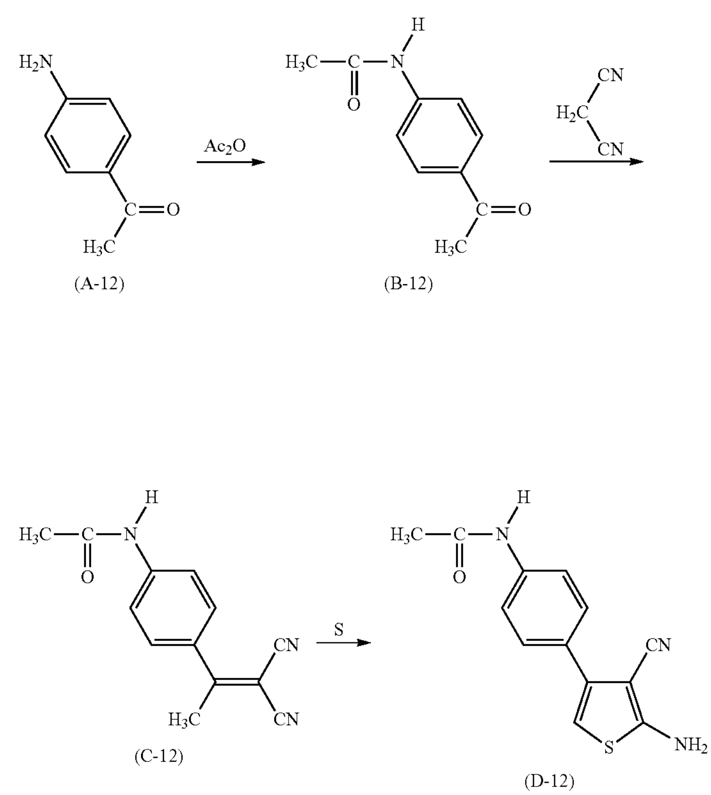

-continued

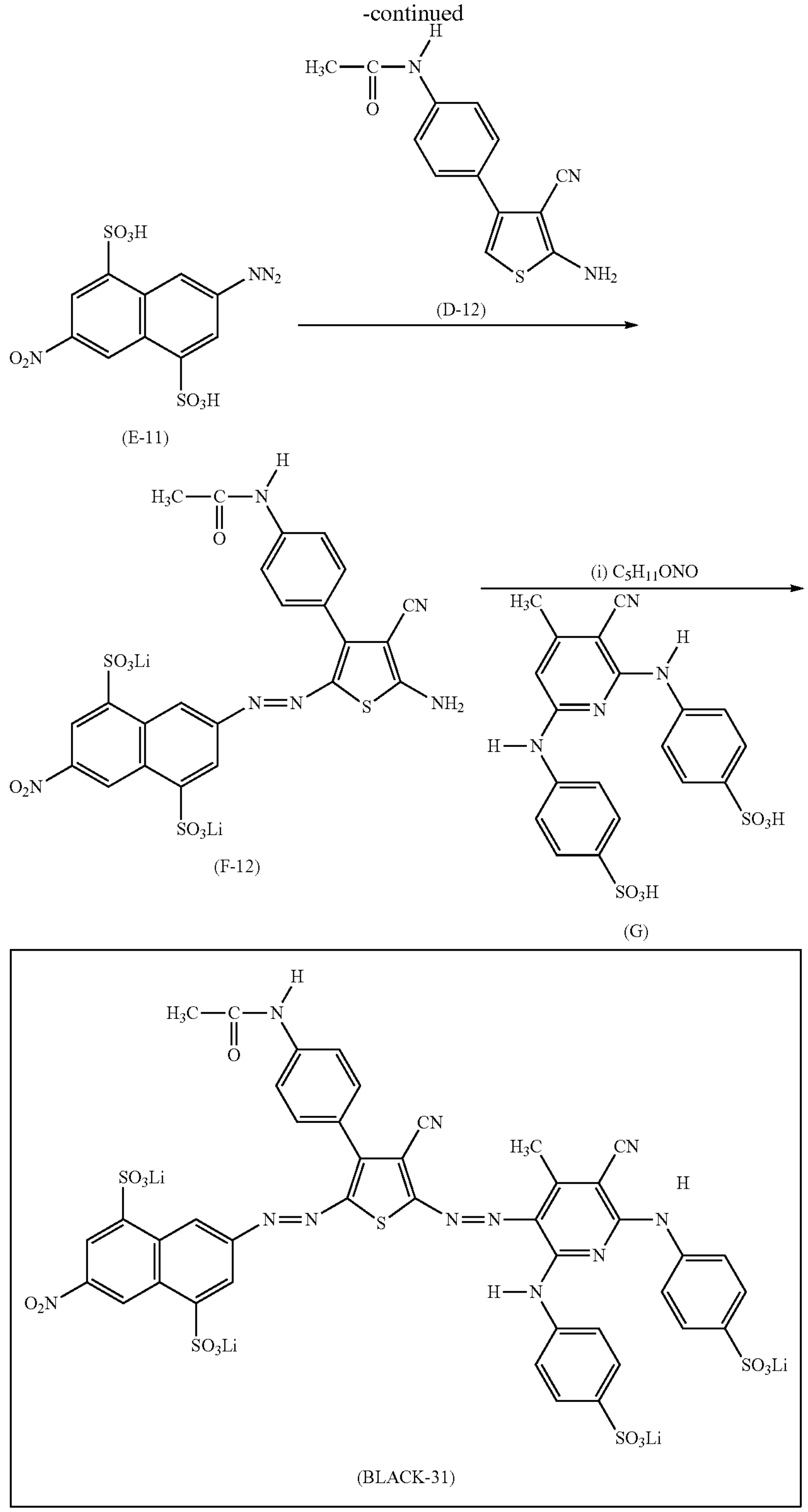

(1) Synthesis of Intermediate (B-12):

20.3 g of p-aminoacetophenone (A-12; a product manufactured by Tokyo Chemical Industry Co., Ltd.) was added to 150 mL of acetonitrile, and completely dissolved by stirring at room temperature. Subsequently, 13.4 mL of pyridine was added, and the internal temperature was maintained at 4° C. in an ice bath. 11.8 g of acetic anhydride was added dropwise, and stirred at the internal temperature of 4° C. for 15 minutes. 300 mL of water, and subsequently, 5 mL of 12N hydrochloric acid were added to the reaction solution, and the crystal was separated by filtration. After washing with 100 mL of water, drying was performed at 80° C. to obtain 18.6 g of a white crystal of Intermediate (B-12).

(2) Synthesis of Intermediate (C-12):

17.7 g of Intermediate (B-12), 7.3 g of malononitrile, 4.6 mL of acetic acid, 1.5 g of ammonium acetate, and 20 mL of toluene were placed into 100 mL three-necked flask equipped with a Dean-Stark trap, and refluxed in an oil bath at 125° C. After stirring for 1 hour, 4.6 mL of acetic acid and 1.5 g of ammonium acetate were further added, and stirred under a reflux condition for 2 hours. After cooling in the air, 30 mL of methanol was added, and stirred in an ice bath for 30 minutes. The crystal was separated by filtration, washed with 20 mL of cold methanol, and dried. 12.1 g of a white crystal of Intermediate (C-12) was obtained.

(3) Synthesis of Intermediate (D-12)

1.5 g of sulfur was added to a solution of 11.3 g of Intermediate (C-12) and 20 mL of ethanol 20 mL, and 6.6 mL of triethylamine was then added dropwise. After stirring was performed at the internal temperature of 50° C. for 30 minutes, 500 mL of ethyl acetate and 300 mL of water were added, followed by agitation and then liquid separation. 200 mL of the saline solution was added to the organic layer, followed by agitation and then liquid separation, and magnesium sulfate was added to the organic layer and dried. After the organic solvent was distilled off, 50 mL of isopropanol was added, suspended, and stirred and the crystal was separated by filtration. Drying was performed at 80° C. to obtain 8.1 g of a white crystal of Intermediate (D-12).

(4) Synthesis of Intermediate (F-12)

6.0 g of Intermediate (E-11) was added to 60 mL of water, followed by stirring at room temperature, and 4.0 mL of 12N hydrochloric acid was added dropwise, followed by cooling to the internal temperature of 4° C. or below. 4 mL of the aqueous solution of 1.3 g of sodium nitrite was added dropwise thereto. After stirring at the internal temperature of 5° C. or below for 2 hours, 0.1 g of urea was added, and stirred at the internal temperature of 4° C. for 15 minutes to obtain a diazonium solution.

Separately, 3.4 g of Intermediate (D-12) and 12.0 g of lithium acetate were dissolved in 90 mL of methanol and 10 mL of dimethylacetamide, followed by cooling to the internal temperature of 4° C., and then, the diazonium solution was added dropwise at the internal temperature of 5° C. or below for 15 minutes. After stirring at the internal temperature of 4° C. or below for 1.5 hours, 20.0 g of lithium chloride was added, and 75 mL of acetonitrile was added dropwise. The crystal was separated by filtration, and then washed with acetonitrile. The isolated crystal was suspended and washed with 75 mL of isopropyl alcohol at the internal temperature of 50° C. Drying was performed at 80° C. to obtain 6.4 g of a brown crystal of Intermediate (F-12).

(5) Synthesis of BLACK-31

The pH of a solution of 5.0 g of Intermediate (F-12), 3.7 g of Intermediate (G) and 50 mL of water was adjusted to 2 or below by 12N hydrochloric acid, and 1.2 g of isoamyl nitrite was added dropwise at the internal temperature of 35° C. to 40° C. After stirring at the internal temperature of 40° C. for 3 hours, 50.0 g of lithium chloride were added, followed by cooling to the internal temperature of 25° C. The crystal was separated by filtration, and then washed with 150 mL of isopropyl alcohol. The isolated crystal was added to 200 mL of methanol, the internal temperature was increased to 40° C., and then, 800 mL of acetonitrile was added dropwise. After the dropwise addition, stirring was performed for 15 minutes, followed by cooling to the internal temperature of 25° C. The crystal was separated by filtration, and added to 150 mL of water, and then, 450 mL of isopropyl alcohol was added dropwise at room temperature. The crystal was separated by filtration, and added to 50 mL of water, and then, the pH was adjusted to 8.3 with addition of 4 mol/L lithium hydroxide aqueous solution. 150 mL of isopropyl alcohol was added dropwise to the solution, and the precipitated crystal was separated by filtration. The isolated crystal was washed with 150 mL of isopropyl alcohol, and then dried at 80° C. to obtain 4.3 g of a black crystal of (BLACK-31) (M:Li).

Examples 1 to 153 and Comparative Examples 1 to 77

Preparation of Ink Composition

Using the aforementioned first water-soluble long-wavelength dye and second water-soluble long-wavelength dye, and additionally, the water-soluble short-wavelength dye S, each ink composition of Examples 1 to 153 and Comparative Examples 1 to 77 was prepared based on the following composition, by stirring each component at room temperature for 30 minutes, and filtering the obtained solution by using the membrane filter having a mesh size of 1.0 μm. Further, the first water-soluble long-wavelength dye and the second water-soluble long-wavelength dye used in Examples have a maximum wavelength of an absorption spectrum in an aqueous solvent at a range of 550 nm to 700 nm. Further, the numerical value of each component represents % by mass of each component in the case where the mass of the ink composition is 100%, and "balance" representing the amount of water represents the amount that adds up to the total sum of 100% with the components other than water.

(Ink Composition)

Dye (the composition of the dyes are shown in Tables 22 to 31): The sum of the whole dyes: 6%

Glycerin: 8%

Ethylene glycol: 3%

Diethylene glycol: 5%

2-pyrrolidone: 5%

Ethylene urea: 2%

OLFINE E1010 (acetylene-based, manufactured by Nissin Chemical Industry Co., Ltd): 1%

Ultrapure water: balance

TABLE 22

| | | First water-soluble long-wavelenght dye | | Second water-soluble long-wavelenght dye | | water-soluble short-wavelenght dye |
|---|---|---|---|---|---|---|
| | Ink composition | Kind | Amount (g) | Kind | Amount (g) | Amount (g) |
| Ex. 1 | 1 | BLACK-11* | 2.6 | Dc-9 | 2.5 | 0.9 |
| Ex. 2 | 2 | BLACK-11* | 2.6 | Dg-1 | 2.5 | 0.9 |
| Ex. 3 | 3 | BLACK-11* | 2.6 | Df-2 | 2.5 | 0.9 |
| Ex. 4 | 4 | BLACK-11* | 2.6 | Ta-7 | 2.5 | 0.9 |
| Ex. 5 | 5 | BLACK-11* | 2.6 | Ta-10 | 2.5 | 0.9 |
| Ex. 6 | 6 | BLACK-11* | 2.6 | Ta-14 | 2.5 | 0.9 |

TABLE 22-continued

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 7 | 7 | BLACK-11* | 2.6 | Tb-13 | 2.5 | 0.9 |
| Ex. 8 | 8 | BLACK-11* | 2.6 | Tb-19 | 2.5 | 0.9 |
| Ex. 9 | 9 | BLACK-11* | 2.6 | Tb-47 | 2.5 | 0.9 |
| Ex. 10 | 10 | BLACK-11* | 2.6 | Tc-2 | 2.5 | 0.9 |
| Ex. 11 | 11 | BLACK-11* | 2.6 | Td-1 | 2.5 | 0.9 |
| Ex. 12 | 12 | BLACK-11* | 2.6 | Qa-25 | 2.5 | 0.9 |
| Ex. 13 | 13 | BLACK-11* | 1.7 | Tb-47 | 3.4 | 0.9 |
| Ex. 14 | 14 | BLACK-11* | 3.4 | Tb-47 | 1.7 | 0.9 |
| Ex. 15 | 15 | BLACK-11* | 3.4 | Td-1 | 1.7 | 0.9 |
| Ex. 16 | 16 | BLACK-11* | 3.4 | Tb-19 | 1.7 | 0.9 |
| Ex. 17 | 17 | BLACK-11* | 3.0 | Tb-13 | 3.0 | None |
| C. Ex. 1 | 18 | BLACK-11* | 6.0 | None | — | 0.9 |
| C. Ex. 2 | 19 | None | — | Dc-9 | 6.0 | 0.9 |
| C. Ex. 3 | 20 | None | — | Tb-47 | 6.0 | 0.9 |
| C. Ex. 4 | 21 | None | — | Td-1 | 6.0 | 0.9 |
| C. Ex. 5 | 22 | None | — | Qa-25 | 6.0 | 0.9 |
| C. Ex. 6 | 23 | None | — | Ta-10 | 6.0 | 0.9 |

*M: Li/Na ≈ 70/30 (mol/mol)

TABLE 23

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 18 | 24 | BLACK-11** | 2.6 | Dc-9 | 2.5 | 0.9 |
| Ex. 19 | 25 | BLACK-11** | 2.6 | Dg-1 | 2.5 | 0.9 |
| Ex. 20 | 26 | BLACK-11** | 2.6 | Df-2 | 2.5 | 0.9 |
| Ex. 21 | 27 | BLACK-11** | 2.6 | Ta-7 | 2.5 | 0.9 |
| Ex. 22 | 28 | BLACK-11** | 2.6 | Ta-10 | 2.5 | 0.9 |
| Ex. 23 | 29 | BLACK-11** | 2.6 | Ta-14 | 2.5 | 0.9 |
| Ex. 24 | 30 | BLACK-11** | 2.6 | Tb-13 | 2.5 | 0.9 |
| Ex. 25 | 31 | BLACK-11** | 2.6 | Tb-19 | 2.5 | 0.9 |
| Ex. 26 | 32 | BLACK-11** | 2.6 | Tb-47 | 2.5 | 0.9 |
| Ex. 27 | 33 | BLACK-11** | 2.6 | Tc-2 | 2.5 | 0.9 |
| Ex. 28 | 34 | BLACK-11** | 2.6 | Td-1 | 2.5 | 0.9 |
| Ex. 29 | 35 | BLACK-11** | 2.6 | Qa-25 | 2.5 | 0.9 |
| Ex. 30 | 36 | BLACK-11** | 1.7 | Tb-47 | 3.4 | 0.9 |
| Ex. 31 | 37 | BLACK-11** | 3.4 | Tb-47 | 1.7 | 0.9 |
| Ex. 32 | 38 | BLACK-11** | 3.4 | Td-1 | 1.7 | 0.9 |
| Ex. 33 | 39 | BLACK-11** | 3.4 | Tb-19 | 1.7 | 0.9 |
| Ex. 34 | 40 | BLACK-11** | 3.0 | Tb-13 | 3.0 | None |
| C. Ex. 7 | 41 | BLACK-11** | 6.0 | None | — | 0.9 |
| C. Ex. 8 | 42 | None | — | Dc-9 | 6.0 | 0.9 |
| C. Ex. 9 | 43 | None | — | Tb-47 | 6.0 | 0.9 |
| C. Ex. 10 | 44 | None | — | Td-1 | 6.0 | 0.9 |
| C. Ex. 11 | 45 | None | — | Qa-25 | 6.0 | 0.9 |
| C. Ex. 12 | 46 | None | — | Ta-10 | 6.0 | 0.9 |

**M: Li

TABLE 24

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 35 | 47 | BLACK-10 | 2.6 | Dc-9 | 2.5 | 0.9 |
| Ex. 36 | 48 | BLACK-10 | 2.6 | Dg-1 | 2.5 | 0.9 |
| Ex. 37 | 49 | BLACK-10 | 2.6 | Df-2 | 2.5 | 0.9 |
| Ex. 38 | 50 | BLACK-10 | 2.6 | Ta-7 | 2.5 | 0.9 |
| Ex. 39 | 51 | BLACK-10 | 2.6 | Ta-10 | 2.5 | 0.9 |

TABLE 24-continued

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 40 | 52 | BLACK-10 | 2.6 | Ta-14 | 2.5 | 0.9 |
| Ex. 41 | 53 | BLACK-10 | 2.6 | Tb-13 | 2.5 | 0.9 |
| Ex. 42 | 54 | BLACK-10 | 2.6 | Tb-19 | 2.5 | 0.9 |
| Ex. 43 | 55 | BLACK-10 | 2.6 | Tb-47 | 2.5 | 0.9 |
| Ex. 44 | 56 | BLACK-10 | 2.6 | Tc-2 | 2.5 | 0.9 |
| Ex. 45 | 57 | BLACK-10 | 2.6 | Td-1 | 2.5 | 0.9 |
| Ex. 46 | 58 | BLACK-10 | 2.6 | Qa-25 | 2.5 | 0.9 |
| Ex. 47 | 59 | BLACK-10 | 1.7 | Tb-47 | 3.4 | 0.9 |
| Ex. 48 | 60 | BLACK-10 | 3.4 | Tb-47 | 1.7 | 0.9 |
| Ex. 49 | 61 | BLACK-10 | 3.4 | Td-1 | 1.7 | 0.9 |
| Ex. 50 | 62 | BLACK-10 | 3.4 | Tb-19 | 1.7 | 0.9 |
| Ex. 51 | 63 | BLACK-10 | 3.0 | Tb-13 | 3.0 | None |
| C. Ex. 13 | 64 | BLACK-10 | 6.0 | None | — | 0.9 |
| C. Ex. 14 | 65 | None | — | Dc-9 | 6.0 | 0.9 |
| C. Ex. 15 | 66 | None | — | Tb-47 | 6.0 | 0.9 |
| C. Ex. 16 | 67 | None | — | Td-1 | 6.0 | 0.9 |
| C. Ex. 17 | 68 | None | — | Qa-25 | 6.0 | 0.9 |
| C. Ex. 18 | 69 | None | — | Ta-10 | 6.0 | 0.9 |

TABLE 25

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 52 | 70 | BLACK-32 | 2.6 | Dc-9 | 2.5 | 0.9 |
| Ex. 53 | 71 | BLACK-32 | 2.6 | Dg-1 | 2.5 | 0.9 |
| Ex. 54 | 72 | BLACK-32 | 2.6 | Df-2 | 2.5 | 0.9 |
| Ex. 55 | 73 | BLACK-32 | 2.6 | Ta-7 | 2.5 | 0.9 |
| Ex. 56 | 74 | BLACK-32 | 2.6 | Ta-10 | 2.5 | 0.9 |
| Ex. 57 | 75 | BLACK-32 | 2.6 | Ta-14 | 2.5 | 0.9 |
| Ex. 58 | 76 | BLACK-32 | 2.6 | Tb-13 | 2.5 | 0.9 |
| Ex. 59 | 77 | BLACK-32 | 2.6 | Tb-19 | 2.5 | 0.9 |
| Ex. 60 | 78 | BLACK-32 | 2.6 | Tb-47 | 2.5 | 0.9 |
| Ex. 61 | 79 | BLACK-32 | 2.6 | Tc-2 | 2.5 | 0.9 |
| Ex. 62 | 80 | BLACK-32 | 2.6 | Td-1 | 2.5 | 0.9 |
| Ex. 63 | 81 | BLACK-32 | 2.6 | Qa-25 | 2.5 | 0.9 |
| Ex. 64 | 82 | BLACK-32 | 1.7 | Tb-47 | 3.4 | 0.9 |
| Ex. 65 | 83 | BLACK-32 | 3.4 | Tb-47 | 1.7 | 0.9 |
| Ex. 66 | 84 | BLACK-32 | 3.4 | Td-1 | 1.7 | 0.9 |
| Ex. 67 | 85 | BLACK-32 | 3.4 | Tb-19 | 1.7 | 0.9 |
| Ex. 68 | 86 | BLACK-32 | 3.0 | Tb-13 | 3.0 | None |
| C. Ex. 19 | 87 | BLACK-32 | 6.0 | None | — | 0.9 |
| C. Ex. 20 | 88 | None | — | Dc-9 | 6.0 | 0.9 |
| C. Ex. 21 | 89 | None | — | Tb-47 | 6.0 | 0.9 |
| C. Ex. 22 | 90 | None | — | Td-1 | 6.0 | 0.9 |
| C. Ex. 23 | 91 | None | — | Qa-25 | 6.0 | 0.9 |
| C. Ex. 24 | 92 | None | — | Ta-10 | 6.0 | 0.9 |

TABLE 26

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 69 | 93 | BLACK-31 | 2.6 | Dc-9 | 2.5 | 0.9 |
| Ex. 70 | 94 | BLACK-31 | 2.6 | Dg-1 | 2.5 | 0.9 |
| Ex. 71 | 95 | BLACK-31 | 2.6 | Df-2 | 2.5 | 0.9 |
| Ex. 72 | 96 | BLACK-31 | 2.6 | Ta-7 | 2.5 | 0.9 |
| Ex. 73 | 97 | BLACK-31 | 2.6 | Ta-10 | 2.5 | 0.9 |
| Ex. 74 | 98 | BLACK-31 | 2.6 | Ta-14 | 2.5 | 0.9 |

TABLE 26-continued

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 75 | 99 | BLACK-31 | 2.6 | Tb-13 | 2.5 | 0.9 |
| Ex. 76 | 100 | BLACK-31 | 2.6 | Tb-19 | 2.5 | 0.9 |
| Ex. 77 | 101 | BLACK-31 | 2.6 | Tb-47 | 2.5 | 0.9 |
| Ex. 78 | 102 | BLACK-31 | 2.6 | Tc-2 | 2.5 | 0.9 |
| Ex. 79 | 103 | BLACK-31 | 2.6 | Td-1 | 2.5 | 0.9 |
| Ex. 80 | 104 | BLACK-31 | 2.6 | Qa-25 | 2.5 | 0.9 |
| Ex. 81 | 105 | BLACK-31 | 1.7 | Tb-47 | 3.4 | 0.9 |
| Ex. 82 | 106 | BLACK-31 | 3.4 | Tb-47 | 1.7 | 0.9 |
| Ex. 83 | 107 | BLACK-31 | 3.4 | Td-1 | 1.7 | 0.9 |
| Ex. 84 | 108 | BLACK-31 | 3.4 | Tb-19 | 1.7 | 0.9 |
| Ex. 85 | 109 | BLACK-31 | 3.0 | Tb-13 | 3.0 | None |
| C. Ex. 25 | 110 | BLACK-31 | 6.0 | None | — | 0.9 |
| C. Ex. 26 | 111 | None | — | Dc-9 | 6.0 | 0.9 |
| C. Ex. 27 | 112 | None | — | Tb-47 | 6.0 | 0.9 |
| C. Ex. 28 | 113 | None | — | Td-1 | 6.0 | 0.9 |
| C. Ex. 29 | 114 | None | — | Qa-25 | 6.0 | 0.9 |
| C. Ex. 30 | 115 | None | — | Ta-10 | 6.0 | 0.9 |

TABLE 27

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 86 | 116 | BLACK-41 | 2.6 | Dc-9 | 2.5 | 0.9 |
| Ex. 87 | 117 | BLACK-41 | 2.6 | Dg-1 | 2.5 | 0.9 |
| Ex. 88 | 118 | BLACK-41 | 2.6 | Df-2 | 2.5 | 0.9 |
| Ex. 89 | 119 | BLACK-41 | 2.6 | Ta-7 | 2.5 | 0.9 |
| Ex. 90 | 120 | BLACK-41 | 2.6 | Ta-10 | 2.5 | 0.9 |
| Ex. 91 | 121 | BLACK-41 | 2.6 | Ta-14 | 2.5 | 0.9 |
| Ex. 92 | 122 | BLACK-41 | 2.6 | Tb-13 | 2.5 | 0.9 |
| Ex. 93 | 123 | BLACK-41 | 2.6 | Tb-19 | 2.5 | 0.9 |
| Ex. 94 | 124 | BLACK-41 | 2.6 | Tb-47 | 2.5 | 0.9 |
| Ex. 95 | 125 | BLACK-41 | 2.6 | Tc-2 | 2.5 | 0.9 |
| Ex. 96 | 126 | BLACK-41 | 2.6 | Td-1 | 2.5 | 0.9 |
| Ex. 97 | 127 | BLACK-41 | 2.6 | Qa-25 | 2.5 | 0.9 |
| Ex. 98 | 128 | BLACK-41 | 1.7 | Tb-47 | 3.4 | 0.9 |
| Ex. 99 | 129 | BLACK-41 | 3.4 | Tb-47 | 1.7 | 0.9 |
| Ex. 100 | 130 | BLACK-41 | 3.4 | Td-1 | 1.7 | 0.9 |
| Ex. 101 | 131 | BLACK-41 | 3.4 | Tb-19 | 1.7 | 0.9 |
| Ex. 102 | 132 | BLACK-41 | 3.0 | Tb-13 | 3.0 | None |
| C. Ex. 31 | 133 | BLACK-41 | 6.0 | None | — | 0.9 |
| C. Ex. 32 | 134 | None | — | Dc-9 | 6.0 | 0.9 |
| C. Ex. 33 | 135 | None | — | Tb-47 | 6.0 | 0.9 |
| C. Ex. 34 | 136 | None | — | Td-1 | 6.0 | 0.9 |
| C. Ex. 35 | 137 | None | — | Qa-25 | 6.0 | 0.9 |
| C. Ex. 36 | 138 | None | — | Ta-10 | 6.0 | 0.9 |

TABLE 28

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 103 | 139 | BLACK-42 | 2.6 | Dc-9 | 2.5 | 0.9 |
| Ex. 104 | 140 | BLACK-42 | 2.6 | Dg-1 | 2.5 | 0.9 |
| Ex. 105 | 141 | BLACK-42 | 2.6 | Df-2 | 2.5 | 0.9 |
| Ex. 106 | 142 | BLACK-42 | 2.6 | Ta-7 | 2.5 | 0.9 |
| Ex. 107 | 143 | BLACK-42 | 2.6 | Ta-10 | 2.5 | 0.9 |
| Ex. 108 | 144 | BLACK-42 | 2.6 | Ta-14 | 2.5 | 0.9 |
| Ex. 109 | 145 | BLACK-42 | 2.6 | Tb-13 | 2.5 | 0.9 |

TABLE 28-continued

| | Ink composition | First water-soluble long-wavelenght dye | | Second water-soluble long-wavelenght dye | | water-soluble short-wavelenght dye |
|---|---|---|---|---|---|---|
| | | Kind | Amount (g) | Kind | Amount (g) | Amount (g) |
| Ex. 110 | 146 | BLACK-42 | 2.6 | Tb-19 | 2.5 | 0.9 |
| Ex. 111 | 147 | BLACK-42 | 2.6 | Tb-47 | 2.5 | 0.9 |
| Ex. 112 | 148 | BLACK-42 | 2.6 | Tc-2 | 2.5 | 0.9 |
| Ex. 113 | 149 | BLACK-42 | 2.6 | Td-1 | 2.5 | 0.9 |
| Ex. 114 | 150 | BLACK-42 | 2.6 | Qa-25 | 2.5 | 0.9 |
| Ex. 115 | 151 | BLACK-42 | 1.7 | Tb-47 | 3.4 | 0.9 |
| Ex. 116 | 152 | BLACK-42 | 3.4 | Tb-47 | 1.7 | 0.9 |
| Ex. 117 | 153 | BLACK-42 | 3.4 | Td-1 | 1.7 | 0.9 |
| Ex. 118 | 154 | BLACK-42 | 3.4 | Tb-19 | 1.7 | 0.9 |
| Ex. 119 | 155 | BLACK-42 | 3.0 | Tb-13 | 3.0 | None |
| C. Ex. 37 | 156 | BLACK-42 | 6.0 | None | — | 0.9 |
| C. Ex. 38 | 157 | None | — | Dc-9 | 6.0 | 0.9 |
| C. Ex. 39 | 158 | None | — | Tb-47 | 6.0 | 0.9 |
| C. Ex. 40 | 159 | None | — | Td-1 | 6.0 | 0.9 |
| C. Ex. 41 | 160 | None | — | Qa-25 | 6.0 | 0.9 |
| C. Ex. 42 | 161 | None | — | Ta-10 | 6.0 | 0.9 |

TABLE 29

| | Ink composition | First water-soluble long-wavelenght dye | | Second water-soluble long-wavelenght dye | | water-soluble short-wavelenght dye |
|---|---|---|---|---|---|---|
| | | Kind | Amount (g) | Kind | Amount (g) | Amount (g) |
| Ex. 120 | 162 | BLACK-51 | 2.6 | Dc-9 | 2.5 | 0.9 |
| Ex. 121 | 163 | BLACK-51 | 2.6 | Dg-1 | 2.5 | 0.9 |
| Ex. 122 | 164 | BLACK-51 | 2.6 | Df-2 | 2.5 | 0.9 |
| Ex. 123 | 165 | BLACK-51 | 2.6 | Ta-7 | 2.5 | 0.9 |
| Ex. 124 | 166 | BLACK-51 | 2.6 | Ta-10 | 2.5 | 0.9 |
| Ex. 125 | 167 | BLACK-51 | 2.6 | Ta-14 | 2.5 | 0.9 |
| Ex. 126 | 168 | BLACK-51 | 2.6 | Tb-13 | 2.5 | 0.9 |
| Ex. 127 | 169 | BLACK-51 | 2.6 | Tb-19 | 2.5 | 0.9 |
| Ex. 128 | 170 | BLACK-51 | 2.6 | Tb-47 | 2.5 | 0.9 |
| Ex. 129 | 171 | BLACK-51 | 2.6 | Tc-2 | 2.5 | 0.9 |
| Ex. 130 | 172 | BLACK-51 | 2.6 | Td-1 | 2.5 | 0.9 |
| Ex. 131 | 173 | BLACK-51 | 2.6 | Qa-25 | 2.5 | 0.9 |
| Ex. 132 | 174 | BLACK-51 | 1.7 | Tb-47 | 3.4 | 0.9 |
| Ex. 133 | 175 | BLACK-51 | 3.4 | Tb-47 | 1.7 | 0.9 |
| Ex. 134 | 176 | BLACK-51 | 3.4 | Td-1 | 1.7 | 0.9 |
| Ex. 135 | 177 | BLACK-51 | 3.4 | Tb-19 | 1.7 | 0.9 |
| Ex. 136 | 178 | BLACK-51 | 3.0 | Tb-13 | 3.0 | None |
| C. Ex. 43 | 179 | BLACK-51 | 6.0 | None | — | 0.9 |
| C. Ex. 44 | 180 | None | — | Dc-9 | 6.0 | 0.9 |
| C. Ex. 45 | 181 | None | — | Tb-47 | 6.0 | 0.9 |
| C. Ex. 46 | 182 | None | — | Td-1 | 6.0 | 0.9 |
| C. Ex. 47 | 183 | None | — | Qa-25 | 6.0 | 0.9 |
| C. Ex. 48 | 184 | None | — | Ta-10 | 6.0 | 0.9 |

TABLE 30

| | Ink composition | First water-soluble long-wavelenght dye | | Second water-soluble long-wavelenght dye | | water-soluble short-wavelenght dye |
|---|---|---|---|---|---|---|
| | | Kind | Amount (g) | Kind | Amount (g) | Amount (g) |
| Ex. 137 | 185 | BLACK-52 | 2.6 | Dc-9 | 2.5 | 0.9 |
| Ex. 138 | 186 | BLACK-52 | 2.6 | Dg-1 | 2.5 | 0.9 |
| Ex. 139 | 187 | BLACK-52 | 2.6 | Df-2 | 2.5 | 0.9 |
| Ex. 140 | 188 | BLACK-52 | 2.6 | Ta-7 | 2.5 | 0.9 |
| Ex. 141 | 189 | BLACK-52 | 2.6 | Ta-10 | 2.5 | 0.9 |
| Ex. 142 | 190 | BLACK-52 | 2.6 | Ta-14 | 2.5 | 0.9 |
| Ex. 143 | 191 | BLACK-52 | 2.6 | Tb-13 | 2.5 | 0.9 |
| Ex. 144 | 192 | BLACK-52 | 2.6 | Tb-19 | 2.5 | 0.9 |

TABLE 30-continued

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| Ex. 145 | 193 | BLACK-52 | 2.6 | Tb-47 | 2.5 | 0.9 |
| Ex. 146 | 194 | BLACK-52 | 2.6 | Tc-2 | 2.5 | 0.9 |
| Ex. 147 | 195 | BLACK-52 | 2.6 | Td-1 | 2.5 | 0.9 |
| Ex. 148 | 196 | BLACK-52 | 2.6 | Qa-25 | 2.5 | 0.9 |
| Ex. 149 | 197 | BLACK-52 | 1.7 | Tb-47 | 3.4 | 0.9 |
| Ex. 150 | 198 | BLACK-52 | 3.4 | Tb-47 | 1.7 | 0.9 |
| Ex. 151 | 199 | BLACK-52 | 3.4 | Td-1 | 1.7 | 0.9 |
| Ex. 152 | 200 | BLACK-52 | 3.4 | Tb-19 | 1.7 | 0.9 |
| Ex. 153 | 201 | BLACK-52 | 3.0 | Tb-13 | 3.0 | None |
| C. Ex. 49 | 202 | BLACK-52 | 6.0 | None | — | 0.9 |
| C. Ex. 50 | 203 | None | — | Dc-9 | 6.0 | 0.9 |
| C. Ex. 51 | 204 | None | — | Tb-47 | 6.0 | 0.9 |
| C. Ex. 52 | 205 | None | — | Td-1 | 6.0 | 0.9 |
| C. Ex. 53 | 206 | None | — | Qa-25 | 6.0 | 0.9 |
| C. Ex. 54 | 207 | None | — | Ta-10 | 6.0 | 0.9 |

TABLE 31

| | Ink composition | First water-soluble long-wavelenght dye Kind | Amount (g) | Second water-soluble long-wavelenght dye Kind | Amount (g) | water-soluble short-wavelenght dye Amount (g) |
|---|---|---|---|---|---|---|
| C. Ex. 55 | 208 | BLACK-101 | 2.6 | Dc-9 | 2.5 | 0.9 |
| C. Ex. 56 | 209 | BLACK-101 | 2.6 | Dg-1 | 2.5 | 0.9 |
| C. Ex. 57 | 210 | BLACK-101 | 2.6 | Df-2 | 2.5 | 0.9 |
| C. Ex. 58 | 211 | BLACK-101 | 2.6 | Ta-7 | 2.5 | 0.9 |
| C. Ex. 59 | 212 | BLACK-101 | 2.6 | Ta-10 | 2.5 | 0.9 |
| C. Ex. 60 | 213 | BLACK-101 | 2.6 | Ta-14 | 2.5 | 0.9 |
| C. Ex. 61 | 214 | BLACK-101 | 2.6 | Tb-13 | 2.5 | 0.9 |
| C. Ex. 62 | 215 | BLACK-101 | 2.6 | Tb-19 | 2.5 | 0.9 |
| C. Ex. 63 | 216 | BLACK-101 | 2.6 | Tb-47 | 2.5 | 0.9 |
| C. Ex. 64 | 217 | BLACK-101 | 2.6 | Tc-2 | 2.5 | 0.9 |
| C. Ex. 65 | 218 | BLACK-101 | 2.6 | Td-1 | 2.5 | 0.9 |
| C. Ex. 66 | 219 | BLACK-101 | 2.6 | Qa-25 | 2.5 | 0.9 |
| C. Ex. 67 | 220 | BLACK-101 | 1.7 | Tb-47 | 3.4 | 0.9 |
| C. Ex. 68 | 221 | BLACK-101 | 3.4 | Tb-47 | 1.7 | 0.9 |
| C. Ex. 69 | 222 | BLACK-101 | 3.4 | Td-1 | 1.7 | 0.9 |
| C. Ex. 70 | 223 | BLACK-101 | 3.4 | Tb-19 | 1.7 | 0.9 |
| C. Ex. 71 | 224 | BLACK-101 | 3.0 | Tb-13 | 3.0 | None |
| C. Ex. 72 | 225 | BLACK-101 | 6.0 | None | — | 0.9 |
| C. Ex. 73 | 226 | None | — | Dc-9 | 6.0 | 0.9 |
| C. Ex. 74 | 227 | None | — | Tb-47 | 6.0 | 0.9 |
| C. Ex. 75 | 228 | None | — | Td-1 | 6.0 | 0.9 |
| C. Ex. 76 | 229 | None | — | Qa-25 | 6.0 | 0.9 |
| C. Ex. 77 | 230 | None | — | Ta-10 | 6.0 | 0.9 |

In Tables 27 and 28, M used in BLACK-41 and 42 is Li.

(BLACK-10)
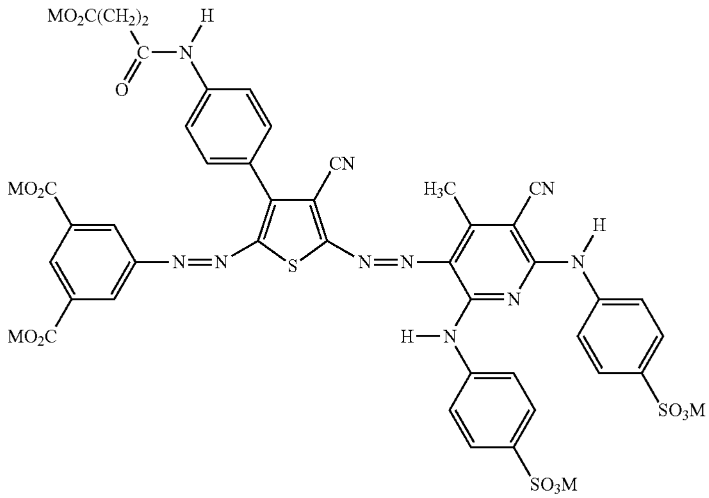
M:Li
(BLACK-11)
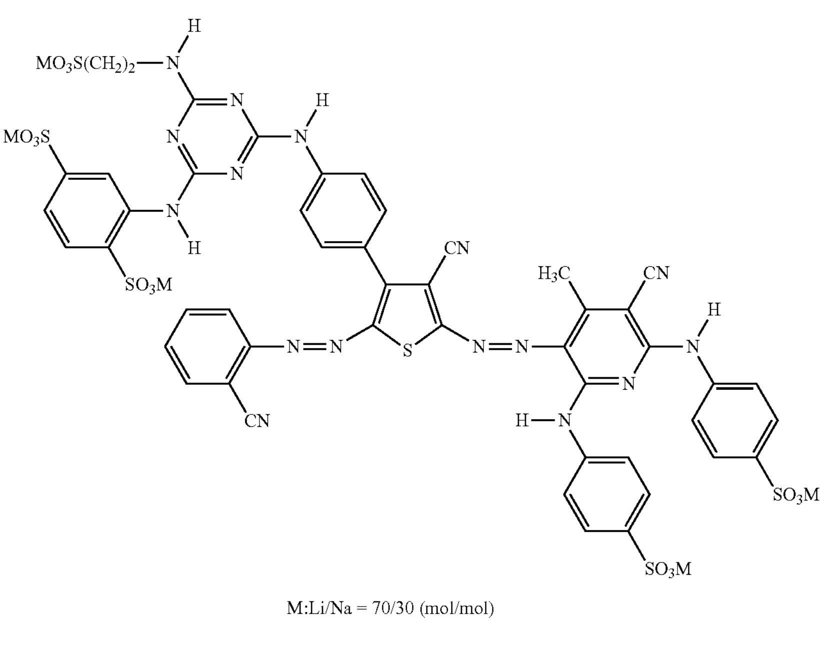
M:Li/Na = 70/30 (mol/mol)

-continued
(BLACK-31)
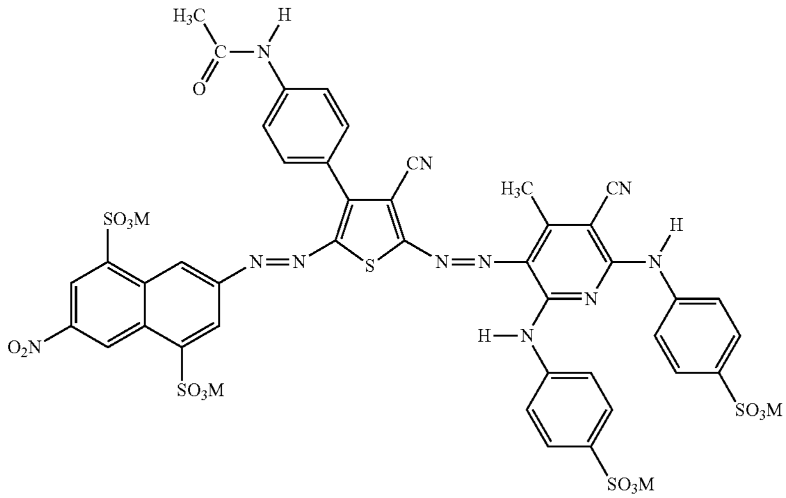
M:Li
(BLACK-32)
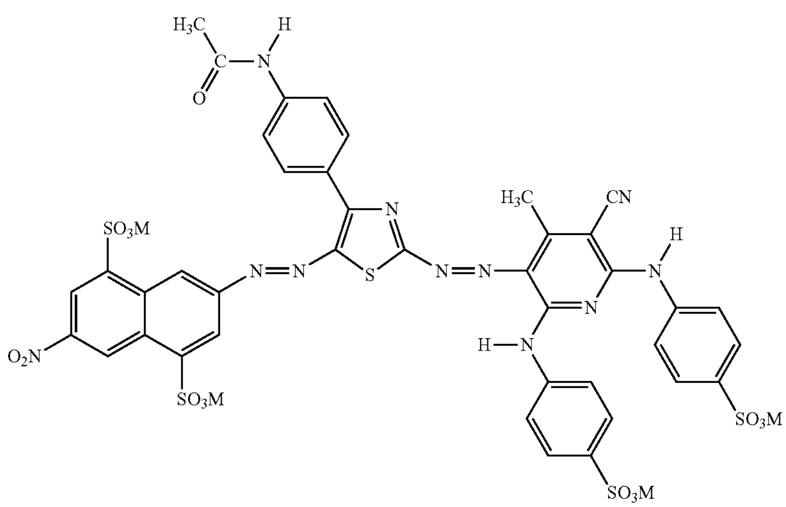
M:Li

-continued
(BLACK-41)
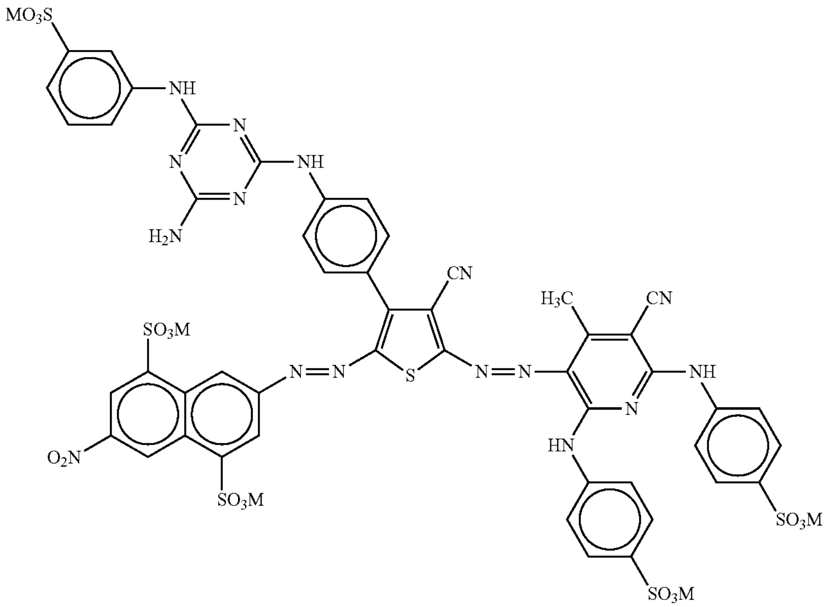
M:Li
(BLACK-42)
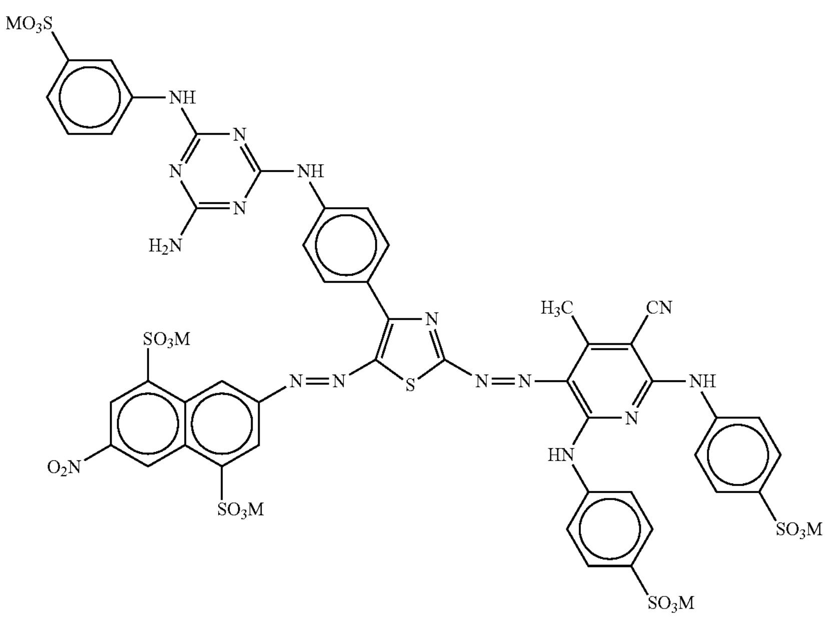
M:Li

-continued
(BLACK-51)
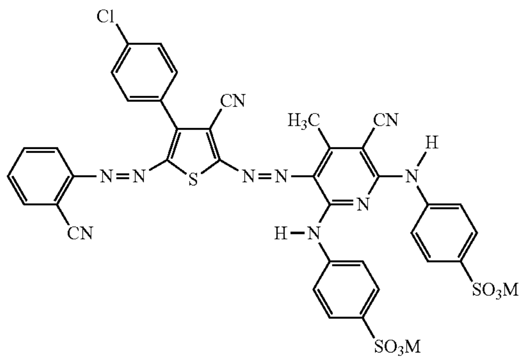
M:Li
(BLACK-52)
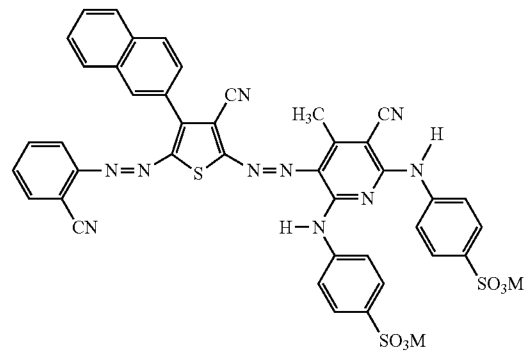
M:Li
(BLACK-101)
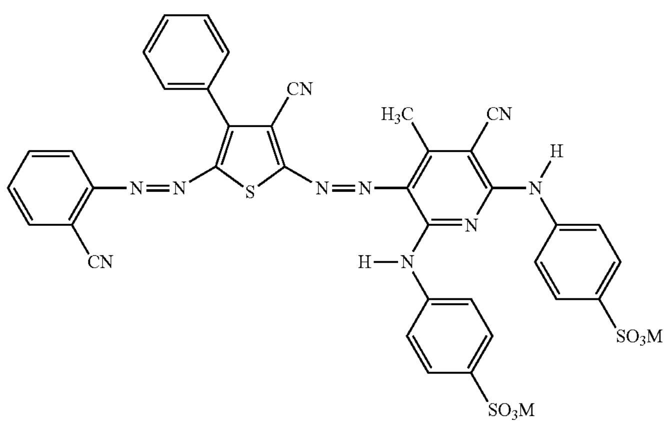
M:Li
Water-Soluble Short-Wavelength Dye S
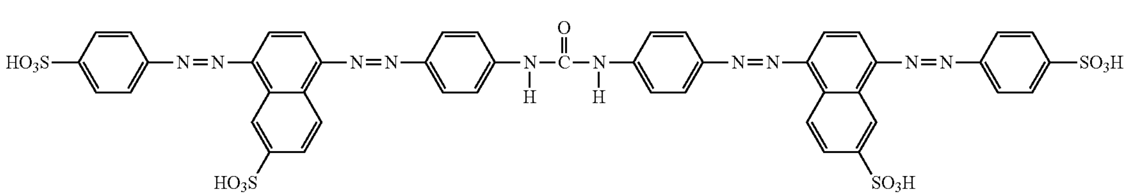 [SMILES: O=C(Nc1ccc(N=Nc2ccc(N=Nc3ccc(S(=O)(=O)O)cc3)c3cc(S(=O)(=O)O)ccc23)cc1)Nc1ccc(N=Nc2ccc(N=Nc3ccc(S(=O)(=O)O)cc3)c3cc(S(=O)(=O)O)ccc23)cc1]

| | A—N═N—B—N═N—C | | |
|---|---|---|---|
| | A | B | C |
| (Dc-9) | 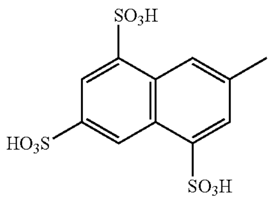 | 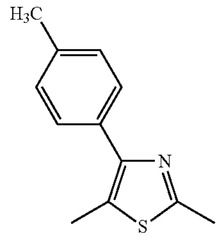 | 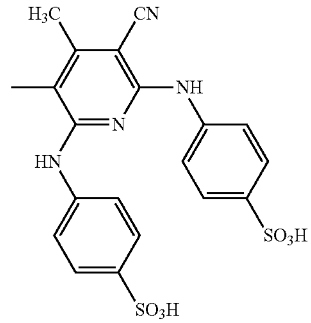 |
| (Dg-1) | 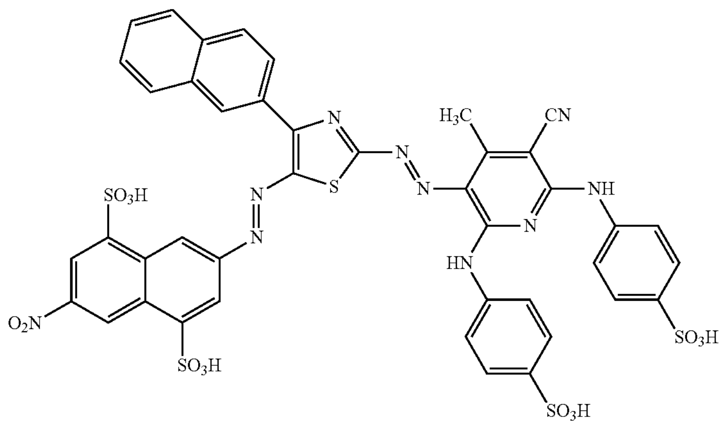 | | |
| (Df-2) | 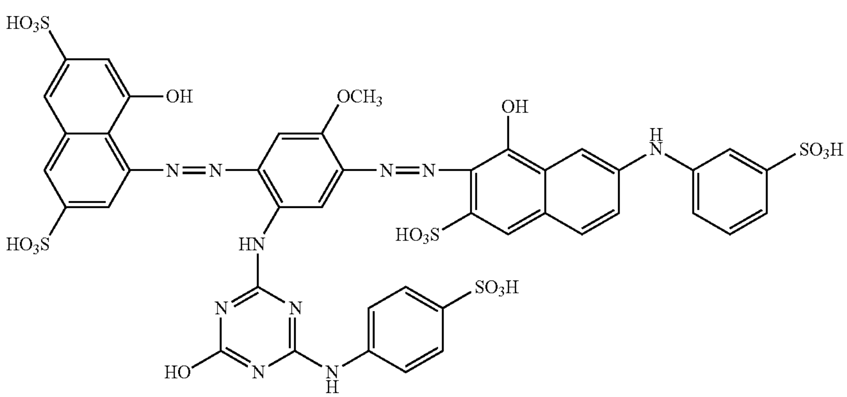 | | |
| (Ta-7) | 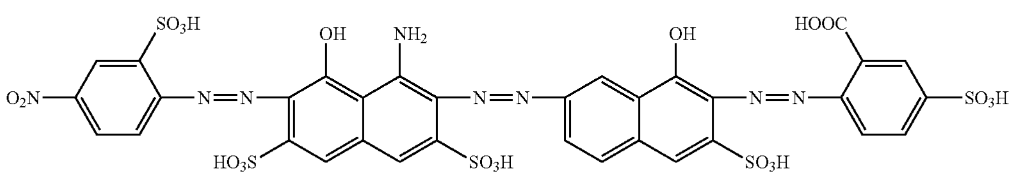 | | |
| (Ta-10) | 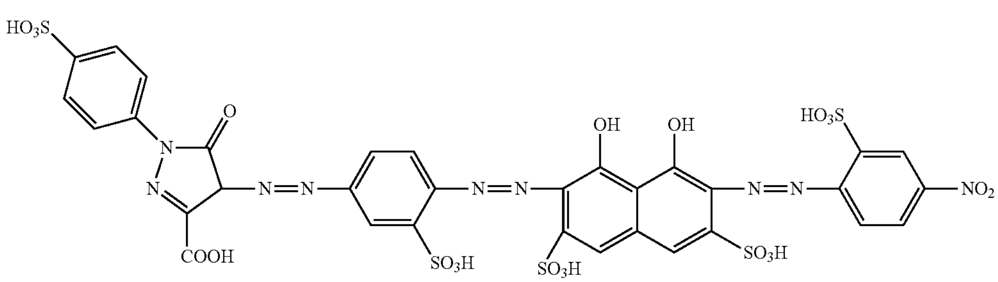 | | |

-continued
| A—N═N—B—N═N—C | | |
|---|---|---|
| A | B | C |
(Ta-14)
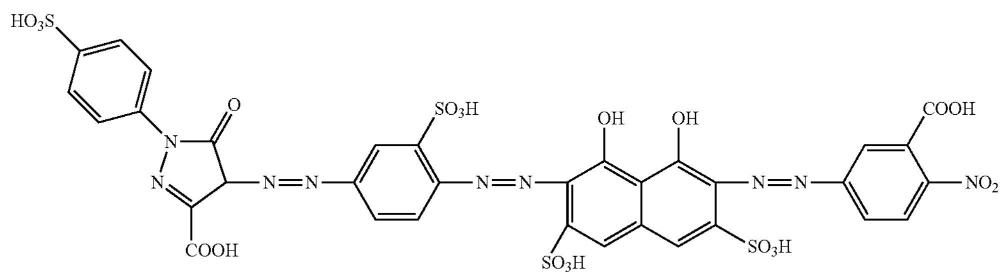 [SMILES: O=C(O)C1=NN(c2ccc(S(=O)(=O)O)cc2)C(=O)C1N=Nc1ccc(N=Nc2c(S(=O)(=O)O)cc3cc(S(=O)(=O)O)c(N=Nc4ccc([N+](=O)[O-])c(C(=O)O)c4)c(O)c3c2O)c(S(=O)(=O)O)c1]
(Tb-13)
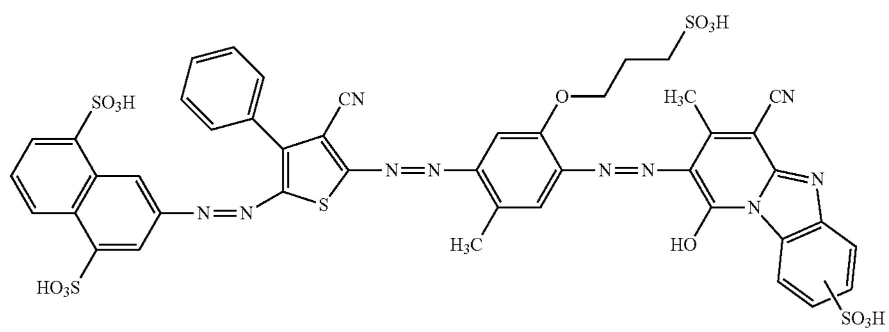
(Tb-19)
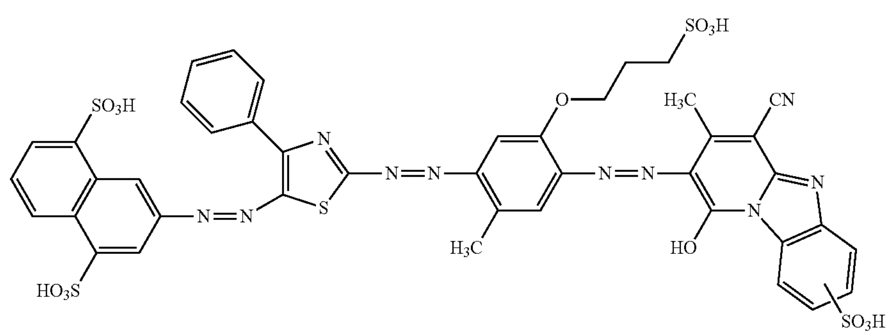
(Tb-47)
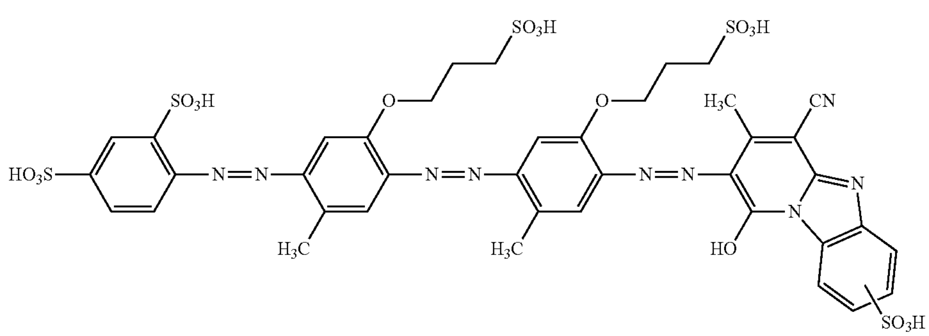

-continued

A—N═N—B—N═N—C

| A | B | C |
| --- | --- | --- |

(Tc-2)

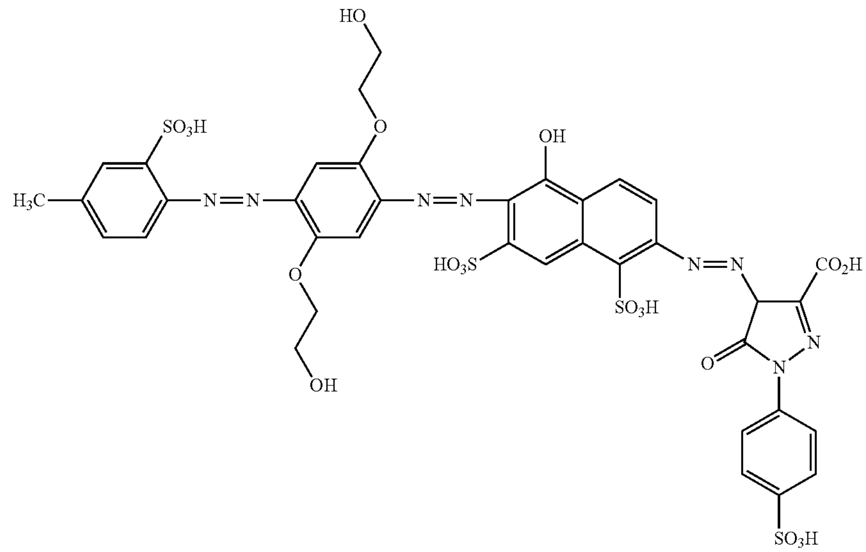 [SMILES: Cc1ccc(N=Nc2cc(OCCO)c(N=Nc3c(S(=O)(=O)O)cc4c(S(=O)(=O)O)c(/N=N/C5C(=O)N(c6ccc(S(=O)(=O)O)cc6)N=C5C(=O)O)ccc4c3O)cc2OCCO)c(S(=O)(=O)O)c1]

(Td-1)

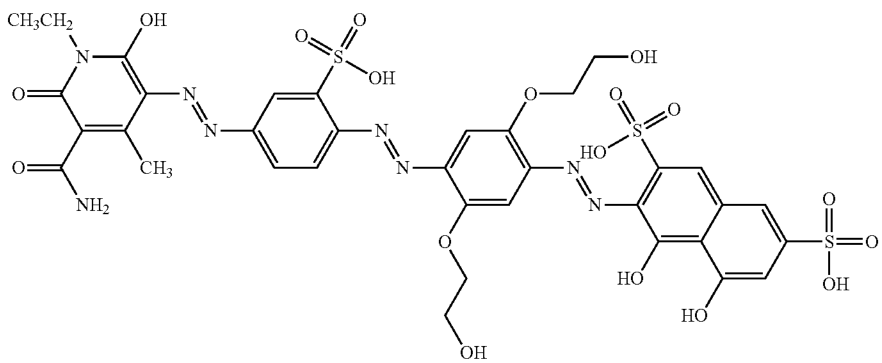

(Qa-25)

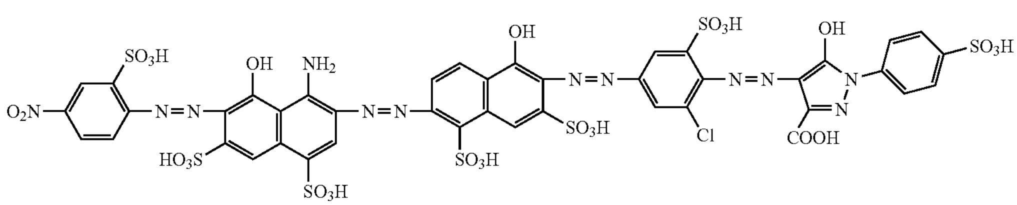 [SMILES: Nc1c(N=Nc2ccc3c(O)c(N=Nc4cc(Cl)c(N=Nc5c(C(=O)O)nn(-c6ccc(S(=O)(=O)O)cc6)c5O)c(S(=O)(=O)O)c4)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12]

The ink compositions were loaded on a black ink cartridge of an inkjet printer (trade name: PIXUS iP8600, manufactured by Canon Inc.), image patterns whose density varied stepwise with respect to grey (images formed at a recording duty of 100%, 80%, 60%, 40%, 20% and 10%) were printed to evaluate the fastness (light resistance and ozone resistance) and the coloring balance (grey balance) of the images. The recoding conditions were set as follows: temperature 23° C., relative humidity 55%, recording density 2,400 dpi×1,200 dpi, and discharge amount 2.5 pL.

The image receiving sheet used herein was an inkjet paper "Kassai" photo finish (manufactured by Fujifilm Corporation).

The evaluation of the fastness (light resistance and ozone resistance) and the coloring balance (grey balance) of the image was performed as follows. The evaluation results are shown in Tables 32 to 41.

<Evaluation>

(1) Fastness (1-1) Light Resistance

For the evaluation of light resistance, the density ($D_{100}$, $D_{40}$, $D_{20}$) Ci was measured at a recording duty of 100%, 40% and 20% immediately after printing, and then, images were irradiated with a xenon light (85,000 lux) using a weather meter (manufactured by Atlas Co., Ltd.) for 10 days. Thereafter, the density Cf was measured again, and the dye residual rate (Cf/Ci×100) was determined to perform the evaluation.

The evaluation criteria are A when the dye residual rate is more than 80% at $D_{100}$, $D_{40}$ and $D_{20}$, B when the rate is 70% to 80% even at a part thereof, and C when the rate is less than 70% even at a part thereof.

(1-2) Ozone Resistance

For the evaluation of ozone resistance, a sample was left standing for 20 hours in a box set to the ozone gas concentration of 10 ppm. The concentration of the pattern S before and after standing in the ozone gas was measured with X-rite 310, and the dye residual rate (Cf/Ci×100) was determined to perform the evaluation.

The ozone gas concentration in the box was set by using an ozone gas monitor (model: OZG-EM-01, manufactured by APPLICS).

The evaluation criteria are A when the dye residual rate is more than 80% at $D_{100}$, $D_{40}$ and $D_{20}$, B when the rate is 70% to 80% even at a part thereof, and C when the rate is less than 70% even at a part thereof.

(2) Coloring Balance (2-1) Coloring Balance 1

In the stepwise pattern of grey, the color tone of grey at each printing concentration was determined by naked eyes. The evaluation criteria are A when a desired neutral grey color tone is exhibited at each concentration, B when the collapse of grey balance is observed at a concentration, and C when the grey balance is collapsed at most concentration.

(2-2) Coloring Balance 2

The color tone of grey, which was printed in the evaluation of fastness, was determined by naked eyes at a concentration in which recording duty of 100%, 40% and 20%. The evaluation criteria are A when a desired neutral grey color tone is exhibited at each concentration, B when the collapse of grey balance is observed at a concentration, and C when the grey balance is collapsed at most concentration.

TABLE 32

| | Light resistance | Ozone resistance | Coloring balance 1 | Coloring balance 2 |
|---|---|---|---|---|
| Ex. 1 | A | A | A | A |
| Ex. 2 | A | A | A | A |
| Ex. 3 | A | A | A | A |
| Ex. 4 | A | A | A | A |
| Ex. 5 | A | A | A | A |
| Ex. 6 | A | A | A | A |
| Ex. 7 | A | A | A | A |
| Ex. 8 | A | A | A | A |
| Ex. 9 | A | A | A | A |
| Ex. 10 | A | A | A | A |
| Ex. 11 | A | A | A | A |
| Ex. 12 | A | A | A | A |
| Ex. 13 | A | B | A | A |
| Ex. 14 | B | A | A | A |
| Ex. 15 | B | A | A | A |
| Ex. 16 | B | A | A | A |
| Ex. 17 | A | A | B | B |
| C. Ex. 1 | B | A | B | C |
| C. Ex. 2 | B | A | B | C |
| C. Ex. 3 | B | C | B | C |
| C. Ex. 4 | B | C | B | C |
| C. Ex. 5 | B | C | B | C |
| C. Ex. 6 | B | B | C | C |

TABLE 33

| | Light resistance | Ozone resistance | Coloring balance 1 | Coloring balance 2 |
|---|---|---|---|---|
| Ex. 18 | A | A | A | A |
| Ex. 19 | A | A | A | A |
| Ex. 20 | A | A | A | A |
| Ex. 21 | A | A | A | A |
| Ex. 22 | A | A | A | A |
| Ex. 23 | A | A | A | A |
| Ex. 24 | A | A | A | A |
| Ex. 25 | A | A | A | A |
| Ex. 26 | A | A | A | A |
| Ex. 27 | A | A | A | A |
| Ex. 28 | A | A | A | A |

TABLE 33-continued

| | Light resistance | Ozone resistance | Coloring balance 1 | Coloring balance 2 |
|---|---|---|---|---|
| Ex. 29 | A | A | A | A |
| Ex. 30 | A | B | A | A |
| Ex. 31 | B | A | A | A |
| Ex. 32 | B | A | A | A |
| Ex. 33 | B | A | A | A |
| Ex. 34 | A | A | B | B |
| C. Ex. 7 | B | A | B | C |
| C. Ex. 8 | B | A | B | C |
| C. Ex. 9 | B | C | B | C |
| C. Ex. 10 | B | C | B | C |
| C. Ex. 11 | B | C | B | C |
| C. Ex. 12 | B | B | C | C |

TABLE 34

| | Light resistance | Ozone resistance | Coloring balance 1 | Coloring balance 2 |
|---|---|---|---|---|
| Ex. 35 | A | A | A | A |
| Ex. 36 | A | A | A | A |
| Ex. 37 | A | A | A | A |
| Ex. 38 | A | A | A | A |
| Ex. 39 | A | A | A | A |
| Ex. 40 | A | A | A | A |
| Ex. 41 | A | A | A | A |
| Ex. 42 | A | A | A | A |
| Ex. 43 | A | A | A | A |
| Ex. 44 | A | A | A | A |
| Ex. 45 | A | A | A | A |
| Ex. 46 | A | A | A | A |
| Ex. 47 | A | B | A | A |
| Ex. 48 | B | A | A | A |
| Ex. 49 | B | A | A | A |
| Ex. 50 | B | A | A | A |
| Ex. 51 | A | A | B | B |
| C. Ex. 13 | B | A | B | C |
| C. Ex. 14 | B | A | B | C |
| C. Ex. 15 | B | C | B | C |
| C. Ex. 16 | B | C | B | C |
| C. Ex. 17 | B | C | B | C |
| C. Ex. 18 | B | B | C | C |

TABLE 35

| | Light resistance | Ozone resistance | Coloring balance 1 | Coloring balance 2 |
|---|---|---|---|---|
| Ex. 52 | A | A | A | A |
| Ex. 53 | A | A | A | A |
| Ex. 54 | A | A | A | A |
| Ex. 55 | A | A | A | A |
| Ex. 56 | A | A | A | A |
| Ex. 57 | A | A | A | A |
| Ex. 58 | A | A | A | A |
| Ex. 59 | A | A | A | A |
| Ex. 60 | A | A | A | A |
| Ex. 61 | A | A | A | A |
| Ex. 62 | A | A | A | A |
| Ex. 63 | A | A | A | A |
| Ex. 64 | A | B | A | A |
| Ex. 65 | B | A | A | A |
| Ex. 66 | B | A | A | A |
| Ex. 67 | B | A | A | A |
| Ex. 68 | A | A | B | B |
| C. Ex. 19 | B | A | B | C |
| C. Ex. 20 | B | A | B | C |
| C. Ex. 21 | B | C | B | C |
| C. Ex. 22 | B | C | B | C |
| C. Ex. 23 | B | C | B | C |
| C. Ex. 24 | B | B | C | C |

TABLE 36

| | Light resistance | Ozone resistance | Coloring balance 1 | Coloring balance 2 |
|---|---|---|---|---|
| Ex. 69 | A | A | A | A |
| Ex. 70 | A | A | A | A |
| Ex. 71 | A | A | A | A |
| Ex. 72 | A | A | A | A |
| Ex. 73 | A | A | A | A |
| Ex. 74 | A | A | A | A |
| Ex. 75 | A | A | A | A |
| Ex. 76 | A | A | A | A |
| Ex. 77 | A | A | A | A |
| Ex. 78 | A | A | A | A |
| Ex. 79 | A | A | A | A |
| Ex. 80 | A | A | A | A |
| Ex. 81 | A | B | A | A |
| Ex. 82 | B | A | A | A |
| Ex. 83 | B | A | A | A |
| Ex. 84 | B | A | A | A |
| Ex. 85 | A | A | B | B |
| C. Ex. 25 | B | A | B | C |
| C. Ex. 26 | B | A | B | C |
| C. Ex. 27 | B | C | B | C |
| C. Ex. 28 | B | C | B | C |
| C. Ex. 29 | B | C | B | C |
| C. Ex. 30 | B | B | C | C |

TABLE 37

| | Light resistance | Ozone resistance | Coloring balance 1 | Coloring balance 2 |
|---|---|---|---|---|
| Ex. 86 | A | A | A | A |
| Ex. 87 | A | A | A | A |
| Ex. 88 | A | A | A | A |
| Ex. 89 | A | A | A | A |
| Ex. 90 | A | A | A | A |
| Ex. 91 | A | A | A | A |
| Ex. 92 | A | A | A | A |
| Ex. 93 | A | A | A | A |
| Ex. 94 | A | A | A | A |
| Ex. 95 | A | A | A | A |
| Ex. 96 | A | A | A | A |
| Ex. 97 | A | A | A | A |
| Ex. 98 | A | B | A | A |
| Ex. 99 | B | A | A | A |
| Ex. 100 | B | A | A | A |
| Ex. 101 | B | A | A | A |
| Ex. 102 | A | A | B | B |
| C. Ex. 31 | B | A | B | C |
| C. Ex. 32 | B | A | B | C |
| C. Ex. 33 | B | C | B | C |
| C. Ex. 34 | B | C | B | C |
| C. Ex. 35 | B | C | B | C |
| C. Ex. 36 | B | B | C | C |

TABLE 38

| | Light resistance | Ozone resistance | Coloring balance 1 | Coloring balance 2 |
|---|---|---|---|---|
| Ex. 103 | A | A | A | A |
| Ex. 104 | A | A | A | A |
| Ex. 105 | A | A | A | A |
| Ex. 106 | A | A | A | A |
| Ex. 107 | A | A | A | A |
| Ex. 108 | A | A | A | A |
| Ex. 109 | A | A | A | A |
| Ex. 110 | A | A | A | A |
| Ex. 111 | A | A | A | A |
| Ex. 112 | A | A | A | A |
| Ex. 113 | A | A | A | A |
| Ex. 114 | A | A | A | A |
| Ex. 115 | A | B | A | A |
| Ex. 116 | B | A | A | A |

TABLE 38-continued

| | Light resistance | Ozone resistance | Coloring balance 1 | Coloring balance 2 |
|---|---|---|---|---|
| Ex. 117 | B | A | A | A |
| Ex. 118 | B | A | A | A |
| Ex. 119 | A | A | B | B |
| C. Ex. 37 | B | A | B | C |
| C. Ex. 38 | B | A | B | C |
| C. Ex. 39 | B | C | B | C |
| C. Ex. 40 | B | C | B | C |
| C. Ex. 41 | B | C | B | C |
| C. Ex. 42 | B | B | C | C |

TABLE 39

| | Light resistance | Ozone resistance | Coloring balance 1 | Coloring balance 2 |
|---|---|---|---|---|
| Ex. 120 | B | B | B | A |
| Ex. 121 | B | B | B | B |
| Ex. 122 | B | B | B | B |
| Ex. 123 | B | B | A | B |
| Ex. 124 | B | B | B | B |
| Ex. 125 | B | B | B | B |
| Ex. 126 | B | B | B | B |
| Ex. 127 | B | B | B | B |
| Ex. 128 | B | B | B | A |
| Ex. 129 | B | B | B | B |
| Ex. 130 | B | B | B | B |
| Ex. 131 | B | B | B | B |
| Ex. 132 | B | B | B | B |
| Ex. 133 | B | B | B | B |
| Ex. 134 | B | B | B | B |
| Ex. 135 | B | B | B | B |
| Ex. 136 | B | B | B | B |
| C. Ex. 43 | B | A | B | C |
| C. Ex. 44 | B | A | B | C |
| C. Ex. 45 | B | C | B | C |
| C. Ex. 46 | B | C | B | C |
| C. Ex. 47 | B | C | B | C |
| C. Ex. 48 | B | B | C | C |

TABLE 40

| | Light resistance | Ozone resistance | Coloring balance 1 | Coloring balance 2 |
|---|---|---|---|---|
| Ex. 137 | B | B | B | A |
| Ex. 138 | B | B | B | B |
| Ex. 139 | B | B | B | B |
| Ex. 140 | B | B | A | B |
| Ex. 141 | B | B | B | B |
| Ex. 142 | B | B | B | B |
| Ex. 143 | B | B | B | B |
| Ex. 144 | B | B | B | B |
| Ex. 145 | B | B | B | A |
| Ex. 146 | B | B | B | B |
| Ex. 147 | B | B | B | B |
| Ex. 148 | B | B | B | B |
| Ex. 149 | B | B | B | B |
| Ex. 150 | B | B | B | B |
| Ex. 151 | B | B | B | B |
| Ex. 152 | B | B | B | B |
| Ex. 153 | B | B | B | B |
| C. Ex. 49 | B | A | B | C |
| C. Ex. 50 | B | A | B | C |
| C. Ex. 51 | B | C | B | C |
| C. Ex. 52 | B | C | B | C |
| C. Ex. 53 | B | C | B | C |
| C. Ex. 54 | B | B | C | C |

TABLE 41

| | Light resistance | Ozone resistance | Coloring balance 1 | Coloring balance 2 |
|---|---|---|---|---|
| C. Ex. 55 | C | C | B | C |
| C. Ex. 56 | C | C | B | C |
| C. Ex. 57 | C | C | C | C |
| C. Ex. 58 | C | C | B | C |
| C. Ex. 59 | C | C | B | C |
| C. Ex. 60 | C | C | C | C |
| C. Ex. 61 | C | C | C | C |
| C. Ex. 62 | C | C | B | C |
| C. Ex. 63 | C | C | B | C |
| C. Ex. 64 | C | C | B | C |
| C. Ex. 65 | C | C | C | C |
| C. Ex. 66 | C | C | C | C |
| C. Ex. 67 | C | C | C | C |
| C. Ex. 68 | C | C | C | C |
| C. Ex. 69 | C | C | C | C |
| C. Ex. 70 | C | C | C | C |
| C. Ex. 71 | C | C | C | C |
| C. Ex. 72 | B | A | B | C |
| C. Ex. 73 | B | A | B | C |
| C. Ex. 74 | B | C | B | C |
| C. Ex. 75 | B | C | B | C |
| C. Ex. 76 | B | C | B | C |
| C. Ex. 77 | B | B | C | C |

From the results, it is understood that, using the first water-soluble long-wavelength dye and the second water-soluble long-wavelength dye of the present invention in combination, an image having excellent light resistance and ozone resistance may be formed, and an ink composition having good coloring balance may be obtained.

Further, although it is not shown in the tables, it is unexpectedly found out that in Examples 18 to 34 (inks using BLACK-11 (M:Li) as a dye compound), the printing concentration is much higher and black is exhibited more clearly, as compared to other examples.

INDUSTRIAL APPLICABILITY

According to the present invention, it is possible to provide an ink composition capable of forming an image which is excellent in light resistance and ozone resistance, and having an excellent grey balance in a range from a high-concentration region to a low-concentration region, an ink for inkjet recording using the ink composition, and an inkjet recording method using the ink for inkjet recording.

The present invention has been described in detail with reference to specific embodiments, but it is apparent to the person with ordinary skill in the art that various changes or modifications may be made without departing from the spirit and the scope of the present invention.

This application is based on Japanese Patent Application Nos. 2011-061444 filed on Mar. 13, 2011 and 2011-145035 filed on Jun. 29, 2011, the disclosures of which are incorporated herein by reference in its entirety.

The invention claimed is:

1. An ink composition comprising at least two kinds of water-soluble long-wavelength dyes whose absorption spectrum in an aqueous solvent has a maximum wavelength of 550 nm to 700 nm, wherein at least one kind of the water-soluble long-wavelength dyes is a first water-soluble long-wavelength dye of an azo compound represented by the following Formula (2-1), at least one kind of the water-soluble long-wavelength dyes is a second water-soluble long-wavelength dye that is different from the first water-soluble long-wavelength dye, and the second water-soluble long-wavelength dye is a compound having two to four azo groups conjugated with each other per molecule:

Formula (2-1)

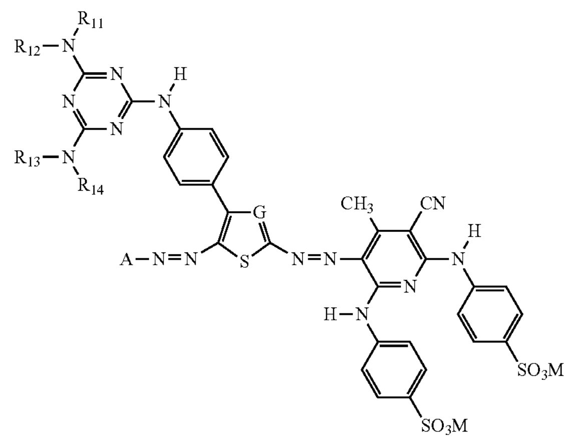

wherein in Formula (2-1), G represents a nitrogen atom or —C($R_2$)═, and $R_2$ represents a hydrogen atom, a sulfo group, a carboxyl group, a substituted or unsubstituted carbamoyl group or a cyano group, $R_{11}$, $R_{12}$, $R_{13}$ and $R_{14}$ each independently represents a hydrogen atom or a monovalent substituent, A represents a substituted or unsubstituted aryl group or a substituted or unsubstituted nitrogen-containing 5-membered heterocyclic group, and M's each independently represent a hydrogen atom or a monovalent countercation.

2. The ink composition according to claim 1, wherein the azo compound represented by Formula (2-1) is an azo compound represented by the following Formula (3-1):

Formula (3-1)

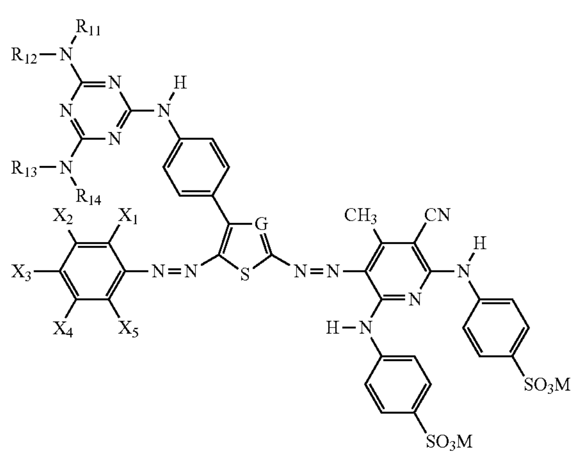

wherein in Formula (3-1), G represents a nitrogen atom or —C($R_2$)═, and $R_2$ represents a hydrogen atom, a sulfo group, a carboxyl group, a substituted or unsubstituted carbamoyl group or a cyano group, $R_{11}$, $R_{12}$, $R_{13}$ and $R_{14}$ each independently represents a hydrogen atom or a monovalent substituent, $X_1$, $X_2$, $X_3$, $X_4$ and $X_5$ each independently represents a hydrogen atom or a monovalent substituent, and M's each independently represent a hydrogen atom or a monovalent countercation.

3. The ink composition according to claim 2, wherein the azo compound represented by Formula (3-1) is an azo compound represented by the following Formula (4-1):

Formula (4-1)

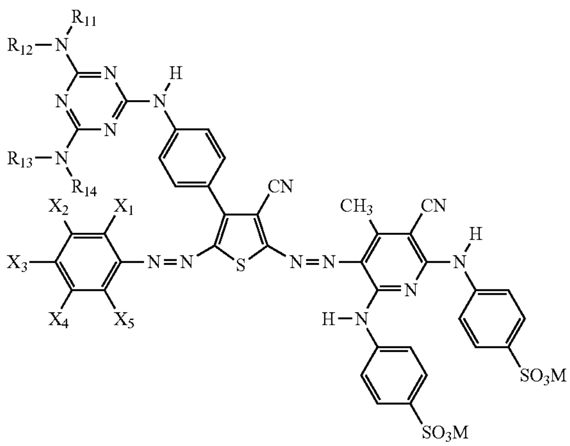

wherein in Formula (4-1), $R_{11}$, $R_{12}$, $R_{13}$ and $R_{14}$ each independently represents a hydrogen atom or a monovalent substituent, $X_1$, $X_2$, $X_3$, $X_4$ and $X_5$ each independently represents a hydrogen atom or a monovalent substituent, and M's each independently represent a hydrogen atom or a monovalent countercation.

4. The ink composition according to claim 1, wherein the azo compound represented by Formula (2-1) is an azo compound represented by the following Formula (2-3):

Compound (2-3)

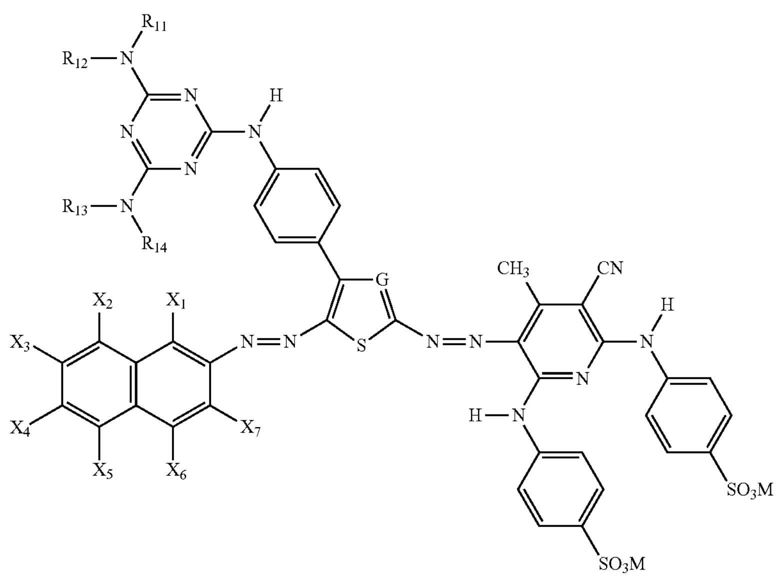

wherein in Formula (2-3), G represents a nitrogen atom or —C($R_2$)═, and $R_2$ represents a hydrogen atom, a sulfo group, a carboxyl group, a substituted or unsubstituted carbamoyl group or a cyano group, $X_1$, $X_2$, $X_3$, $X_4$, $X_5$, $X_6$ and $X_7$ each independently represents a hydrogen atom or a monovalent substituent, $R_{11}$, $R_{12}$, $R_{13}$ and $R_{14}$ each independently represents a hydrogen atom or a monovalent substituent, and M's each independently represent a hydrogen atom or a monovalent countercation.

5. The ink composition according to claim 4, wherein the azo compound represented by Formula (2-3) is an azo compound represented by the following Formula (3-3):

Formula (3-3)

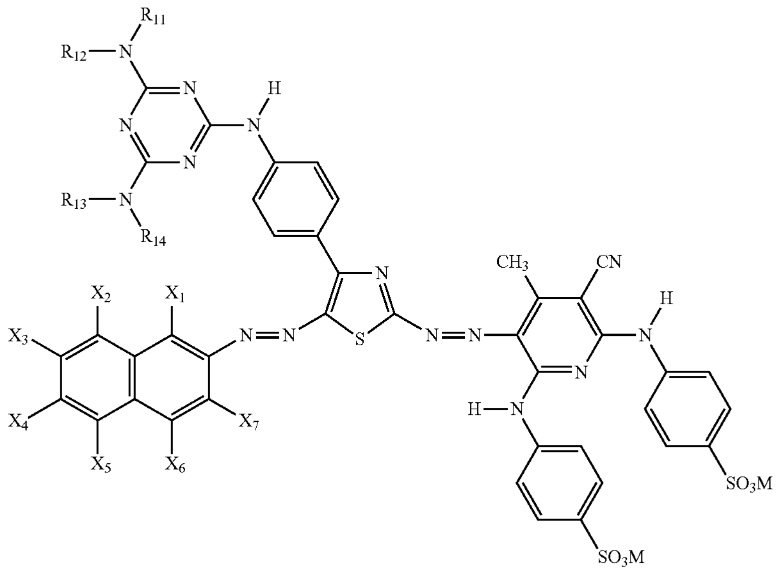

wherein in Formula (3-3), $R_{11}$, $R_{12}$, $R_{13}$ and $R_{14}$ each independently represents a hydrogen atom or a monovalent substituent, $X_1$, $X_2$, $X_3$, $X_4$, $X_5$, $X_6$ and $X_7$ each independently represents a hydrogen atom or a monovalent substituent, and M's each independently represent a hydrogen atom or a monovalent countercation.

6. The ink composition according to claim 4, wherein the azo compound represented by Formula (2-3) is an azo compound represented by the following Formula (4-3):

(Formula 4-3)

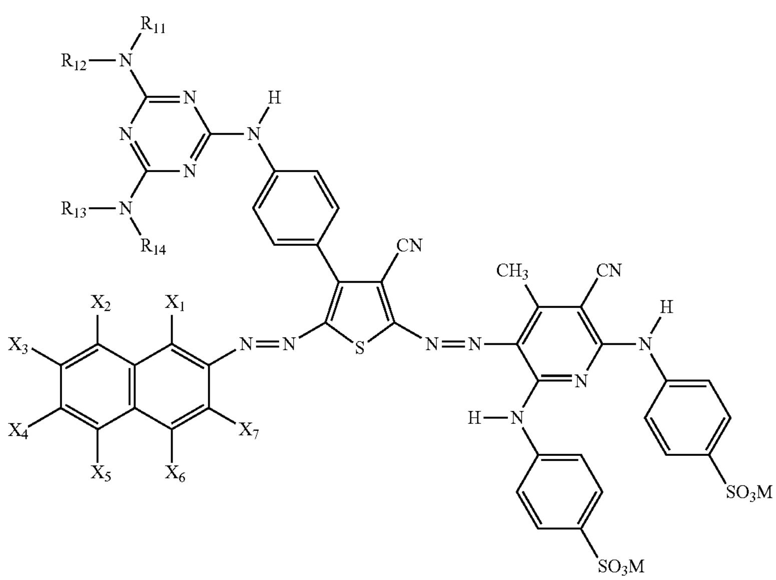

wherein in Formula (4-3), $R_{11}$, $R_{12}$, $R_{13}$ and $R_{14}$ each independently represents a hydrogen atom or a monovalent substituent, $X_1$, $X_2$, $X_3$, $X_4$, $X_5$, $X_6$ and $X_7$ each independently represents a hydrogen atom or a monovalent substituent, and M's each independently represent a hydrogen atom or a monovalent countercation.

7. The ink composition according to claim 1, wherein the azo compound represented by Formula (2-1) has at least three ionic hydrophilic groups selected from the group consisting of a sulfo group, a carboxyl group and a salt thereof.

8. The ink composition according to claim 1, wherein in the azo compound represented by Formula (2-1), at least one M is a lithium ion.

9. The ink composition according to claim 1, wherein the second water-soluble long-wavelength dye is a compound or a salt thereof, the compound represented by any one of the following Formulas (DC-1), (DF-1), (DG-1), (TA-4), (TA-6), (TB-1), (TC-2), (TD-1) and (QA-1):

Formula (DC-1)

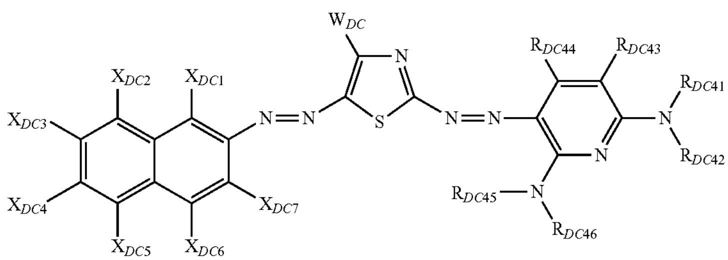

wherein in Formula (DC-1), $W_{DC}$, $R_{DC43}$ and $R_{DC44}$ each independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be substituted, $R_{DC41}$, $R_{DC42}$, $R_{DC45}$ and $R_{DC46}$ each independently represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group, and each group may be substituted, provided that $R_{DC41}$ and $R_{DC42}$ do not represent a hydrogen atom at the same time, and $R_{DC43}$ and $R_{DC41}$, $R_{DC41}$ and $R_{DC42}$, or $R_{DC45}$ and $R_{DC46}$ may be bound with each other to form a 5- or 6-membered ring, $X_{DC1}$, $X_{DC2}$, $X_{DC3}$, $X_{DC4}$, $X_{DC5}$, $X_{DC6}$ and $X_{DC7}$ represent a monovalent group, provided that Formula (DC-1) contains at least one ionic hydrophilic group selected from the group consisting of a carboxyl group, a sulfo group and a salt thereof:

Formula (DF-1)

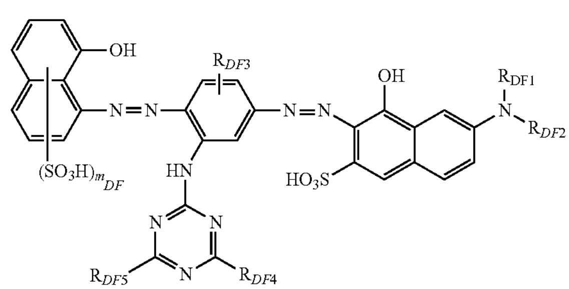

wherein in Formula (DF-1), $R_{DF1}$ and $R_{DF2}$ each independently represents a hydrogen atom, an alkyl group, an alkanoyl group, a hydroxyalkyl group, or a phenyl group, a benzoyl group or a benzyl group which may be substituted, $R_{DF3}$ represents a hydrogen atom, an alkyl group, an alkoxy group, an alkoxyalkoxy group, a carboxyl group or a sulfonate group, $R_{DF4}$ and $_{RD5}$ each independently represents a substituted or unsubstituted amino group, a substituted or unsubstituted hydroxyl group or a chlorine atom, and $m_{DF}$ represents 1 or 2:

Formula (DG-1)

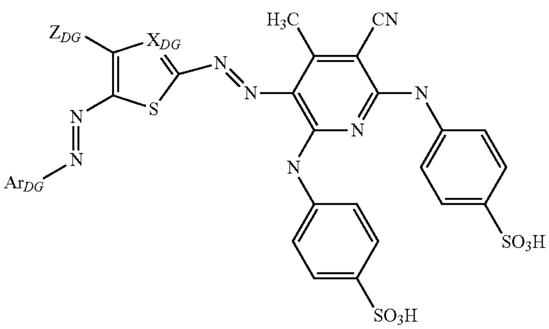

wherein in Formula (DG-1), $X_{DG}$ represents N or C(CN), $Z_{DG}$ represents an alkyl group which may be substituted, an aryl group which may be substituted or a heterocyclic group which may be substituted, and $Ar_{DG}$ is an aryl group substituted with at least one nitro group, and may further have a substituent:

(TA-4)

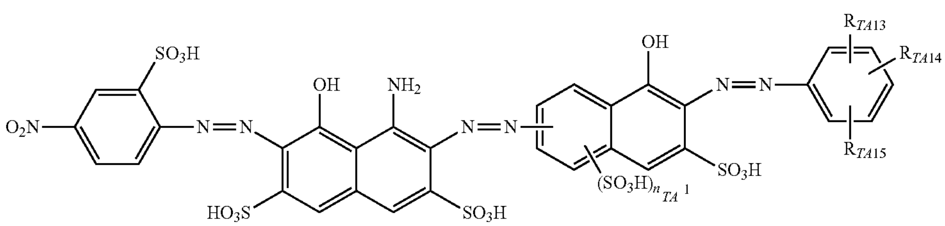

wherein in Formula (TA-4), $R_{TA13}$, $R_{TA14}$ and $R_{TA15}$ each independently represents a hydrogen atom, a halogen atom, a cyano group, a carboxyl group, a sulfo group, a sulfamoyl group which may be substituted with an alkyl group having 1 to 4 carbon atoms or a phenyl group, a phosphate group, a nitro group, an acyl group, a ureido group, an alkyl group having 1 to 4 carbon atoms which may be substituted with a hydroxyl group or an alkoxy group having 1 to 4 carbon atoms, an alkoxy group having 1 to 4 carbon atoms having which may be substituted with a hydroxyl group, an alkoxy group having 1 to 4 carbon atoms, a sulfo group or a carboxyl group, or an acylamino group, and at least one of $R_{TA13}$, $R_{TA14}$ and $R_{TA15}$ is a sulfo group or a carboxyl group, and $n_{TA}1$ is 0 or 1:

(TA-6)

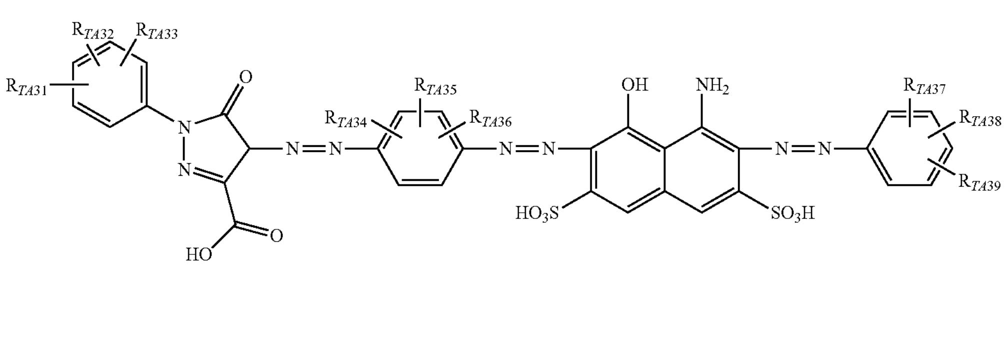

wherein in Formula (TA-6), $R_{TA31}$ to $R_{TA39}$ independently represent a group selected from the group consisting of H, OH, $SO_3H$, $PO_3H_2$, $CO_2H$, $NO_2$ and $NH_2$:

Formula (TB-1)

Formula (TB-1)

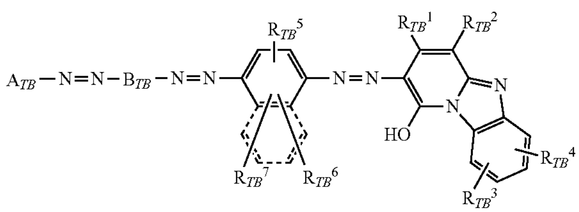

wherein in Formula (TB-1), $R_{TB}^1$ represents an unsubstituted alkyl group having 1 to 4 carbon atoms; a carboxy-substituted alkyl group having 2 to 5 carbon atoms; an unsubstituted phenyl group; a sulfo-substituted phenyl group or a carboxyl group, $R_{TB}^2$ represents a cyano group; a carbamoyl group; or a carboxyl group, $R_{TB}^3$ and $R_{TB}^4$ each independently represents a hydrogen atom; a methyl group; a chlorine atom or a sulfo group, a ring substituted with $R_{TB}^5$, $R_{TB}^6$ and $R_{TB}^7$ represents a benzene ring when a ring shown as broken lines is not present or a naphthalene ring when the ring shown as broken lines is present, $R_{TB}^5$, $R_{TB}^6$ and $R_{TB}^7$ each independently represent a hydrogen atom; a carboxyl group; a sulfo group; a hydroxyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a hydroxyalkoxy group having 1 to 4 carbon atoms, a sulfo group or a carboxyl group; or an acetylamino group, $A_{TB}$ is a substituted phenyl group or a substituted naphthyl group, and a substituent of $A_{TB}$ is selected from the group consisting of a carboxyl group; a sulfo group; a hydroxyl group; unsubstituted benzenesulfonyloxy group; a benzenesulfonyloxy group whose benzene ring is substituted with a methyl group, a nitro group or a chlorine atom; a chlorine atom; a cyano group; a nitro group; a sulfamoyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a sulfo group or a carboxyl group; an unsubstituted alkylsulfonyl group having 1 to 4 carbon atoms; an alkylsulfonyl group having 1 to 4 carbon atoms substituted with a hydroxyl group, a sulfo group or a carboxyl group; an unsubstituted alkylaminosulfonyl group having 1 to 8 carbon atoms; an alkylaminosulfonyl group having 1 to 8 carbon atoms substituted with a hydroxyl group, a sulfo group or a carboxyl group; an unsubstituted alkylcarbonylamino group having 1 to 8 carbon atoms; a carboxy-substituted alkylcarbonylamino group having 2 to 9 carbon atoms; an unsubstituted benzoylamino group; a benzoylamino group whose benzene ring is substituted with a sulfo group, a carboxyl group, a chlorine atom or an alkyl group having 1 to 4 carbon atoms; an unsubstituted benzenesulfonylamino group; a benzenesulfonylamino group whose benzene ring is substituted with a methyl group, a nitro group or a chlorine atom; a trifluoromethyl group; an acetyl group; and a benzoyl group, $B_{TB}$ is a substituted phenylene group, or a divalent substituted thiophene group or a divalent substituted thiazole group which is bound with an azo group at the 2- and 5-positions, and a substituent of $B_{TB}$ is selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms, or a sulfo-substituted alkoxy group having 1 to 4 carbon atoms:

Formula (TC-2)

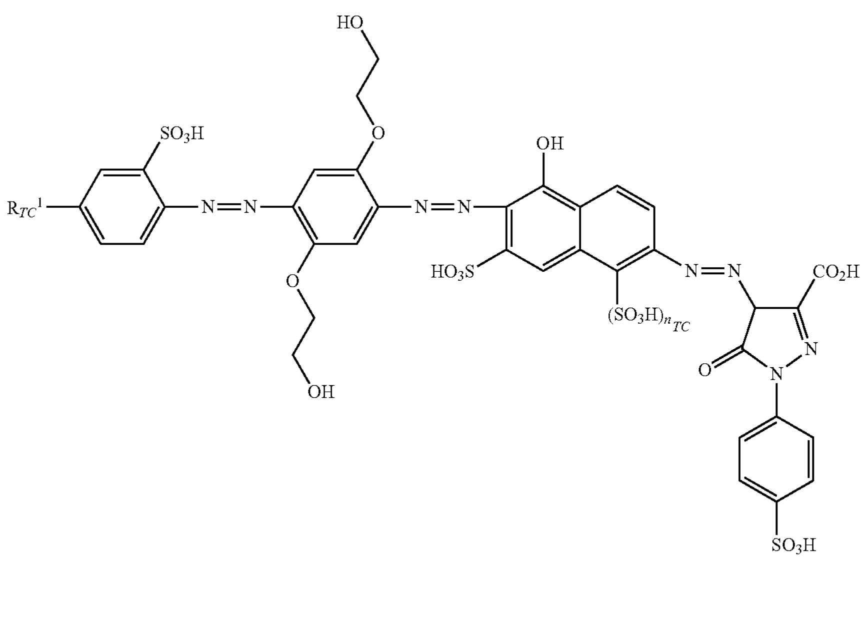

wherein in Formula (TC-2), $R_{TC}^{1}$ represents an alkyl group having 1 to 4 carbon atoms or an alkoxy group having 1 to 4 carbon atoms, and $n_{TC}$ is 0 or 1:

Formula (TD-1)

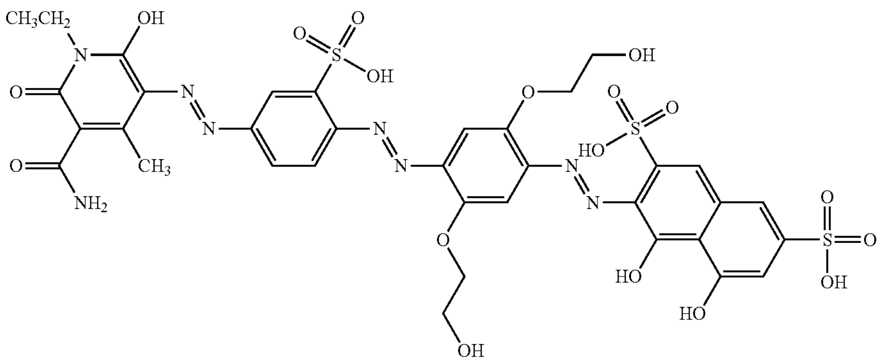

Formula (QA-1)

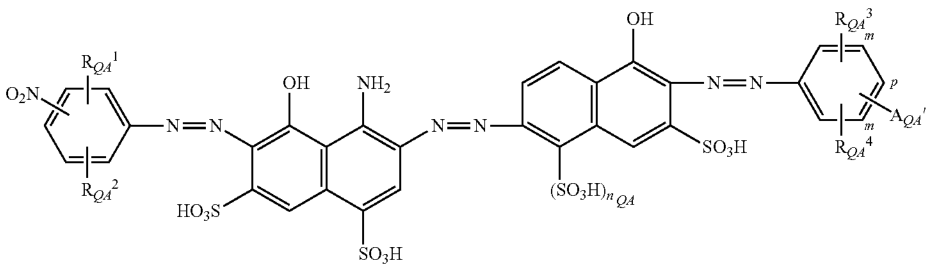

wherein in Formula (QA-1), $A_{QA}'$ is represented by the following Formula (QA-1a-1), and a substitution position of $A_{QA}'$ is m-position or p-position with respect to the azo group, $R_{QA}^{1}$ and $R_{QA}^{2}$ each independently represents a hydrogen atom; a halogen atom; a cyano group; carboxyl group; a sulfo group; a sulfamoyl group; an N-alkylaminosulfonyl group; an N-phenylaminosulfonyl group; a phospho group; a nitro group; an acyl group; a ureido group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfo group or a carboxyl group; or an acylamino group which may be substituted with an alkoxy group having 1 to 4 carbon atoms, a sulfo group or a carboxyl group, $R_{QA}^{3}$ and $R_{QA}^{4}$ each independently represents a hydrogen atom; a halogen atom; a cyano group; a carboxyl group; a sulfo group; a nitro group; an alkyl group having 1 to 4 carbon atoms; a hydroxyl group; or an alkoxy group having 1 to 4 carbon atoms which may be substituted with an alkoxy group having 1 to 4 carbon atoms or a sulfo group, and $n_{QA}$ is 0 or 1:

Formula (QA-1a-1)

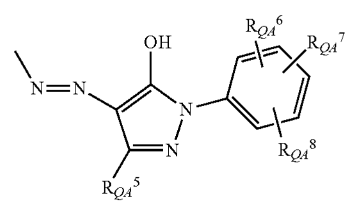

wherein in Formula (QA-1a-1), $R_{QA}^{5}$ represents a cyano group; a carboxyl group; an alkyl group having 1 to 4 carbon atoms; an alkoxycarbonyl group having 1 to 4 carbon atoms or a phenyl group, and $R_{QA}^{6}$, $R_{QA}^{7}$ and $R_{QA}^{8}$ each independently represents a hydrogen atom; a halogen atom; a cyano group; a carboxyl group; a sulfo group; a nitro group, an alkyl group having 1 to 4 carbon atoms; an alkoxy group having 1 to 4 carbon atoms which may be substituted with a hydroxyl group, an alkoxy group having 1 to 4 carbon atoms or a sulfo group; or an acylamino group which may be substituted with a hydroxyl group, an alkoxy group having 1 to 4 carbon atoms or a sulfo group.

10. The ink composition according to claim 1, wherein a mass ratio of a content (% by mass) of the first water-soluble long-wavelength dye to a content (% by mass) of the second water-soluble long-wavelength dye in the ink composition is 0.5 to 5.0.

11. An ink for inkjet recording comprising the ink composition according to claim 1.

12. An ink composition comprising at least two kinds of water-soluble long-wavelength dyes whose absorption spectrum in an aqueous solvent has a maximum wavelength of 550 nm to 700 nm, wherein at least one kind of the water-soluble long-wavelength dyes is a first water-soluble long-wavelength dye of an azo compound represented by the following Formula (3-2), at least one kind of the water-soluble long-wavelength dyes is a second water-soluble long-wavelength dye that is different from the first water-soluble long-wavelength dye, and the second water-soluble long-wavelength dye is a compound having two to four azo groups conjugated with each other per molecule:

Formula (3-2)

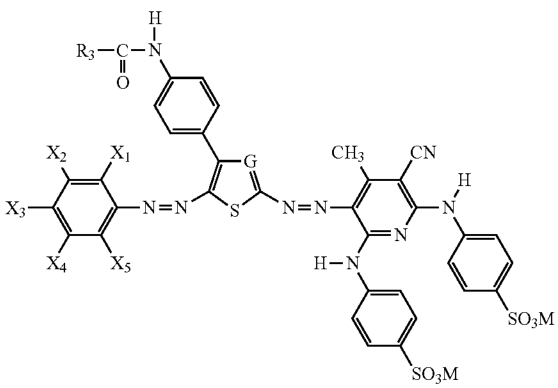

wherein in Formula (3-2), G represents a nitrogen atom or $—C(R_2)═$, and $R_2$ represents a hydrogen atom, a sulfo group, a carboxyl group, a substituted or unsubstituted carbamoyl group or a cyano group, $R_3$ represents a monovalent substituent, $X_1$, $X_2$, $X_3$, $X_4$ and $X_5$ each independently represents a hydrogen atom or a monovalent substituent, and M's each independently represent a hydrogen atom or a monovalent countercation.

13. The ink composition according to claim 12, wherein the azo compound represented by Formula (3-2) is an azo compound represented by the following Formula (4-2):

Formula (4-2)

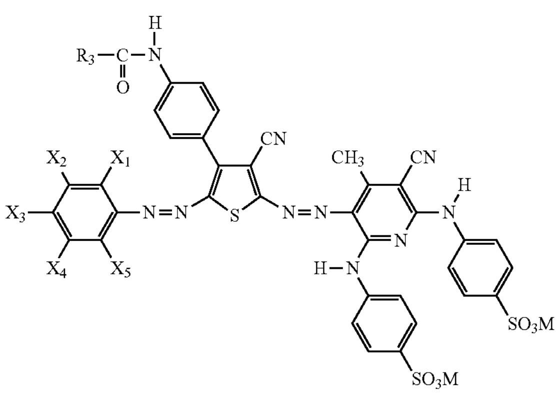

wherein in Formula (4-2), $R_3$ represents a monovalent substituent, $X_1$, $X_2$, $X_3$, $X_4$ and $X_5$ each independently represents a hydrogen atom or a monovalent substituent, and M's each independently represent a hydrogen atom or a monovalent countercation.

14. The ink composition according to claim 12, wherein the azo compound represented by Formula (3-2) has at least three ionic hydrophilic groups selected from the group consisting of a sulfo group, a carboxyl group and a salt thereof.

15. The ink composition according to claim 12, wherein in the azo compound represented by Formula (3-2), at least one M is a lithium ion.

16. The ink composition according to claim 12, wherein the second water-soluble long-wavelength dye is a compound or a salt thereof, the compound represented by any one of the following Formulas (DC-1), (DF-1), (DG-1), (TA-4), (TA-6), (TB-1), (TC-2), (TD-1) and (QA-1):

Formula (DC-1)

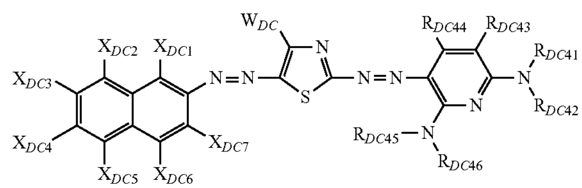

wherein in Formula (DC 1), $W_{DC}$,$R_{DC43}$, $R_{DC44}$ each independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be substituted, $R_{DC41}$, $R_{DC42}$, $R_{DC45}$ and $R_{DC46}$ each independently represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group, and each group may be substituted, provided that $R_{DC41}$ and $R_{DC42}$ do not represent a hydrogen atom at the same time, and $R_{DC43}$ and $R_{DC41}$, $R_{DC41}$ and $R_{DC42}$, or $R_{DC45}$ and $R_{DC46}$ may be bound with each other to form a 5- or 6-membered ring, $X_{DC1}$, $X_{DC2}$, $X_{DC3}$, $X_{DC4}$, $X_{DC5}$, $X_{DC6}$ and $X_{DC7}$ represent a monovalent group, provided that Formula (DC-1) contains at least one ionic hydrophilic group selected from the group consisting of a carboxyl group, a sulfo group and a salt thereof:

Formula (DF-1)

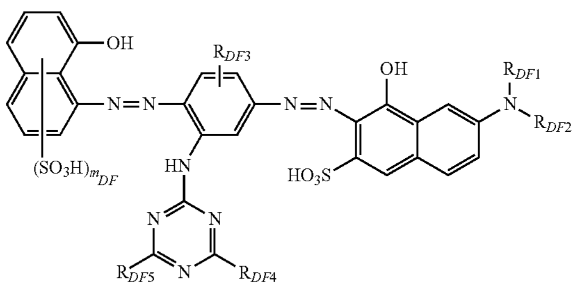

wherein in Formula (DF-1), $R_{DF1}$ and $R_{DF2}$ each independently represents a hydrogen atom, an alkyl group, an alkanoyl group, a hydroxyalkyl group, or a phenyl group, a benzoyl group or a benzyl group which may be substituted, $R_{DF3}$ represents a hydrogen atom, an alkyl group, an alkoxy group, an alkoxyalkoxy group, a carboxyl group or a sulfonate group, $R_{DF4}$ and $R_{DF5}$ each independently represents a substituted or unsubstituted amino group, a substituted or unsubstituted hydroxyl group or a chlorine atom, and $m_{DF}$ represents 1 or 2:

Formula (DG-1)

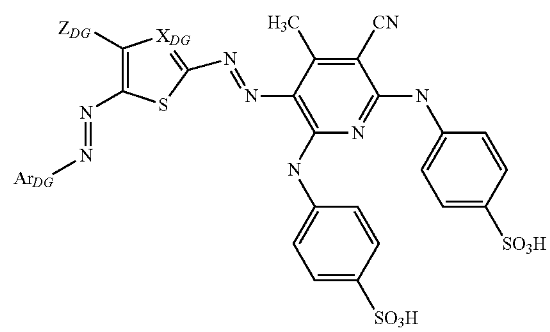

wherein in Formula (DG-1), $X_{DG}$ represents N or C(CN), $Z_{DG}$ represents an alkyl group which may be substituted, an aryl group which may be substituted or a heterocyclic group which may be substituted, and $Ar_{DG}$ is an aryl group substituted with at least one nitro group, and may further have a substituent:

(TA-4)

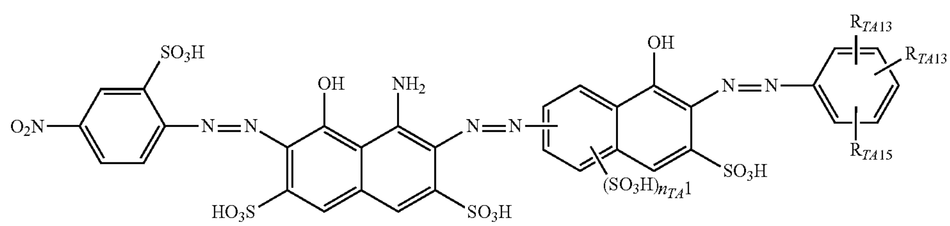

wherein in Formula (TA-4), $R_{TA13}$, $R_{TA14}$ and $R_{TA15}$ each independently represents a hydrogen atom, a halogen atom, a cyano group, a carboxyl group, a sulfo group, a sulfamoyl group which may be substituted with an alkyl group having 1 to 4 carbon atoms or a phenyl group, a phosphate group, a nitro group, an acyl group, a ureido group, an alkyl group having 1 to 4 carbon atoms which may be substituted with a hydroxyl group or an alkoxy group having 1 to 4 carbon atoms, an alkoxy group having 1 to 4 carbon atoms having which may be substituted with a hydroxyl group, an alkoxy group having 1 to 4 carbon atoms, a sulfo group or a carboxyl group, or an acylamino group, and at least one of $R_{TA13}$, $R_{TA14}$ and $R_{TA15}$ is a sulfo group or a carboxyl group, and $n_{TA}1$ is 0 or 1:

(TA-6)

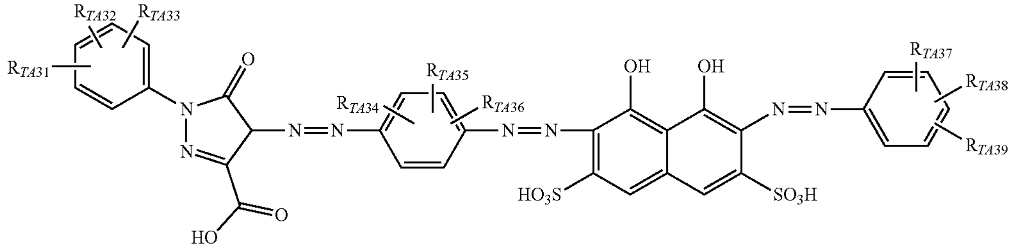

wherein in Formula (TA-6), $R_{TA31}$ to $R_{TA39}$ independently represent a group selected from the group consisting of H, OH, $SO_3H$, $PO_3H_2$, $CO_2H$, $NO_2$ and $NH_2$:

Formula (TB-1)

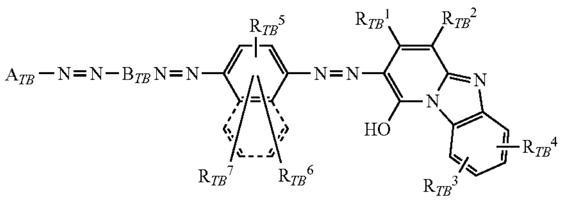

wherein in Formula (TB-1), $R_{TB}^1$ represents an unsubstituted alkyl group having 1 to 4 carbon atoms; a carboxy-substituted alkyl group having 2 to 5 carbon atoms; an unsubstituted phenyl group; a sulfo-substituted phenyl group or a carboxyl group, $R_{TB}^2$ represents a cyano group; a carbamoyl group; or a carboxyl group, $R_{TB}^3$ and $R_{TB}^4$ each independently represents a hydrogen atom; a methyl group; a chlorine atom or a sulfo group, a ring substituted with $R_{TB}^5$, $R_{TB}^6$ and $R_{TB}^7$ represents a benzene ring when a ring shown as broken lines is not present or a naphthalene ring when the ring shown as broken lines is present, $R_{TB}^5$, $R_{TB}^6$ and $R_{TB}^7$ each independently represents a hydrogen atom; a carboxyl group; a sulfo group; a hydroxyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a hydroxyalkoxy group having 1 to 4 carbon atoms, a sulfo group or a carboxyl group; or an acetylamino group, $A_{TB}$ is a substituted phenyl group or a substituted naphthyl group, and a substituent of $A_{TB}$ is selected from the group consisting of a carboxyl group; a sulfo group; a hydroxyl group; unsubstituted benzenesulfonyloxy group; a benzenesulfonyloxy group whose benzene ring is substituted with a methyl group, a nitro group or a chlorine atom; a chlorine atom; a cyano group; a nitro group; a sulfamoyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a sulfo group or a carboxyl group; an unsubstituted alkylsulfonyl group having 1 to 4 carbon atoms; an alkylsulfonyl group having 1 to 4 carbon atoms substituted with a hydroxyl group, a sulfo group or a carboxyl group; an unsubstituted alkylaminosulfonyl group having 1 to 8 carbon atoms; an alkylaminosulfonyl group having 1 to 8 carbon atoms substituted with a hydroxyl group, a sulfo group or a carboxyl group; an unsubstituted alkylcarbonylamino group having 1 to 8 carbon atoms; a carboxy-substituted alkylcarbonylamino group having 2 to 9 carbon atoms; an unsubstituted benzoylamino group; a benzoylamino group whose benzene ring is substituted with a sulfo group, a carboxyl group, a chlorine atom or an alkyl group having 1 to 4 carbon atoms; an unsubstituted benzenesulfonylamino group; a benzenesulfonylamino group whose benzene ring is substituted with a methyl group, a nitro group or a chlorine atom; a trifluoromethyl group; an acetyl group; and a benzoyl group, $B_{TB}$ is a substituted phenylene group, or a divalent substituted thiophene group or a divalent substituted thiazole group which is bound with an azo group at the 2- and 5-positions, and a substituent of $B_{TB}$ is selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms, or a sulfo-substituted alkoxy group having 1 to 4 carbon atoms:

Formula (TC-2)

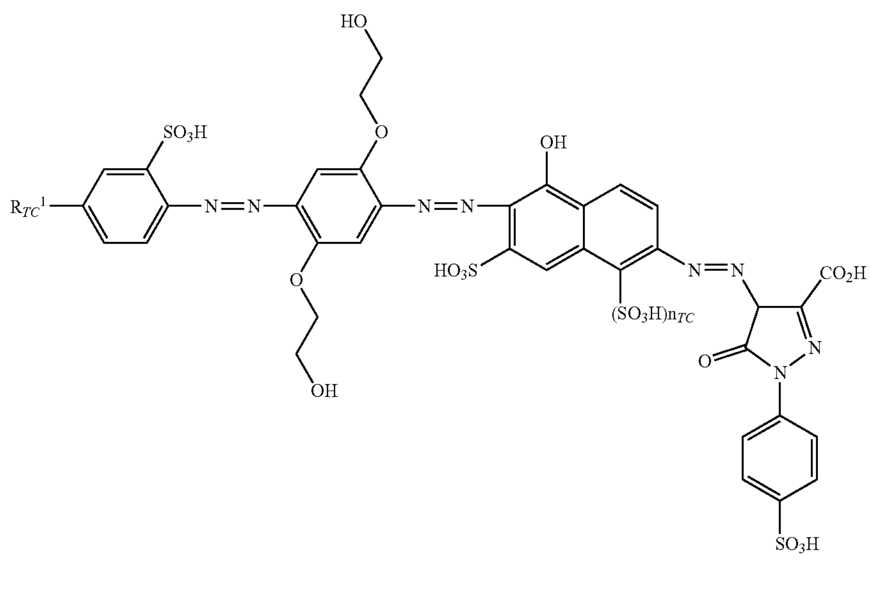

wherein in Formula (TC-2), $R_{TC}^1$ represents an alkyl group having 1 to 4 carbon atoms or an alkoxy group having 1 to 4 carbon atoms, and $n_{TC}$ is 0 or 1:

Formula (TD-1)

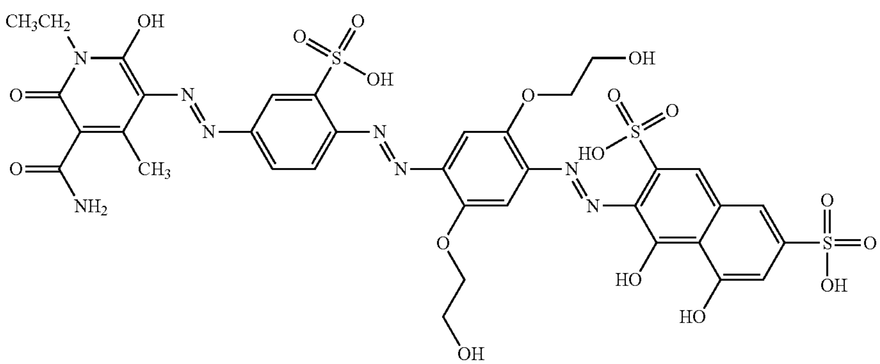

Formula (QA-1)

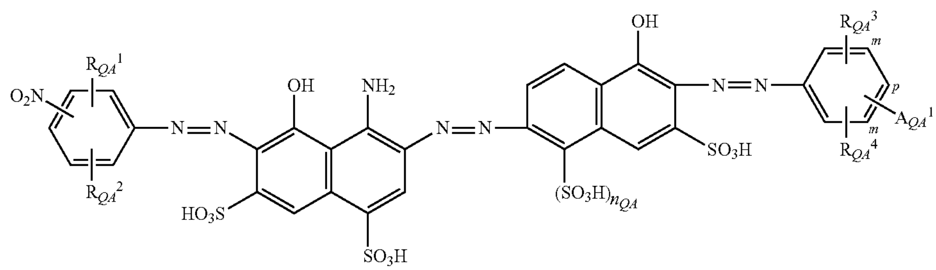

wherein in Formula (QA-1), $A_{QA}'$ is represented by the following Formula (QA-1a-1), and a substitution position of $A_{QA}'$ is m-position or p-position with respect to the azo group, $R_{QA}^1$ and $R_{QA}^2$ each independently represents a hydrogen atom; a halogen atom; a cyano group; carboxyl group; a sulfo group; a sulfamoyl group; an N-alkylaminosulfonyl group; an N-phenylaminosulfonyl group; a phospho group; a nitro group; an acyl group; a ureido group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfo group or a carboxyl group; or an acylamino group which may be substituted with an alkoxy group having 1 to 4 carbon atoms, a sulfo group or a carboxyl group, $R_{QA}^3$ and $R_{QA}^4$ each independently represents a hydrogen atom; a halogen atom; a cyano group; a carboxyl group; a sulfo group; a nitro group; an alkyl group having 1 to 4 carbon atoms; a hydroxyl group; or an alkoxy group having 1 to 4 carbon atoms which may be substituted with an alkoxy group having 1 to 4 carbon atoms or a sulfo group, and $n_{QA}$ is 0 or 1:

Formula (QA-1a-1)

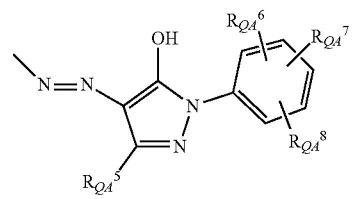

wherein in Formula (QA-1a-1), $R_{QA}^5$ represents a cyano group; a carboxyl group; an alkyl group having 1 to 4 carbon atoms; an alkoxycarbonyl group having 1 to 4 carbon atoms or a phenyl group, and $R_{QA}^6$, $R_{QA}^7$ and $R_{QA}^8$ each independently represents a hydrogen atom; a halogen atom; a cyano group; a carboxyl group; a sulfo group; a nitro group, an alkyl group having 1 to 4 carbon atoms; an alkoxy group having 1 to 4 carbon atoms which may be substituted with a hydroxyl group, an alkoxy group having 1 to 4 carbon atoms or a sulfo group; or an acylamino group which may be substituted with a hydroxyl group, an alkoxy group having 1 to 4 carbon atoms or a sulfo group.

17. The ink composition according to claim 12, wherein a mass ratio of a content (% by mass) of the first water-soluble long-wavelength dye to a content (% by mass) of the second water-soluble long-wavelength dye in the ink composition is 0.5 to 5.0.

18. An ink for inkjet recording comprising the ink composition according to claim 12.

19. An ink composition comprising at least two kinds of water-soluble long-wavelength dyes whose absorption spectrum in an aqueous solvent has a maximum wavelength of 550 nm to 700 nm, wherein at least one kind of the water-soluble long-wavelength dyes is a first water-soluble long-wavelength dye of an azo compound represented by the following Formula (2-1), at least one kind of the water-soluble long-wavelength dyes is a second water-soluble long-wavelength dye that is different from the first water-soluble long-wavelength dye, and the second water-soluble long-wavelength dye is a compound having two to four azo groups conjugated with each other per molecule:

Formula (2-1)

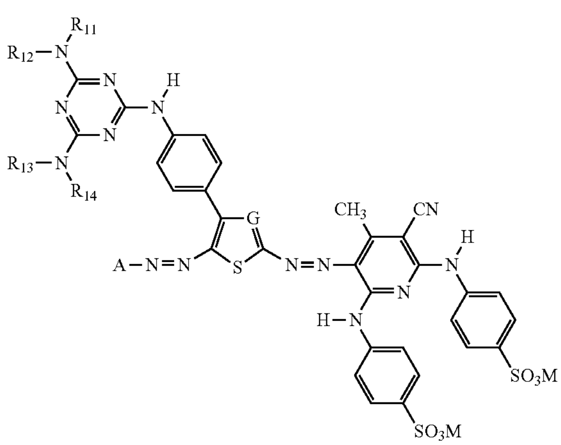

wherein in Formula (2-1), G represents a nitrogen atom or —C($R_2$)═, and $R_2$ represents a hydrogen atom, a sulfo group, a carboxyl group, a substituted or unsubstituted carbamoyl group or a cyano group, $R_{11}$, $R_{12}$, $R_{13}$ and $R_{14}$ each independently represents a hydrogen atom or a monovalent substituent, A represents a substituted or unsubstituted aryl group or a substituted or unsubstituted nitrogen-containing 5-membered heterocyclic group, and M's each independently represent a hydrogen atom or a monovalent countercation, the azo compound represented by Formula (2-1) has at least three ionic hydrophilic groups selected from the group consisting of a sulfo group, a carboxyl group and a salt thereof, in the azo compound represented by Formula (2-1), at least one M is a lithium ion, the second water-soluble long-wavelength dye is a compound or a salt thereof, the compound represented by any one of the following Formulas (DC-1), (DF-1), (DG-1), (TA-4), (TA-6), (TB-1), (TC-2), (TD-1) and (QA-1):

Formula (DC-1)

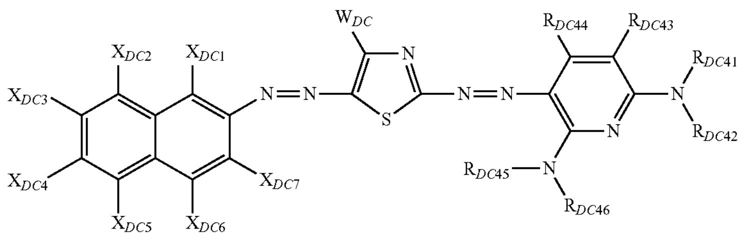

wherein in Formula (DC-1), $W_{DC}$, $R_{DC43}$ and $R_{DC44}$ each independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be substituted, $R_{D41}$, $R_{DC42}$, $R_{DC45}$ and $R_{DC46}$ each independently represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group, and each group may be substituted, provided that $R_{DC41}$ and $_{RDC42}$ do not represent a hydrogen atom at the same time, and $R_{DC43}$ and $R_{DC41}$, $R_{DC41}$ and $R_{DC42}$, or $R_{DC45}$ and $R_{DC46}$ may be bound with each other to form a 5- or 6-membered ring, $X_{DC1}$, $X_{DC2}$, $X_{DC3}$, $X_{DC4}$, $X_{DC5}$, $X_{DC6}$ and $X_{DC7}$ represent a monovalent group, provided that Formula (DC-1) contains at least one ionic hydrophilic group selected from the group consisting of a carboxyl group, a sulfo group and a salt thereof:

Formula (DF-1)

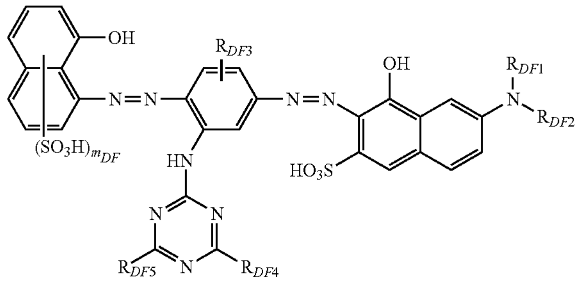

wherein in Formula (DF-1), $R_{DF1}$ and $R_{DF2}$ each independently represents a hydrogen atom, an alkyl group, an alkanoyl group, a hydroxyalkyl group, or a phenyl group, a benzoyl group or a benzyl group which may be substituted, $R_{DF3}$ represents a hydrogen atom, an alkyl group, an alkoxy group, an alkoxyalkoxy group, a carboxyl group or a sulfonate group, $R_{DF4}$ and $R_{DF5}$ each independently represents a substituted or unsubstituted amino group, a substituted or unsubstituted hydroxyl group or a chlorine atom, and $m_{DF}$ represents 1 or 2:

Formula (DG-1)

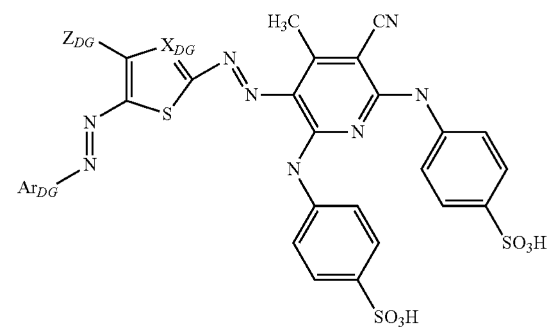

wherein in Formula (DG-1), $X_{DG}$ represents N or C(CN), $Z_{DG}$ represents an alkyl group which may be substituted, an aryl group which may be substituted or a heterocyclic group which may be substituted, and $Ar_{DG}$ is an aryl group substituted with at least one nitro group, and may further have a substituent:

(TA-4)

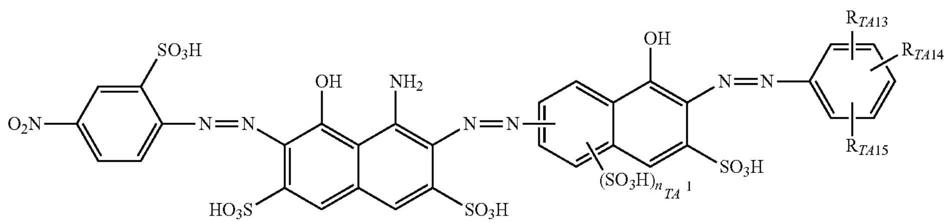

wherein in Formula (TA-4), $R_{TA13}$, $R_{TA14}$ and $R_{TA15}$ each independently represents a hydrogen atom, a halogen atom, a cyano group, a carboxyl group, a sulfo group, a sulfamoyl group which may be substituted with an alkyl group having 1 to 4 carbon atoms or a phenyl group, a phosphate group, a nitro group, an acyl group, a ureido group, an alkyl group having 1 to 4 carbon atoms which may be substituted with a hydroxyl group or an alkoxy group having 1 to 4 carbon atoms, an alkoxy group having 1 to 4 carbon atoms having which may be substituted with a hydroxyl group, an alkoxy group having 1 to 4 carbon atoms, a sulfo group or a carboxyl group, or an acylamino group, and at least one of $R_{TA13}$, $R_{TA14}$ and $R_{TA15}$ is a sulfo group or a carboxyl group, and $n_{TA}1$ is 0 or 1:

(TA-6)

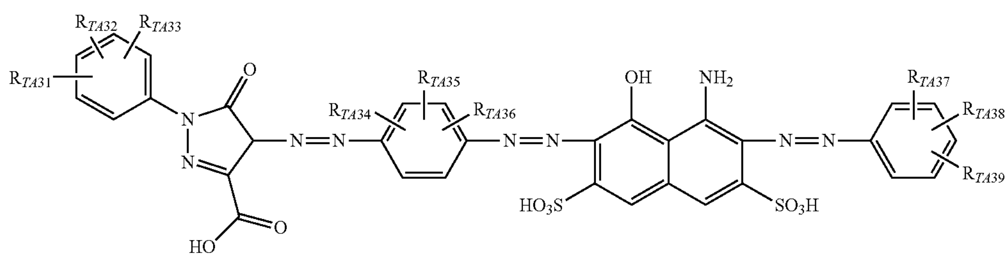

wherein in Formula (TA-6), $R_{TA31}$ to $R_{TA39}$ independently represent a group selected from the group consisting of H, OH, $SO_3H$, $PO_3H_2$, $CO_2H$, $NO_2$ and $NH_2$:

Formula (TB-1)

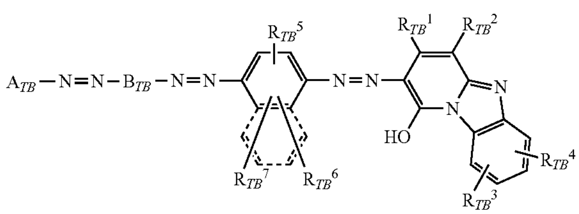

wherein in Formula (TB-1), $R_{TB}^1$ represents an unsubstituted alkyl group having 1 to 4 carbon atoms; a carboxy-substituted alkyl group having 2 to 5 carbon atoms; an unsubstituted phenyl group; a sulfo-substituted phenyl group or a carboxyl group, $R_{TB}^2$ represents a cyano group; a carbamoyl group; or a carboxyl group, $R_{TB}^3$ and $R_{TB}^4$ each independently represents a hydrogen atom; a methyl group; a chlorine atom or a sulfo group, a ring substituted with $R_{TB}^5$, $R_{TB}^6$ and $R_{TB}^7$ represents a benzene ring when a ring shown as broken lines is not present or a naphthalene ring when the ring shown as broken lines is present, $R_{TB}^5$, $R_{TB}^6$ and $R_{TB}^7$ each independently represents a hydrogen atom; a carboxyl group; a sulfo group; a hydroxyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a hydroxyalkoxy group having 1 to 4 carbon atoms, a sulfo group or a carboxyl group; or an acetylamino group, $A_{TB}$ is a substituted phenyl group or a substituted naphthyl group, and a substituent of $A_{TB}$ is selected from the group consisting of a carboxyl group; a sulfo group; a hydroxyl group; unsubstituted benzenesulfonyloxy group; a benzenesulfonyloxy group whose benzene ring is substituted with a methyl group, a nitro group or a chlorine atom; a chlorine atom; a cyano group; a nitro group; a sulfamoyl group; an unsubstituted alkyl group having 1 to 4 carbon atoms; an unsubstituted alkoxy group having 1 to 4 carbon atoms; an alkoxy group having 1 to 4 carbon atoms substituted with a hydroxyl group, an unsubstituted alkoxy group having 1 to 4 carbon atoms, a sulfo group or a carboxyl group; an unsubstituted alkylsulfonyl group having 1 to 4 carbon atoms; an alkylsulfonyl group having 1 to 4 carbon atoms substituted with a hydroxyl group, a sulfo group or a carboxyl group; an unsubstituted alkylaminosulfonyl group having 1 to 8 carbon atoms; an alkylaminosulfonyl group having 1 to 8 carbon atoms substituted with a hydroxyl group, a sulfo group or a carboxyl group; an unsubstituted alkylcarbonylamino group having 1 to 8 carbon atoms; a carboxy-substituted alkylcarbonylamino group having 2 to 9 carbon atoms; an unsubstituted benzoylamino group; a benzoylamino group whose benzene ring is substituted with a sulfo group, a carboxyl group, a chlorine atom or an alkyl group having 1 to 4 carbon atoms; an unsubstituted benzenesulfonylamino group; a benzenesulfonylamino group whose benzene ring is substituted with a methyl group, a nitro group or a chlorine atom; a trifluoromethyl group; an acetyl group; and a benzoyl group, $B_{TB}$ is a substituted phenylene group, or a divalent substituted thiophene group or a divalent substituted thiazole group which is bound with an azo group at the 2- and 5-positions, and a substituent of $B_{TB}$ is selected from the group consisting of a cyano group; a carbamoyl group; an unsubstituted alkyl group having 1 to 4 carbon atoms; an unsubstituted phenyl group; a phenyl group whose benzene ring is substituted with a methyl group, a methoxy group, an acetylamino group, a nitro group, a sulfo group, a carboxyl group, a cyano group, a carbamoyl group, a fluorine atom, a chlorine atom or a bromine atom; an unsubstituted naphthyl group; and a naphthyl group whose naphthalene ring is substituted with a methyl group, a bromine atom, a carboxyl group, a sulfo group, an unsubstituted alkoxy group having 1 to 4 carbon atoms, or a sulfo-substituted alkoxy group having 1 to 4 carbon atoms:

Formula (TC-2)

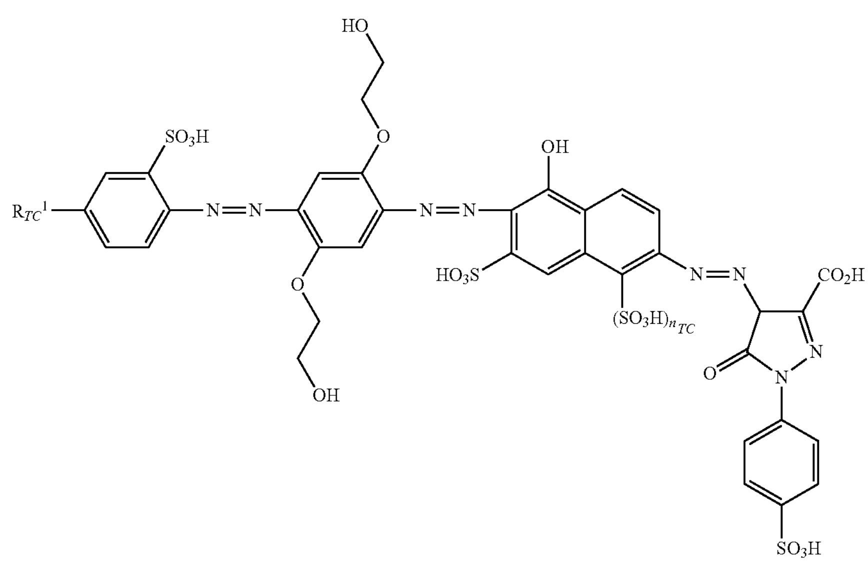

wherein in Formula (TC-2), $R_{TC}^1$ represents an alkyl group having 1 to 4 carbon atoms or an alkoxy group having 1 to 4 carbon atoms, and $n_{TC}$ is 0 or 1:

Formula (TD-1)

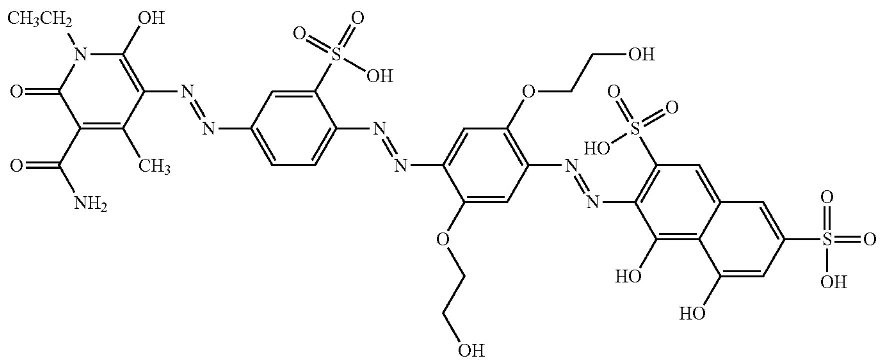

Formula (QA-1)

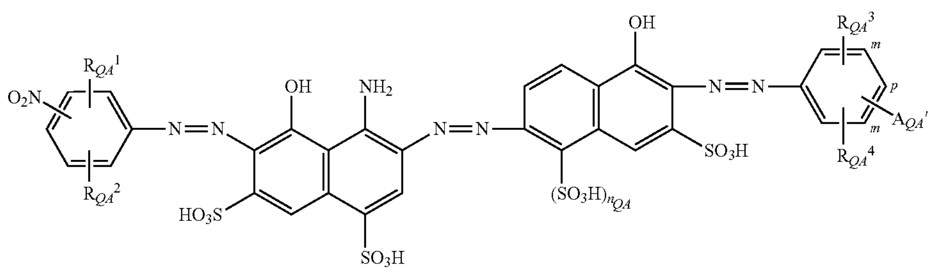

wherein in Formula (QA-1), $A_{QA}'$ is represented by the following Formula (QA-1a-1), and a substitution position of $A_{QA}'$ is m-position or p-position with respect to the azo group, $R_{QA}^1$ and $R_{QA}^2$ each independently represents a hydrogen atom; a halogen atom; a cyano group; carboxyl group; a sulfo group; a sulfamoyl group; an N-alkylaminosulfonyl group; an N-phenylaminosulfonyl group; a phospho group; a nitro group; an acyl group; a ureido group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfo group or a carboxyl group; or an acylamino group which may be substituted with an alkoxy group having 1 to 4 carbon atoms, a sulfo group or a carboxyl group, $R_{QA}^3$ and $R_{QA}^4$ each independently represents a hydrogen atom; a halogen atom; a cyano group; a carboxyl group; a sulfo group; a nitro group; an alkyl group having 1 to 4 carbon atoms; a hydroxyl group; or an alkoxy group having 1 to 4 carbon atoms which may be substituted with an alkoxy group having 1 to 4 carbon atoms or a sulfo group, and $n_{QA}$ is 0 or 1:

Formula (QA-1a-1)

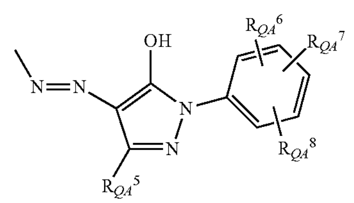

wherein in Formula (QA-1a-1), $R_{QA}^5$ represents a cyano group; a carboxyl group; an alkyl group having 1 to 4 carbon atoms; an alkoxycarbonyl group having 1 to 4 carbon atoms or a phenyl group, and $R_{QA}^6$, $R_{QA}^7$ and $R_{QA}^8$ each independently represents a hydrogen atom; a halogen atom; a cyano group; a carboxyl group; a sulfo group; a nitro group, an alkyl group having 1 to 4 carbon atoms; an alkoxy group having 1 to 4 carbon atoms which may be substituted with a hydroxyl group, an alkoxy group having 1 to 4 carbon atoms or a sulfo group; or an acylamino group which may be substituted with a hydroxyl group, an alkoxy group having 1 to 4 carbon atoms or a sulfo group, and a mass ratio of a content (% by mass) of the first water-soluble long-wavelength dye to a content (% by mass) of the second water-soluble long-wavelength dye in the ink composition is 0.5 to 5.0.

* * * * *